US012497713B2

(12) United States Patent
Drmanac et al.

(10) Patent No.: US 12,497,713 B2
(45) Date of Patent: Dec. 16, 2025

(54) SINGLE TUBE BEAD-BASED DNA CO-BARCODING FOR ACCURATE AND COST-EFFECTIVE SEQUENCING, HAPLOTYPING, AND ASSEMBLY

(71) Applicants: MGI Tech Co., Ltd., Guangdong (CN); BGI Shenzhen, Guangdong (CN)

(72) Inventors: Radoje T. Drmanac, San Jose, CA (US); Brock A. Peters, San Jose, CA (US); Ou Wang, Shenzhen (CN)

(73) Assignees: MGI Tech Co., Ltd., Shenzhen (CN); BGI Shenzhen, Shenzhen (CN)

( * ) Notice: Subject to any disclaimer, the term of this patent is extended or adjusted under 35 U.S.C. 154(b) by 1307 days.

(21) Appl. No.: 17/051,870

(22) PCT Filed: May 7, 2019

(86) PCT No.: PCT/US2019/031161
§ 371 (c)(1),
(2) Date: Oct. 30, 2020

(87) PCT Pub. No.: WO2019/217452
PCT Pub. Date: Nov. 14, 2019

(65) Prior Publication Data

US 2021/0115595 A1 Apr. 22, 2021

Related U.S. Application Data

(60) Provisional application No. 62/687,159, filed on Jun. 19, 2018, provisional application No. 62/672,501,
(Continued)

(51) Int. Cl.

| | |
|---|---|
| ***C40B 50/16*** | (2006.01) |
| ***C12N 15/10*** | (2006.01) |
| ***C40B 20/04*** | (2006.01) |

(52) U.S. Cl.
CPC .......... *C40B 50/16* (2013.01); *C12N 15/1082* (2013.01); *C40B 20/04* (2013.01)

(58) Field of Classification Search
CPC ...... C40B 50/16; C40B 20/04; C12N 15/1082
(Continued)

(56) References Cited

U.S. PATENT DOCUMENTS

| | | |
|---|---|---|
| 6,451,996 B1 | 9/2002 | Drmanac et al. |
| 6,593,113 B1 | 7/2003 | Tenkanen et al. |

(Continued)

FOREIGN PATENT DOCUMENTS

| | | |
|---|---|---|
| CA | 3128098 A1 | 8/2020 |
| CN | 1193357 A | 9/1998 |

(Continued)

OTHER PUBLICATIONS

Zhang et al., "Haplotype phasing of whole human genomes using bead-based barcode partitioning in a single tube", Nature Biotechnology, Jun. 26, 2017, pp. 852-857, vol. 35 No 9.
(Continued)

*Primary Examiner* — Aaron A Priest
*Assistant Examiner* — Randi Lynn Beil
(74) *Attorney, Agent, or Firm* — Kilpatrick Townsend & Stockton LLP

(57) ABSTRACT

Methods and compositions for preparing a nucleic acid sequencing library are described including (a) transposing an insertion sequence into first fragments of the target nucleic acid, wherein the insertion sequence comprises a hybridization sequence, and wherein the transposing produces nicks in the first fragments; (b) combining in a single mixture (i) the first fragments of the target nucleic acid from (a), (ii) a splint oligonucleotide, and (iii) a population of beads, wherein each bead comprises capture oligonucleotides immobilized thereon, and (c) ligating capture oligo-
(Continued)

Figure 1A:
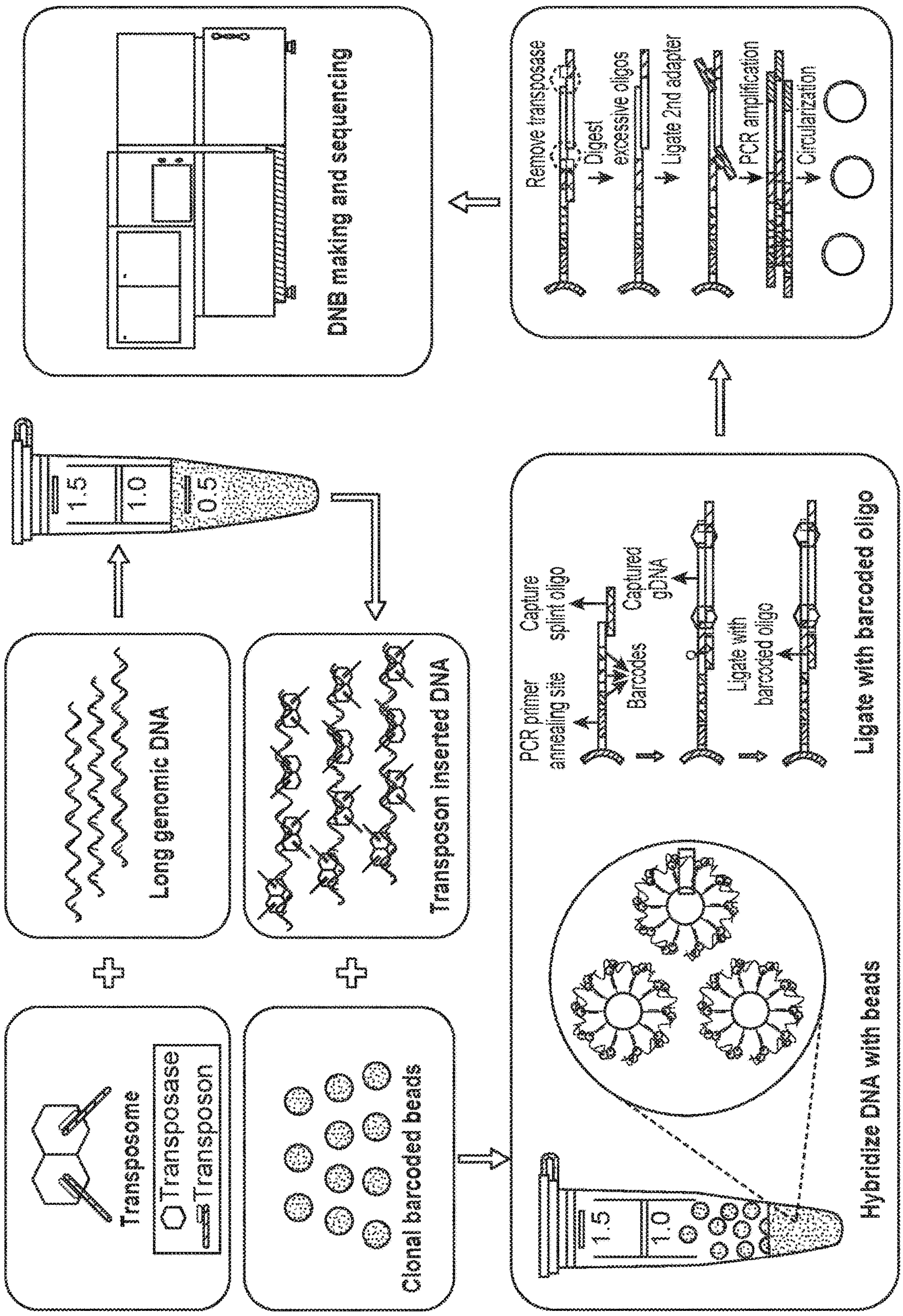

nucleotides of individual beads to inserted hybridization sequences of individual first fragments.

30 Claims, 64 Drawing Sheets

Specification includes a Sequence Listing.

Related U.S. Application Data filed on May 16, 2018, provisional application No. 62/668,757, filed on May 8, 2018.

(58) Field of Classification Search
USPC .............................................................. 506/4
See application file for complete search history.

(56) References Cited

U.S. PATENT DOCUMENTS

| | | | |
|---|---|---|---|
| 7,371,851 | B1 | 5/2008 | Lexow |
| 7,897,344 | B2 | 3/2011 | Dahl et al. |
| 7,901,890 | B2 | 3/2011 | Dahl et al. |
| 7,910,354 | B2 | 3/2011 | Drmanac et al. |
| 8,034,566 | B2 | 10/2011 | Drmanac et al. |
| 8,278,039 | B2 | 10/2012 | Drmanac |
| 8,445,197 | B2 | 5/2013 | Drmanac et al. |
| 8,518,640 | B2 | 8/2013 | Drmanac et al. |
| 8,551,702 | B2 | 10/2013 | Drmanac et al. |
| 8,592,150 | B2 | 11/2013 | Drmanac et al. |
| 8,609,335 | B2 | 12/2013 | Drmanac et al. |
| 8,615,365 | B2 | 12/2013 | Halpern et al. |
| 8,658,368 | B2 | 2/2014 | Quake et al. |
| 8,673,562 | B2 | 3/2014 | Drmanac |
| 8,722,326 | B2 | 5/2014 | Drmanac et al. |
| 8,765,382 | B2 | 7/2014 | Drmanac |
| 8,785,127 | B2 | 7/2014 | Drmanac |
| 9,040,256 | B2 | 5/2015 | Grunenwald et al. |
| 9,328,382 | B2 | 5/2016 | Drmanac et al. |
| 9,683,230 | B2 | 6/2017 | Gormley et al. |
| 10,023,910 | B2 | 7/2018 | Drmanac et al. |
| 12,071,659 | B2 | 8/2024 | Drmanac et al. |
| 2003/0040620 | A1 | 2/2003 | Langmore et al. |
| 2007/0072208 | A1 | 3/2007 | Drmanac |
| 2007/0269817 | A1 | 11/2007 | Shapero |
| 2008/0242560 | A1 | 10/2008 | Gunderson et al. |
| 2009/0176652 | A1 | 7/2009 | Dahl et al. |
| 2009/0203551 | A1 | 8/2009 | Dahl et al. |
| 2009/0233814 | A1 | 9/2009 | Bashkirov et al. |
| 2009/0270273 | A1 | 10/2009 | Burns et al. |
| 2009/0311691 | A1 | 12/2009 | Drmanac |
| 2010/0028888 | A1 | 2/2010 | Smith et al. |
| 2010/0069263 | A1 | 3/2010 | Shendure et al. |
| 2010/0105052 | A1 | 4/2010 | Drmanac et al. |
| 2010/0143908 | A1 | 6/2010 | Gillevet |
| 2010/0298170 | A1 | 11/2010 | Heredia et al. |
| 2011/0014623 | A1 | 1/2011 | Becker et al. |
| 2012/0003657 | A1 | 1/2012 | Myllykangas et al. |
| 2012/0100534 | A1 | 4/2012 | Drmanac et al. |
| 2012/0157322 | A1 | 6/2012 | Myllykangas et al. |
| 2012/0165202 | A1 | 6/2012 | Porreca et al. |
| 2012/0208705 | A1 | 8/2012 | Steemers et al. |
| 2012/0208724 | A1 | 8/2012 | Steemers et al. |
| 2012/0258892 | A1 | 10/2012 | Wang |
| 2012/0301925 | A1 | 11/2012 | Belyaev |
| 2012/0301926 | A1 | 11/2012 | Chen et al. |
| 2013/0124100 | A1 | 5/2013 | Drmanac et al. |
| 2013/0281305 | A1 | 10/2013 | Peck et al. |
| 2014/0051588 | A9 | 2/2014 | Drmanac et al. |
| 2014/0152793 | A1 | 6/2014 | Staker et al. |
| 2014/0323316 | A1 | 10/2014 | Drmanac et al. |
| 2015/0368638 | A1 | 12/2015 | Steemers et al. |
| 2016/0046985 | A1 | 2/2016 | Drmanac et al. |
| 2016/0376647 | A1 | 12/2016 | Travers et al. |
| 2017/0022554 | A1 | 1/2017 | Drmanac et al. |
| 2018/0044667 | A1 | 2/2018 | Geng |
| 2018/0044668 | A1 | 2/2018 | Jiang et al. |
| 2019/0002970 | A1 | 1/2019 | Drmanac et al. |

FOREIGN PATENT DOCUMENTS

| | | | |
|---|---|---|---|
| CN | 101278058 | A | 10/2008 |
| CN | 101432439 | | 5/2009 |
| CN | 102084001 | A | 6/2011 |
| CN | 105189308 | | 12/2015 |
| CN | 105593683 | A | 5/2016 |
| CN | 106795651 | | 5/2017 |
| CN | 107686842 | A | 2/2018 |
| EP | 2969847 | | 1/2016 |
| HK | 1218412 | A1 | 2/2017 |
| HK | 1218471 | | 2/2017 |
| HK | 1219709 | | 4/2017 |
| WO | 9523875 | | 9/1995 |
| WO | 2010048605 | | 4/2010 |
| WO | 2012025250 | A1 | 3/2012 |
| WO | 2012061832 | | 5/2012 |
| WO | 2012106546 | | 8/2012 |
| WO | 2012166425 | | 12/2012 |
| WO | 2014108810 | | 7/2014 |
| WO | 2014145820 | | 9/2014 |
| WO | 2015051006 | | 4/2015 |
| WO | 2015085274 | A1 | 6/2015 |
| WO | 2016058517 | A1 | 4/2016 |
| WO | 2016061517 | A2 | 4/2016 |
| WO | 2016109604 | | 7/2016 |
| WO | 2017151828 | | 9/2017 |
| WO | 2018118971 | A1 | 6/2018 |
| WO | 2019217452 | A1 | 11/2019 |

OTHER PUBLICATIONS

Written Opinion, dated Oct. 1, 2019, 7 pages for application PCT/US2019/031161, Published as WO2019217452.

International Search Report, dated Oct. 1, 2019, 6 pages for application PCT/US2019/031161, Published as WO2019217452.

Canadian Application No. 2,902,882, Office Action mailed on Aug. 10, 2022, 3 pages.

Adey et al., In Vitro, Long-Range Sequence Information for de novo Genome Assembly via Transposase Contiguity, Genome Research, vol. 24, 2014, pp. 2041-2049.

Adey et al., Rapid, Low-Input, Low-Bias Construction of Shotgun Fragment Libraries by High-Density In vitro Transposition, Genome Biology, vol. 11, No. 12, Dec. 8, 2010, pp. 1-17.

Adey et al., The Haplotype-Resolved Genome and Epigenome of the Aneuploid HeLa Cancer Cell Line, Nature, vol. 500, No. 7461, Aug. 8, 2013, pp. 207-211.

Amini et al., Haplotype-Resolved Whole-Genome Sequencing by Contiguity-Preserving Transposition and Combinatorial Indexing, Technical Reports, Nature Genetics, vol. 46, No. 12, Dec. 2014, pp. 1343-1349.

Ason et al., DNA Sequence Bias During Tn5 Transposition, Journal of Molecular Biology, vol. 335, No. 5, Jan. 30, 2004, pp. 1213-1225.

Bansal et al., An MCMC Algorithm for Haplotype Assembly from Whole-Genome Sequence Data, Genome Research, vol. 18, No. 8, Aug. 2008, pp. 1336-1346.

Bansal et al., The Next Phase in Human Genetics, Nature Biotechnology, vol. 29, No. 1, Jan. 2011, pp. 38-39.

Barbee et al., Magnetic Assembly of High-Density DNA Arrays for Genomic Analyses, Analytical Chemistry, vol. 80, No. 6, Mar. 15, 2008, pp. 2149-2154.

Bentley et al., Accurate Whole Human Genome Sequencing Using Reversible Terminator Chemistry, Nature, vol. 456, No. 7218, Nov. 6, 2008, pp. 53-59.

Berensmeier, Magnetic Particles for the Separation and Purification of Nucleic Acids, Applied Microbiology and Biotechnology, vol. 73, 2006, pp. 495-504.

Brenner et al., In Vitro Cloning of Complex Mixtures of DNA on Microbeads: Physical Separation of Differentially Expressed cdNAs, PNAS, vol. 97, No. 4, 2000, pp. 1665-1670.

(56) References Cited

OTHER PUBLICATIONS

Bronner et al., Improved Protocols for Illumina Sequencing, Current Protocols in Human Genetics, Jul. 2009, pp. 1-46.
Browning et al., Haplotype Phasing: Existing Methods and New Developments, Nature Reviews Genetics, vol. 12, No. 10, Sep. 16, 2011, pp. 703-714.
Bryne et al., JASPAR, The Open Access Database of Transcription Factor-Binding Profiles: New Content and Tools in the 2008 Update, Nucleic Acids Research, vol. 36, Jan. 1, 2008, pp. D102-D106.
Burton et al., Chromosome-Scale Scaffolding of de novo Genome Assemblies Based on Chromatin Interactions, Nature Biotechnology, vol. 31, No. 12, Dec. 2013, pp. 1119-1125.
Cao et al., De Novo Assembly of a Haplotype-Resolved Human Genome, Nature Biotechnology, vol. 33, May 2015, 11 pages.
Chen et al., Tagmentation on Microbeads: Restore Long-Range DNA Sequence Information Using Next Generation Sequencing with Library Prepared by Surface-Immobilized Transposomes, ACS Appl. Mater Interfaces, vol. 10, No. 14, Mar. 15, 2018, pp. 11539-11545.
Chen et al., Ultralow-Input Single-Tube Linked-Read Library Method Enables Short-read Second-generation Sequencing Systems to Routinely Generate Highly Accurate and Economical Long-range Sequencing Information, Genome Research, vol. 30, Available Online at: https://genome.cshlp.org/content/30/6/898.short, 2020, pp. 898-909.
Cusanovich et al., Multiplex Single Cell Profiling of Chromatin Accessibility by Combinatorial Cellular Indexing, Science, Research Reports, vol. 348, No. 6237, May 22, 2015, pp. 910-914.
Dear et al., Happy Mapping: A Proposal for Linkage Mapping the Human Genome, Nucleic Acids Research., vol. 17, No. 17, Sep. 12, 1989, pp. 6795-6807.
Dressman et al., Transforming Single DNA Molecules into Fluorescent Magnetic Particles for Detection and Enumeration of Genetic Variations, Proceedings of the National Academy of Sciences of the United States of America, vol. 100, No. 15, Jul. 22, 2003, pp. 8817-8822.
Drmanac et al., Human Genome Sequencing Using Unchained Base Reads on Self-Assembling DNA Nanoarrays, Science, Reports, vol. 327, No. 5961, Jan. 1, 2010, pp. 78-81.
European Application No. 14764477.7, Communication of Notices of Opposition mailed on Feb. 3, 2021, 1 page.
European Application No. 14764477.7, Notice of Opposition mailed on Jan. 27, 2021, 44 pages.
European Application No. 14764477.7, Patentee's Response to Opposition mailed on Jun. 11, 2021, 54 pages.
Fan et al., Whole-Genome Molecular Haplotyping of Single Cells, Nature Biotechnology, vol. 29, No. 1, Jan. 2011, pp. 51-57.
Feuk et al., Structural Variation in the Human Genome, Nature Reviews, Genetics, vol. 7, Feb. 2006, pp. 85-97.
Furka et al., General Method for Rapid Synthesis of Multicomponent Peptide Mixtures, International Journal of Peptide and Protein Research, vol. 37, Jul. 1991, pp. 487-493.
Goodwin et al., Oxford Nanopore Sequencing and de novo Assembly of a Eukaryotic Genome, bioRxiv, Available online at: https://www.biorxiv.org/content/biorxiv/early/2015/01/06/013490.full.pdf, Nov. 2015, 15 pages.
Jo et al., Elongation and Migration of Single DNA Molecules in Microchannels Using Oscillatory Shear Flows, Lab on a Chip, vol. 9, 2009, pp. 2348-2355.
Kaper et al., Whole-Genome Haplotyping by Dilution, Amplification and Sequencing, Proc. Nat. Acad. Sci., vol. 110, No. 14, Apr. 2, 2013, pp. 5552-5557.
Kitzman et al., Haplotype-Resolved Genome Sequencing of a Gujarati Indian Individual, Nature Biotechnology, vol. 29, No. 1, Jan. 2011, pp. 59-64.
Kremsky et al., Immobilization of DNA via Oligonucleotides Containing an Aldehyde or Carboxylic Acid Group at the 5' Terminus, Nucleic Acids Research, vol. 15, No. 7, Apr. 10, 1987, pp. 2891-2909.
Kuleshov et al., Whole-Genome Haplotyping Using Long Reads and Statistical Methods, Nature Biotechnology, vol. 32, No. 3, Mar. 2014, pp. 261-266.
Lander et al., Initial Sequencing and Analysis of the Human Genome, Nature, vol. 409, No. 6822, Feb. 15, 2001, pp. 860-921.
Lebl et al., Automatic Oligonucleotide Synthesizer Utilizing the Concept of Parallel Processing, Collection Symposium Series, vol. 12, 2011, pp. 264-267.
Levy et al., The Diploid Genome Sequence of an Individual Human, PLoS Biology, vol. 5, No. 10, e254, Oct. 2007, pp. 2113-2144.
Li et al., The Sequence Alignment/Map Format and SAMtools, Bioinformatics, vol. 25, No. 16, Aug. 15, 2009, pp. 2078-2079.
Loman et al., A Complete Bacterial Genome Assembled de novo Using Only Nanopore Sequencing Data, Nature Methods, vol. 12, No. 8, Aug. 2015, pp. 733-735.
Medvedev et al., Computational Methods for Discovering Structural Variation with Next Generation Sequencing, Nature Methods, vol. 6, No. 11, Nov. 2009, pp. S13-S20.
Moncunill et al., Comprehensive Characterization of Complex Structural Variations in Cancer by Directly Comparing Genome Sequence Reads, Nature Biotechnology, vol. 32, No. 11, Nov. 2014, pp. 1106-1112.
Nalls et al., Large-Scale Meta-Analysis of Genome-Wide Association Data Identifies Six New Risk Loci for Parkinson's Disease, Nature Genetics, vol. 46, Sep. 2014, pp. 989-993.
International Application No. PCT/IB2020/050715, International Search Report and Written Opinion mailed on Jul. 10, 2020, 11 pages.
International Application No. PCT/US2014/030649, International Search Report and Written Opinion mailed on Oct. 7, 2014, 25 pages.
Pendleton et al., Assembly and Diploid Architecture of an Individual Human Genome via Single-Molecule Technologies, Nature Methods, vol. 12, No. 8, Aug. 2015, pp. 780-786.
Peters et al., Accurate Whole-Genome Sequencing and Haplotyping from 10 to 20 Human Cells, Nature, vol. 487, No. 7406, Jul. 12, 2012, pp. 190-195.
Peters et al., Detection and Phasing of Single Base de novo Mutations in Biopsies from Human in Vitrofertilized Embryos by Advanced Whole-Genome Sequencing, Genome Research, vol. 25, Feb. 2015, pp. 426-434.
Raczy et al., Isaac: Ultra-Fast Whole-Genome Secondary Analysis on Illumina Sequencing Platforms, Bioinformatics, vol. 29, No. 16, Jun. 2013, pp. 2041-2043.
Radler et al., Structure of DNA-Cationic Liposome Complexes: DNA Intercalation in Multilamellar Membranes in Distinct Interhelical Packing Regimes, Science, vol. 275, No. 5301, Feb. 7, 1997, pp. 810-814.
Reznikoff, Tn5 as a Model for Understanding DNA Transposition, Molecular Microbiology, vol. 47, No. 5, 2003, pp. 1199-1206.
Ripke et al., Genome-Wide Association Analysis Identifies 13 New Risk Loci for Schizophrenia, Nat. Genet., vol. 45, No. 10, Aug. 2013, pp. 1150-1159.
Sandelin et al., JASPAR: An Open-Access Database for Eukaryotic Transcription Factor Binding Profiles, Nucleic Acids Research, vol. 32, 2004, pp. D91-D94.
Schwartz et al., Capturing Native Long-Range Contiguity by in Situ Library Construction and Optical Sequencing, Proceedings of the National Academy of Sciences, vol. 109, No. 46, Nov. 13, 2012, pp. 18749-18754.
Shendure et al., Accurate Multiplex Polony Sequencing of an Evolved Bacterial Genome, Science, vol. 309, No. 5741, Sep. 9, 2005, pp. 1728-1732.
Snyder et al., Haplotype-Resolved Genome Sequencing: Experimental Methods and Applications, Nature Reviews Genetics vol. 16, No. 6, Jun. 2015, pp. 344-358.
Steemers et al., Whole-Genome Genotyping with the Single-Base Extension Assay, Nat. Methods, vol. 3, No. 1, Jan. 2006, pp. 31-33.
Steinberg et al., Strategies for Covalent Attachment of DNA to Beads, Biopolymers, vol. 73, 2004, pp. 597-605.
Tarasov et al., Sambamba: Fast Processing of NGS Alignment Formats, Bioinformatics, vol. 31, No. 12, Feb. 19, 2015, pp. 2032-2034.

(56) References Cited

OTHER PUBLICATIONS

Venter et al., The Sequence of the Human Genome, Science, vol. 291, Feb. 16, 2001, pp. 1304-1351.
Wang et al., 3' Branch Ligation: A Novel Method to Ligate Non-complementary DNA to Recessed or Internal 3'OH Ends in DNA or RNA, DNA Research, vol. 26, No. 1, 2019, pp. 45-53.
Wang et al., Efficient and Unique Cobarcoding Of Second-Generation Sequencing Reads from Long DNA Molecules Enabling Cost-effective and Accurate Sequencing, Haplotyping, and De Novo Assembly, Genome Research, vol. 29, No. 5, Apr. 2, 2019, pp. 798-808.
Wang et al., Single Tube Bead-Based DNA Co-Barcoding for Cost Effective and Accurate Sequencing, Haplotyping, and Assembly, bioRxiv, Available online at https://doi.org/10.1101/324392, May 17, 2018, 17 pages.
Xie et al., A Fast and Accurate Algorithm for Single Individual Haplotyping, BMC Systems Biology, vol. 6, Supplement 2, Dec. 12-14, 2012, 10 pages.
Zheng et al., Haplotyping Gemnline and Cancer Genomes Using High-Throughput Linked-Read Sequencing, Nature Biotechnology, vol. 34, No. 3, 2016, 13 pages.
Zinchenko et al., Single-Chain Compaction of Long Duplex DNA by Cationic Nanoparticles: Modes of Interaction and Comparison with Chromatin, The Journal of Physical Chemistry B, vol. 111, 2007, pp. 3019-3031.
Zong et al., Genome-Wide Detection of Single Nucleotide and Copy-Number Variations of a Single Human Cell, Science, vol. 338, No. 6114, Dec. 21, 2012, pp. 1622-1626.
Levin et al., Dynamic Interactions between Transposable Elements and Their Hosts, Nature Reviews Genetics, vol. 12, Sep. 2011, pp. 615-627.
European Application No. 23168214.7, Extended European Search Report mailed on Sep. 12, 2023, 6 pages.
European Application No. 14764477.7, Summons to Attend Oral Proceedings mailed on Feb. 7, 2023, “0” p. 19.
Lamble et al., Improved Workflows for High Throughput Library Preparation Using the Transposome-based Nextera System, BMC Biotechnology, vol. 13, No. 104, Nov. 20, 2013, pp. 1-10.
U.S. Appl. No. 15/936,123, Non-Final Office Action mailed on Mar. 2, 2021, 12 pages.
U.S. Appl. No. 15/936,123, Notice of Allowance mailed on Nov. 1, 2021, 7 pages.
U.S. Appl. No. 15/993,418, Final Office Action mailed on Dec. 10, 2020, 31 pages.
U.S. Appl. No. 15/993,418, Non-Final Office Action mailed on Apr. 24, 2020, 34 pages.
U.S. Appl. No. 61/623,876, Identification of DNA Fragments and Structural Variations, filed on Apr. 13, 2012, 88 pages.
Australian Application No. 2014232515, First Examination Report mailed on Jul. 10, 2017, 4 pages.
Canadian Application No. 2,902,882, Office Action mailed on Jul. 7, 2021, 6 pages.
Chinese Application No. 201480016181.5, Notice of Decision to Grant mailed on Feb. 22, 2018, 3 pages (2 pages of Original document and 1 page of English translation).
Chinese Application No. 201480016181.5, Office Action mailed on Aug. 9, 2016, 35 pages (16 pages of Original document and 19 pages of English translation).
European Application No. 14764477.7, Extended European Search Report mailed on Nov. 17, 2016, 11 pages.
European Application No. 14764477.7, Notice of Decision to Grant mailed on Mar. 26, 2020, 2 pages.
European Application No. 14764477.7, Office Action mailed on Mar. 18, 2019, 5 pages.
European Application No. 14764477.7, Office Action mailed on Mar. 29, 2018, 5 pages.
European Application No. 19799951.9, Extended European Search Report mailed on Nov. 30, 2021, 5 pages.
European Application No. 20170317.0, Extended European Search Report mailed on Oct. 6, 2020, 9 pages.
International Application No. PCT/IB2020/050715, International Preliminary Report on Patentability mailed on Aug. 12, 2021, 7 pages.
International Application No. PCT/US2014/030649, International Preliminary Report on Patentability mailed on Sep. 24, 2015, 22 pages.
International Application No. PCT/US2019/031161, International Preliminary Report on Patentability mailed on Nov. 19, 2020, 9 pages.
International Application No. PCT/US2019/031161, Invitation to Pay Additional Fees and, Where Applicable, Protest Fee mailed on Jul. 29, 2019, 3 pages.
U.S. Appl. No. 15/936,123, Non-Final Office Action mailed on Jul. 6, 2022, 17 pages.
Dunne Jr. et al., Next-Generation and Whole-Genome Sequencing in the Diagnostic Clinical Microbiology Laboratory, European Journal of Clinical Microbiology & Infectious Diseases, vol. 31, No. 8, Jun. 8, 2012, pp. 1719-1726.
Chinese Application No. 201480016181.5, Office Action mailed on Jul. 26, 2017, 9 pages (4 pages of Original document and 5 pages of English Translation).
Chinese Application No. 201810436392.4, Office Action mailed on Aug. 20, 2021, 10 pages (7 pages of Original document and 3 pages of English Translation).
Chinese Application No. 201810436392.4, Office Action mailed on Jun. 6, 2022, 5 pages (4 pages of Original document and 1 pages of English Translation).
European Application No. 20749055.8, Partial Supplementary European Search Report mailed on Sep. 19, 2022, 12 pages.
U.S. Appl. No. 14/205,145, Non-Final Office Action mailed on Jun. 4, 2015, 11 pages.
U.S. Appl. No. 14/205,145, Notice of Allowance mailed on Mar. 14, 2016, 5 pages.
U.S. Appl. No. 14/782,307, Advisory Action mailed on Feb. 12, 2018, 3 pages.
U.S. Appl. No. 14/782,307, Corrected Notice of Allowance mailed on Apr. 27, 2018, 3 pages.
U.S. Appl. No. 14/782,307, Final Office Action mailed on Jul. 19, 2017, 9 pages.
U.S. Appl. No. 14/782,307, Non-Final Office Action mailed on Oct. 31, 2016, 18 pages.
U.S. Appl. No. 14/782,307, Non-Final Office Action mailed on Dec. 18, 2018, 20 pages.
U.S. Appl. No. 14/782,307, Notice of Allowance mailed on Mar. 20, 2018, 8 pages.
U.S. Appl. No. 14/782,307, Notice of Allowance mailed on Sep. 25, 2019, 9 pages.
U.S. Appl. No. 15/136,780, Non-Final Office Action mailed on Jun. 21, 2017, 11 pages.
U.S. Appl. No. 15/136,780, Notice of Allowance mailed on Apr. 20, 2018, 7 pages.
U.S. Appl. No. 15/136,780, Supplemental Notice of Allowance mailed on Jun. 13, 2018, 2 pages.
U.S. Appl. No. 15/993,418, Non-Final Office Action mailed on Dec. 15, 2021, 28 pages.
U.S. Appl. No. 61/750,682, Sample Preparation on a Solid Support mailed on Jan. 9, 2013, 79 pages.
U.S. Appl. No. 17/424,989, Non-Final Office Action mailed on Apr. 7, 2023, 24 pages.
Johne et al., Rolling-Circle Amplification of Viral DNA Genomes using Phi29 Polymerase, Trends in Microbiology, vol. 17, 2009, pp. 205-211.
Lou et al., High-Throughput DNA Sequencing Errors are Reduced by Orders of Magnitude Using Circle Sequencing, Proceedings of the National Academy of Sciences, vol. 110, No. 49, Dec. 3, 2013, pp. 19872-19877.
Salk et al., Enhancing the Accuracy of Next-Generation Sequencing for Detecting Rare and Subclonal Mutations, Nature Reviews Genetics, vol. 19, 2018, pp. 269-285.
Schmitt et al., Risks of Double-Counting in Deep Sequencing, PNAS, vol. 111, No. 16, Apr. 22, 2014, 1 page.

(56) References Cited

OTHER PUBLICATIONS

Zhang et al., Haplotype Phasing of Whole Human Genomes Using Bead-based Barcode Partitioning in a Single Tube, Nature Biotechnology, vol. 35, No. 9, Jun. 26, 2017, 9 pages.
European Application No. 19799951.9, Intension to Grant mailed on Nov. 15, 2022, 9 pages.
European Application No. 20749055.8, Extended European Search Report mailed on Dec. 21, 2022, 12 pages.
Peters et al., Co-Barcoded Sequence Reads from Long DNA Fragments: A Cost-Effective Solution for "Perfect Genome" Sequencing, Frontiers in Genetics, vol. 5, No. 466, Jan. 14, 2015, pp. 1-8.

FIG. 12
1st barcode is ligated to common adapter
Bind to streptavidin coated beads
2nd barcode is ligated to common adapter
3rd barcode is ligated to common adapter
Denature to remove bottom strand
Hybridize bridge oligonucleotide

Figure 17:
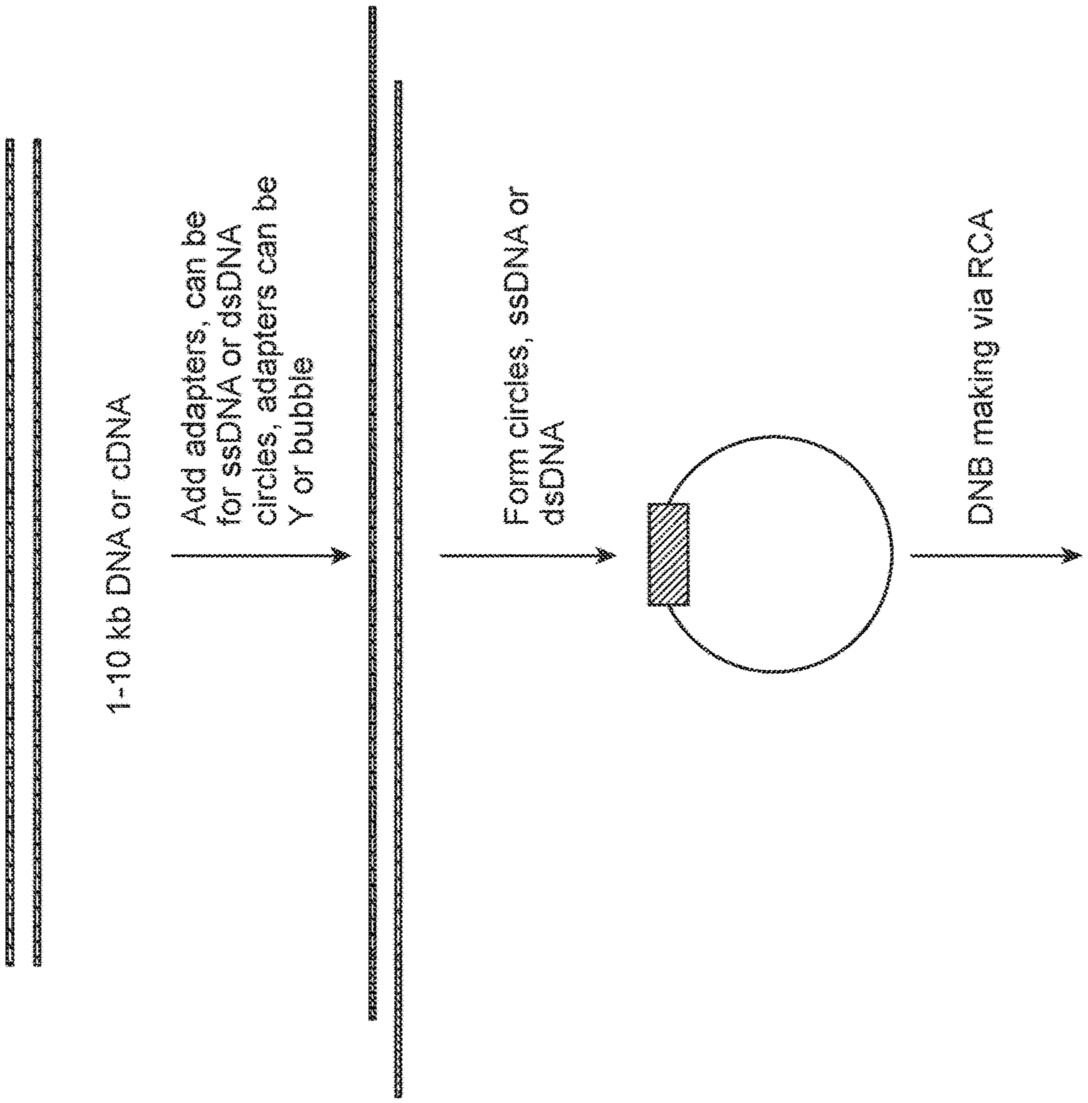

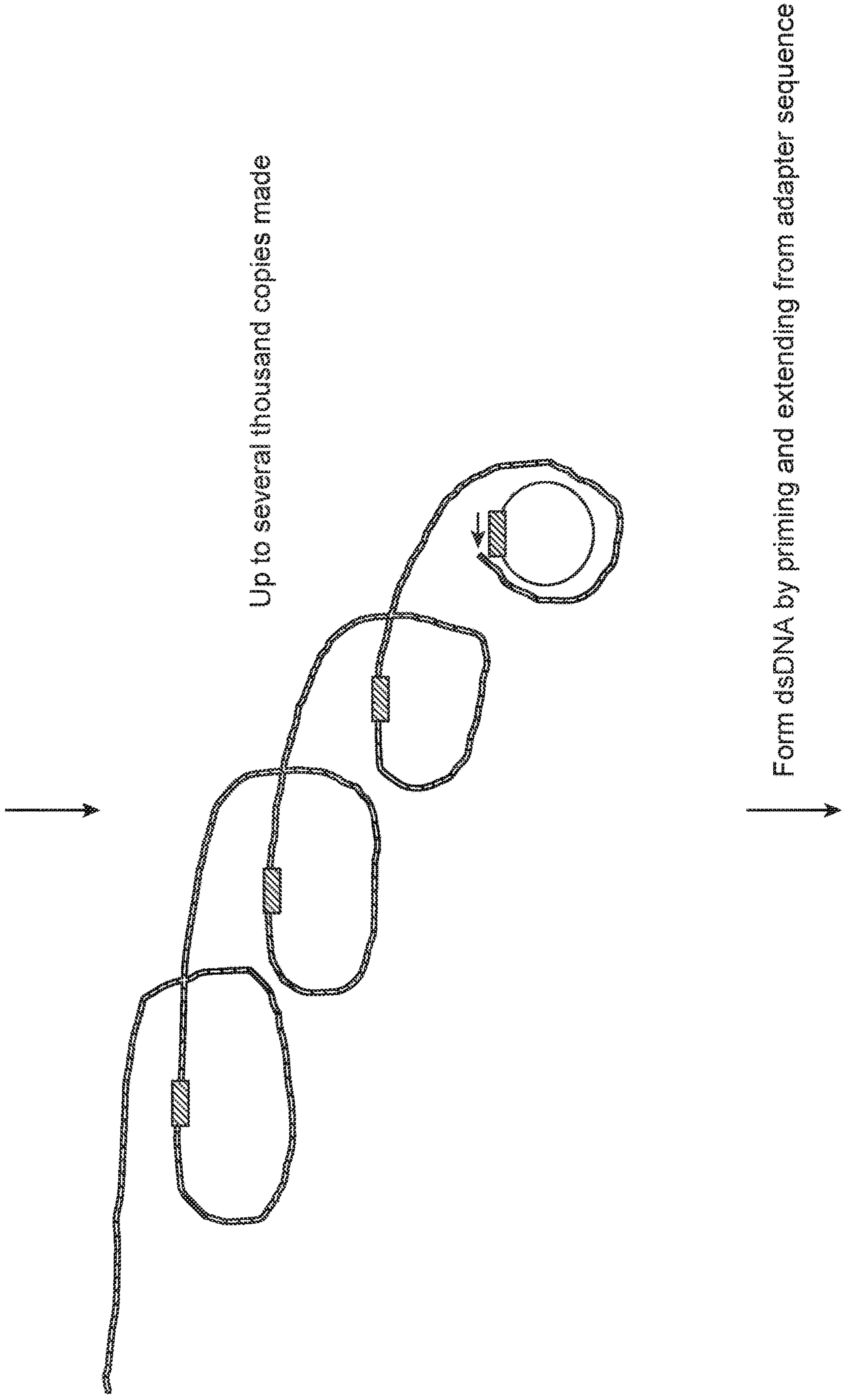
FIG. 17 (Cont. 1)

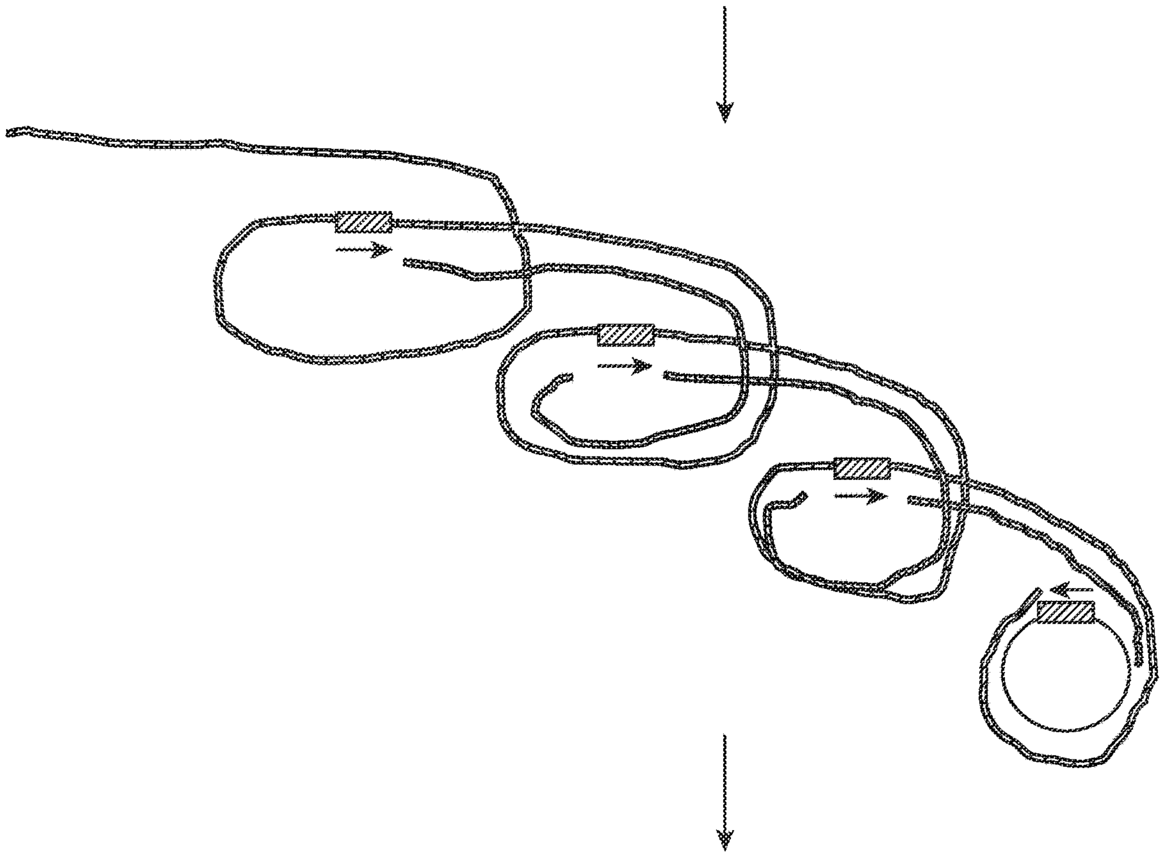
Double stranded DNB can now be transposon inserted and captured by stLFR beads, potentially thousands of copies of the original molecule were made and all on the same DNA strand, this enables high coverage of the original molecule with stLFR sequencing
FIG. 17 (Cont. 2)

Figure 18:
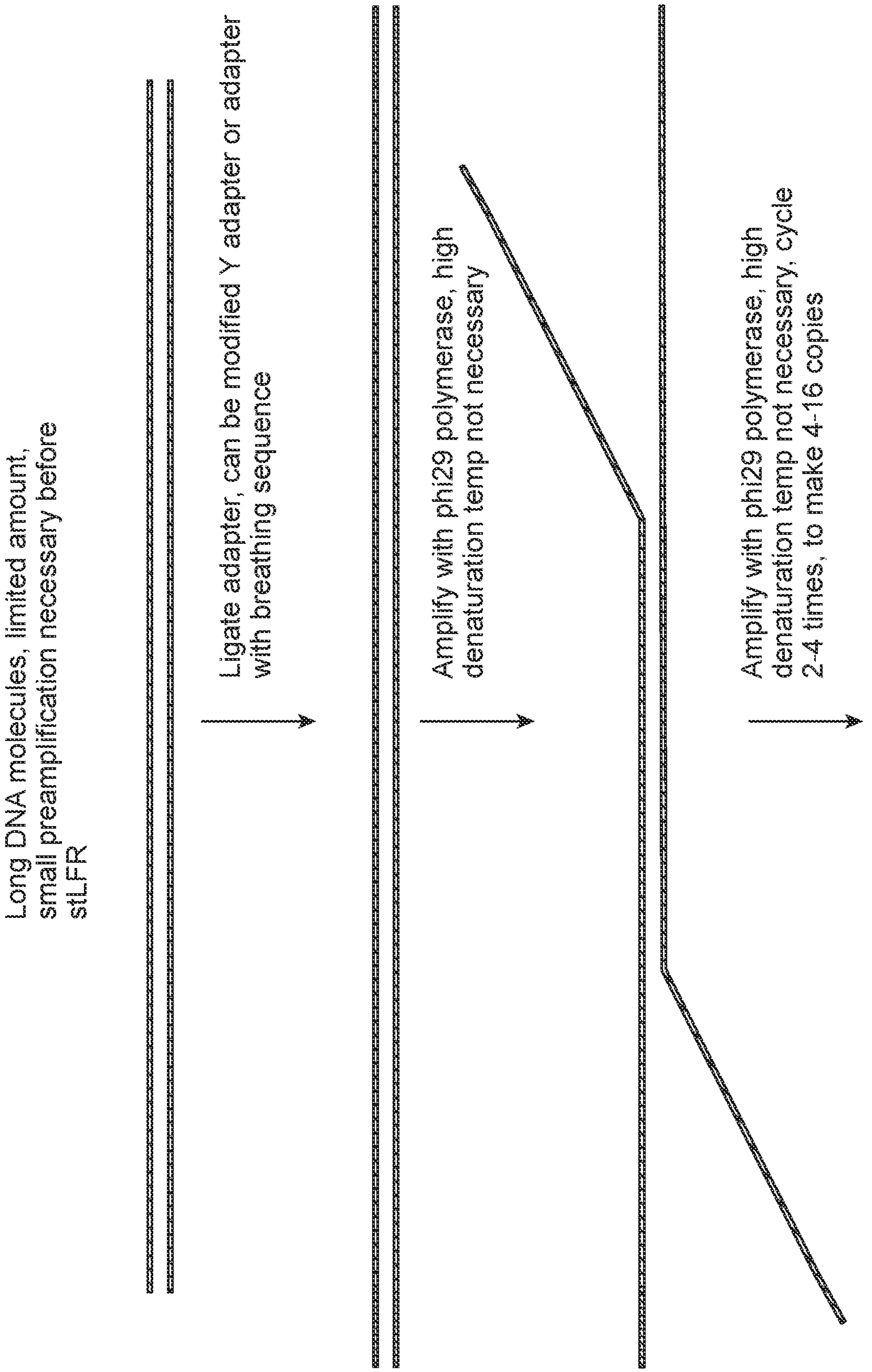

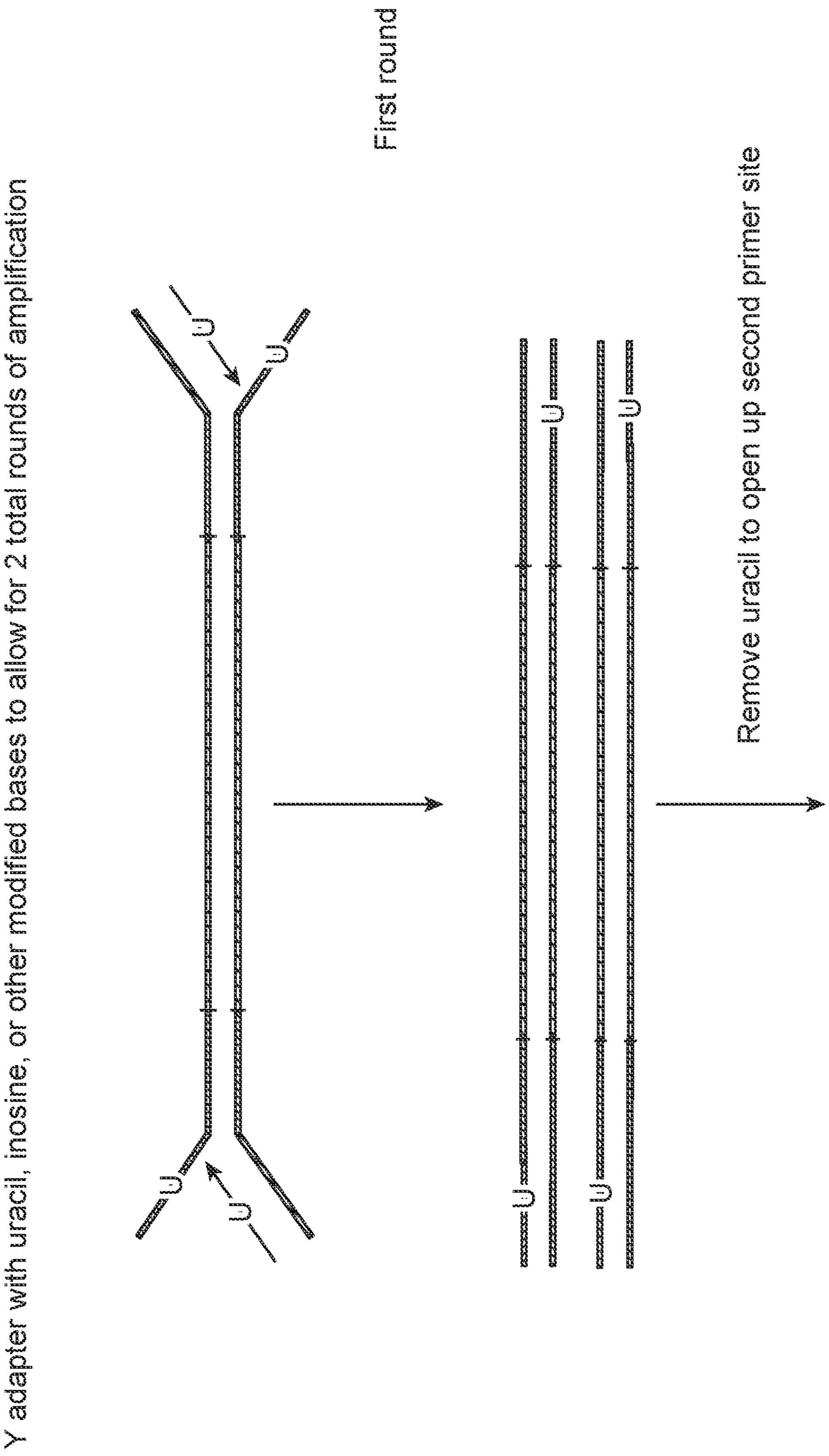
FIG. 18 (Cont. 1)

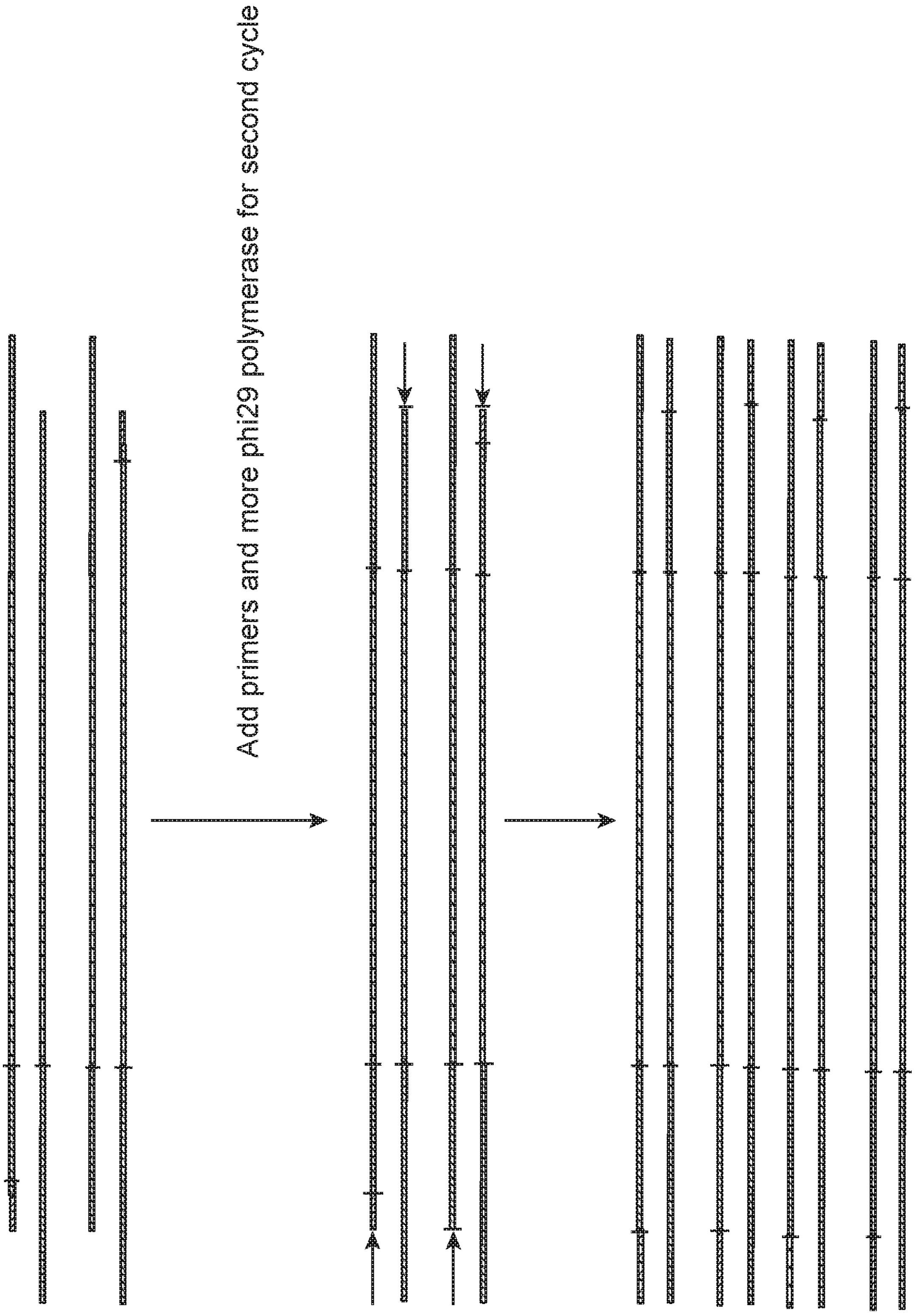
FIG. 18 (Cont. 2)

Figure 19:
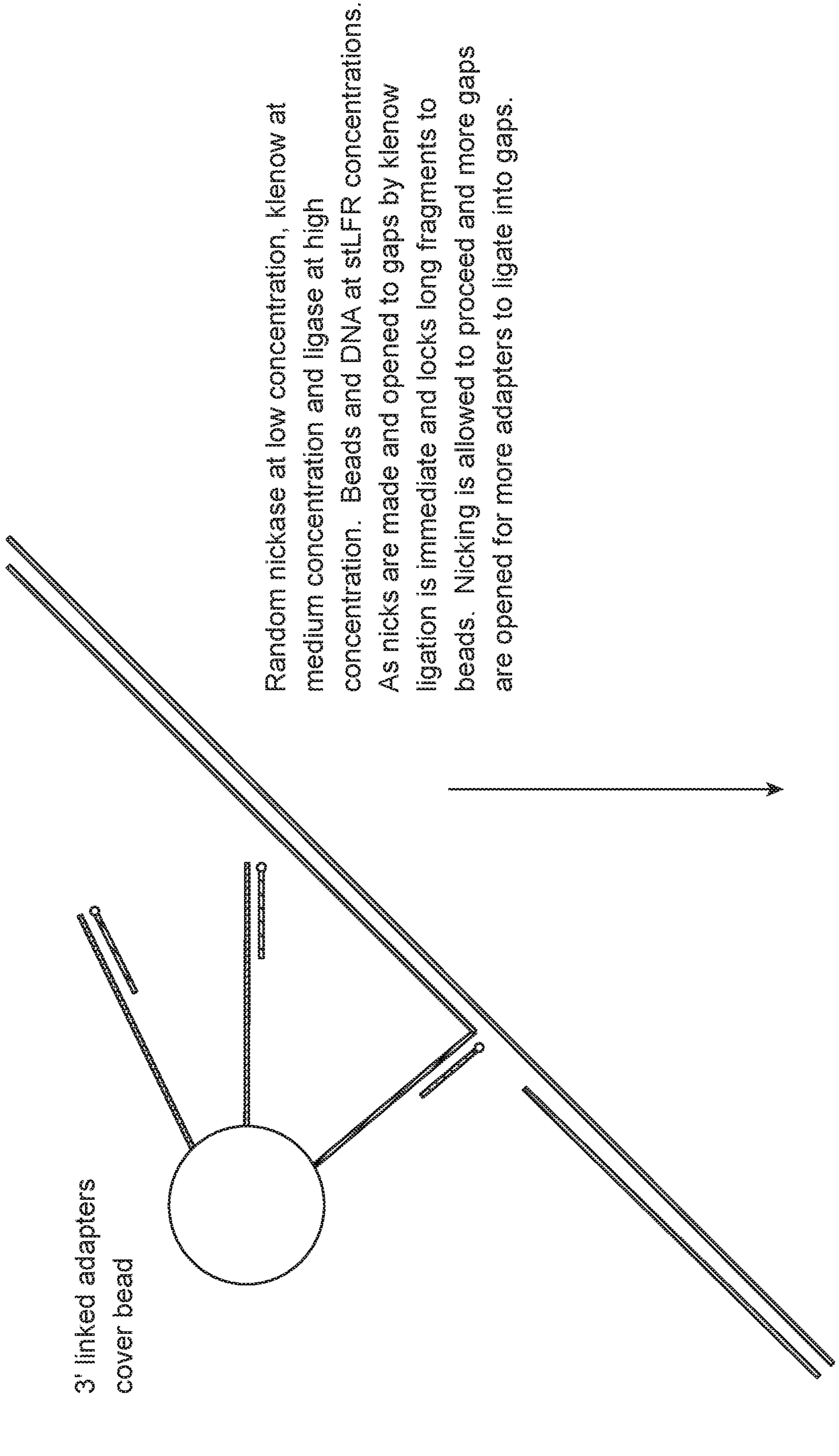

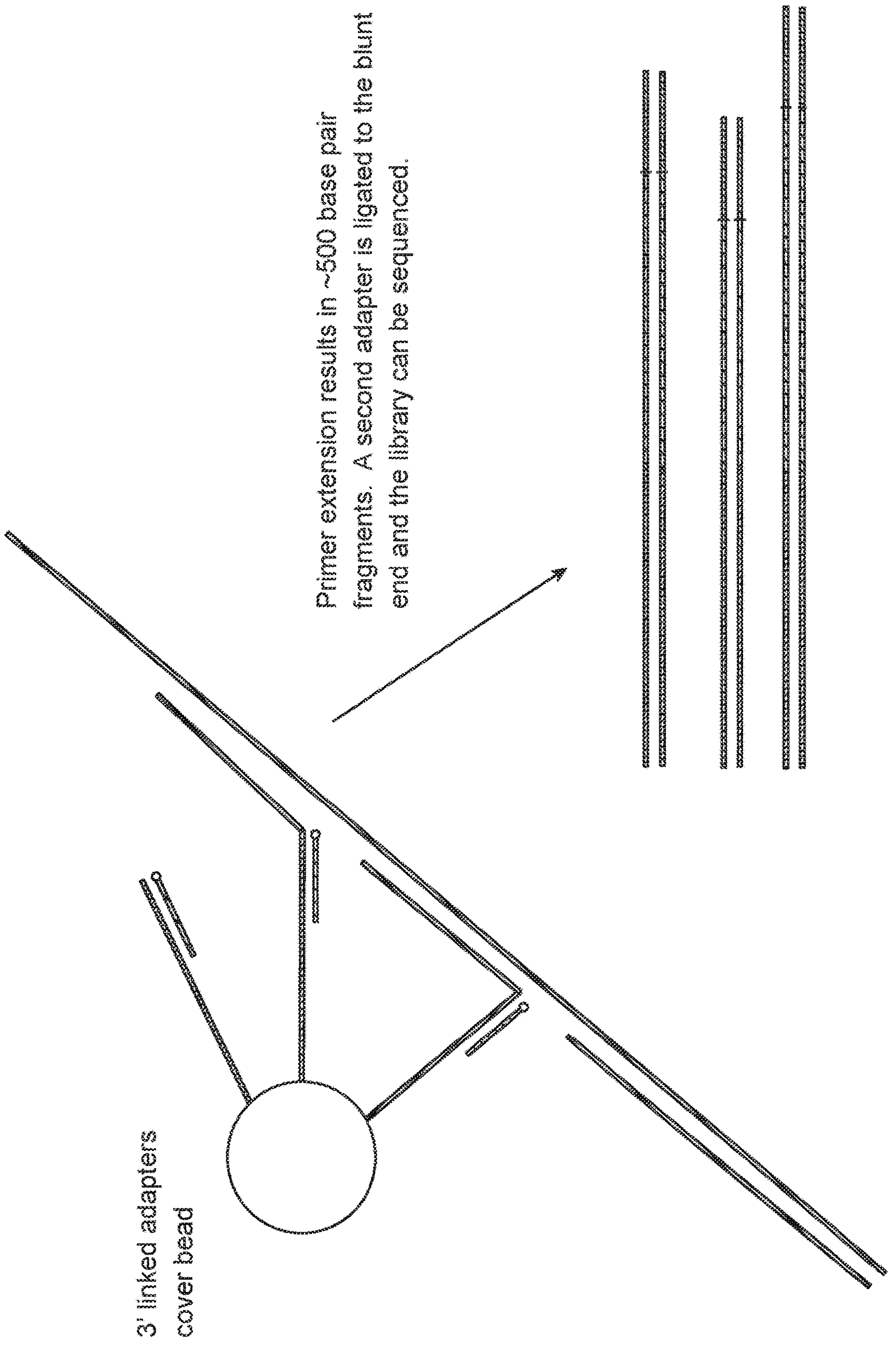
FIG. 19 (Cont. 1)

Figure 20:
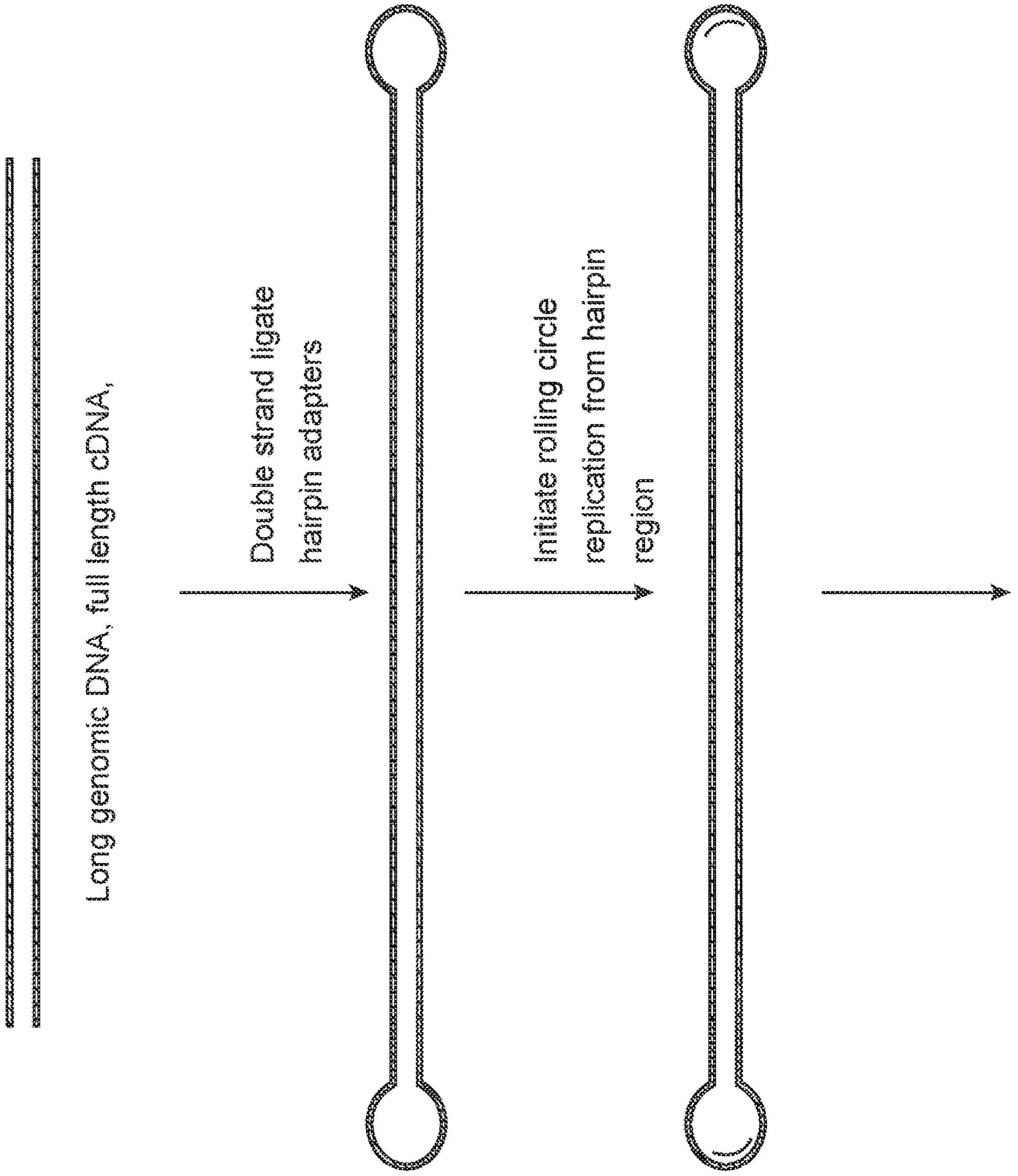

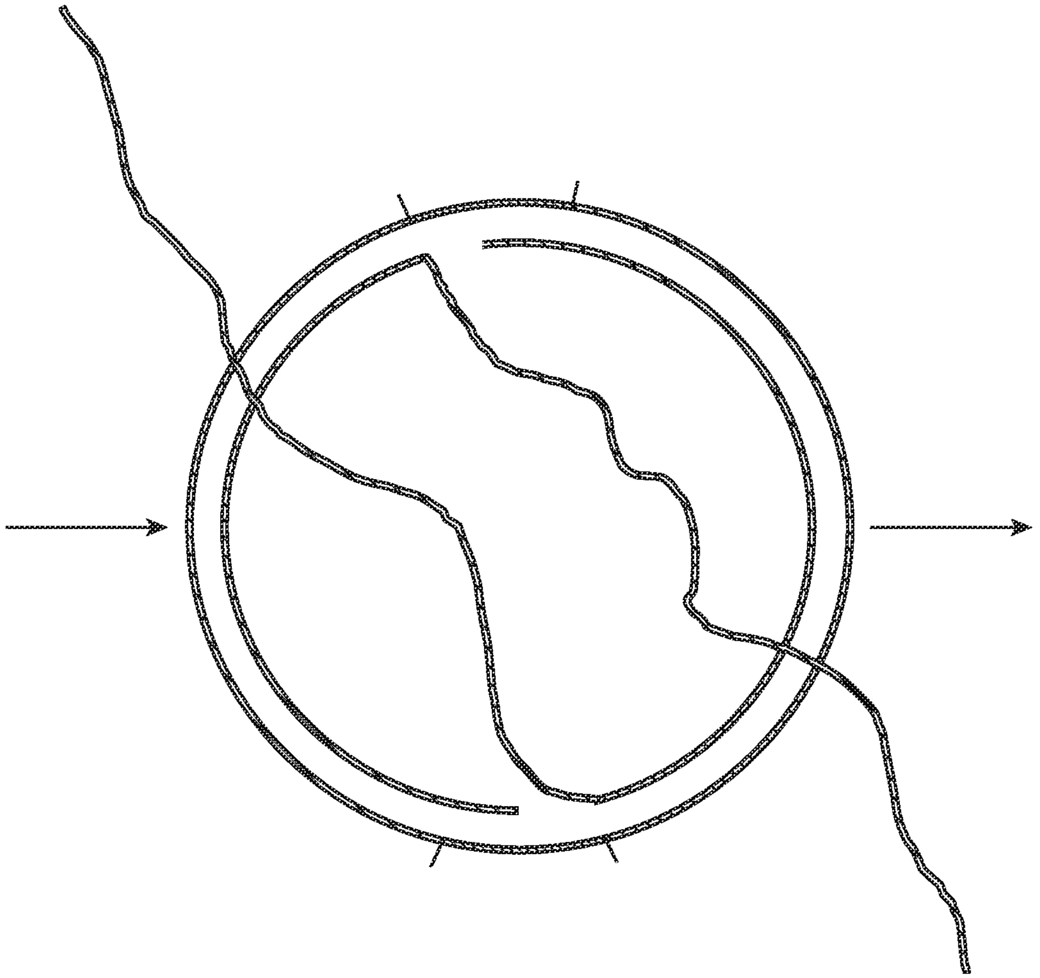
FIG. 20 (Cont. 1)

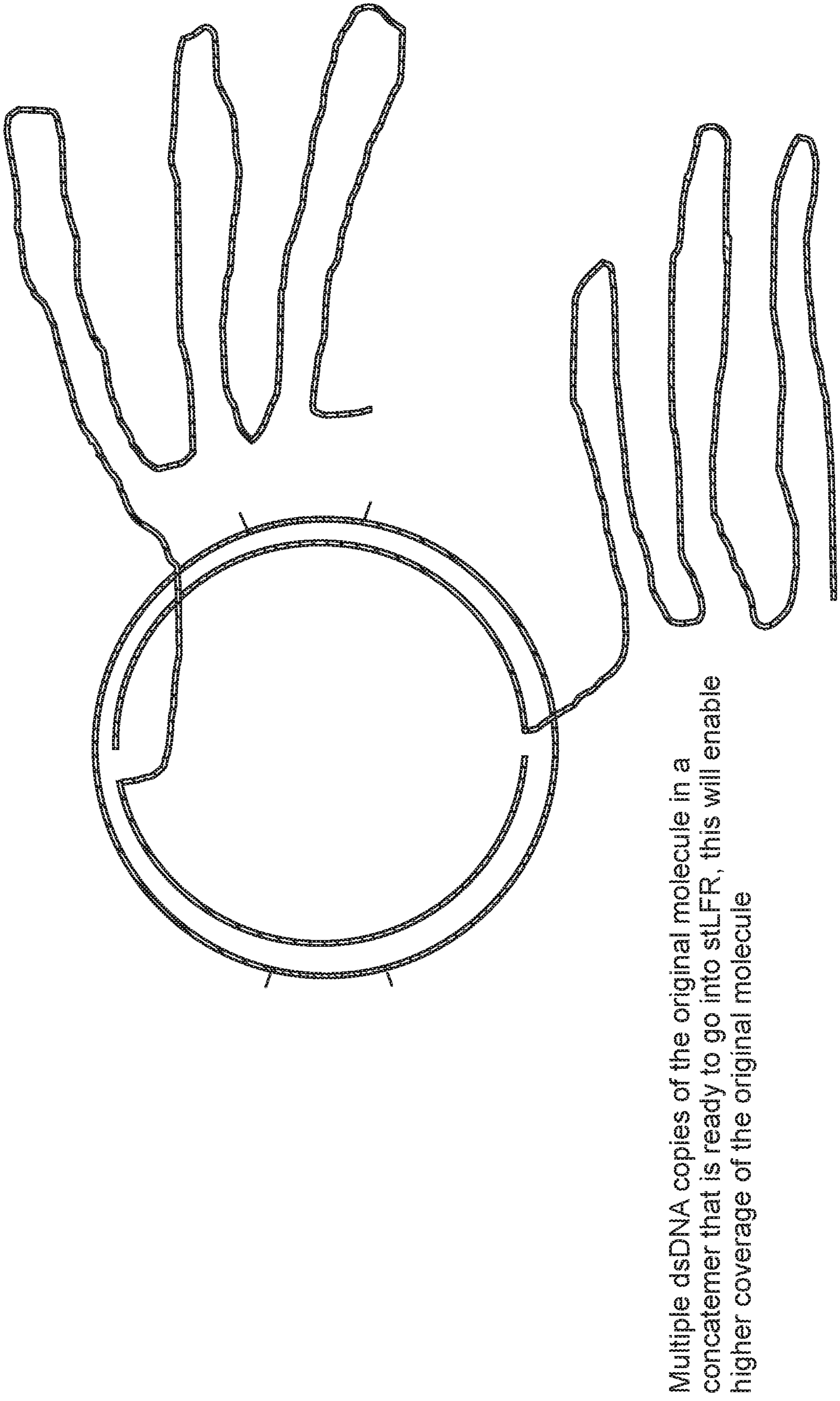
Multiple dsDNA copies of the original molecule in a concatemer that is ready to go into stLFR, this will enable higher coverage of the original molecule
FIG. 20 (Cont. 2)

Figure 25:
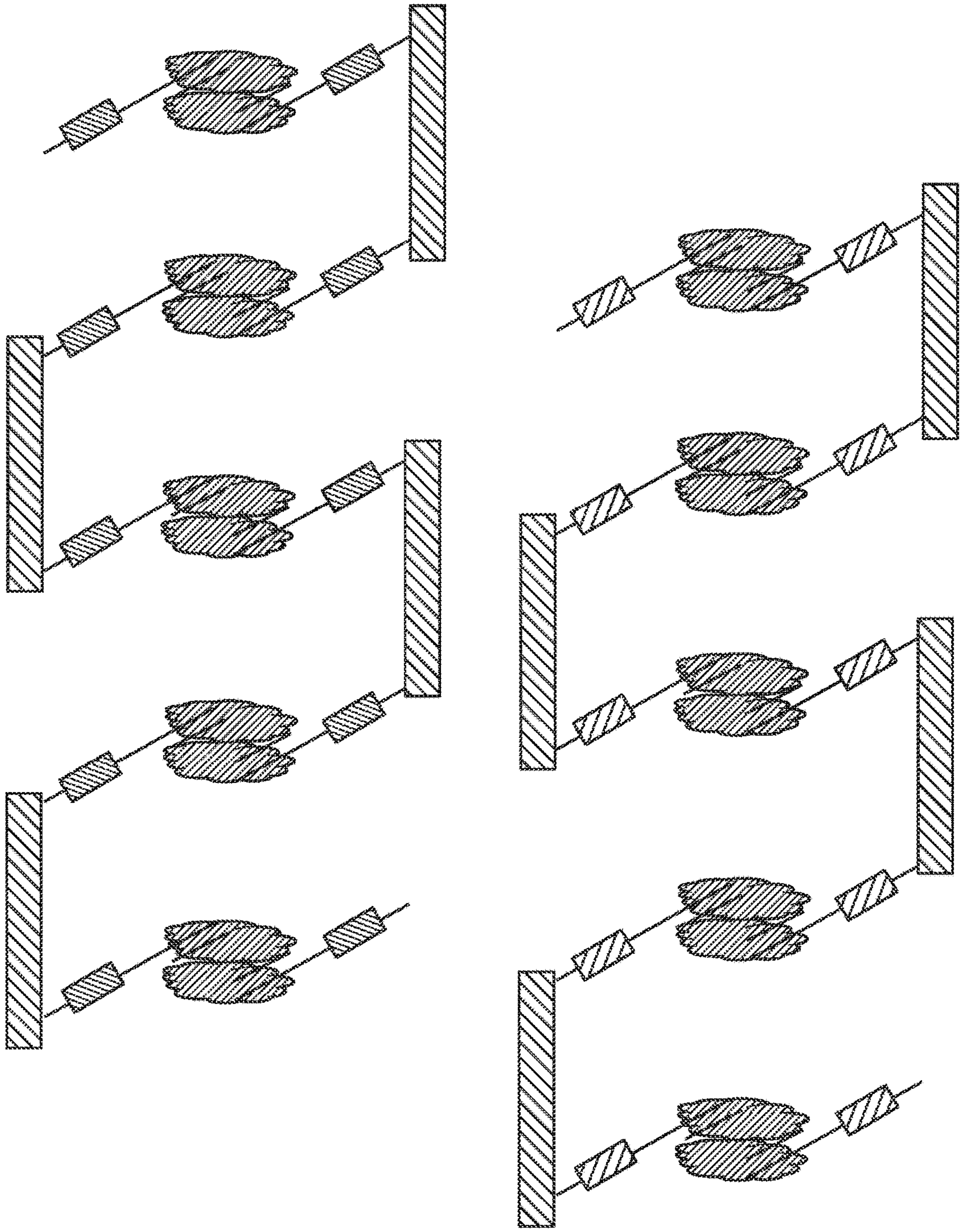

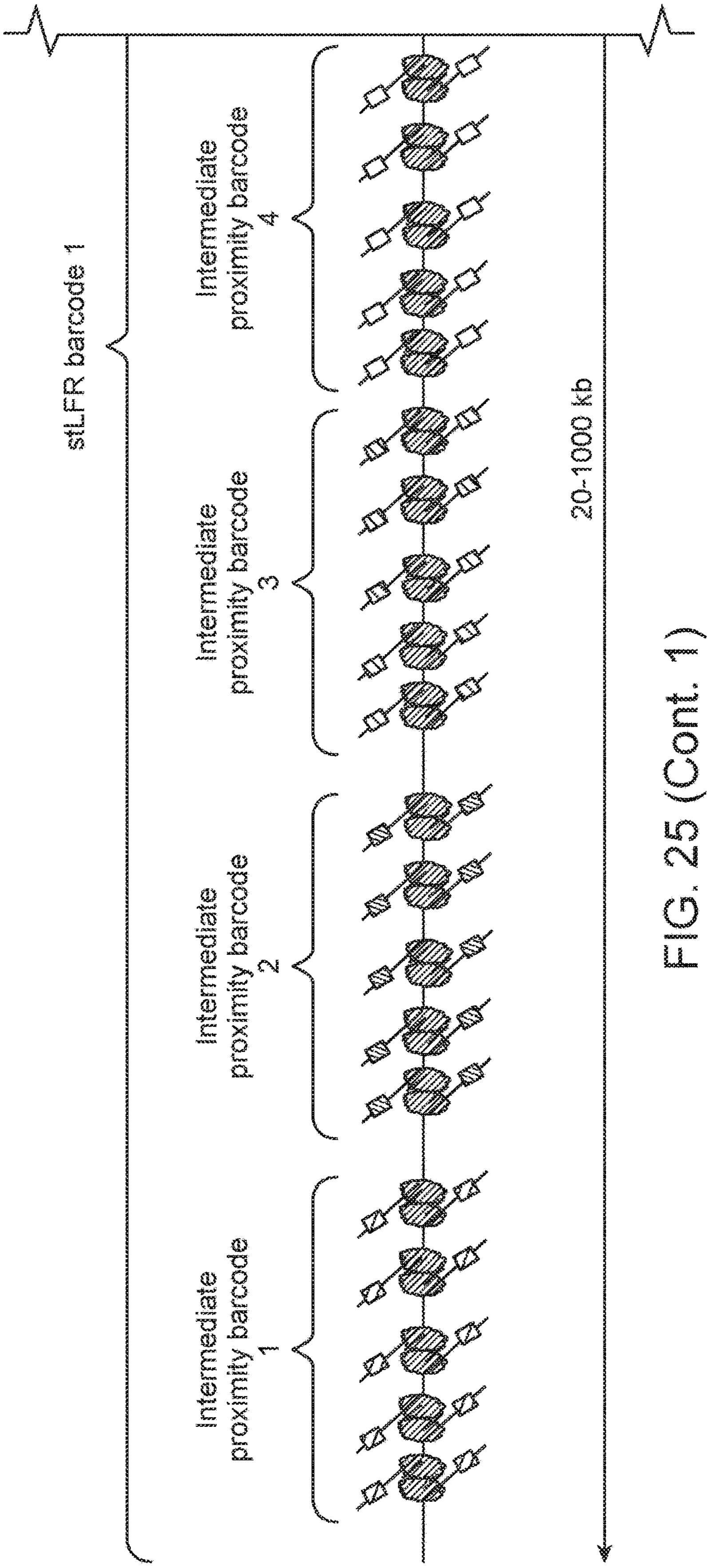
FIG. 25 (Cont. 1)

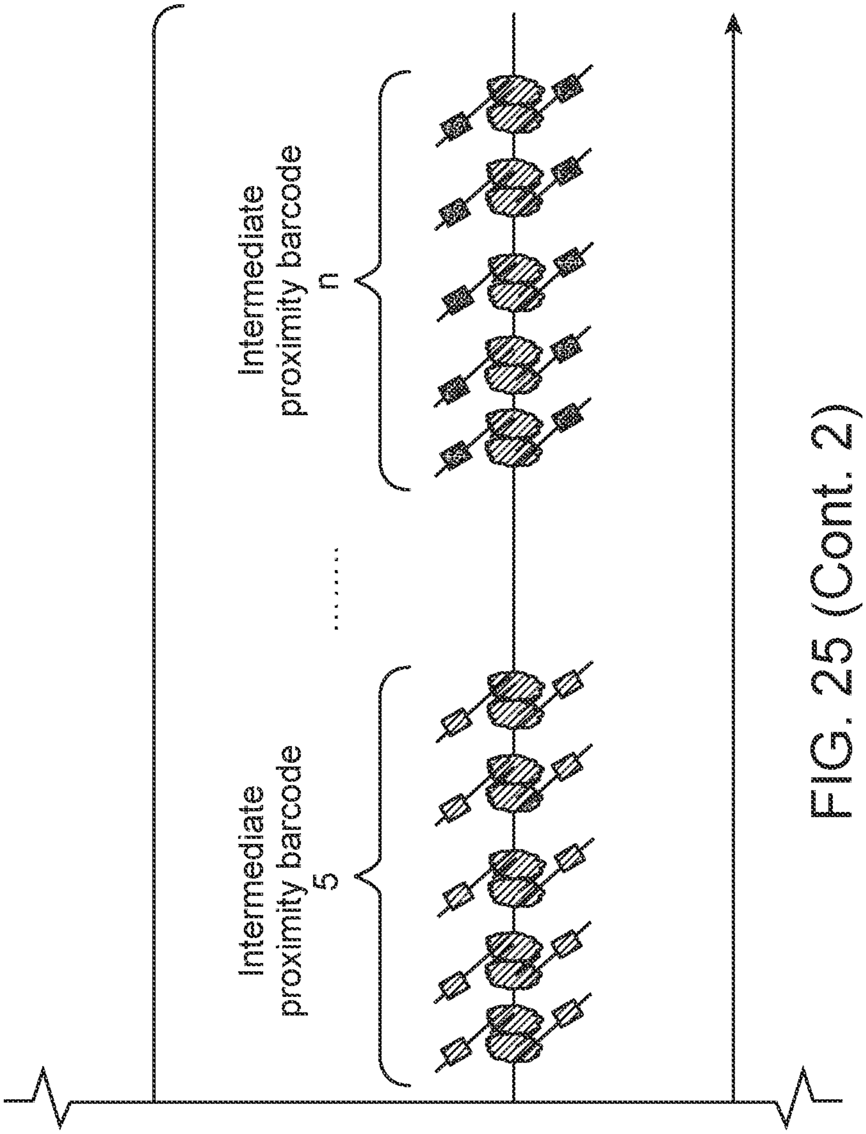
FIG. 25 (Cont. 2)

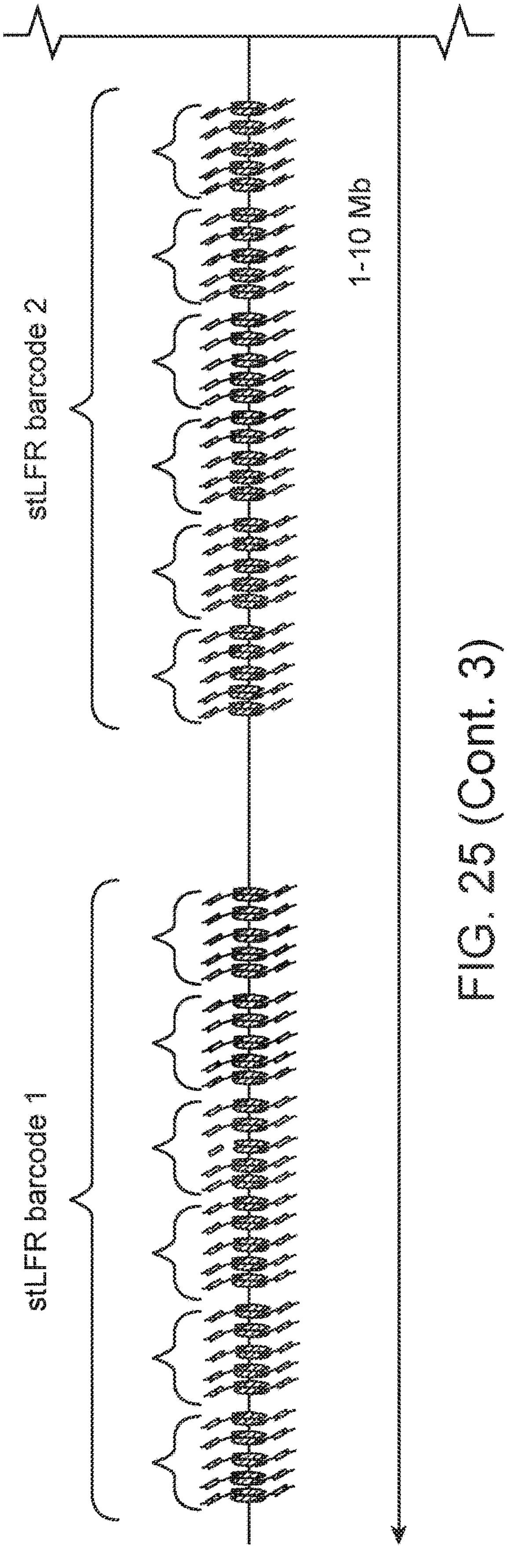
FIG. 25 (Cont. 3)

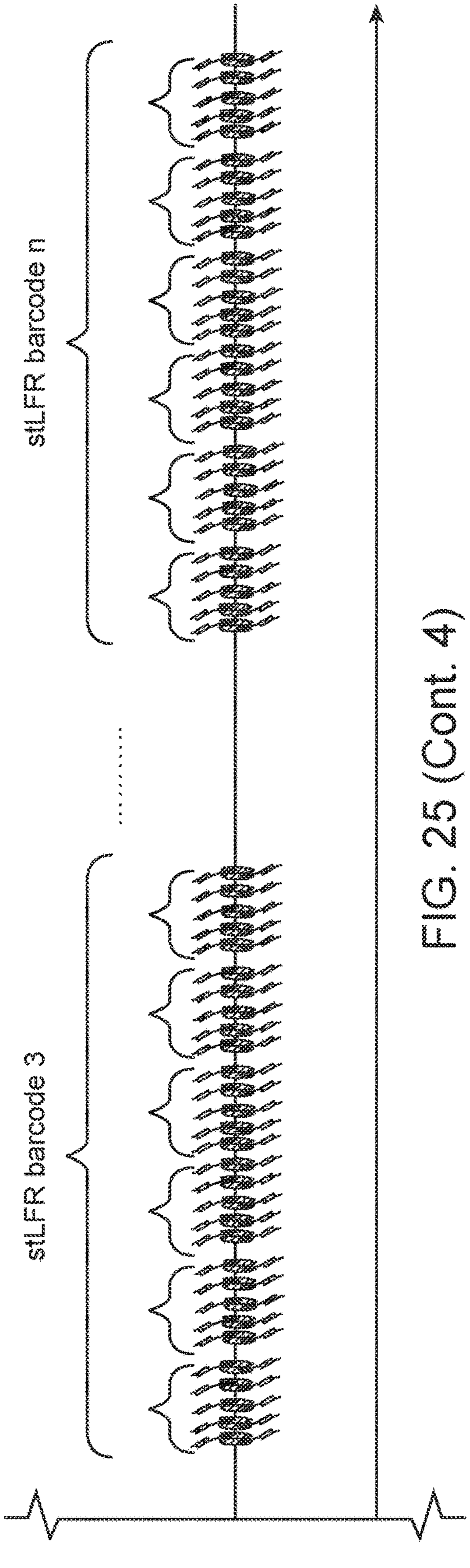
FIG. 25 (Cont. 4)

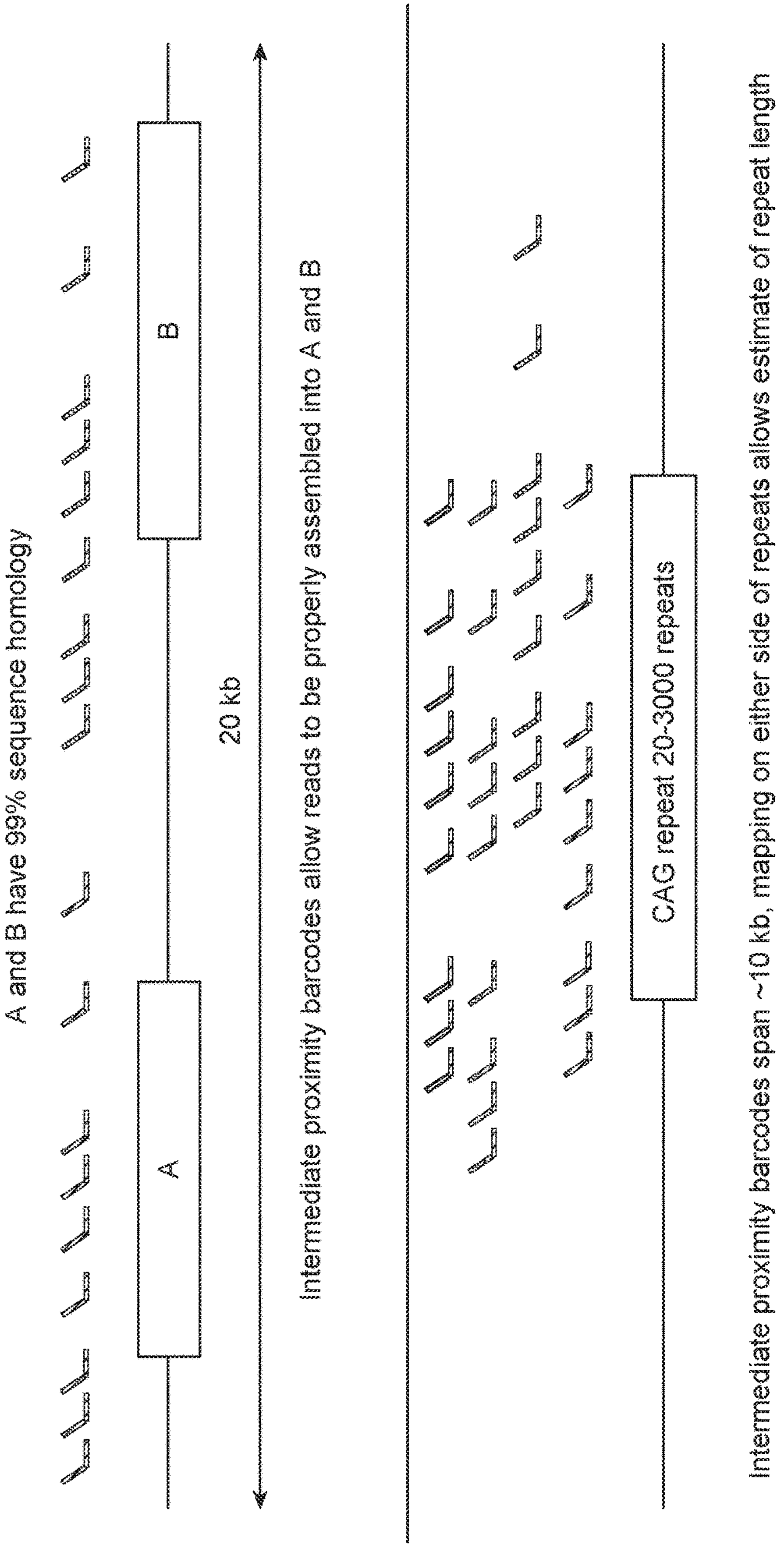
FIG. 25 (Cont. 5)

SINGLE TUBE BEAD-BASED DNA CO-BARCODING FOR ACCURATE AND COST-EFFECTIVE SEQUENCING, HAPLOTYPING, AND ASSEMBLY

REFERENCE TO PREVIOUS APPLICATIONS

This application claims benefit and is a 371 application and claims the benefit of PCT Application No. PCT/US2019/031161, filed May 7, 2019, which claims the priority benefit of U.S. Provisional Patent Applications 62/668,757, filed May 8, 2018; 62/672,501, filed May 16, 2018; and 62/687,159, filed Jun. 19, 2018. The aforelisted priority applications are hereby incorporated herein by reference in their entirety for all purposes.

REFERENCE TO AN ELECTRONIC SEQUENCE LISTING

The contents of the electronic sequence listing (092171-1130724-5068-WO_SL.txt; Size: 12,316 bytes; and Date of Creation: Jun. 17, 2019) is herein incorporated by reference in its entirety.

BACKGROUND

To date, the vast majority of individual whole genome sequences lack information regarding the order of single to multi-base variants transmitted as contiguous blocks on homologous chromosomes. Numerous technologies have recently been developed to enable this. Most are based on the process of co-barcoding (13), that is, the addition of the same barcode to the sub-fragments of single long genomic DNA molecules. After sequencing the barcode information can be used to determine which reads are derived from the original long DNA molecule. This process was first described by Drmanac (14) and implemented as a 384-well plate assay by Peters et al. (6). However, these approaches are technically challenging to implement, expensive, have lower data quality, do not provide unique co-barcoding, or some combination of all four. In practice, most of these approaches require a separate whole genome sequence to be generated by standard methods to improve variant calling. This has resulted in the limited use of these methods as cost and ease of use are dominant factors in what technologies are used for WGS.

SUMMARY OF THE INVENTION

Drawings and Tables

Figure 1B:
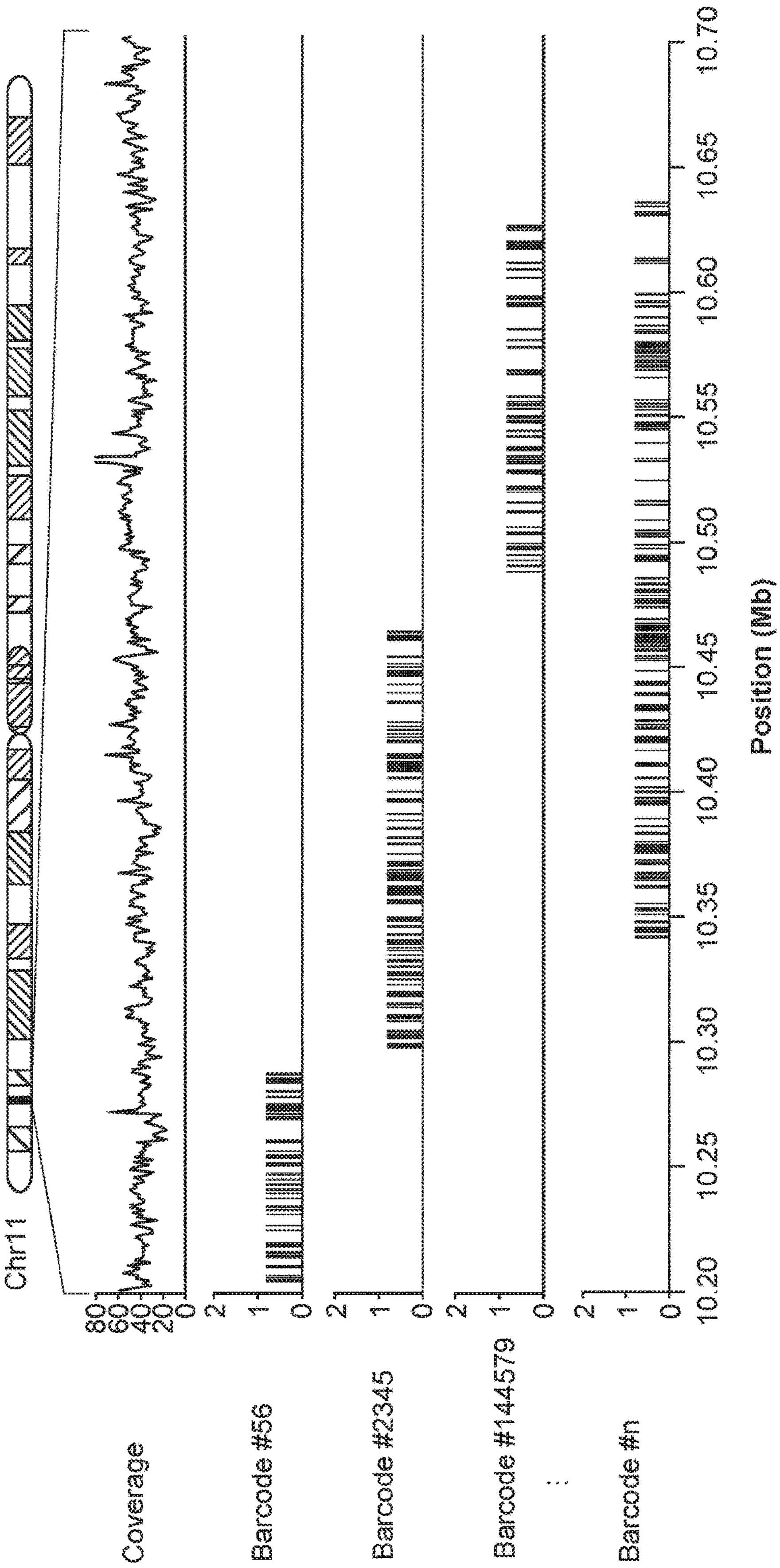
Figure 1D:
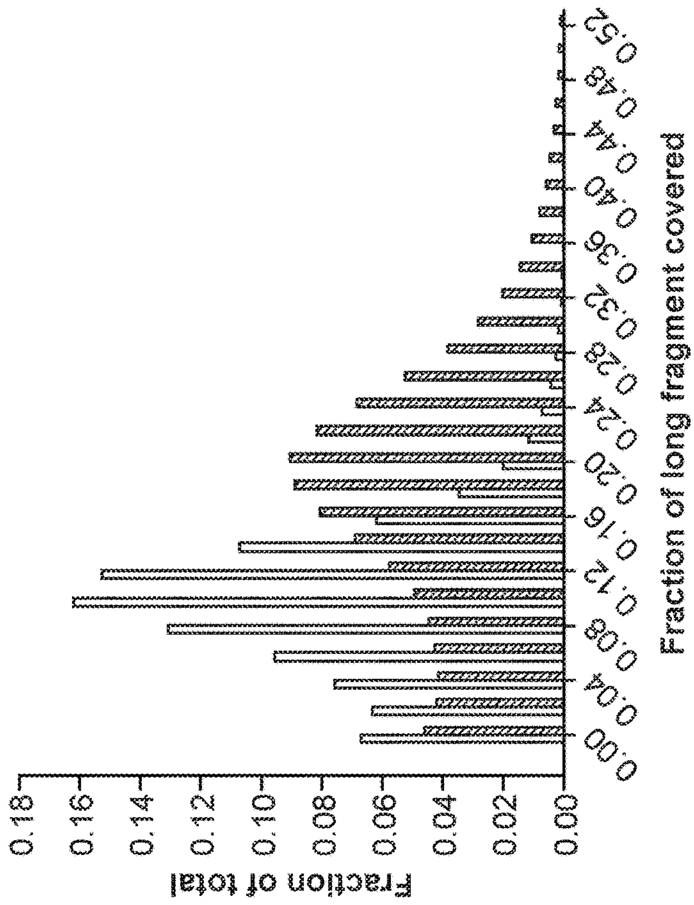
Figure 1C:
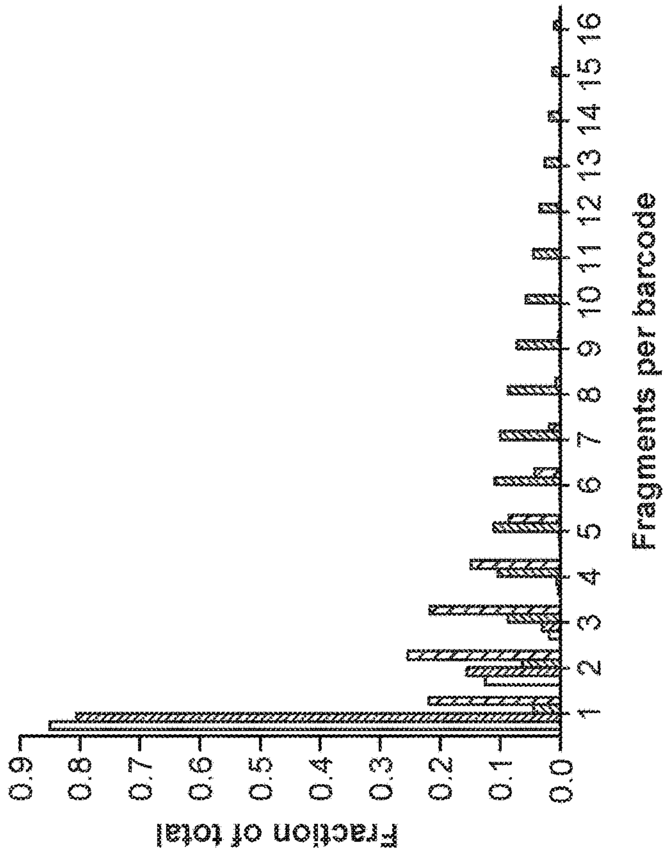
Figure 2A:
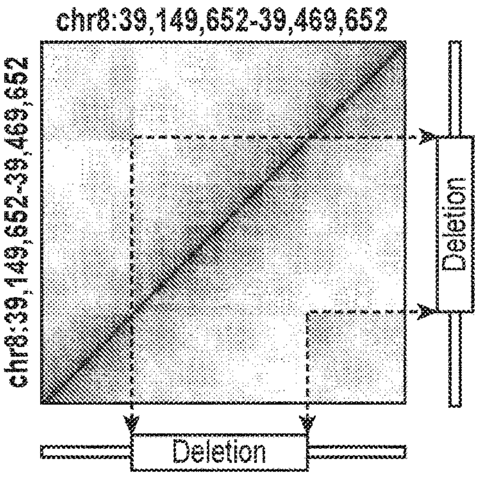
Figure 2B:
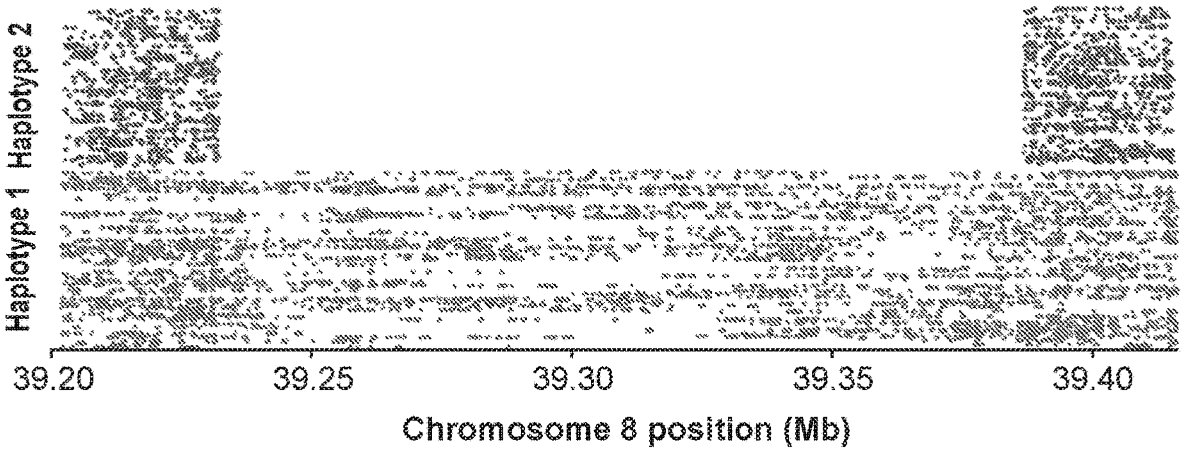
Figure 2C:
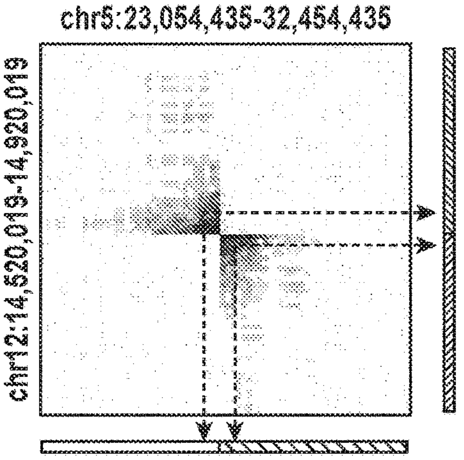

FIGS. 1(A) to 1(D). Overview of stLFR. FIG. 1(A) The first step of stLFR involves inserting a hybridization sequence approximately every 200-1000 base pairs on long genomic DNA molecules. This is achieved using transposons. The transposon integrated DNA is then mixed with beads that each contain ~400,000 copies of an adapter sequence that contains a unique barcode shared by all adapters on the bead, a common PCR primer site, and a common capture sequence that is complementary to the sequence on the integrated transposons. After the genomic DNA is captured to the beads, the transposons are ligated to the barcode adapters. There are a few additional library processing steps and then the co-barcoded sub-fragments are sequenced on a BGISEQ-500 or equivalent sequencer. FIG. 1(B) Mapping read data by barcode results in clustering of reads within 10 to 350 kb regions of the genome. Total coverage and barcode coverage from 4 barcodes are shown for the 1 ng stLFR-1 library across a small region on Chr11. Most barcodes are associated with only one read cluster in the genome. FIG. 1(C) The number of original long DNA fragments per barcode are plotted for the 1 ng libraries stLFR-1 and stLFR-2 and the 10 ng stLFR libraries stLFR-3 and stLFR-4. Over 80% of the fragments from the 1 ng stLFR libraries are co-barcoded by a single unique barcode. FIG. 1(D) The fraction of nonoverlapping sequence reads and captured sub-fragments covering each original long DNA fragment are plotted for the 1 ng stLFR-1 library. Also see FIG. 14, FIGS. 2(A) to 2(D). SV detection. Previously reported deletions in NA12878 were also found using stLFR data. Heat maps of barcode sharing for each deletion can be found in FIG. 10. FIG. 2(1) A heat map of barcode sharing within windows of 2 kb for a region with a ~150 kb heterozygous deletion on chromosome 8 was plotted using a Jaccard Index as previously described (12). Arrows demonstrate how regions that are spatially distant from each other on chromosome 8 have increased overlap marking the locations of the deletion. FIG. 2(B) Co-barcoded reads are separated by haplotype and plotted by unique barcode on the y axis and chromosome 8 position on the x axis. The heterozygous deletion is found in a single haplotype. FIG. 2(C) Heat maps were also plotted for overlapping barcodes between chromosomes 5 and 12 for a patient cell line with a known translocation (26) and FIG. 2(D) GM20759, a cell line with a known transversion in chromosome 2 (27).

Figure 3B:
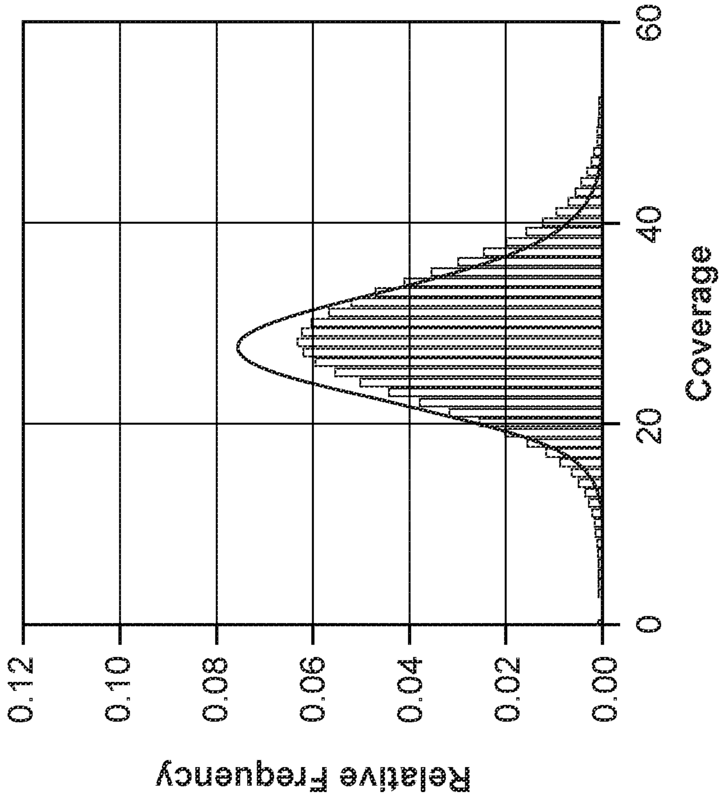
Figure 3A:
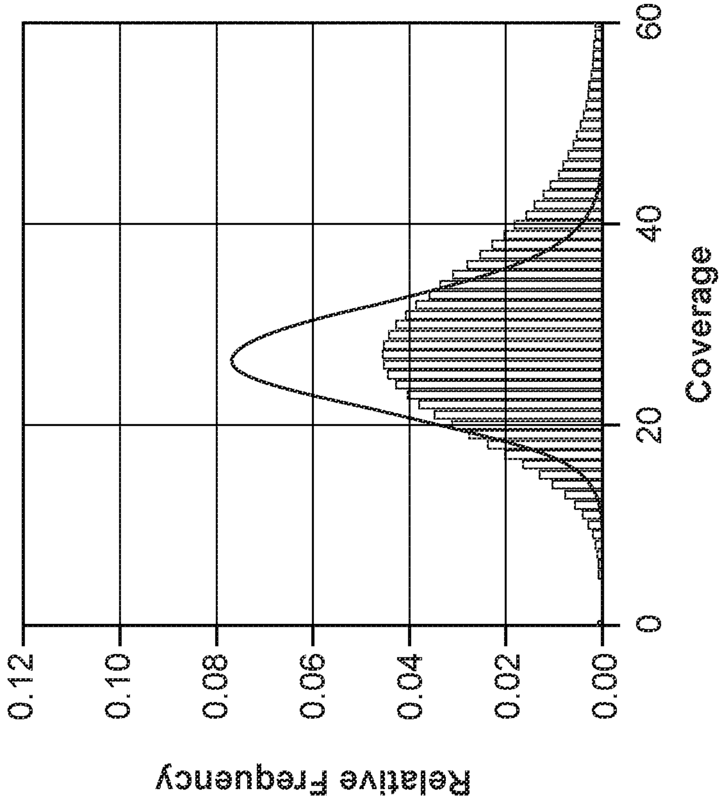

FIGS. 3(A) and 3(B): Coverage distribution plots. Coverage was plotted for an stLFR-2 (A) and a standard (B) library sequenced on a BGISEQ500. Coverage was down-sampled to 30× for both samples. The Poisson distribution for a 30× genome is plotted.

Figure 4A:
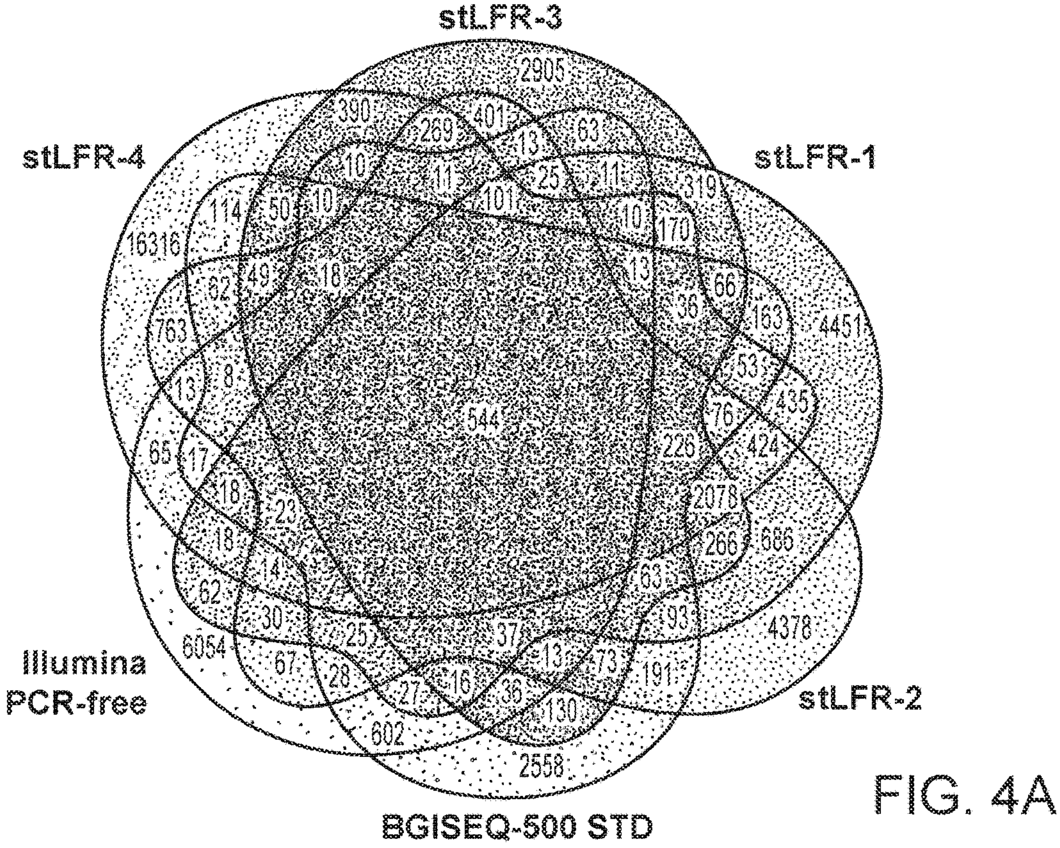
Figure 4B:
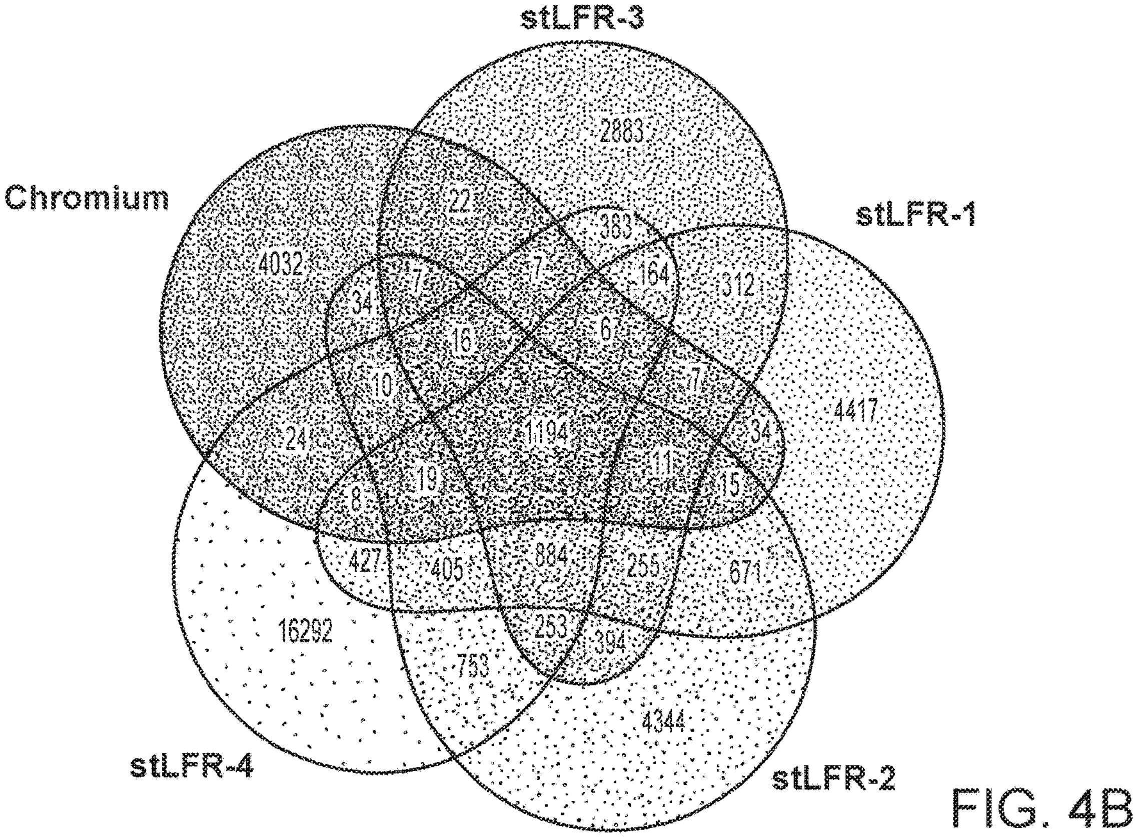
Figure 5A:
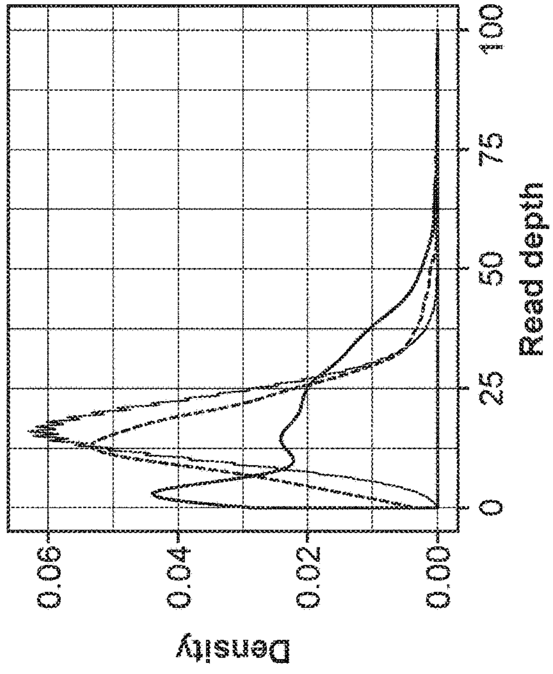
Figure 5B:
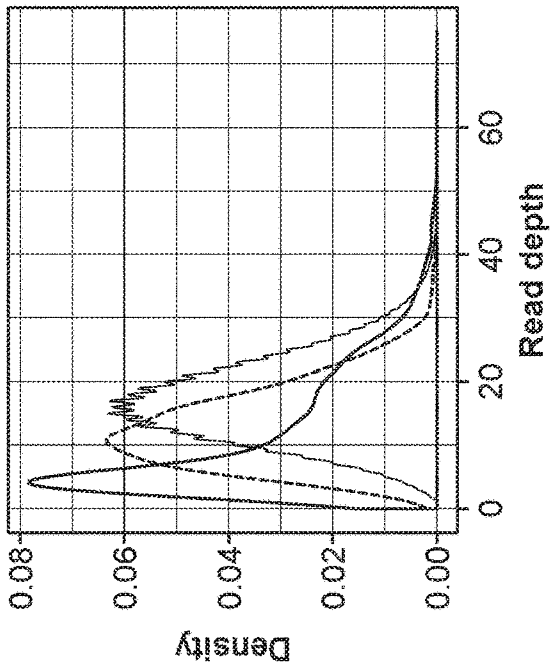
Figure 5C:
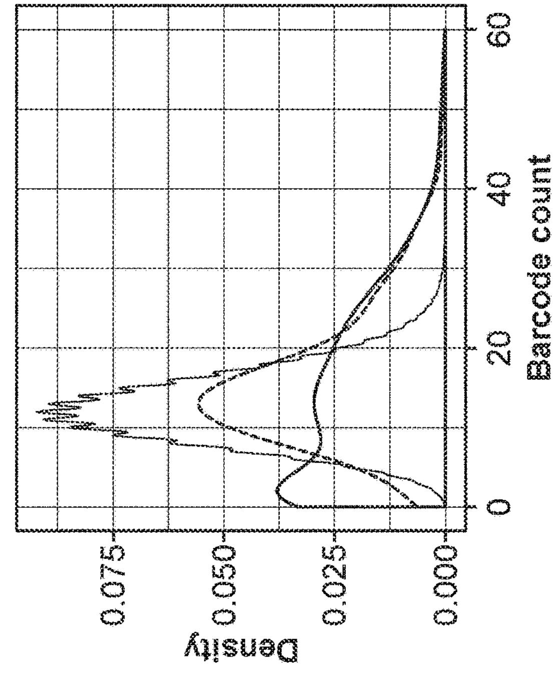
Figure 5D:
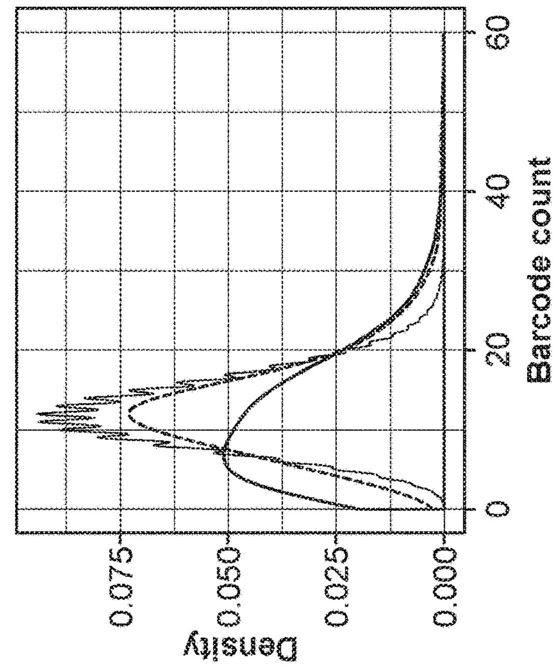
Figure 6A:
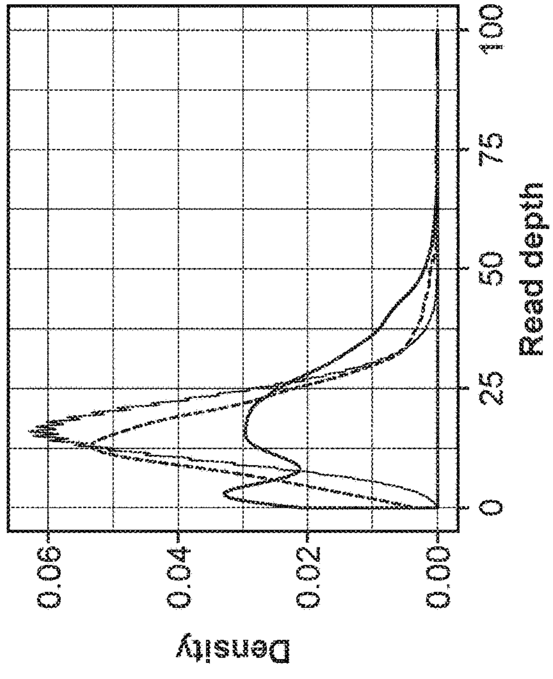
Figure 6B:
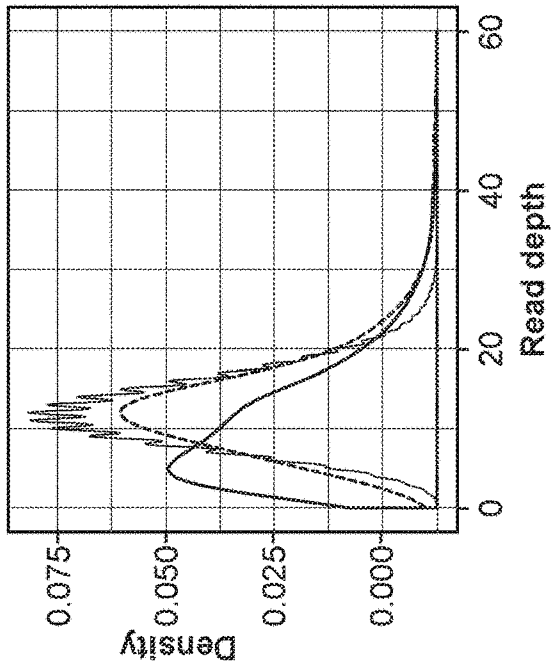
Figure 6C:
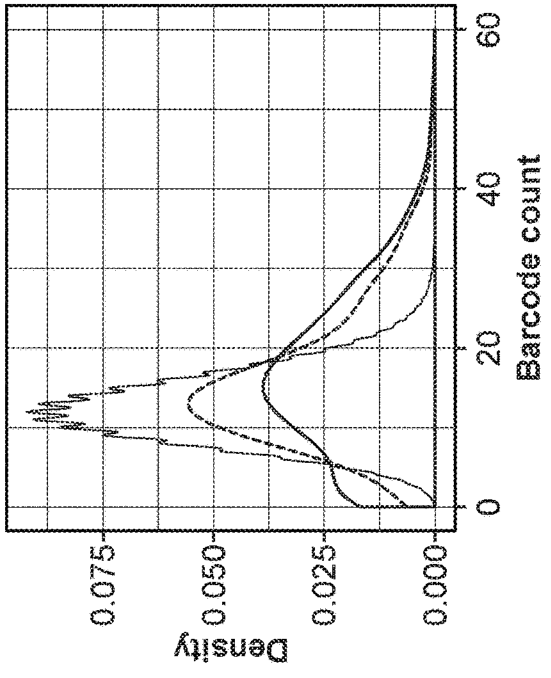
Figure 6D:
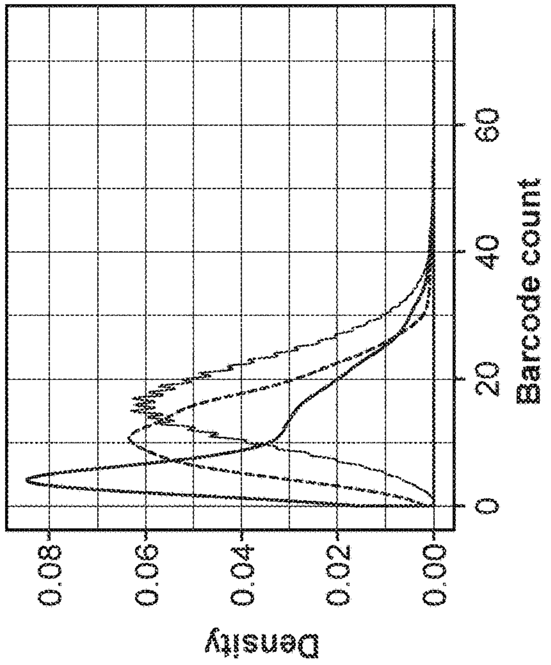

FIGS. 4(A) and 4(B): Overlap of FPs between libraries. (A) The FPs from each stLFR library, the BGISEQ-500 standard library, and a PCR-free library sequenced by Illumina (library "HiSeq2500-TruSeq_PCR-Free_DNA_2x251 NA12878" downloaded from basespace) were plotted in a Venn diagram. 2,078 FPs are shared between the four stLFR libraries. (B) The overlap of stLFR library FPs and a Chromium library FPs shows that 1,194 FPs are shared between the two different technologies that both used DNA isolated from GM12878 as opposed to the GIAB reference material for NA12878. 884 FPs are unique to stLFR libraries.

FIGS. 5(A) to 5(D): stLFR-1 variant metrics. Read depth and barcode depth were analyzed for the reference and variant alleles for all true positive variants, false positive variants, and shared false positive variants. The read depth for the reference (A) and alternative (B) alleles are plotted as are the barcode counts for the reference (C) and alternative (D) alleles. In general, the shared false positives look more like the true positives suggesting there are some filtering criteria that can differentiate between these variants and unshared false positives.

FIGS. 6(A) to 6(D): stLFR-3 variant metrics. Read depth and barcode depth were analyzed for the reference and variant alleles for all true positive variants, false positive variants, and shared false positive variants. The read depth for the reference (A) and alternative (B) alleles are plotted as are the barcode counts for the reference (C) and alternative (D) alleles. In general, the shared false positives look more like the true positives suggesting there are some filtering criteria that can differentiate between these variants and unshared false positives.

Figure 7A:
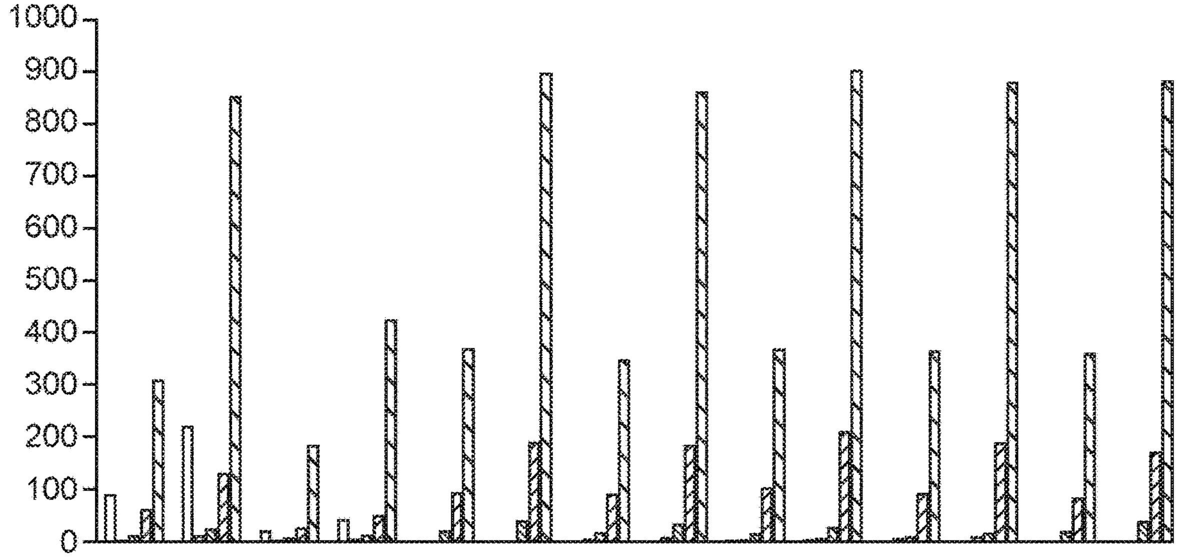
Figure 7B:
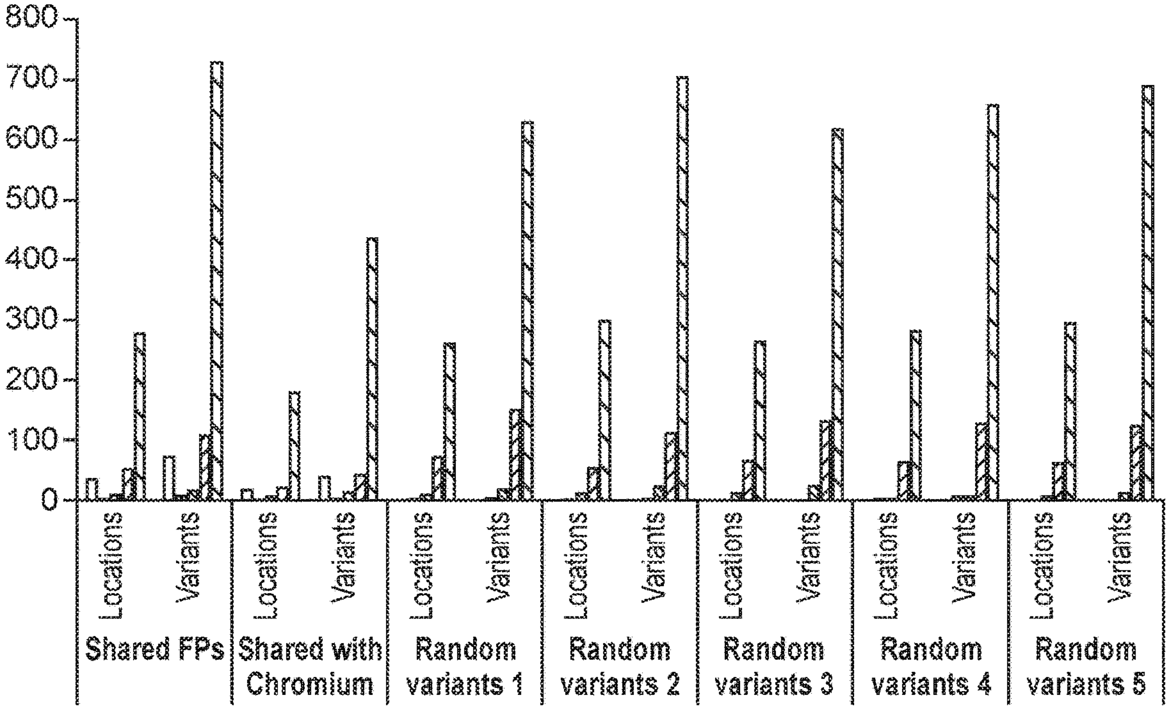

FIGS. 7(A) and 7(B): Shared false positive variant distribution. The genomic distance separating 2,078 shared FP variants were summed within consecutive bins of 100 bp, 1,000 bp, 10,000 bp, 100,000 bp, and 1 million bp. 5 sets of 2,078 randomly selected variants from the stLFR-1 library were also plotted. For each sample the total number of locations or the total number of variants are plotted. Only bins or the variants within bins where 2 or more variants are found are summed. (A) Before filtering there are 219 shared FPs that appear to be tightly clustered and are probably the result of mapping errors. The remaining 1,859 variants appear to share a distribution similar to random sets of variants. (B) After filtering 1,738 shared FPs remain, but only 72 are tightly clustered.

Figure 8A:
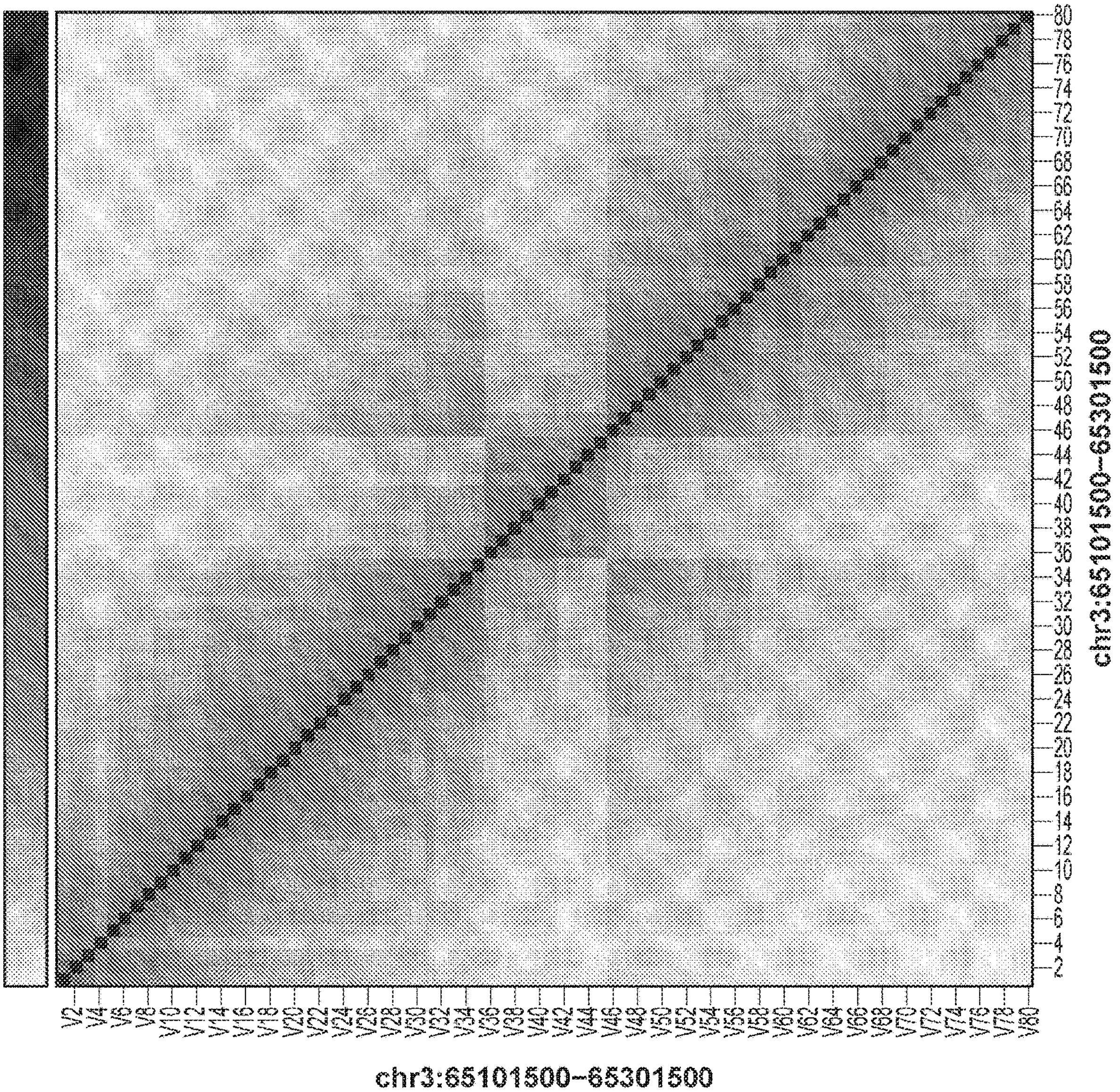
Figure 8B:
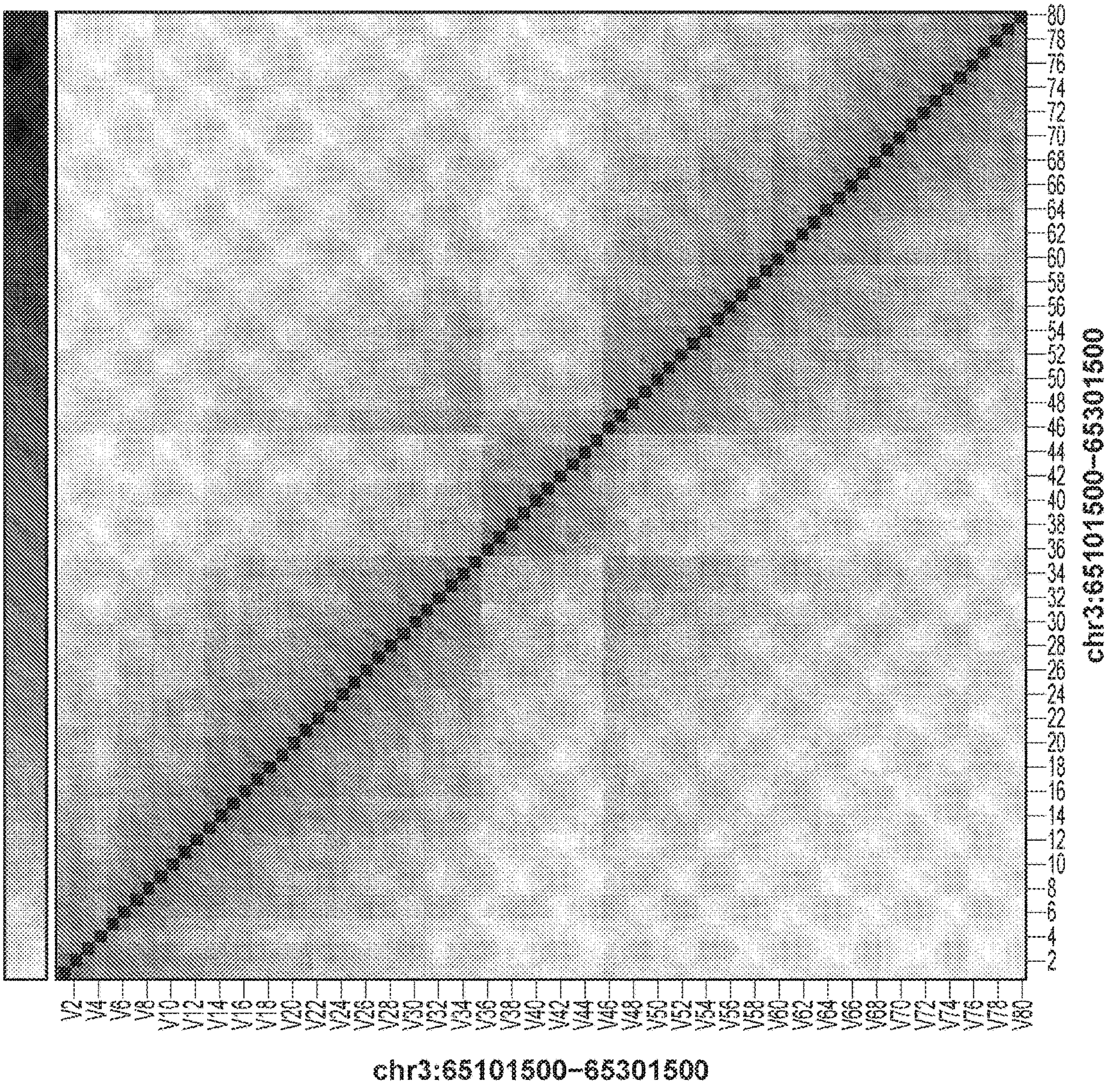
Figure 8C:
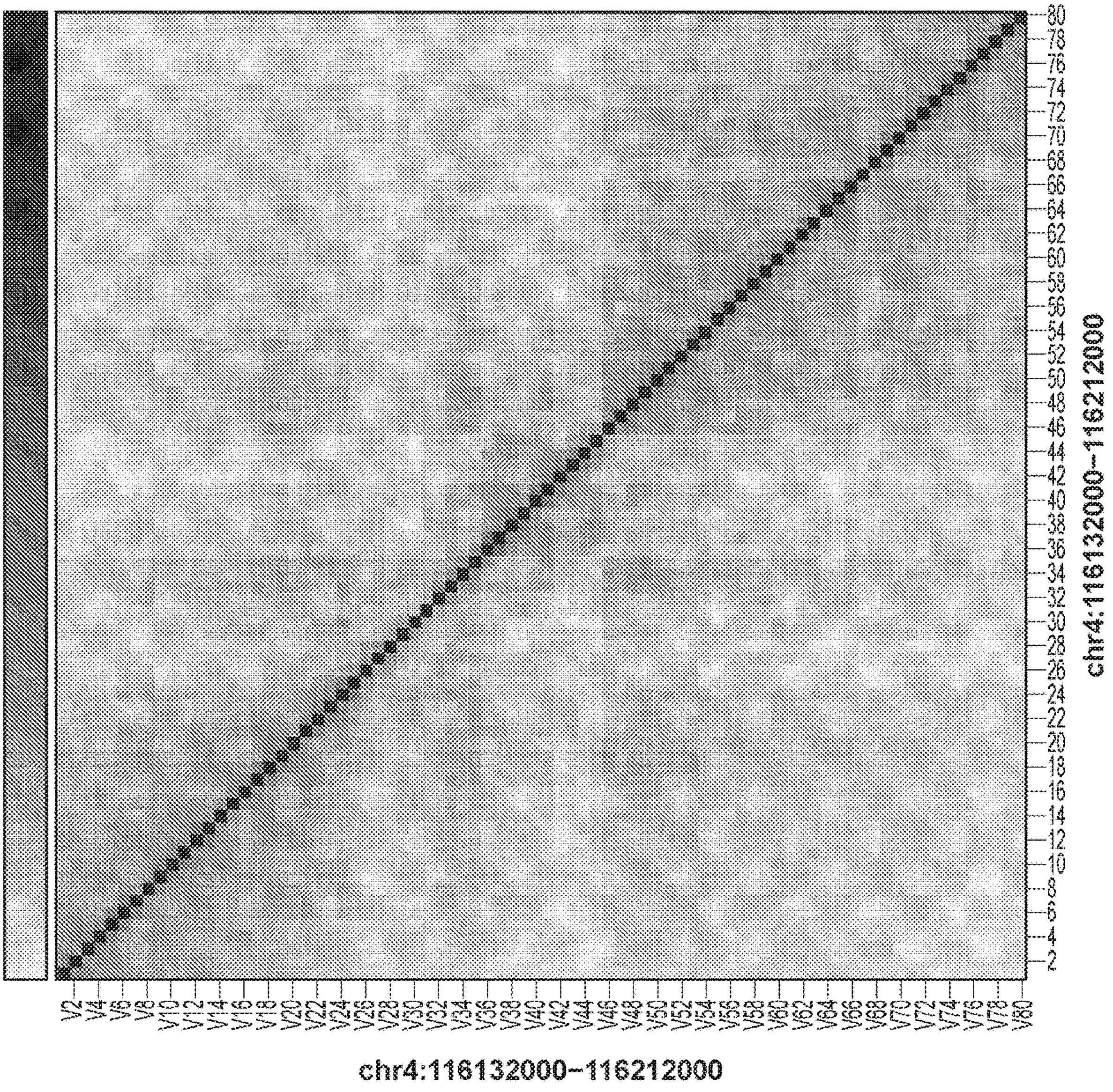
Figure 8D:
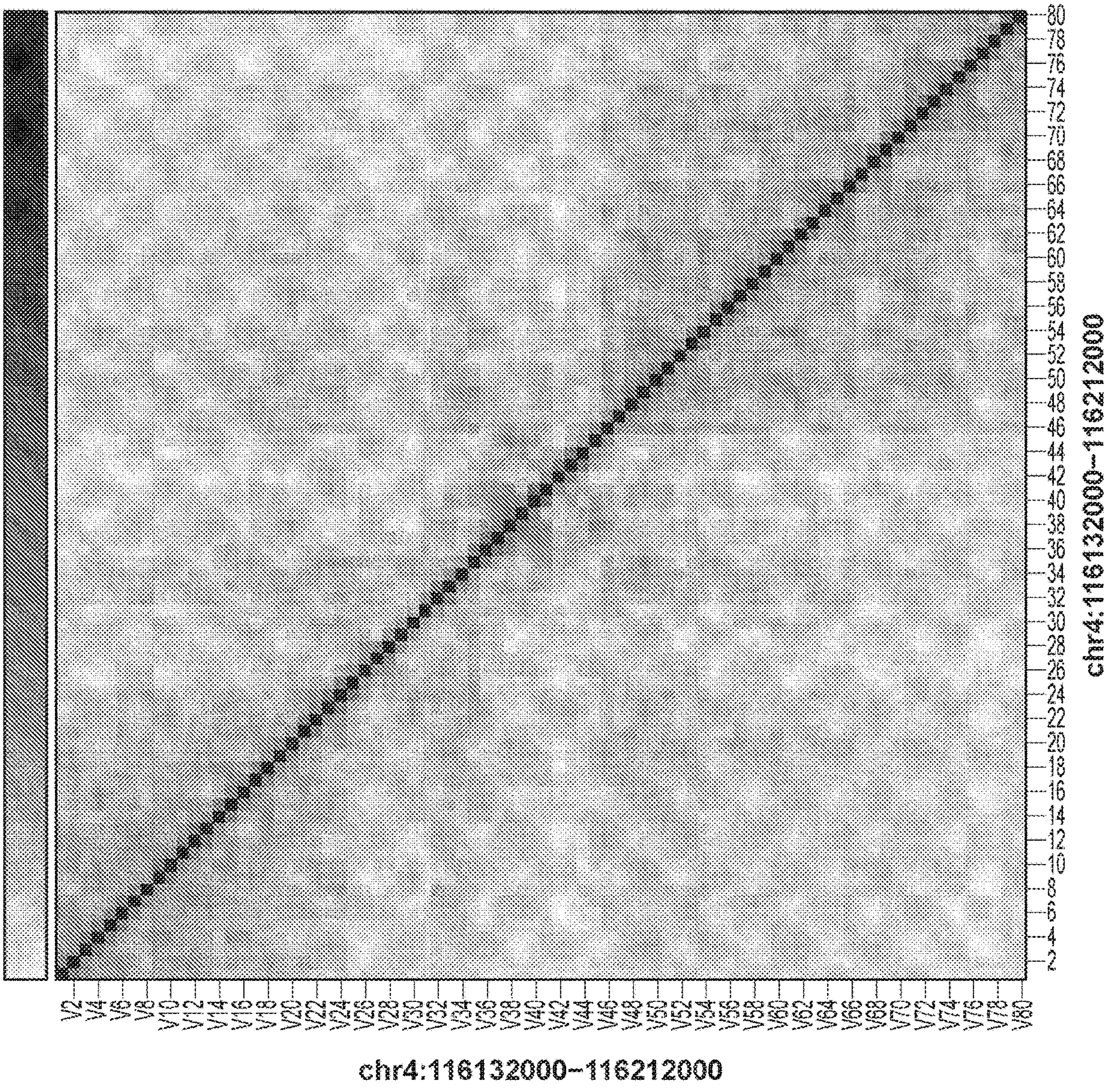
Figure 8E:
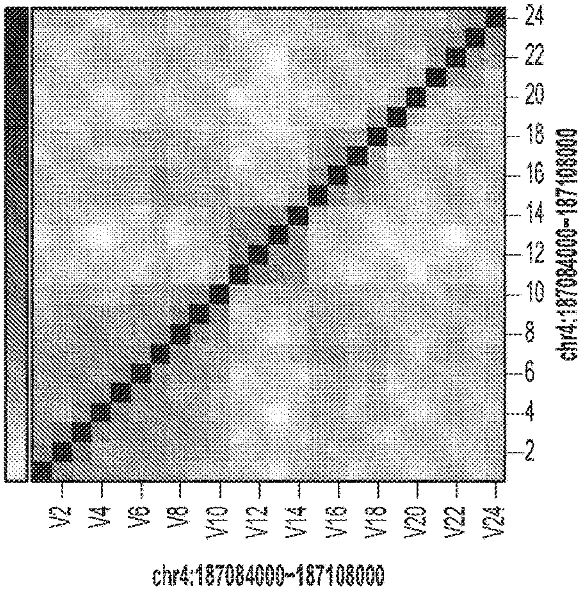
Figure 8F:
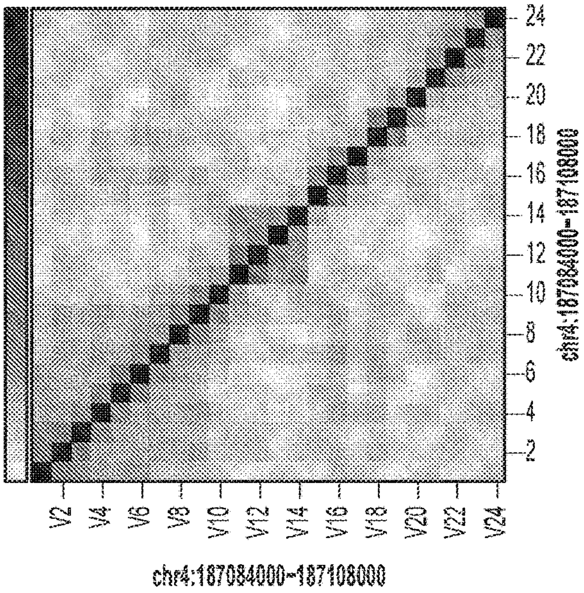
Figure 8G:
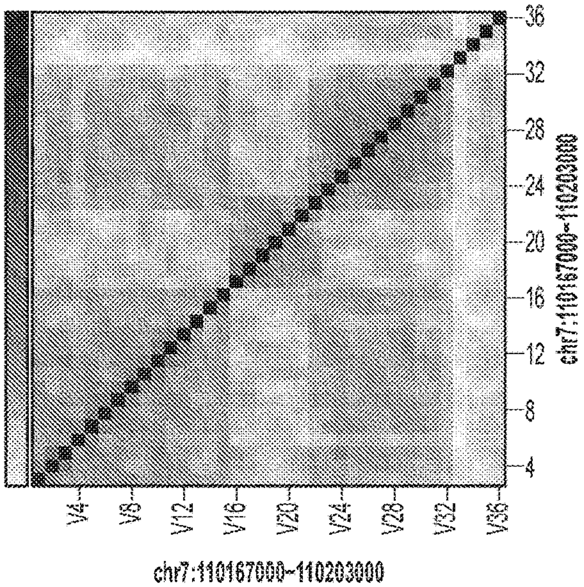
Figure 8H:
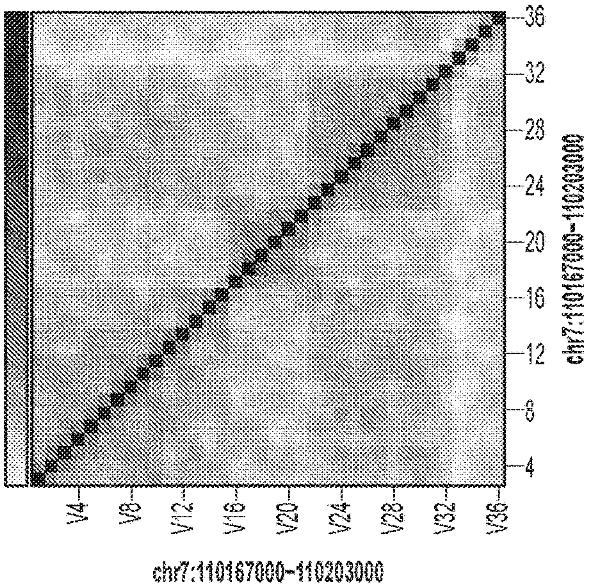
Figure 8I:
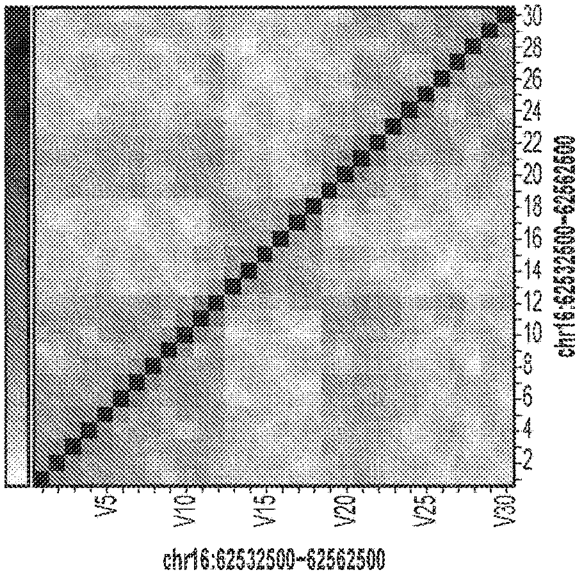
Figure 8J:
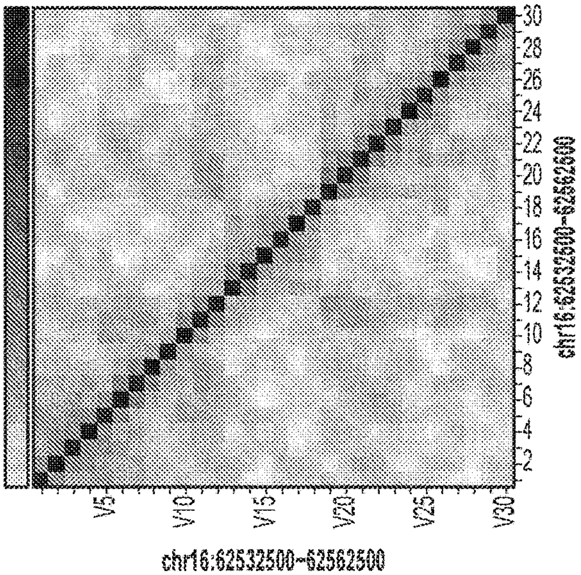
Figure 8K:
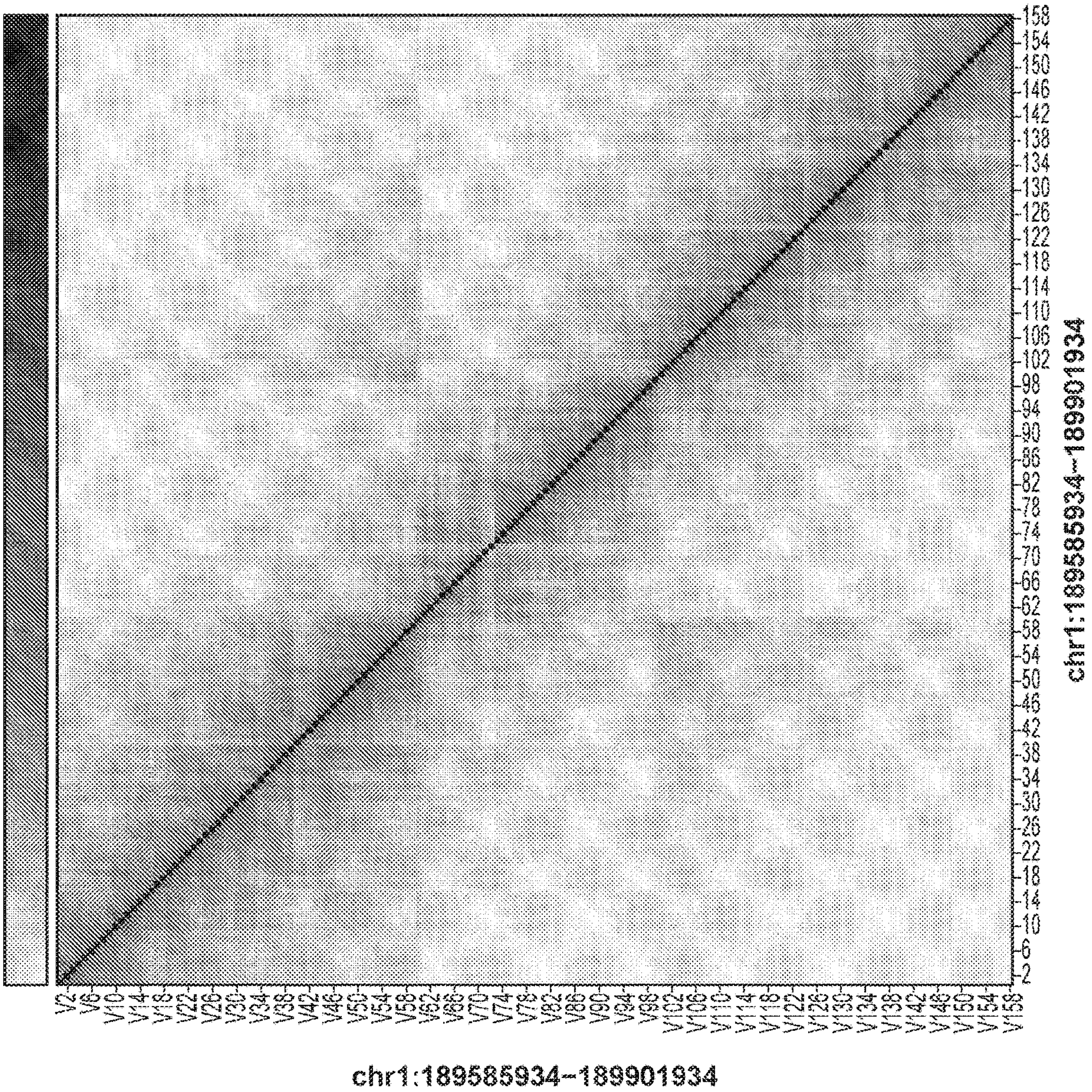
Figure 8L:
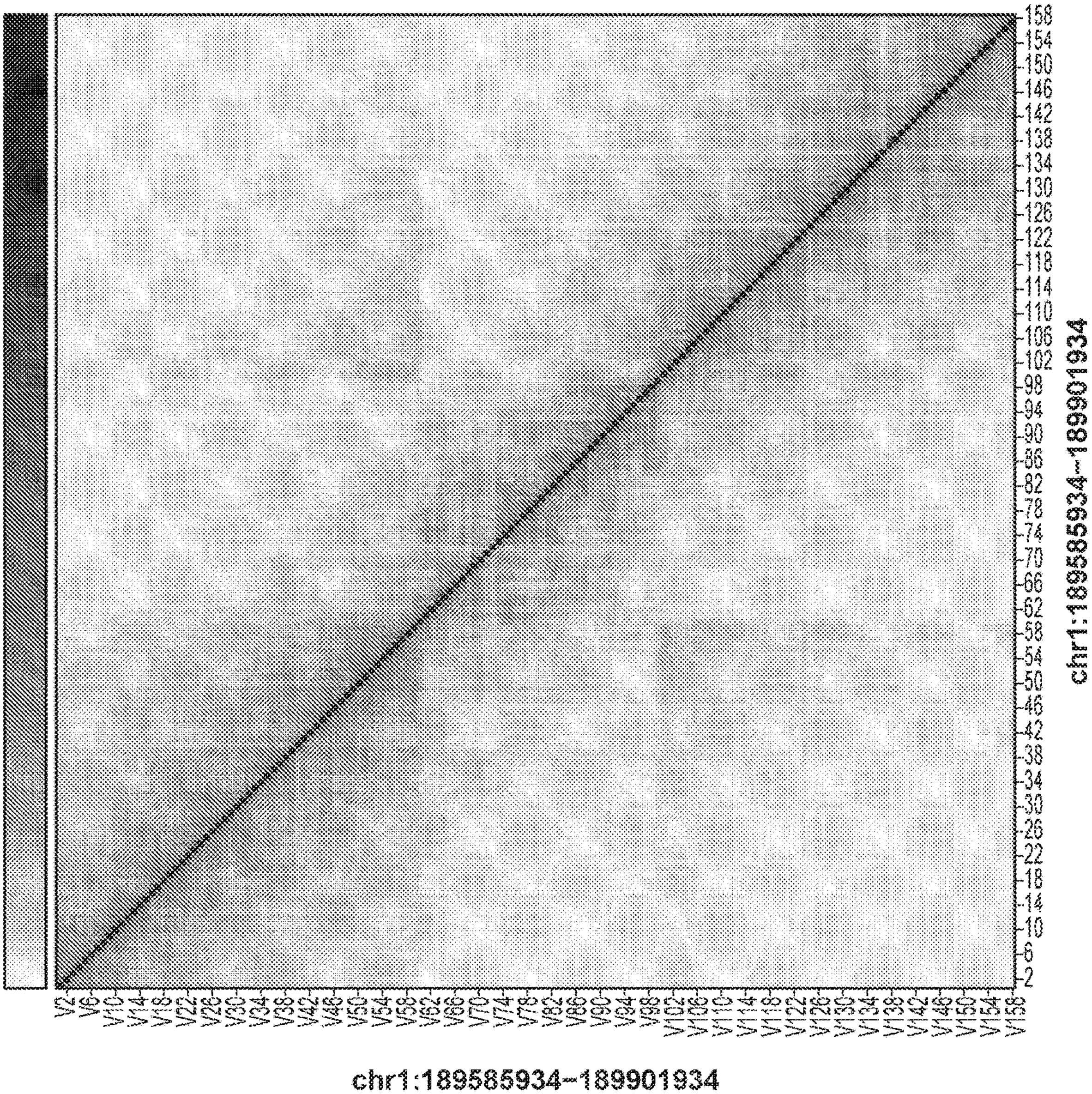
Figure 8M:
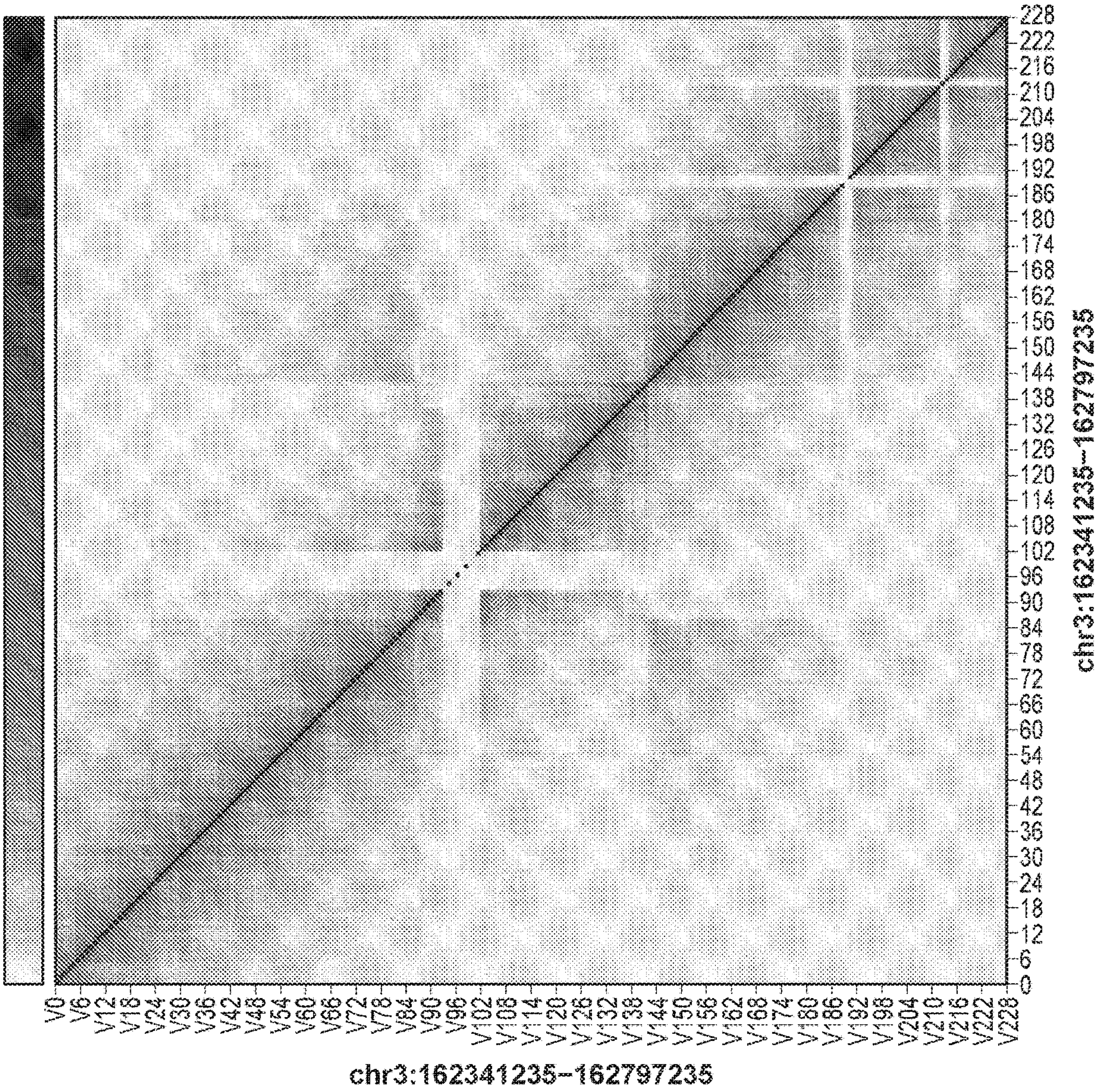
Figure 8N:
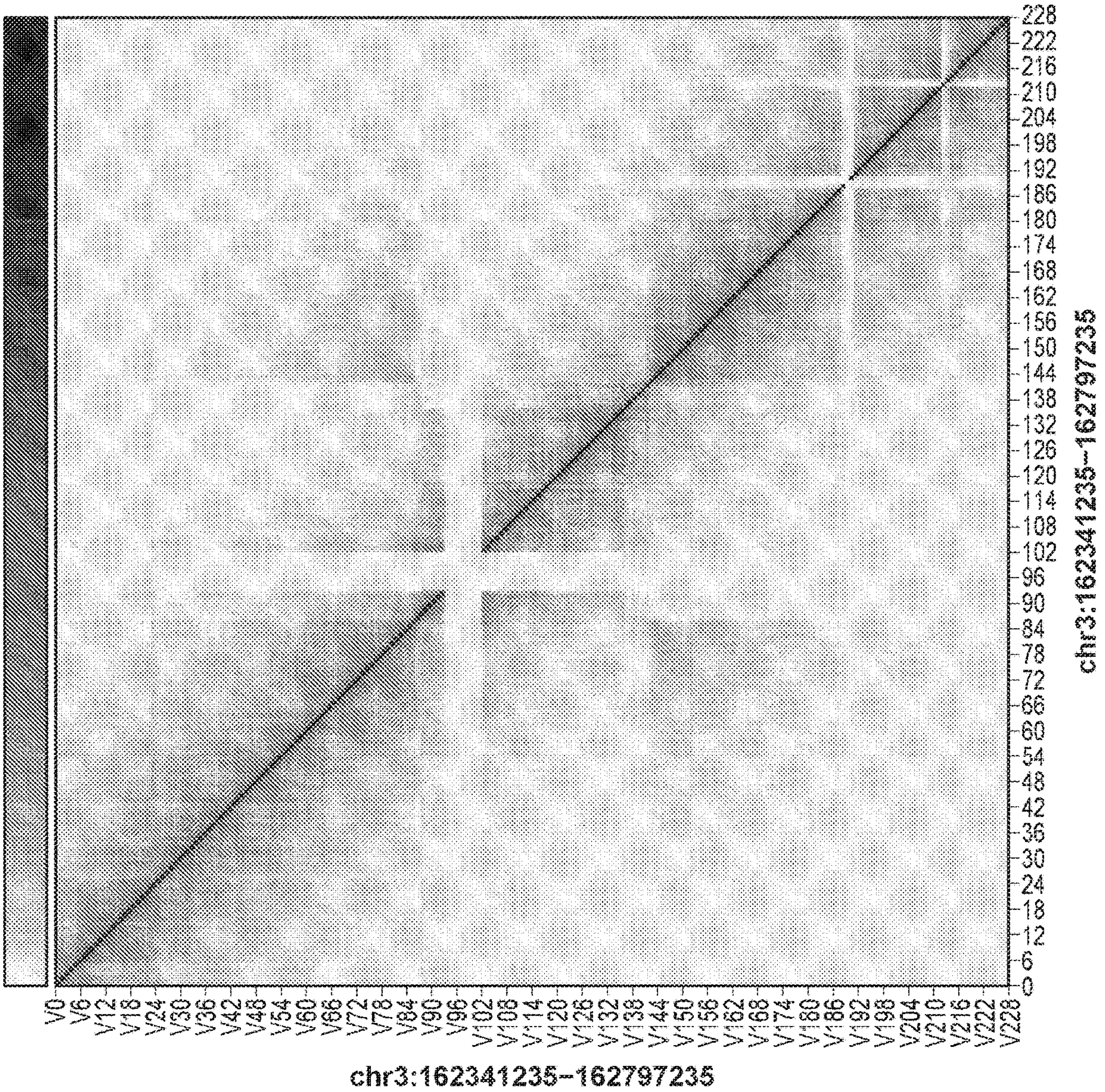
Figure 8O:
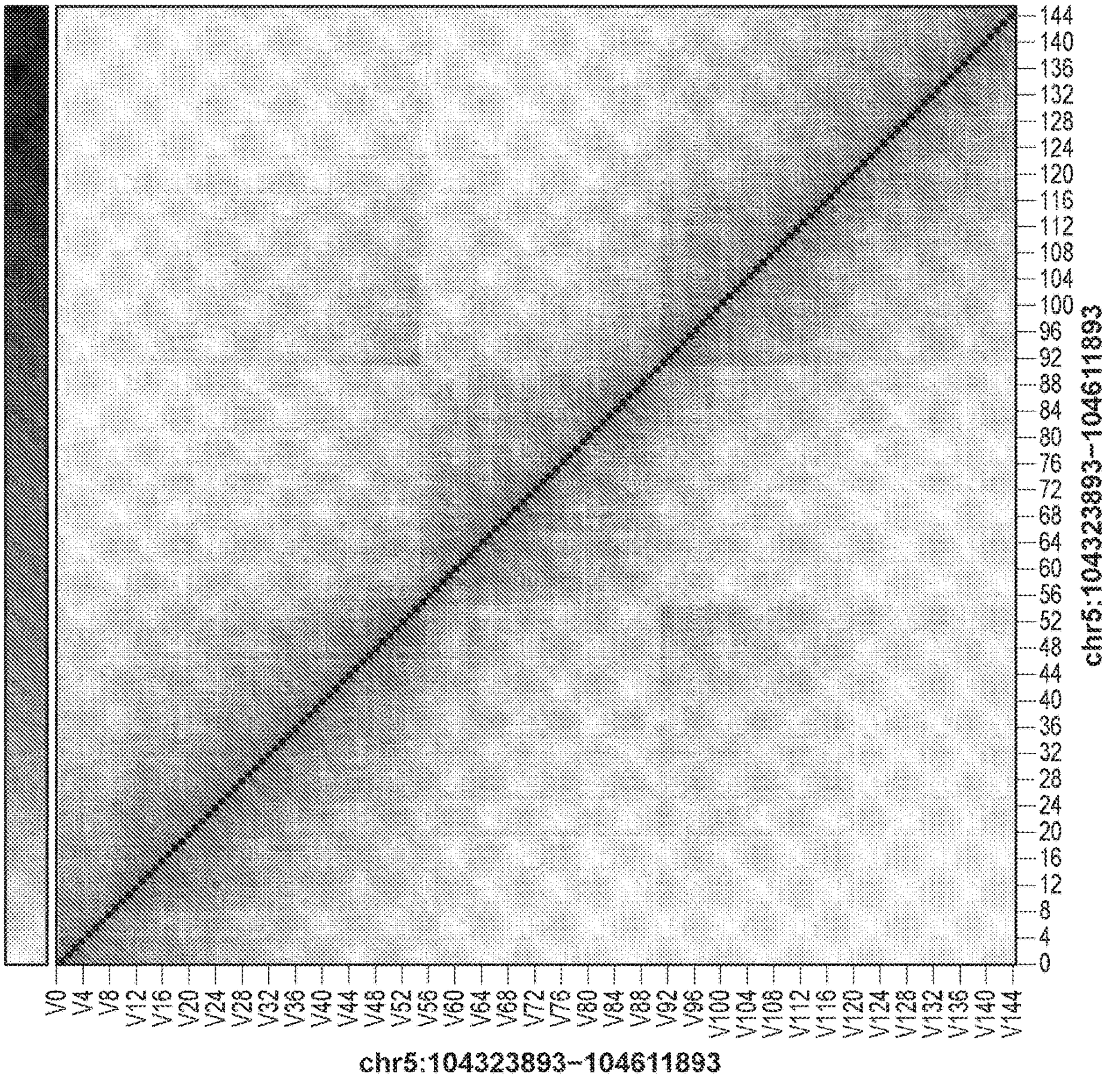
Figure 8P:
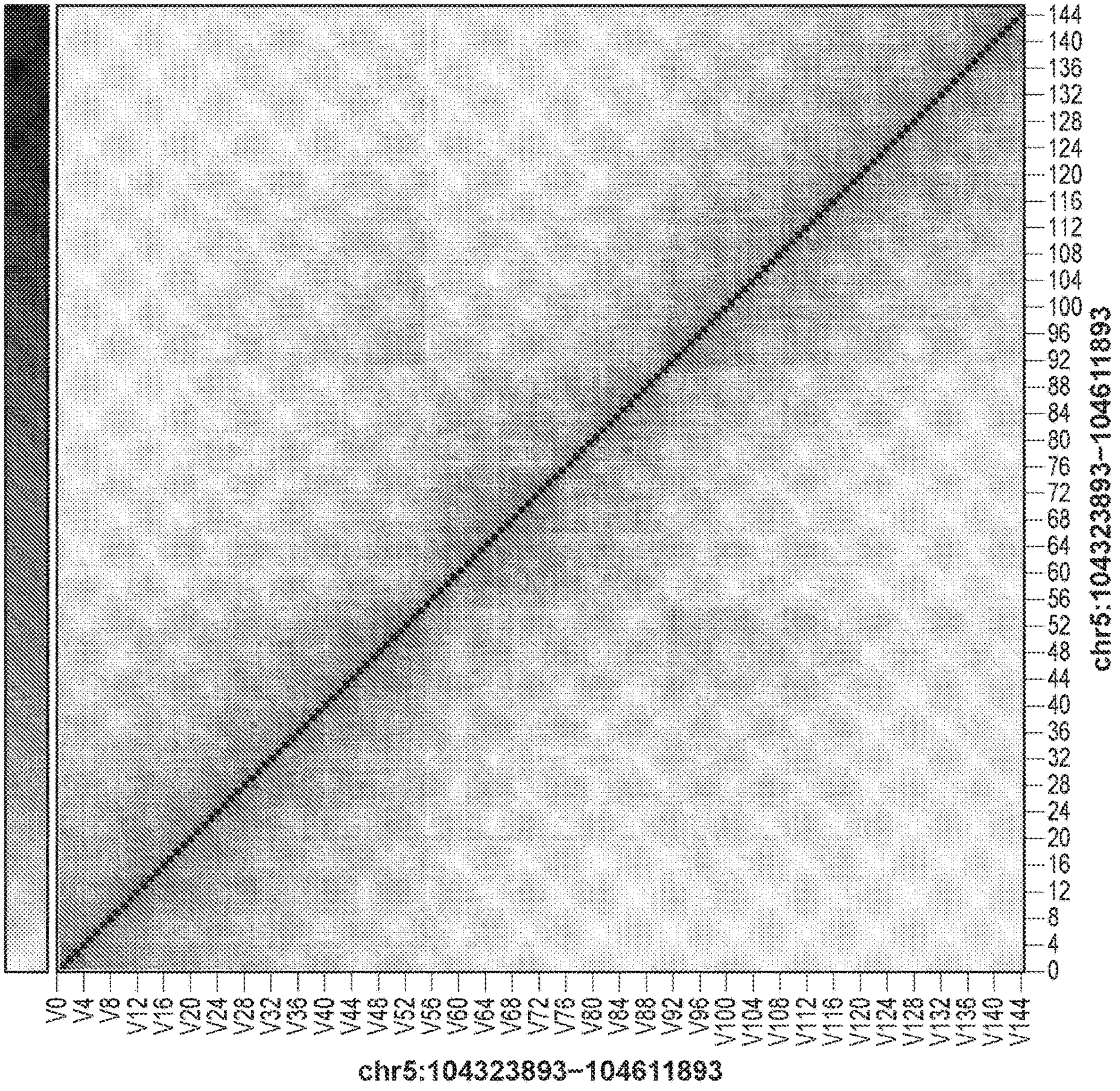
Figure 8Q:
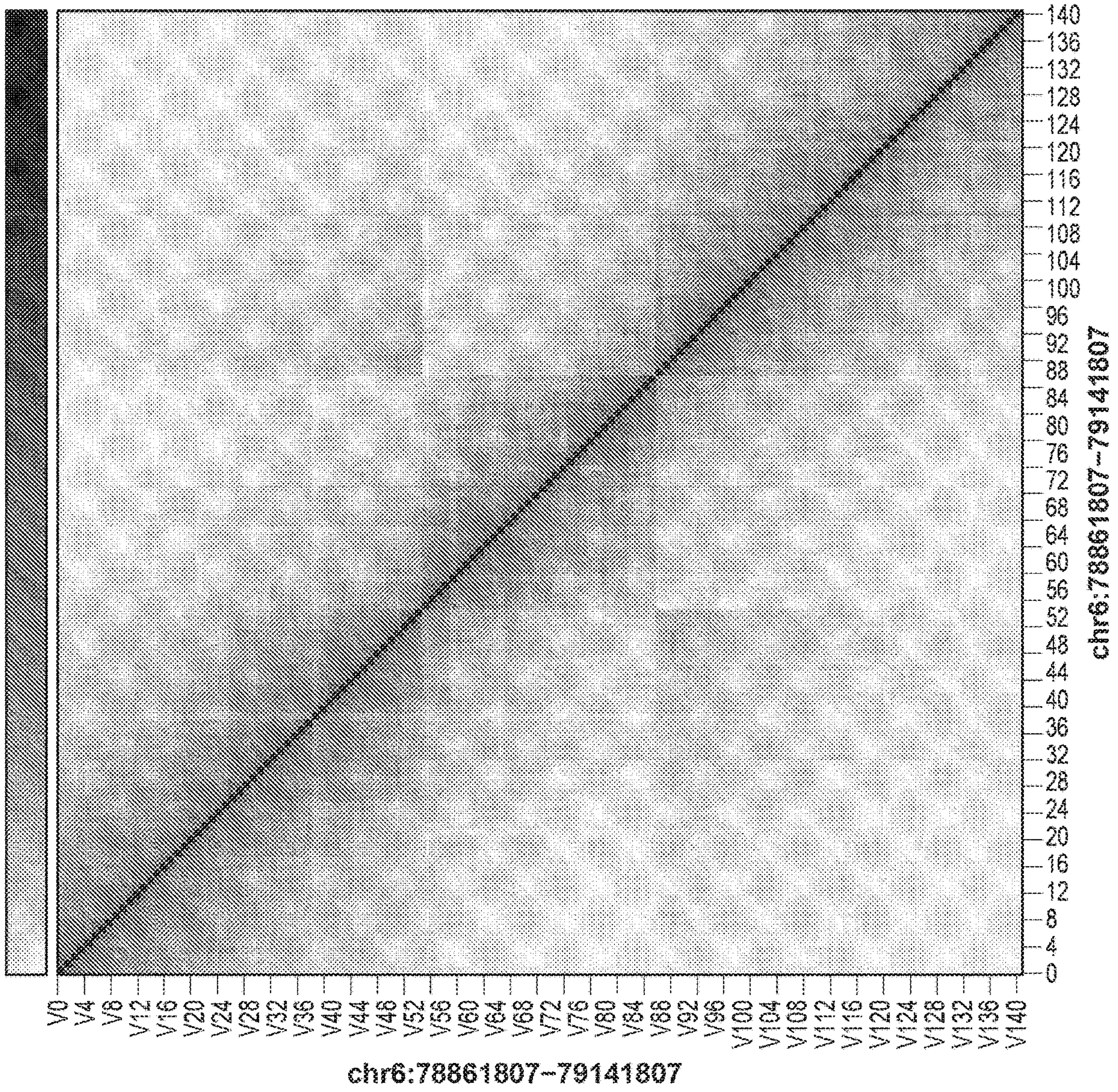
Figure 8R:
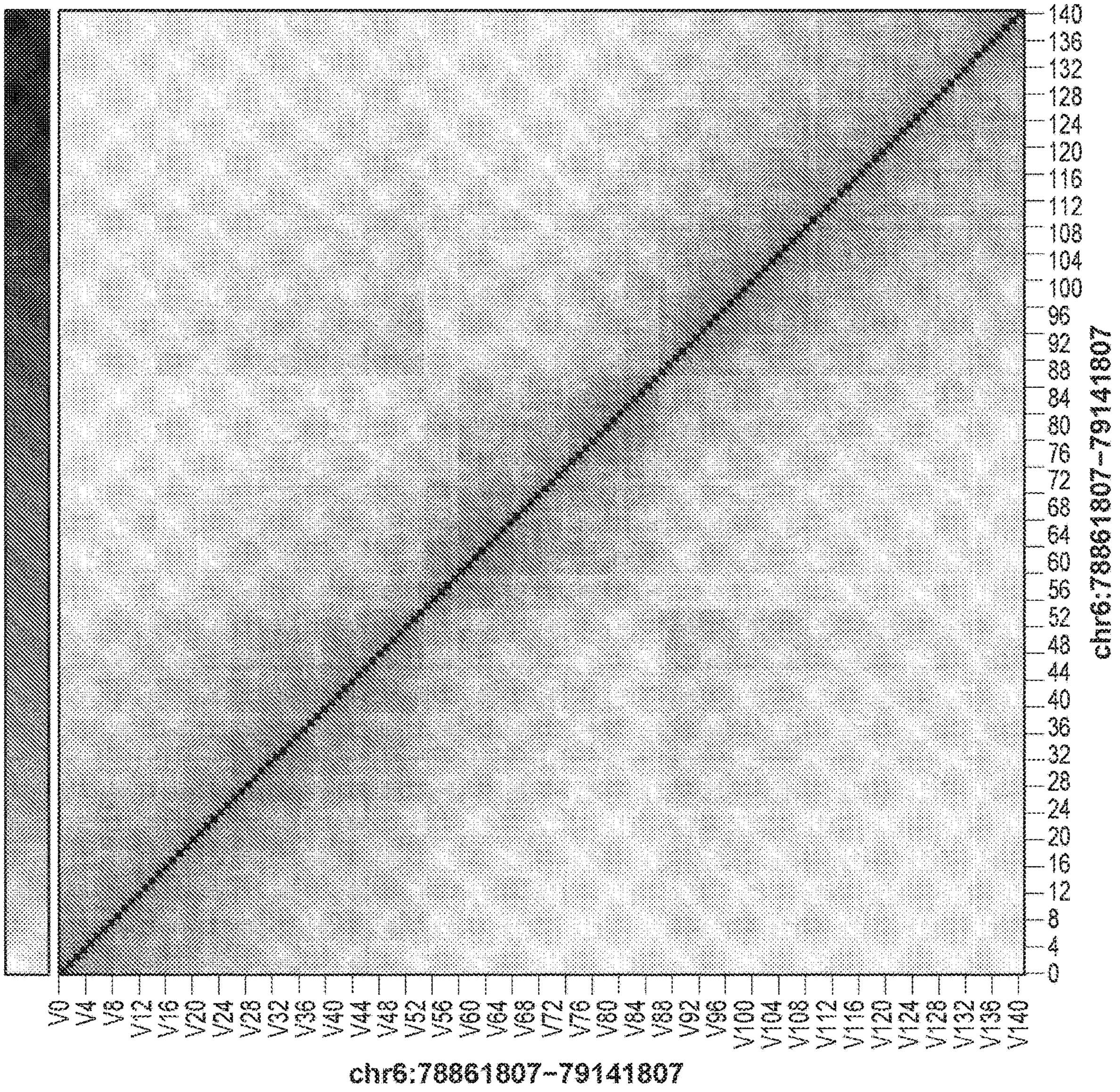
Figure 8S:
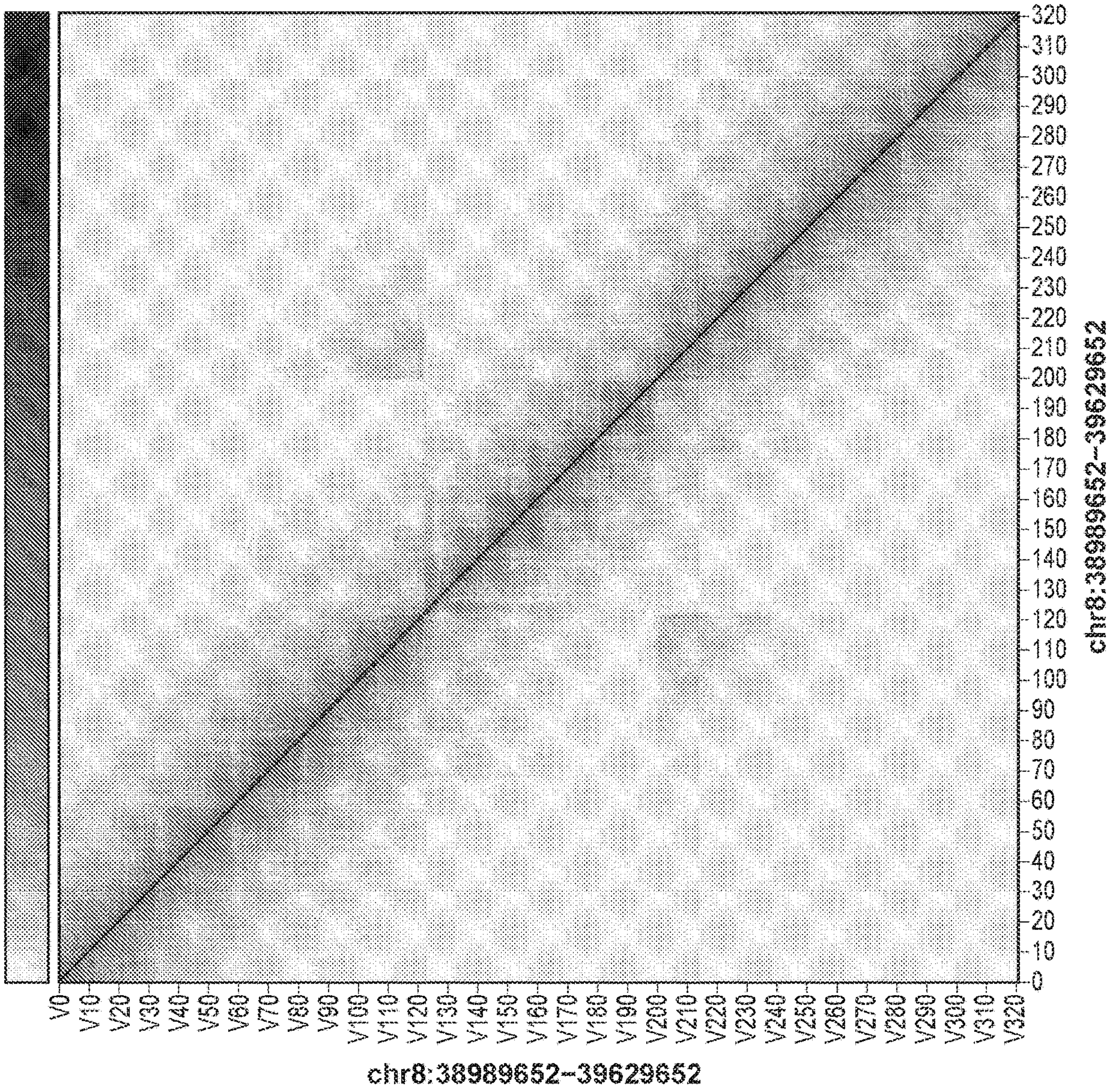
Figure 8T:
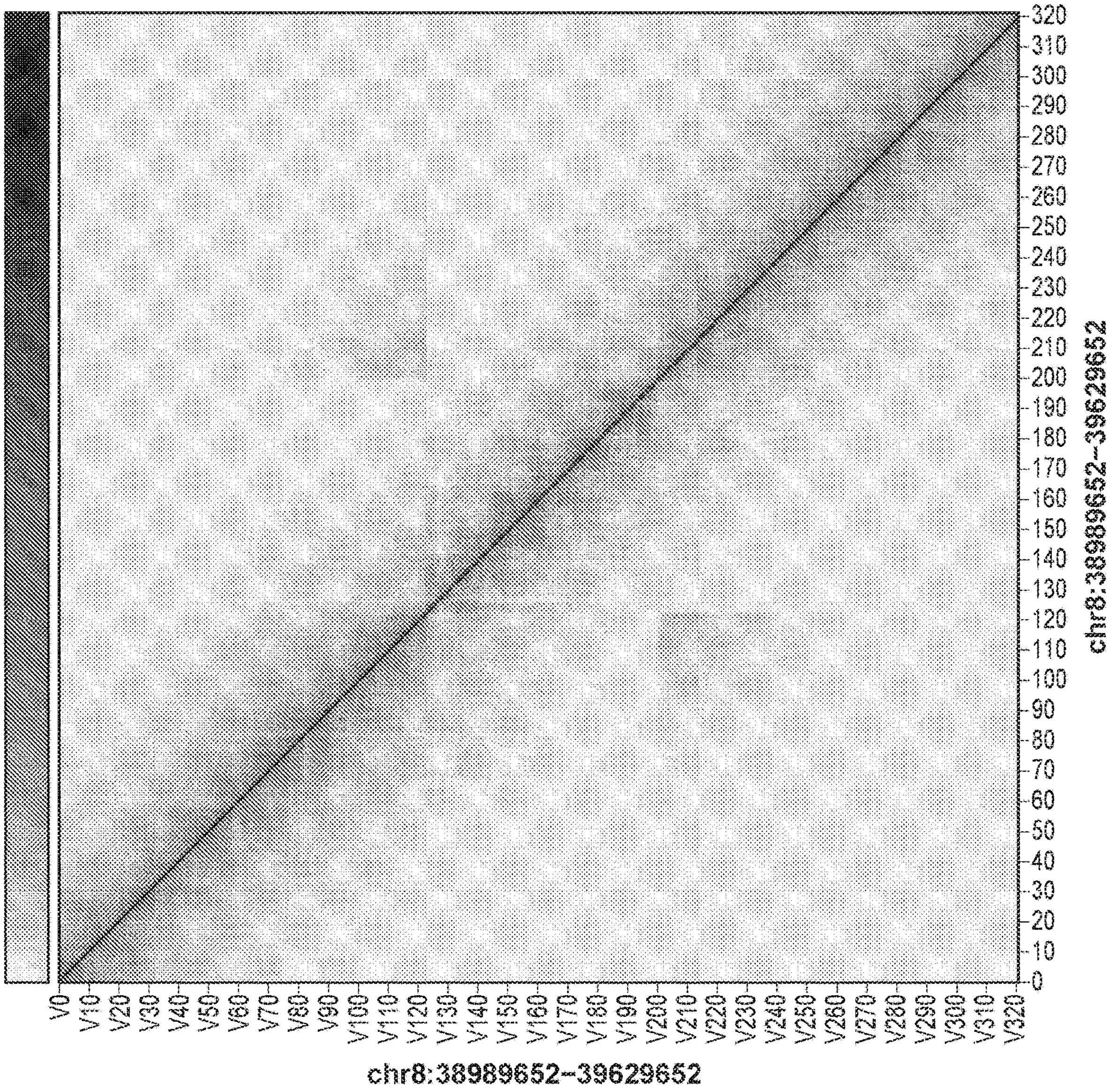
Figure 9A:
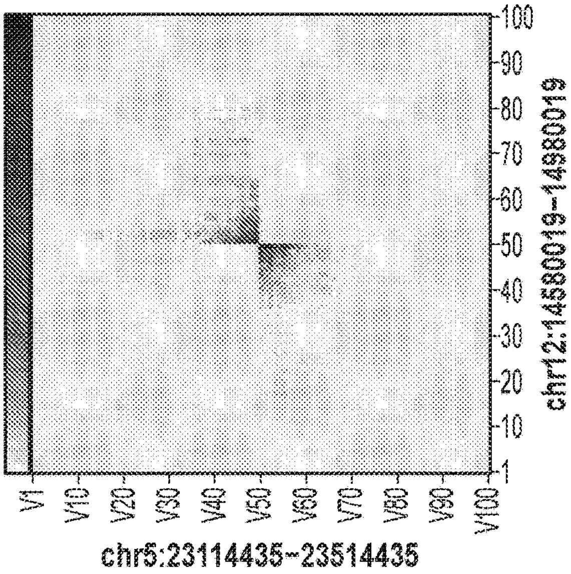
Figure 9B:
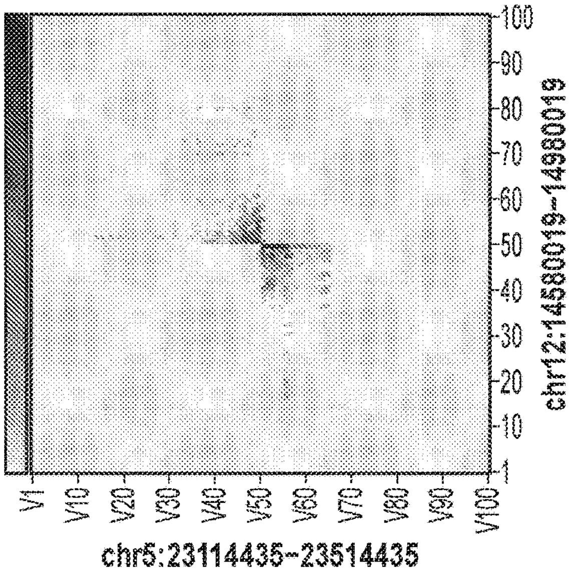
Figure 9C:
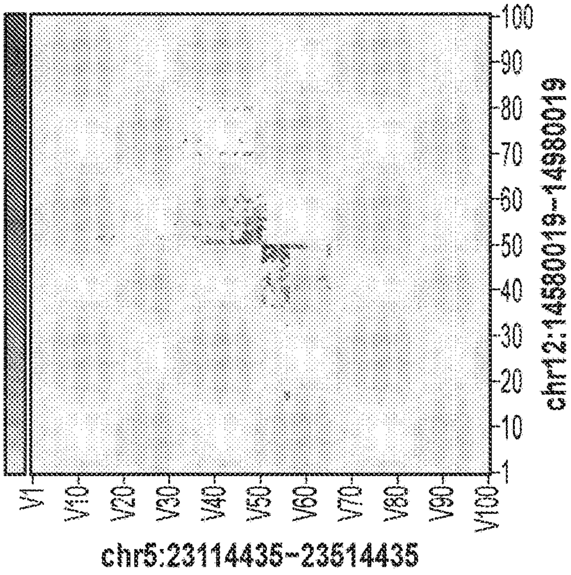
Figure 9D:
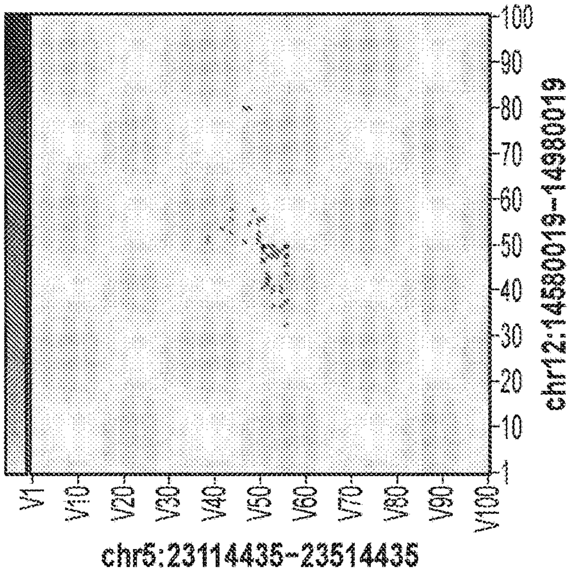
Figure 9E:
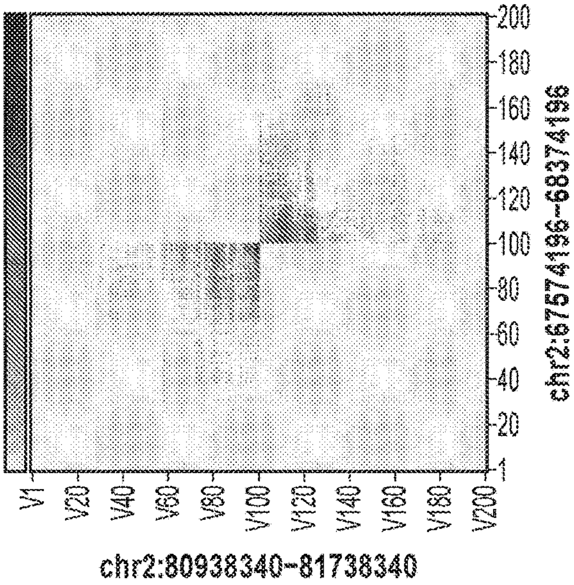
Figure 9F:
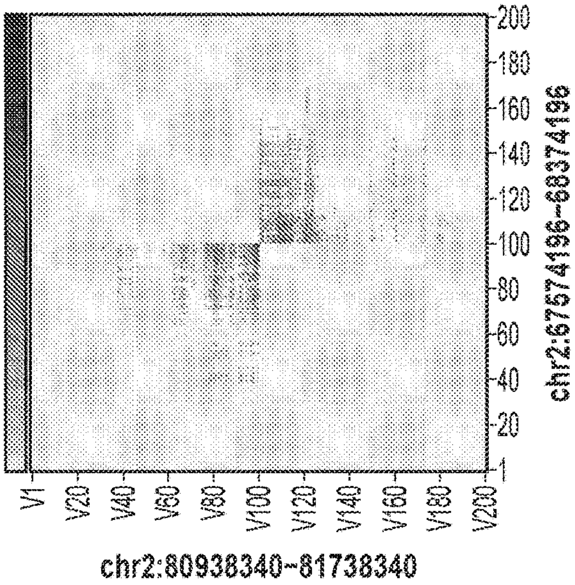
Figure 9G:
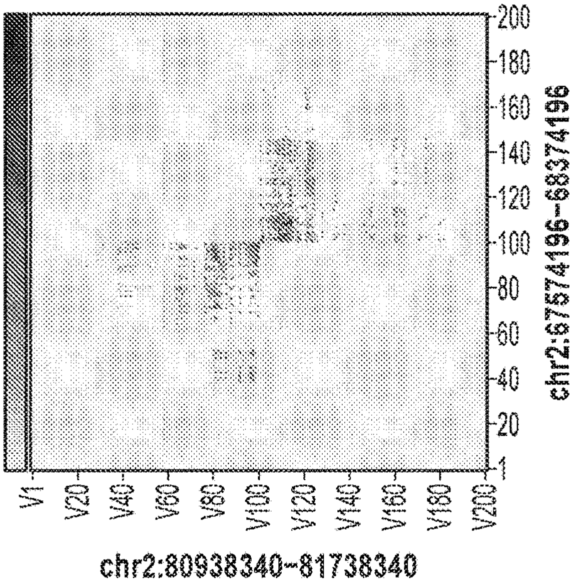
Figure 9H:
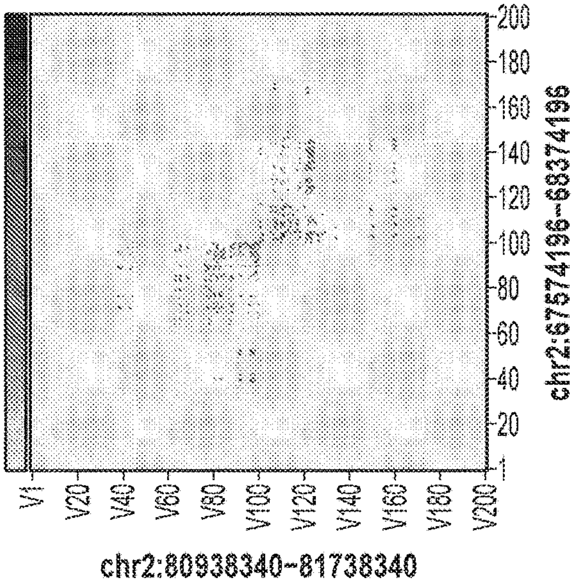
Figure 9I:
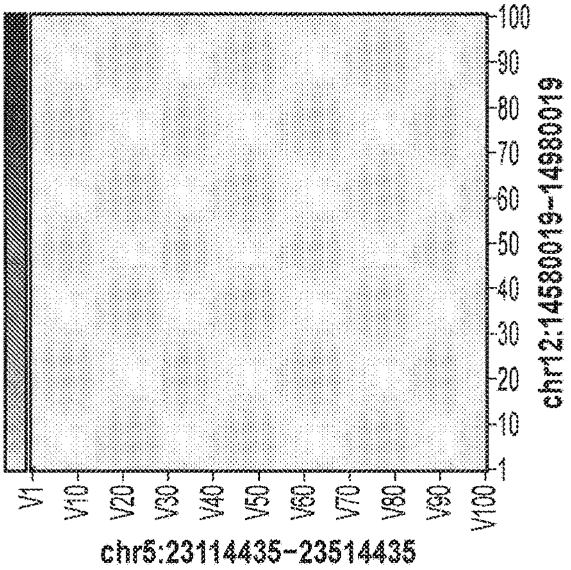
Figure 9J:
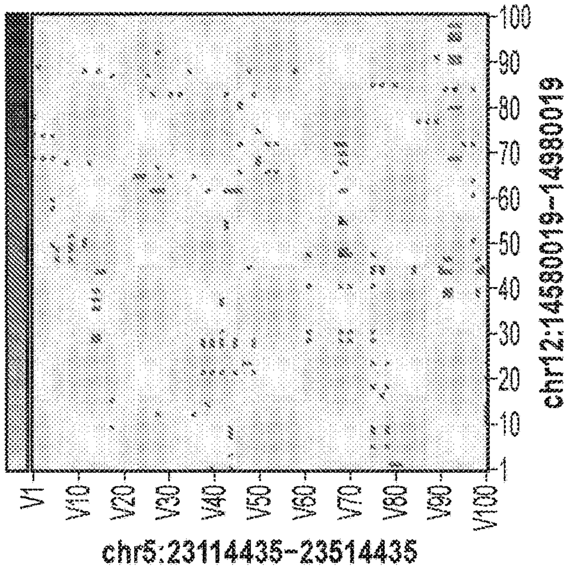
Figure 9K:
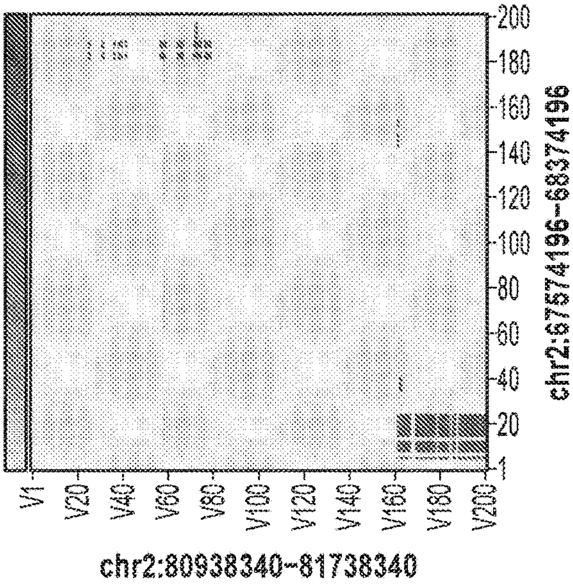
Figure 9L:
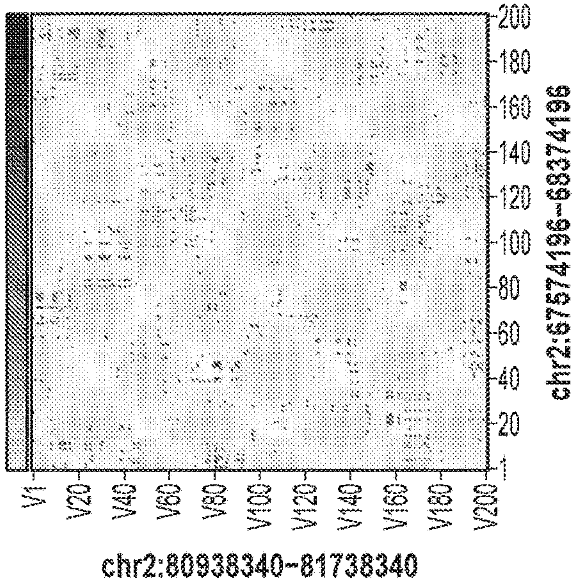

FIGS. 8(A) to 8(T): NA12878 deletion detection using barcode sharing heatmaps. Detection of deletions in the stLFR-1 library at chr3: 65189000-65213999 using 230 Gb (A) or 100 Gb (B), chr4: 116167000-116176999 using 230 Gb (C) or 100 Gb (D), chr4: 187094000-187097999 230 Gb (E) or 100 Gb (F), chr7: 110182000-110187999 230 Gb (G) or 100 Gb (H), chr16: 62545000-62549999 230 Gb (I) or 100 Gb (J), chr1: 189704509-189783359 230 Gb (K) or 100 Gb (L), chr3: 162512134-162569235 230 Gb (M) or 100 Gb (N), chr5: 104432113-104467893 230 Gb (O) or 100 Gb (P), chr6: 78967194-79001807, and chr8: 39232074-39309652 230 Gb(S) or 100 Gb (T) of read data.

FIGS. 9(A) to 9(L): Translocation and inversion detection with stLFR. A patient cell line and cell line GM20759 harboring a translocation between chromosome 5 and 12 and an inversion on chromosome 2, respectively, were analyzed with stLFR. For each library the total sequence coverage was downsampled to investigate the detection ability at lower coverages. The translocation between chromosome 12 and 5 was easily detected at total sequence coverages of 40 Gb (A), 20 Gb (B), 10 Gb (C), and even 5 Gb (D). The inversion in GM20759 was also easily detected at total sequence coverages of 46 Gb (E), 20 Gb (F), 10 Gb (G), and 5 Gb (H). In addition, we investigated these regions in the GM12878 cell line which is not known to harbor either of these SVs. The translocation between chromosome 5 and 12 was not evident in either the stLFR library from 1 ng with 230 Gb of coverage (I) or the 10 ng library with 126 Gb of coverage (J). The transversion also was not found in the stLFR-1 (K) or stLFR-4 library (L) either.

Figure 10A:
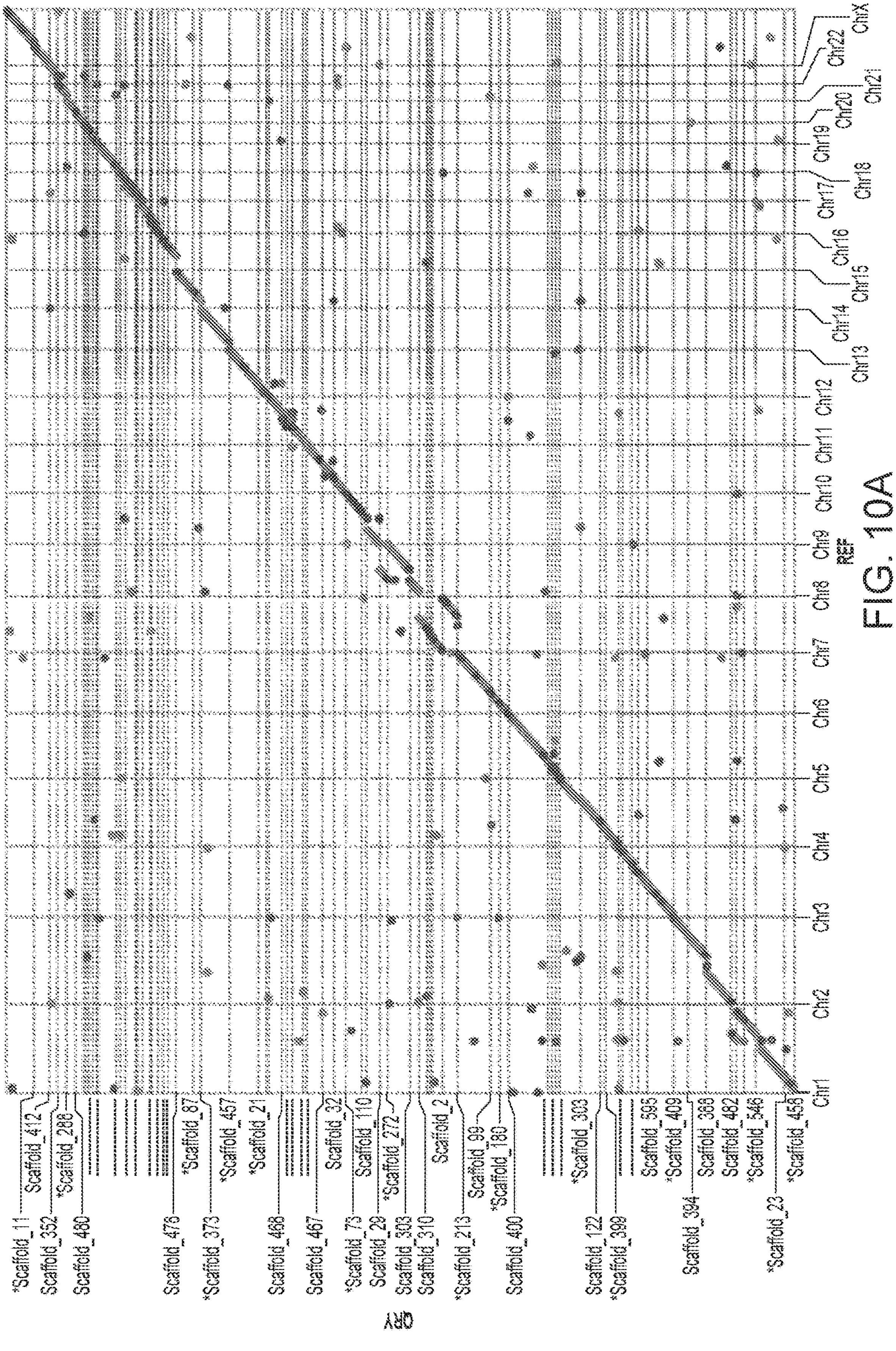
Figure 10B:
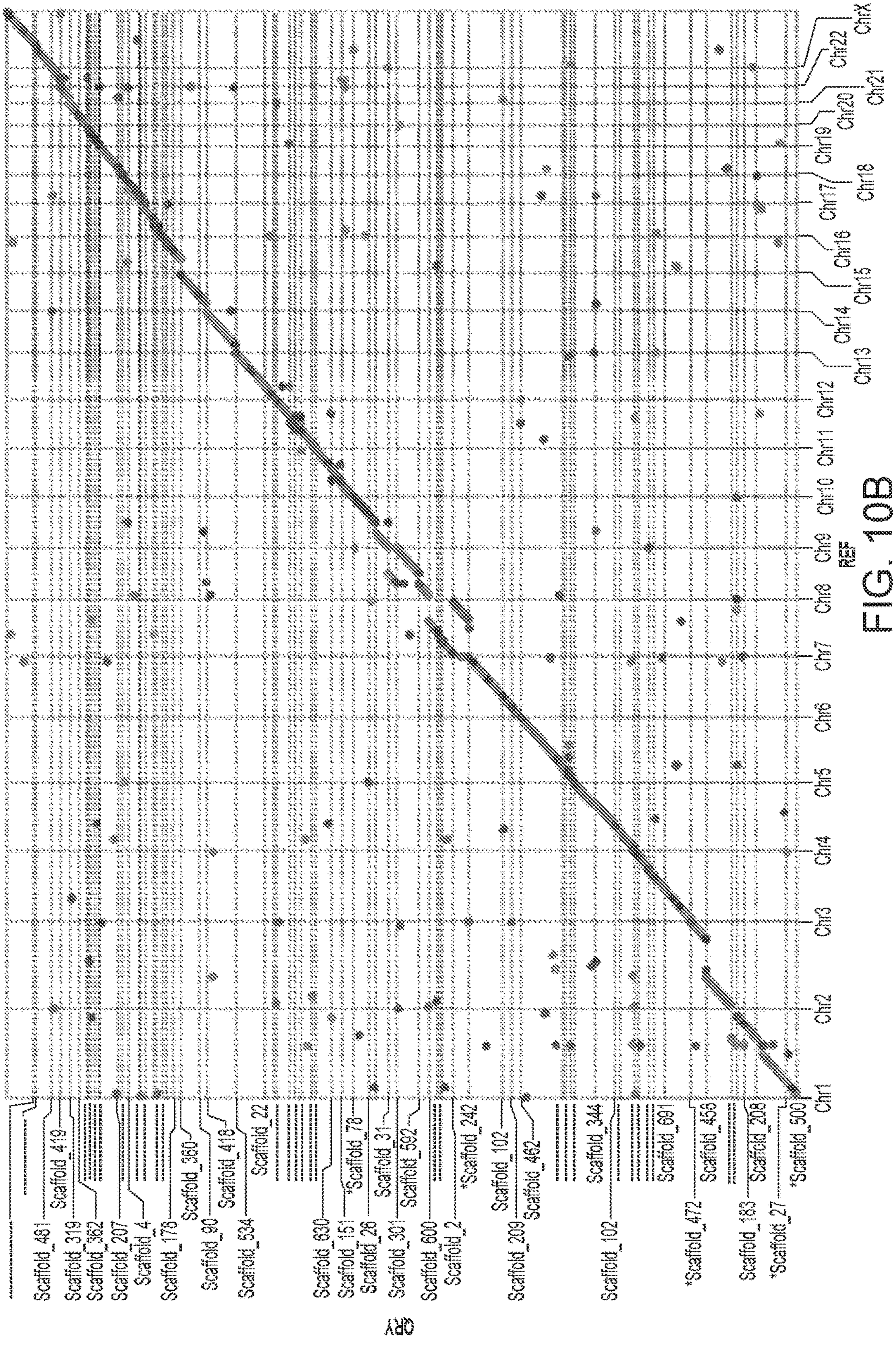
Figure 10C:
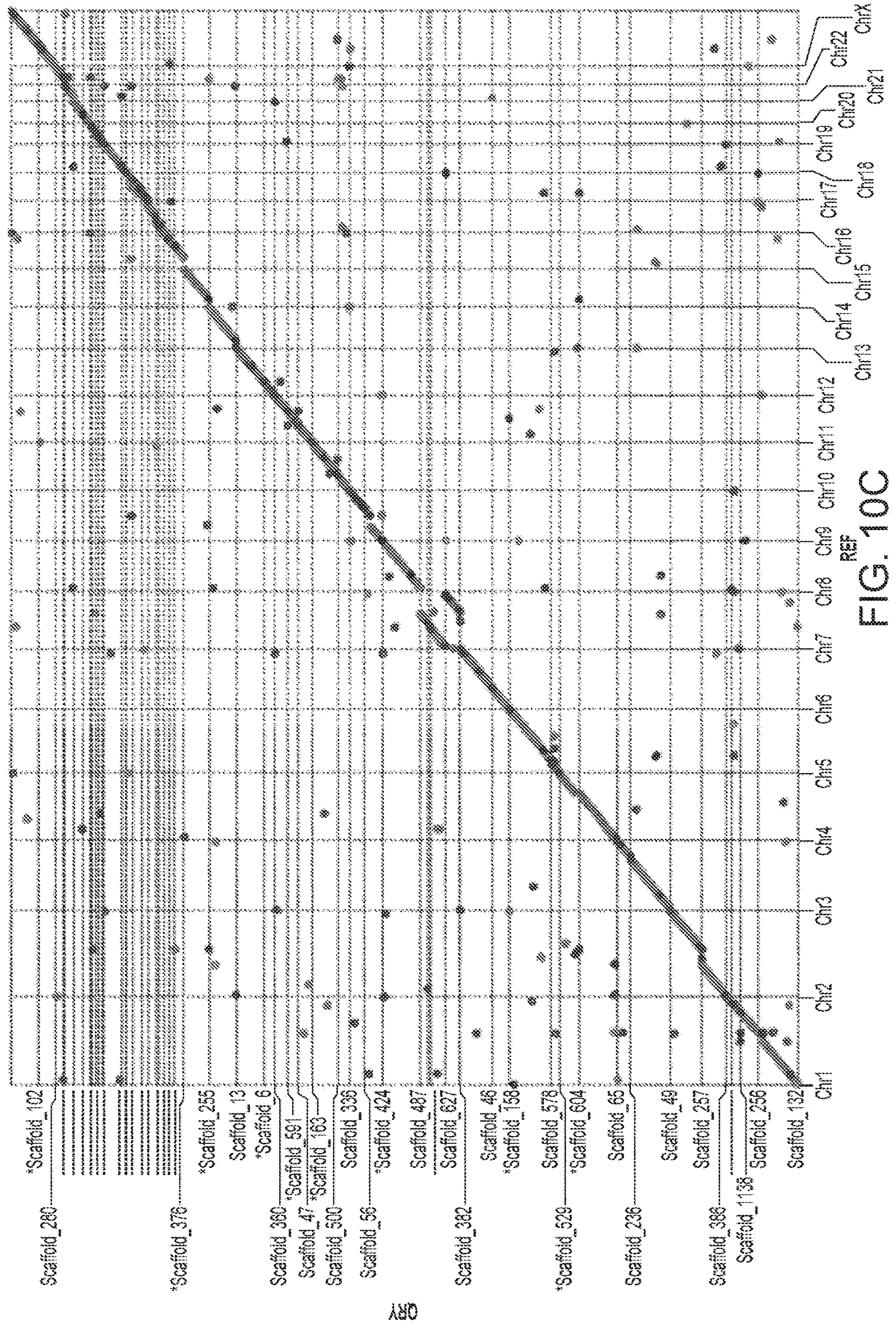

FIG. 10(A) to 10(C): Alignment dotplots of NA12878 scaffolds. SALSA scaffolds from stLFR-1 (A) and stLFR-4 (B) libraries were plotted against hg37 of the reference human genome. 734 million HiC reads from Dixon et al. (29) were also used to generate scaffolds and are plotted against hg37 as well (C). In all cases just scaffolds covering 5% or more of a chromosome were plotted.

Figure 11:
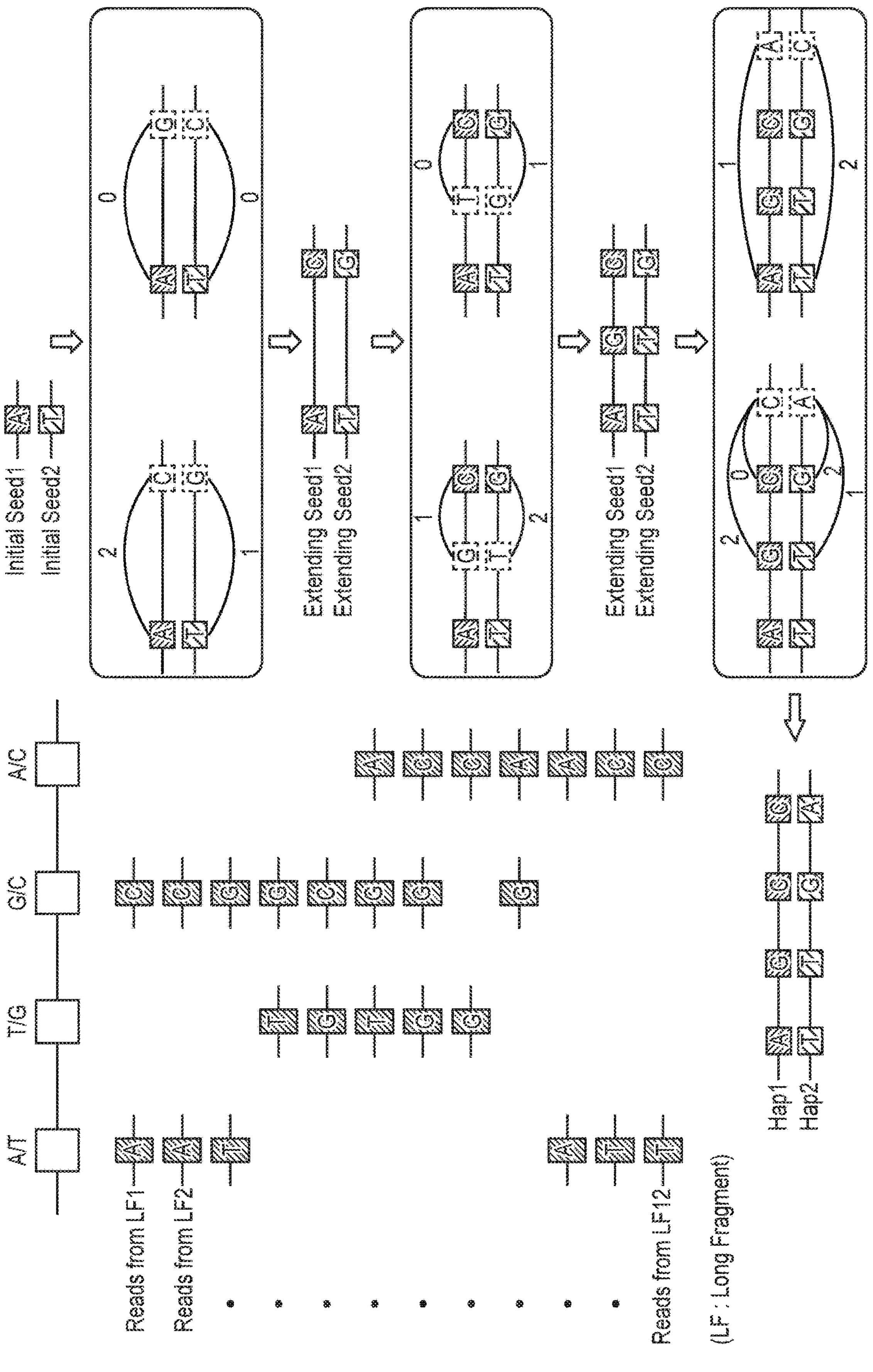

FIG. 11: LongHap phasing. A full description of the phasing algorithm applied with LongHap can be found in the Methods and Materials section.

Figure 12:

FIG. 12: Barcode sequence assembly. Three ligations are used necessary to generate ~3.6 billion different barcodes. The expected sequence at each step of the barcode assembly is displayed as SEQ. ID NOS: 1 to 13 and 30.

Figure 13:
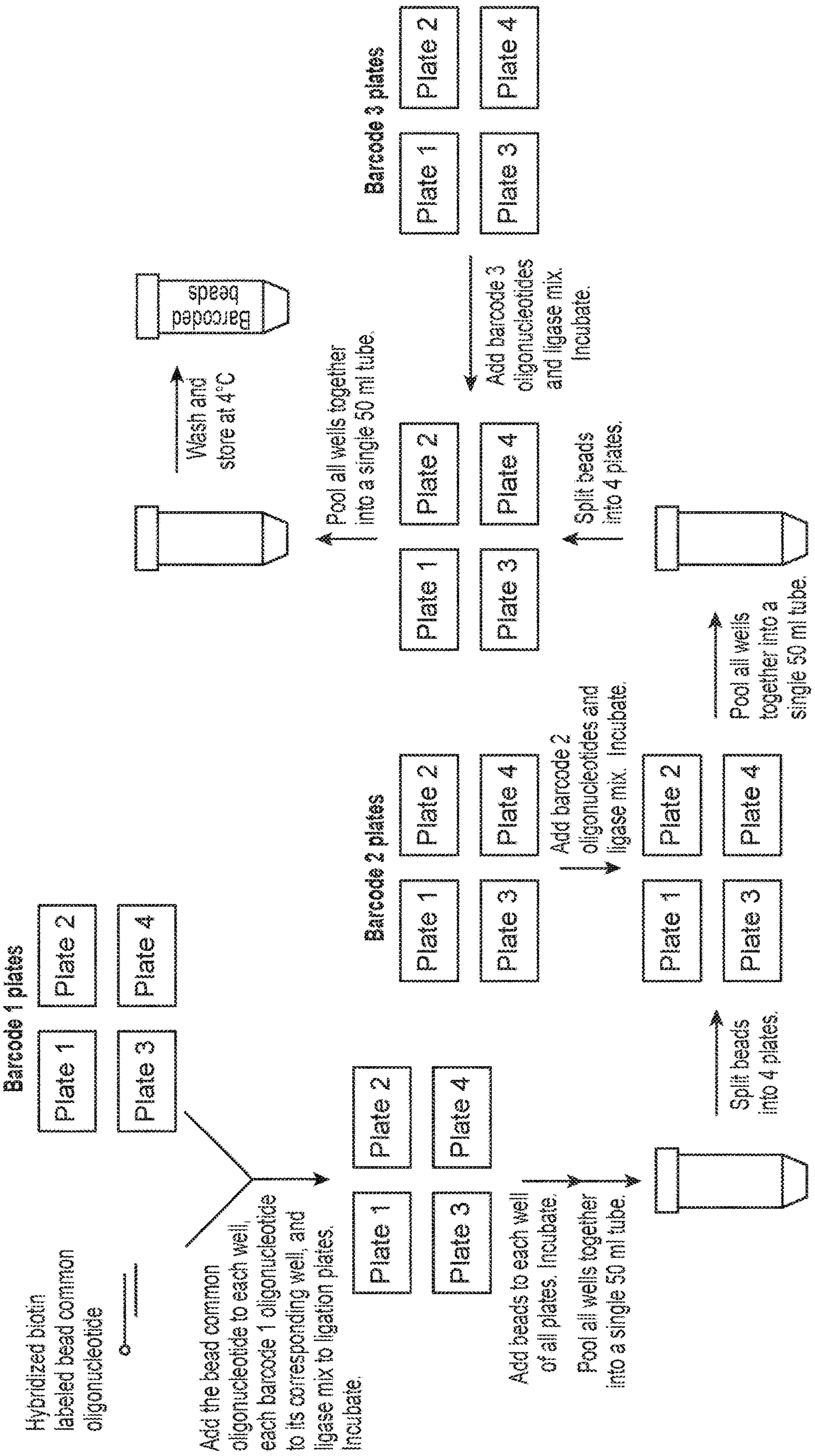

FIG. 13: Flowchart of Barcode sequence assembly.

Figure 14:
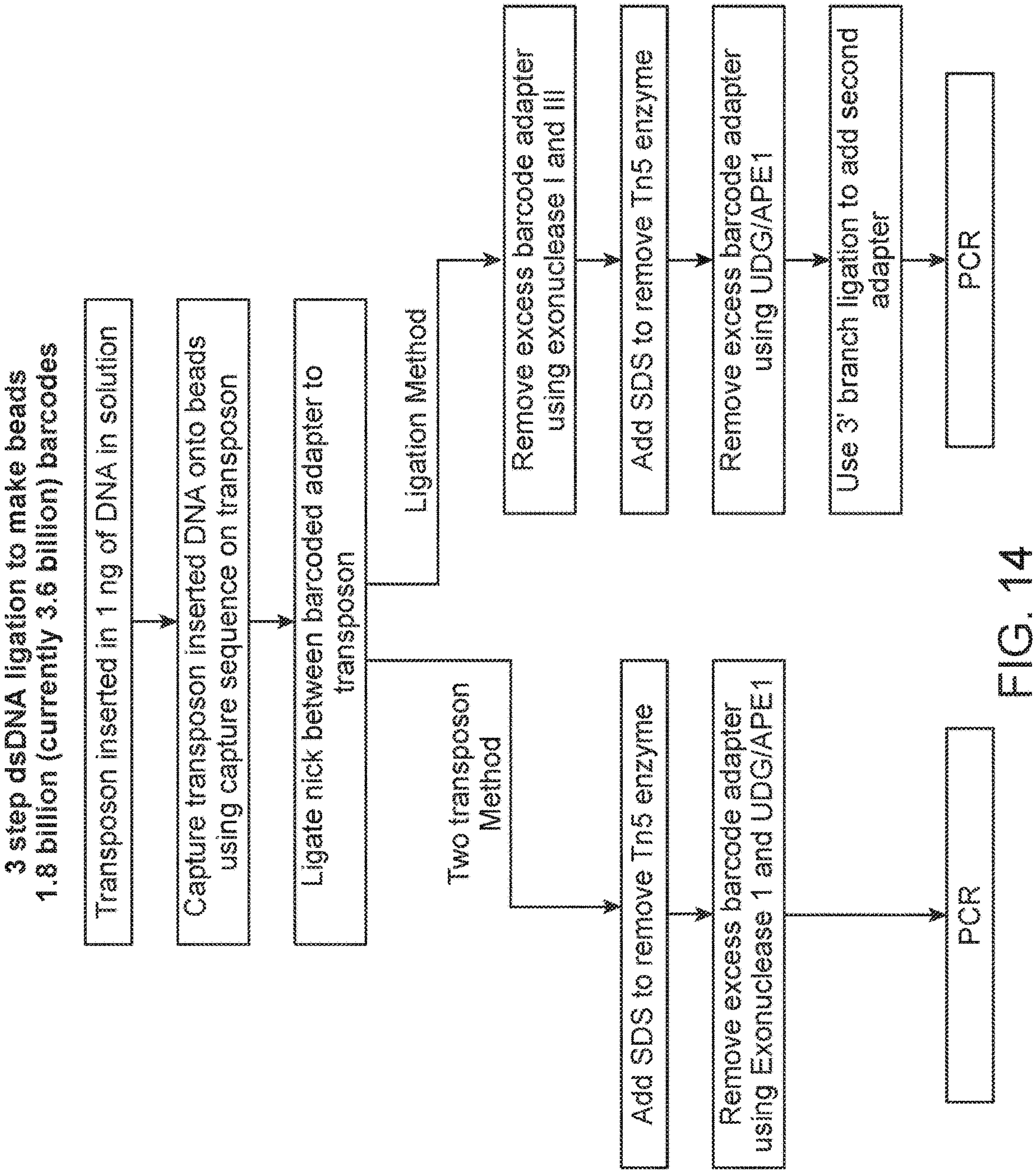

FIG. 14: Exemplary Flow Chart of Barcode protocol.

Figure 15:
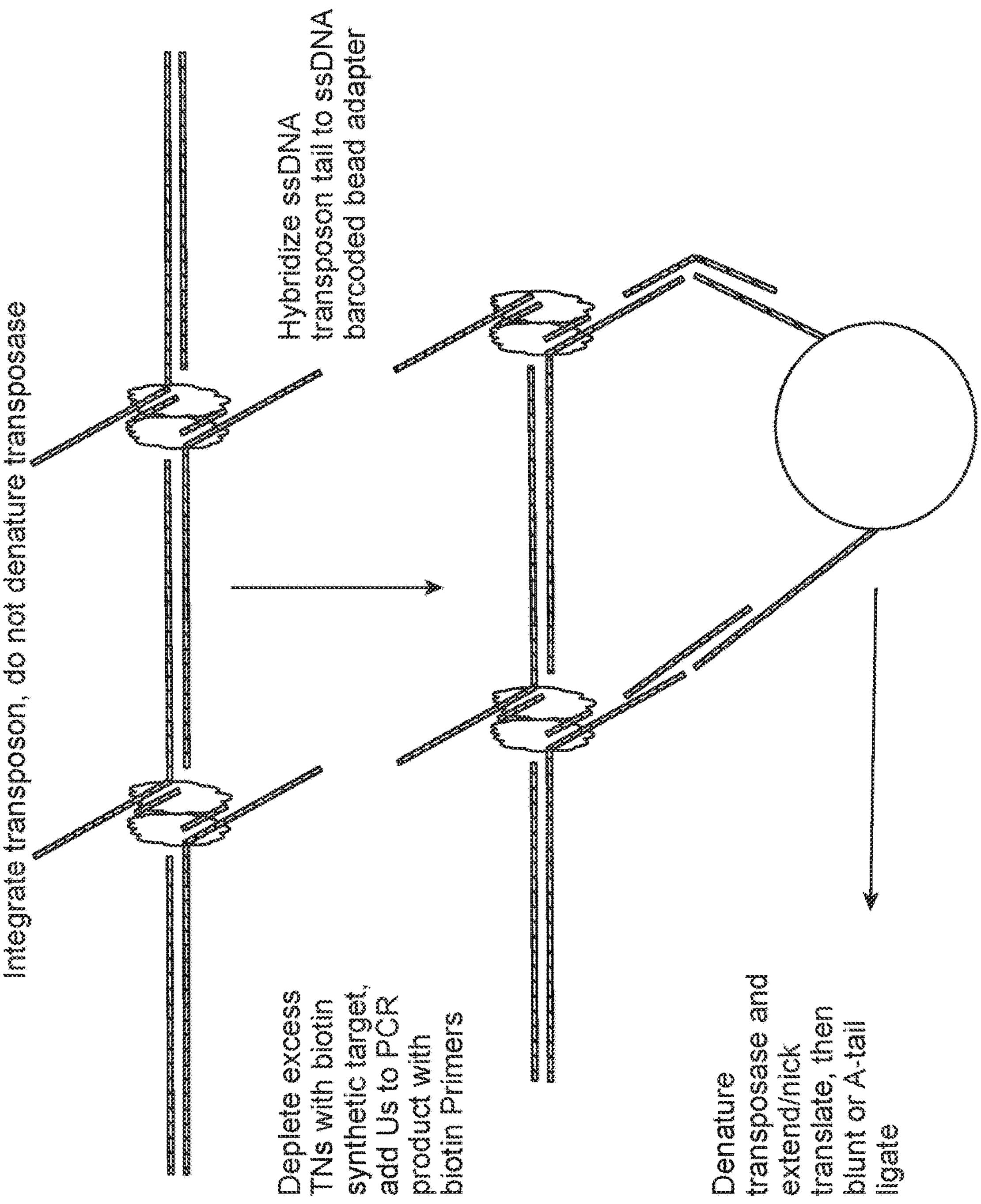

FIG. 15: Cartoon of hybridization step.

Figure 16:
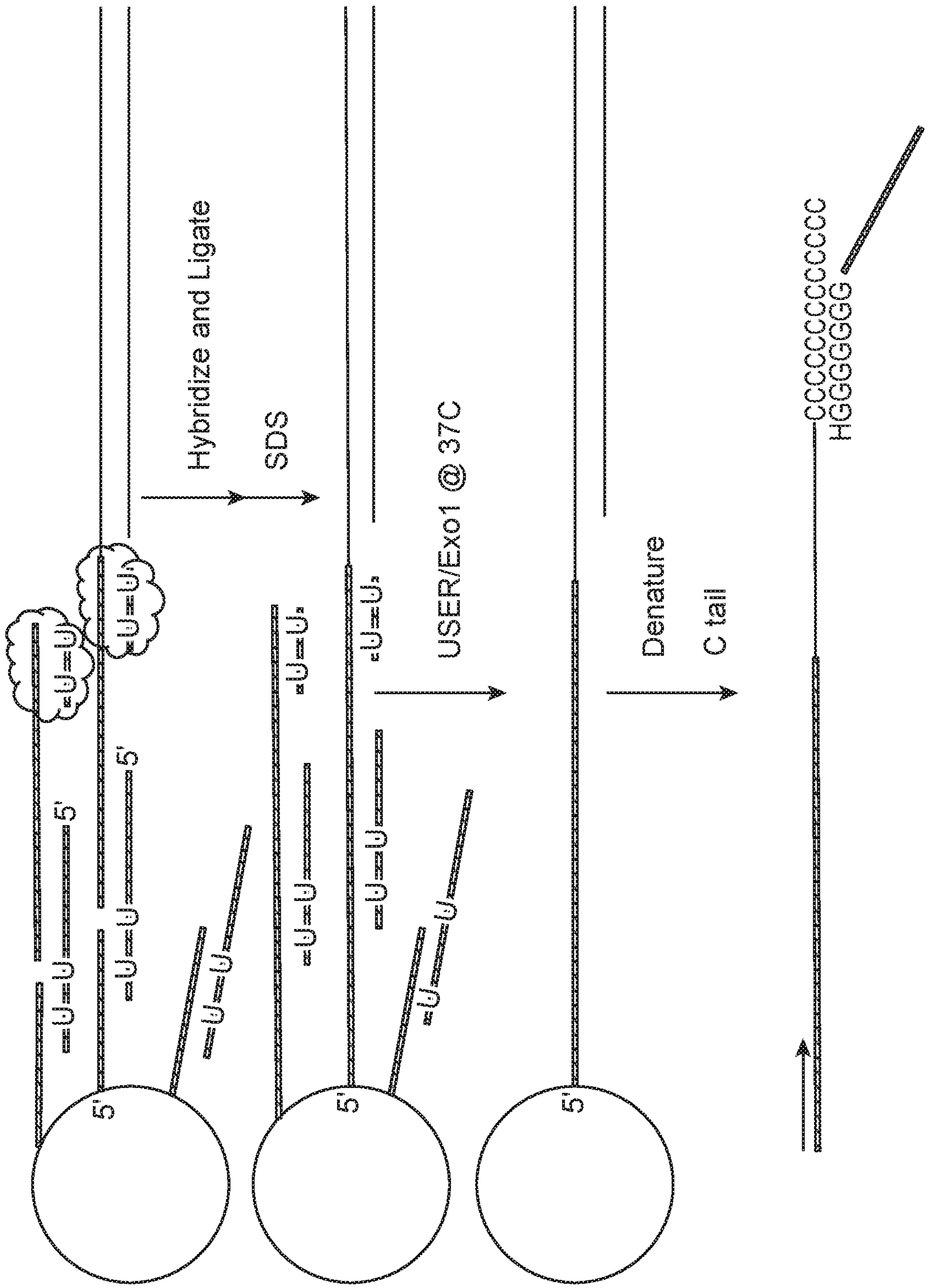

FIG. 16: Cartoon of ligation and degradation steps. The final steps showing denaturation and C tailing are optional and not further described herein. FIG. 16 discloses SEQ ID NO: 31.

FIG. 17: Production and use of double-stranded DNBs.

FIG. 18: Amplification of long molecules.

FIG. 19: Random nickase methods.

FIG. 20: Hairpin adaptor methods.

Figure 21B:
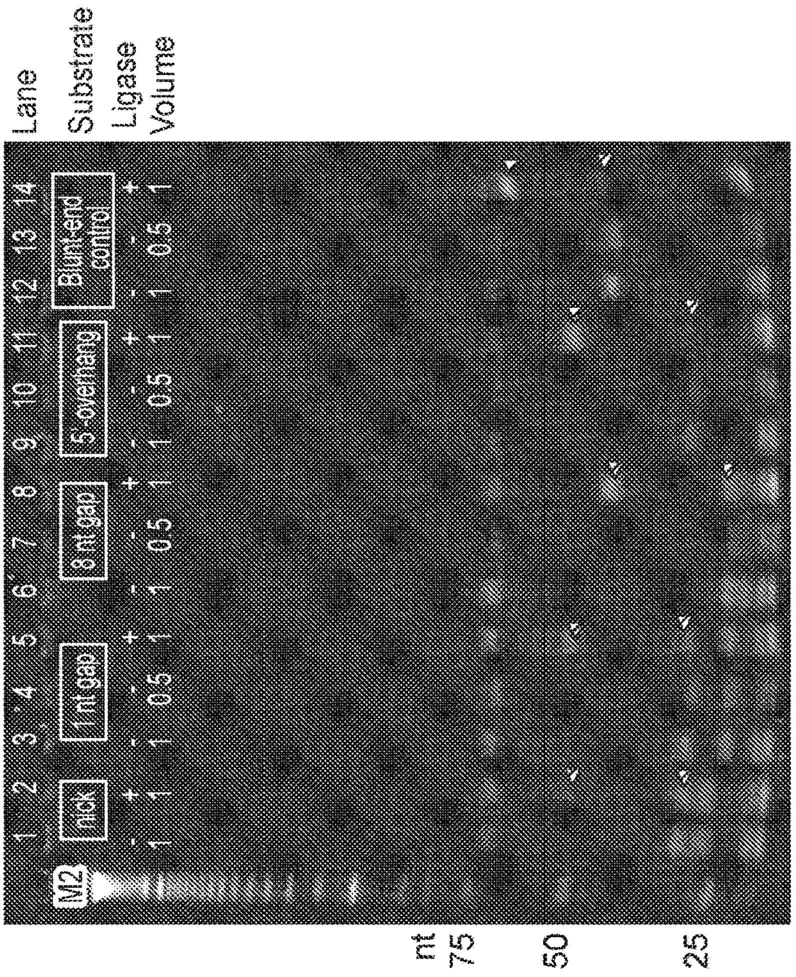
Figure 21A:
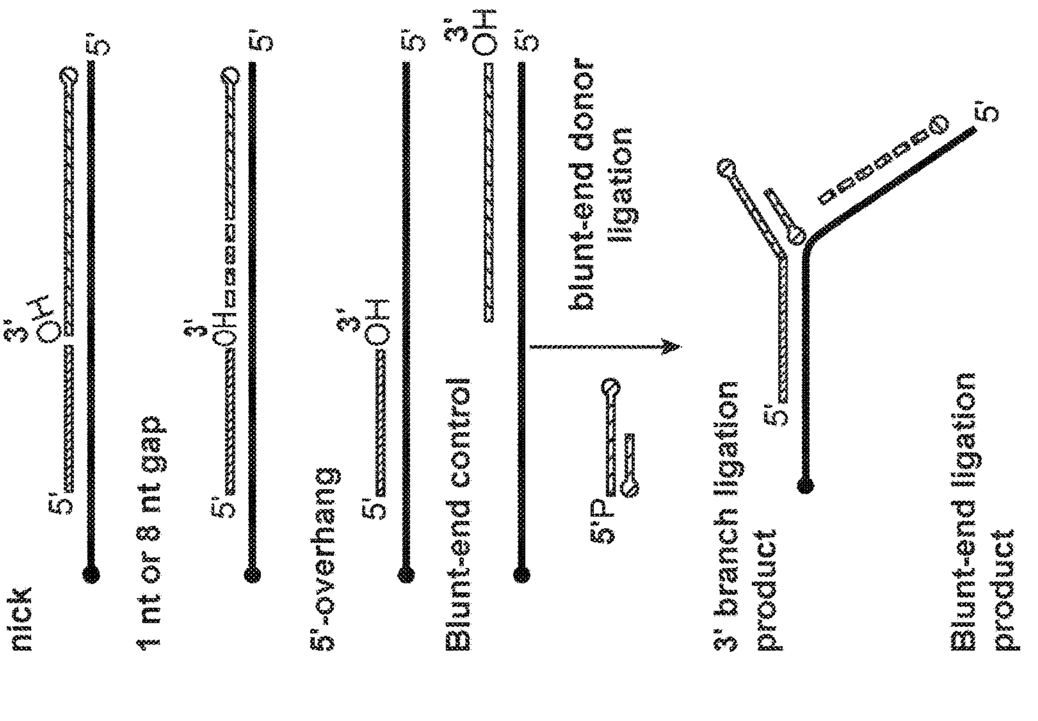

FIGS. 21(A) and 21(B): FIG. 21(A) is a schematic representation of ligation assay on different DNA substrates. The blunt-end DNA donor is a synthetic, partially dsDNA molecule with dideoxy 3'-termini (filled circles) to prevent adapter self-ligation. The long arm of the adapter is 5'-phosporylated. The DNA acceptors were assembled using 2 or 3 oligos to form either a nick (without phosphates), a gap (1 or 8 nt), or a 36 nt 5'-overhang end. All strands of the substrates are unphosphorylated and the scaffold strand is 3' dideoxy protected. FIG. 21(B) shows analysis of the size shift of ligated products using a 6% denaturing polyacrylamide gel. The negative no-ligase controls (lane 1, 3, 4, 6, 7, 9, 10, 12 and 13) were loaded at 1 or 0.5× volume of their corresponding experimental tests. If ligation occurs, the substrate size is shifted up by 22 nt. M2=Thermo Fisher's 25 bp DNA Ladder (c) Table of expected ligation product sizes and estimation of ligation efficiency using ImageJ. Ligation efficiency rate was estimated by dividing the intensity of ligated products by the total intensity of ligated and unligated products.

FIGS. 22(A) to 22(D): Gel analysis of size shift of ligated products using 6% TBE polyacrylamide gel. Nick (A, left), 5'-overhang (A, right), Int gap (B), 2nt gap (C), and 3nt gap (D). M2-Thermo Fisher's 25 bp DNA Ladder. Two Adapter (Ad1 and Ad2) sequences were compared and different bases (A or G) at 5'-end of ligation junction of Ad2 were also examined. **(e) Table of ligation efficiency calculated based on band intensity using ImageJ.

Figure 23A:
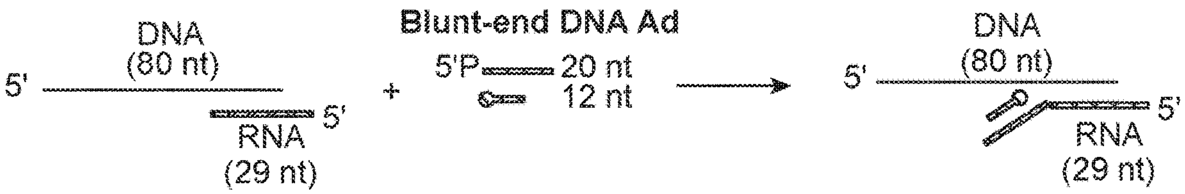
Figure 23B:
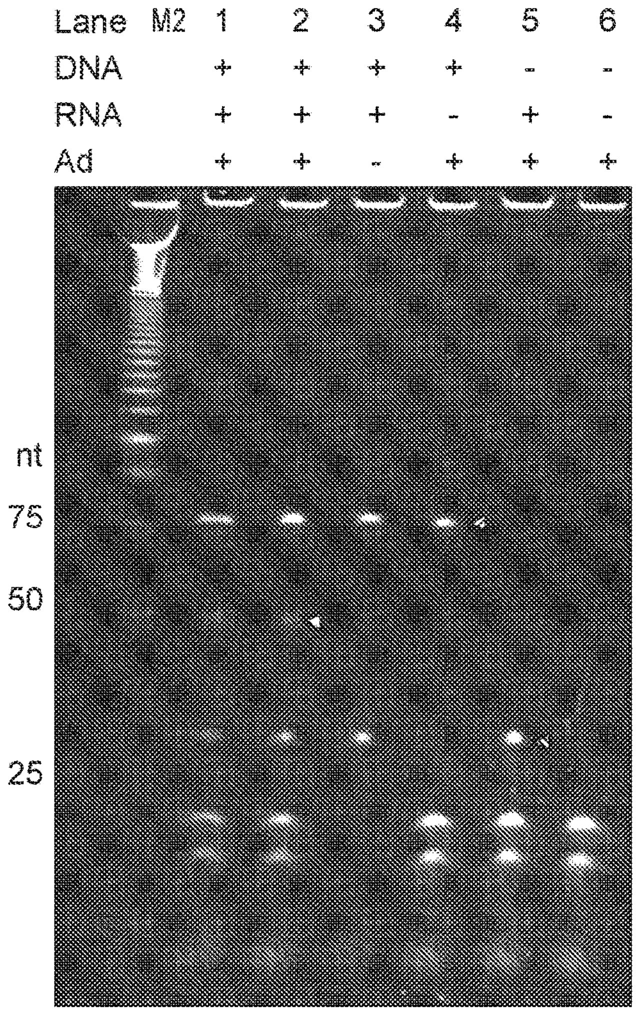

FIGS. 23(A) and 23(B): FIG. 23(A) shows a schematic representation of 3'-branch ligation on a DNA/RNA hybrid with 20 bp complimentary region. We tested whether blunt-end adapters would ligate to 3'-end of DNA at 5'-RNA overhang, and/or to the 3'-end of RNA at 5'-DNA overhang. (B) Gel analysis of size shift of ligated products using 6% denaturing polyacrylamide gel. The DNA substrate (80 nt) are shown. If ligation occurs, the substrate size would shift up for 20 nt. Reaction 1 and 2 are duplicates. M2=Thermo Fisher's 25 bp DNA Ladder.

Figure 24B:
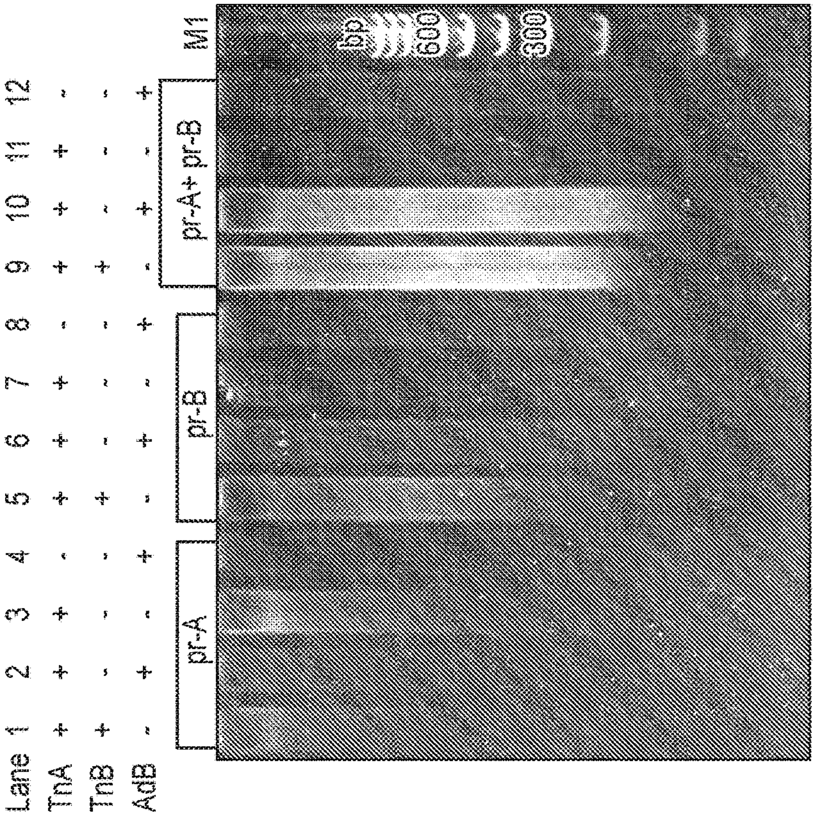
Figure 24A:
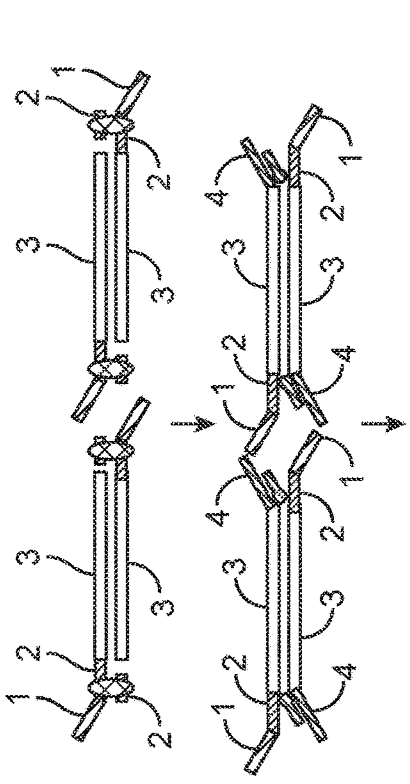
Figure 24C:
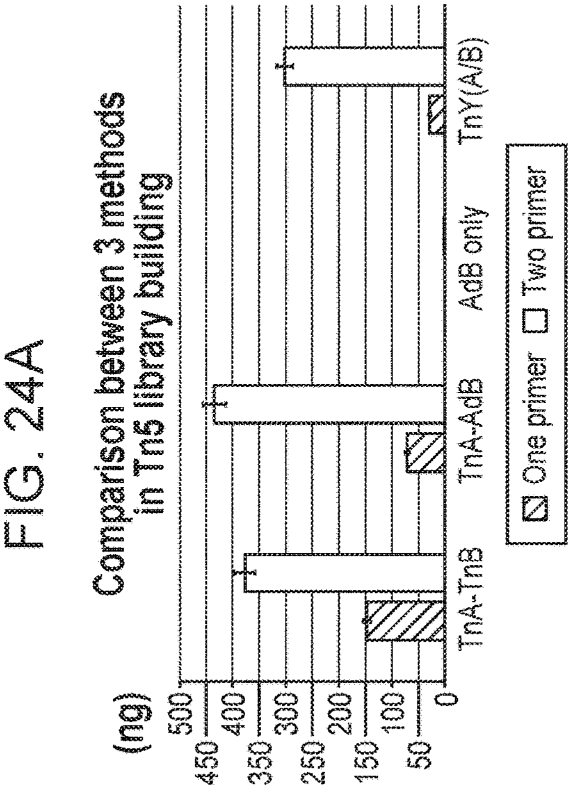

FIGS. 24(A) to 24(C): FIG. 24(A) is a schematic representation of transposon insertion followed by 3'-3' branch ligation and PCR amplification using Pr-A and Pr-B. (B) Amplification products following transposon insertion with TnA and/or TnB and/or 3' branch ligation of AdB using primers pr-A, pr-B, or both. Products were run on a 6% polyacrylamide gel. M1=ThermoFisher MassRuler Low Range DNA Ladder. (C) Graph of amplification signal using pr-A and pr-B after the various transposon insertion and 3' branch ligation conditions.

FIG. 25: Intermediate length tagging.

Figure 26B:
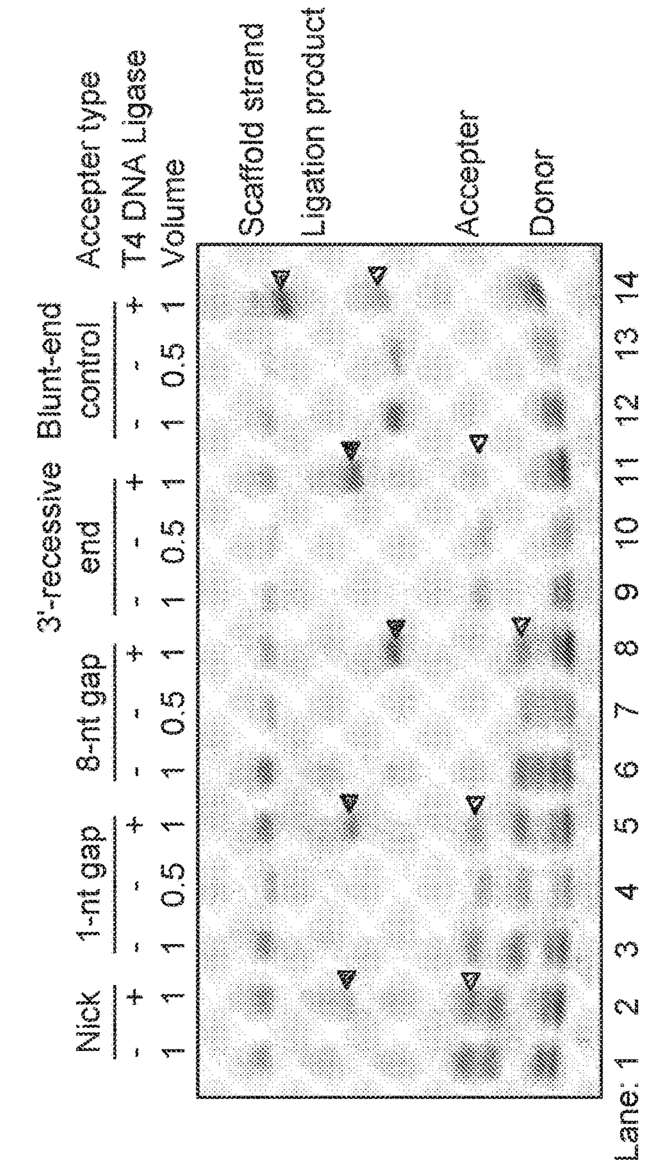
Figure 26A:
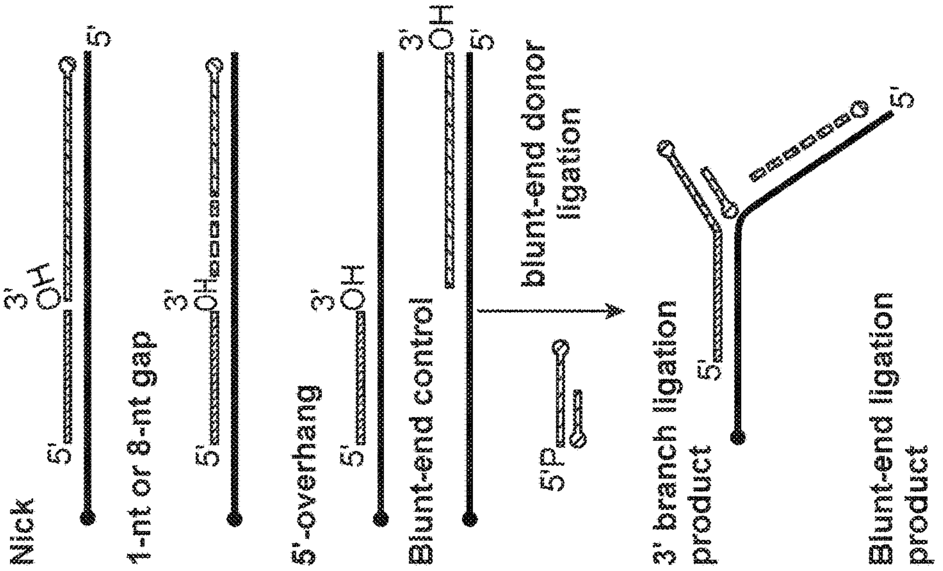
Figures 27A, 27B, 27C, 27D, 27E:
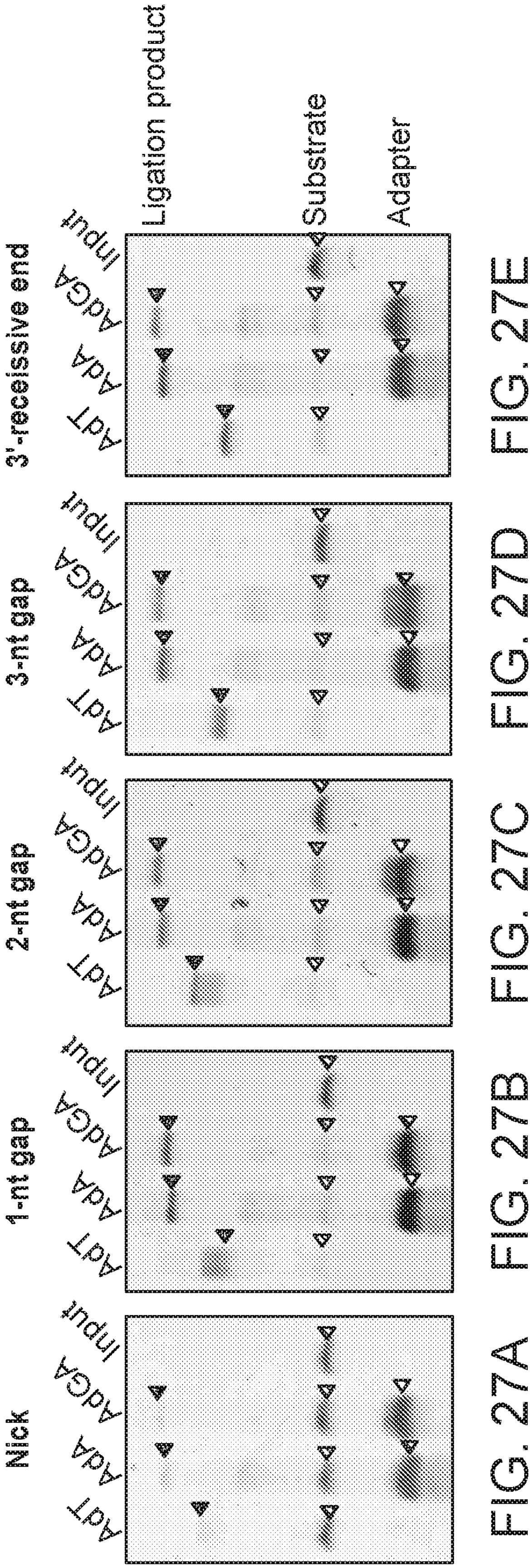

FIGS. 26(A) and (B): 3' branch ligation by T4 DNA ligase at non-conventional DNA ends formed by nicks, gaps, and overhangs. (A) Schematic representation of ligation assay on different DNA accepter types. The blunt-end DNA donor is a synthetic, partially dsDNA molecule with dideoxy 3'-termini (filled circles) to prevent DNA donor self-ligation. The long arm of the donor is 5'-phosporylated. The DNA acceptors were assembled using 2 or 3 oligos to form a nick (without phosphates), a gap (1 or 8 nt), or a 36-nt 3'-recessive end. All strands of the substrates are unphosphorylated, and the scaffold strand is 3' dideoxy protected. (B) Analysis of the size shift of ligated products of substrates 1, 2, 3, and 4, respectively, using a 6% denaturing polyacrylamide gel. The negative no-ligase controls (lanes 1, 3, 4, 6, 7, 9, 10, 12, and 13) were loaded at 1 or 0.5× volume of corresponding experimental assays. If ligation occurs, the substrate size is shifted up by 22 nt. Thermo Fisher's 25-bp DNA Ladder was used. Donor and substrate sequences in Table S1. TABLE 8 shows expected sizes of substrate and ligation product and approximate ligation efficiency in each experimental group. The intensity of each band was estimated using ImageJ and normalized by its expected size. Ligation efficiency was estimated by dividing the normalized intensity of ligated products by the normalized total intensity of ligated and unligated products.

FIGS. 27(A) to 27(E): Gel analysis of size shift of ligated products using 6% TBE polyacrylamide gel. 5 (nick) (A), substrate 6 (1-nt gap) (B), substrate 7 (2-nt gap) (C), substrate 8 (3-nt gap), (D) and substrate 9 (3'-recessive end) (E). Thermo Fisher's 25-bp DNA Ladder was used. Three DNA donors with different bases at 5'-end of the ligation junction (T, A, or GA) were examined. Shown in TABLE 9 is the ligation efficiency calculated based on normalized band intensity using ImageJ.

Figure 28A:
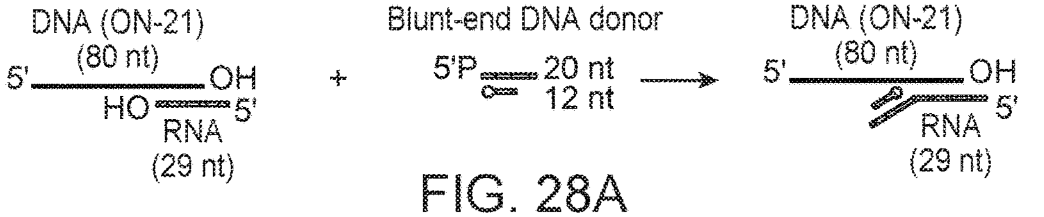
Figure 28B:
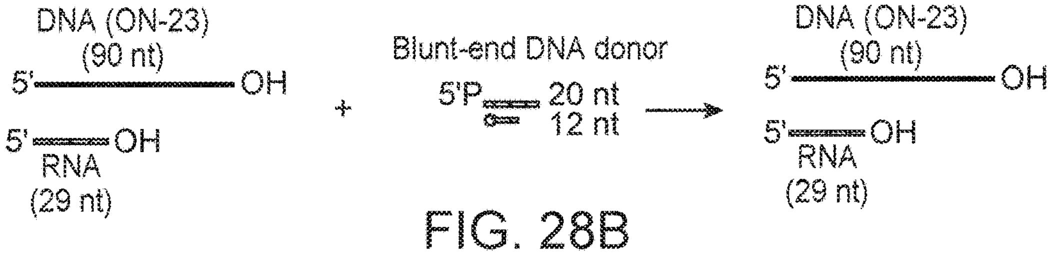
Figure 28C:
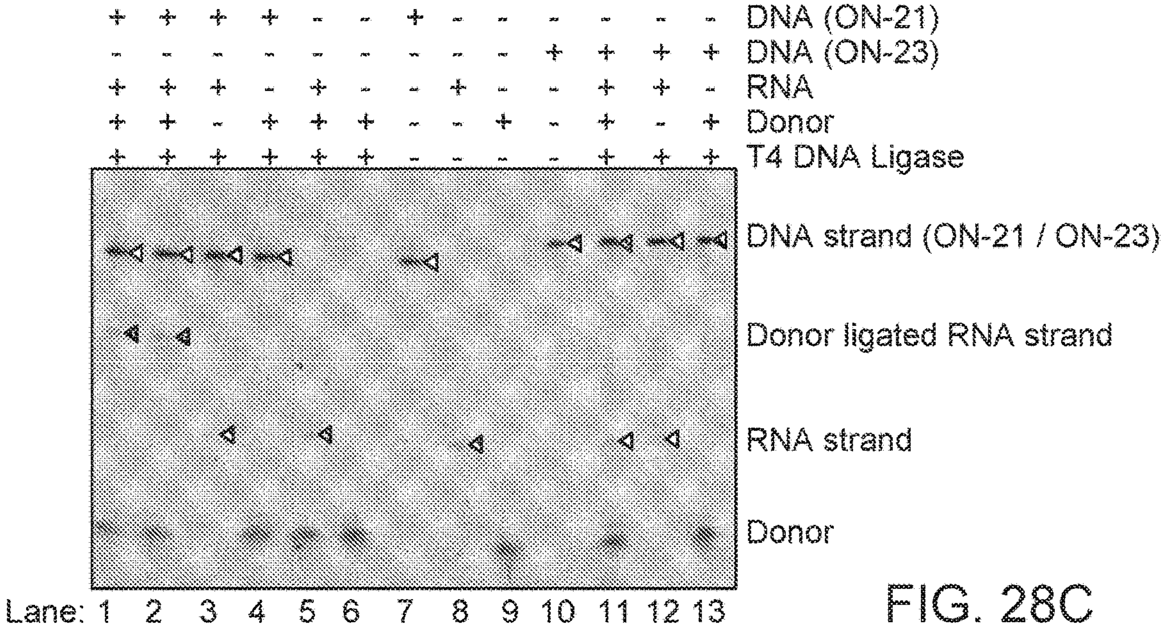
Figure 28D:
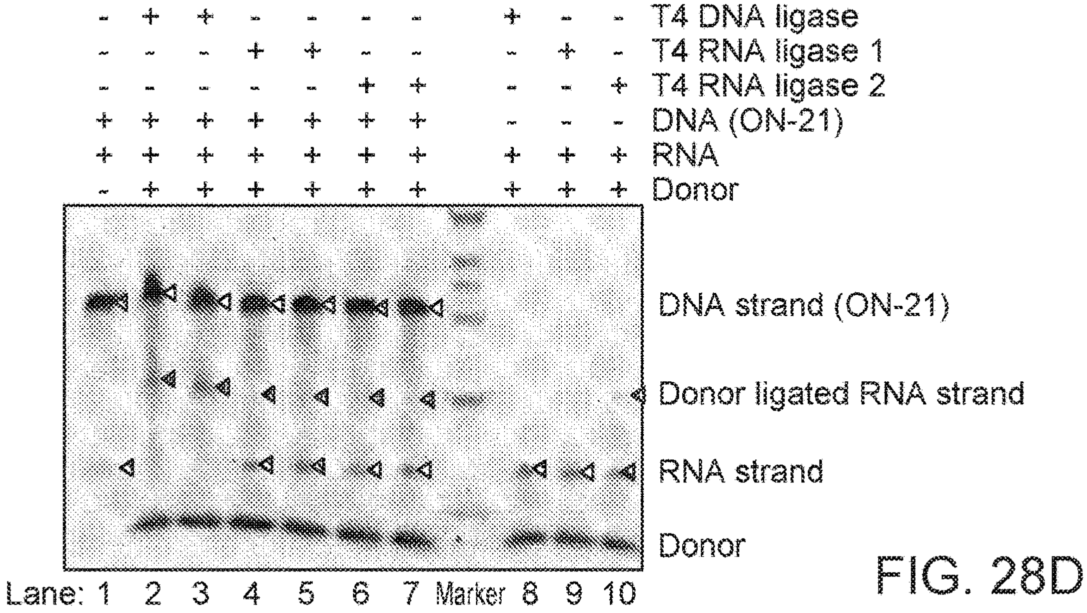

FIGS. 28(A) to 28(D). 3' branch ligation at 3' end of RNA in DNA/RNA hybrid. Schematic representation of 3'-branch ligation on a DNA/RNA hybrid with a 20-bp complimentary region. We tested whether blunt-end DNA donors would ligate to 3'-recessive end of DNA and/or to 3'-recessive end of RNA. DNA (ON-21) hybridizes with the RNA strand (A), whereas DNA (ON-23) cannot hybridize with the RNA strand (B). FIGS. 28(C) and (D) show gel analysis of size shift of ligated products using 6% denaturing polyacrylamide gel. The RNA substrate (29 nt), and the DNA substrate (80 nt) are shown. If ligation occurs, the substrate size would shift up by 20 nt. (c) Lane 1 and 2, experimental duplicates; lanes 7-10, no-ligase controls; 10% PEG was added with T4 DNA ligase. (d) Lane 1, no-ligase control; lane 2, 3, and 8, T4 DNA ligase with 10% PEG; lane 4, 5, and 9, T4 RNA ligase 1 with 20% DMSO; lane 6, 7, and 10, T4 RNA ligase 2 with 20% DMSO. Thermo Fisher's 25-bp DNA Ladder was used. May correspond to FIG. 23, but it's not exact in multiple ways.

Figure 29A:
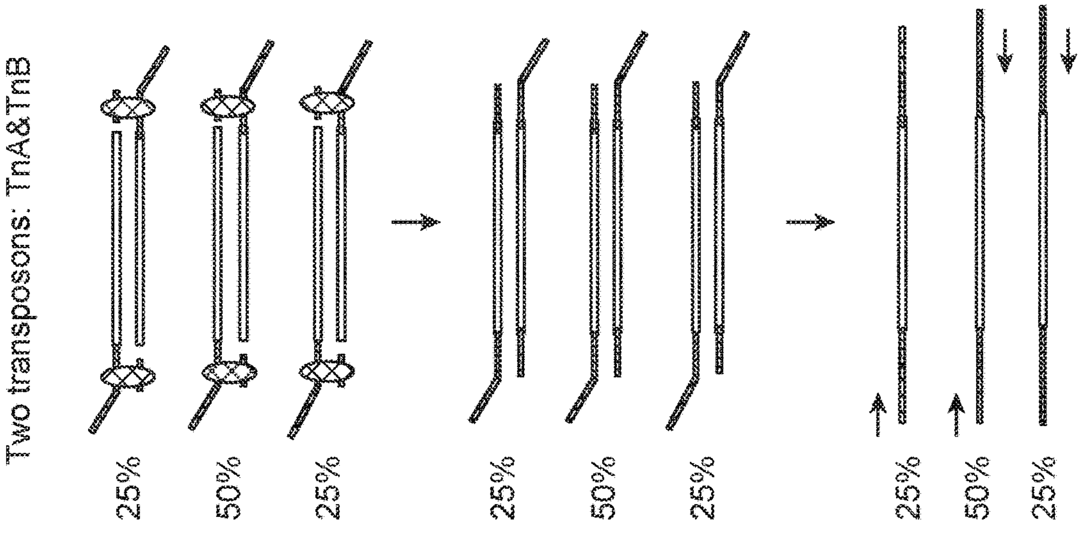
Figure 29B:
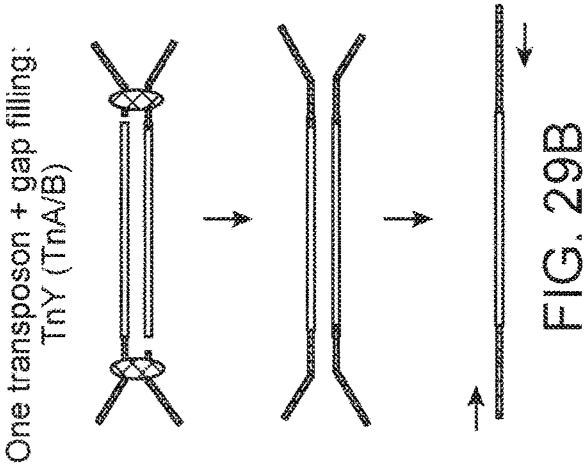
Figure 29C:
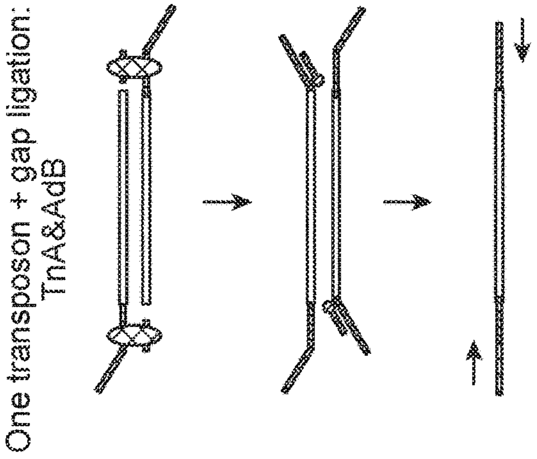
Figure 29D:
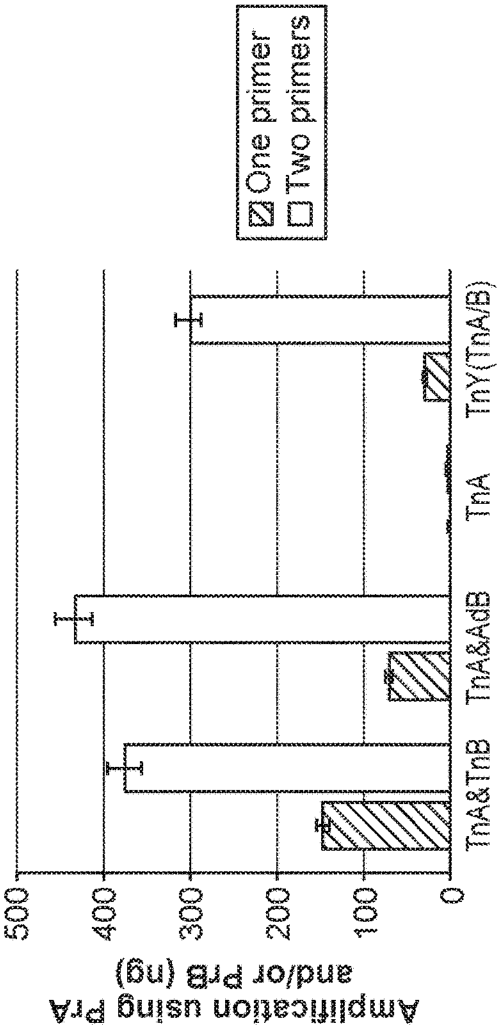

FIGS. 29(A) to 29(C) present a schematic representation of three transposon tagmentation methods followed by PCR amplification using Pr-A and Pr-B. Two-transposons method (A); one Y transposon tagmentation with 3'-gap filling (B); One-transposon method with adapter ligation at 3'-gap (C). FIG. 29(D) is a graph of amplification signal after purification using pr-A or pr-A with pr-B after the various tagmentation and gap ligation conditions. May correspond to FIG. 23, but it's not exact in multiple ways.

Figure 30A:
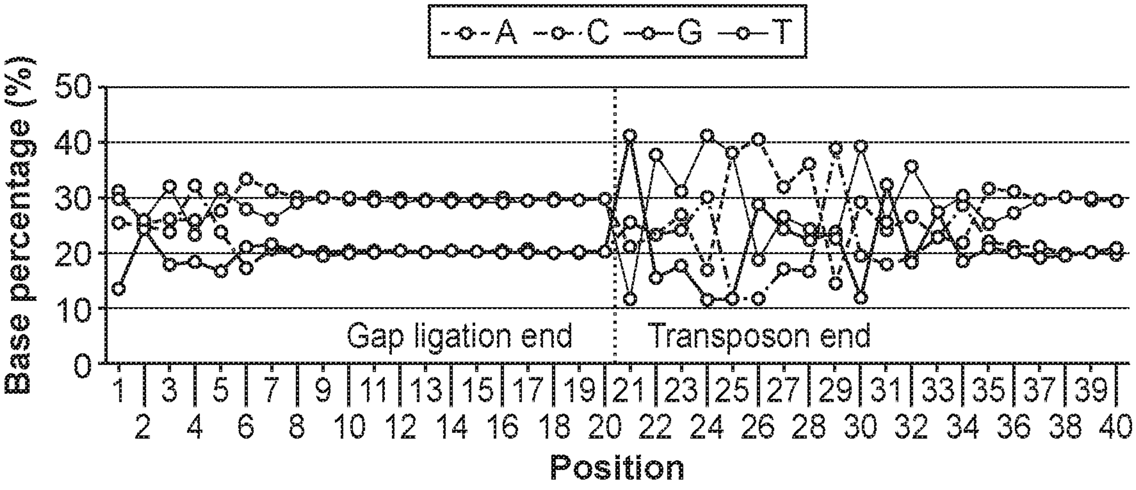
Figure 30B:
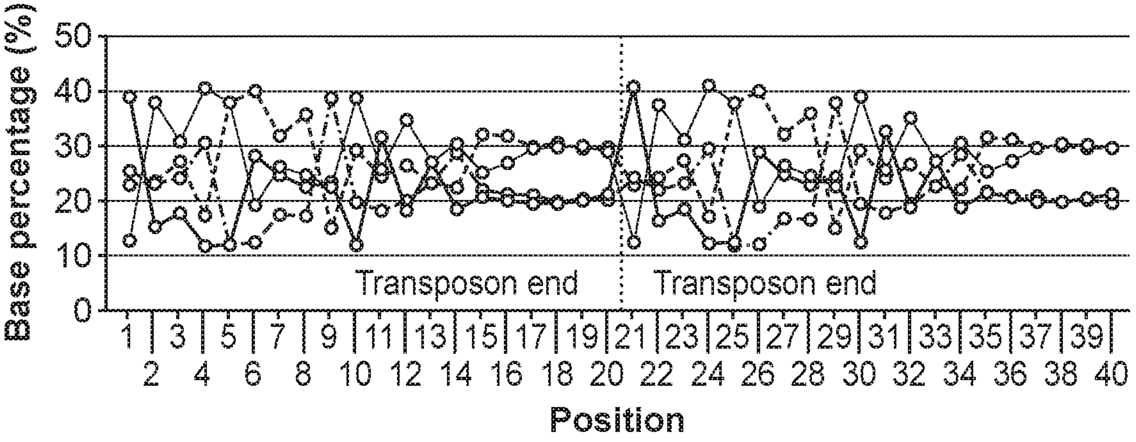
Figure 30C:
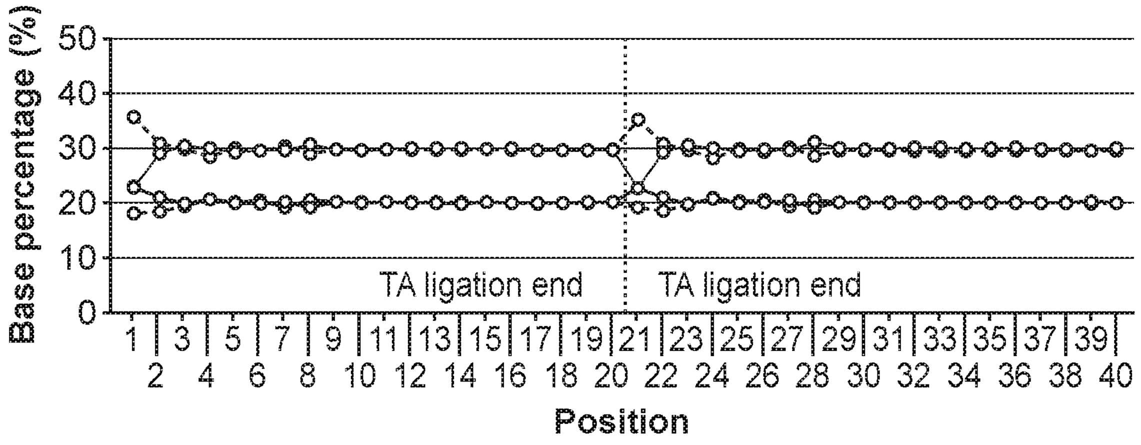

FIGS. 30(A) to 30(C). Base distribution bias of Tn5-gap ligation (A), two transposons (B), and regular TA ligation (C). Only the first 20 bases from each end of the ligation are presented; adenine, cytosine, guanine, and thymine are represented by different patterns as indicated on the top of the chart; the average and standard deviation of five independent libraries are presented. Not present at all.

Figure 31A:
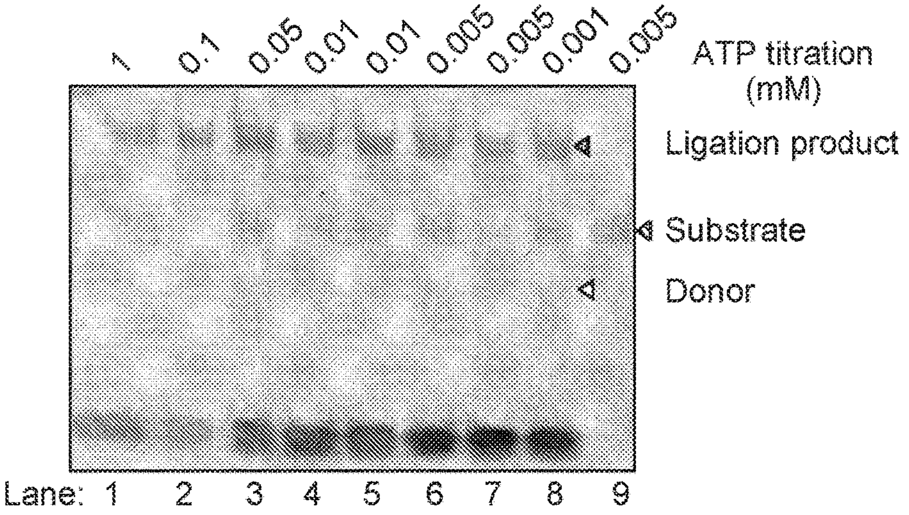
Figure 31B:
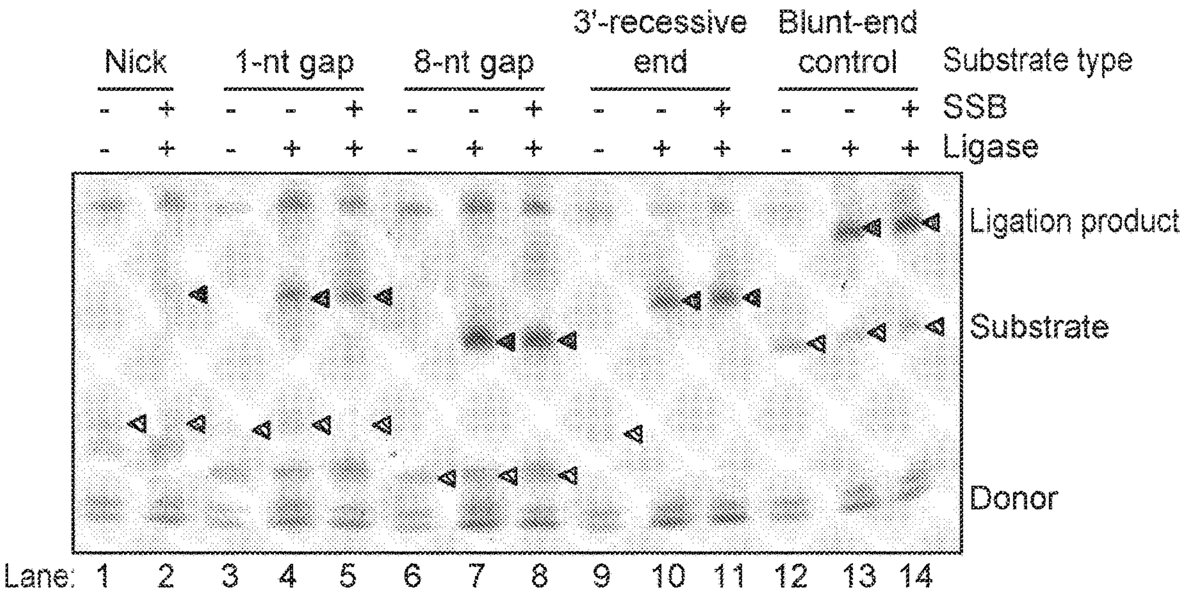

FIGS. 31(A) and 31(B). DNA 3' branch ligation with different additive conditions. (A) Ligation at 5'-overhang DNA at titrated ATP concentrations. Duplicates were performed for 0.01 mM (lane 4 and 5) and 0.005 mM ATP (lane 6 and 7). Lane 9 is a no-donor control. (B) 3' branch ligation of DNA at nick, 1-nt gap, 8-nt gap, 5'-overhang, and blunt end with or without SSB and ligase. Not present at all.

TABLE 1: Phasing and variant calling statistics. Reads were mapped to Hg37 with decoy sequence and variants were called with GATK with default settings for all libraries except where otherwise described. SNPs from the GIAB high-confidence variant calls VCF were used as input for phasing.

TABLE 2: Scaffolding statistics.

TABLE 3: Filtering reduces false positive calls. The final FP calls were calculated by subtracting 1,666 from the filtered FPs except for the STD library which by definition did not share any of these FPs with the stLFR libraries because it was made with GIAB reference material.

TABLE 4: LongHap SNP and Indel phasing.

TABLE 5: Filtering Criteria. Various filtering criteria, explained in the Materials and Methods section were used to remove FPs.

TABLE 6: Exemplary sequences.

DETAILED DESCRIPTION

1. stLFR Library Process

1.1 Introduction

Here we describe an implementation of single tube Long Fragment Read (stLFR) technology (15), an efficient approach for DNA co-barcoding with millions of barcodes enabled in a single tube. See WO 2014/145820 A2 (2014), incorporated herein by reference for all purposes. This is achieved by using the surface of a microbead as a replacement for a compartment (e.g., the well of a 384-well plate). Each bead carries many copies of a unique barcode sequence which is transferred to the sub-fragments of each long DNA molecule. These co-barcoded sub-fragments are then analyzed on common short read sequencing devices such as the BGISEQ-500 or equivalent. In our implementation of this approach we use a ligation-based combinatorial barcode generation strategy to create over 1.8 billion different barcodes in three ligation steps. For a single sample we use ~10-50 million of these barcoded beads to capture ~10-100 million long DNA molecules in a single tube. It is infrequent that two beads will share the same barcode because we sample 10-50 million beads from such a large library of total barcodes. Furthermore, in the case of using 50 million beads and 10 million long genomic DNA fragments, the vast majority of sub-fragments from each long DNA fragment are co-barcoded by a unique barcode. This is analogous to long-read single molecule sequencing and potentially enables powerful informatics approaches for de novo assembly. Importantly, stLFR is simple to perform and can be implemented with a relatively small investment in oligonucleotides to generate barcoded beads. Further, stLFR uses standard equipment found in almost all molecular biology laboratories and can be analyzed by almost any sequencing strategy. Finally, stLFR replaces standard NGS library preparation methods, requires only 1 ng of DNA, and does not add significantly to the cost of whole genome or whole exome analyses with a total cost per sample of less than 30 dollars.

As used herein, "single tube" refers to the analysis of a large number of individual DNA fragments without the need to separate fragments into separate tubes, vessels, aliquots, wells, or droplets during tagging steps. Instead, the surface of a microbead serves as a replacement for a compartment.

The first step in stLFR is the insertion of a hybridization sequence, preferably at regular intervals, along genomic DNA fragments. Suitable intervals may vary with the application and the desired result but are typically in the range 100-1500 bp, often 200-1000 bp. This is achieved through the incorporation of DNA sequences by transposition. In one embodiment, the transposase is Tn3, Tn5, Tn7 or Mu. Often, a Tn5 transposase is used (see Picelli et al. 2014, incorporated by reference herein for all purposes). The transposed DNA, or insertion sequence, comprises a single stranded region for hybridization ("hybridization sequence") as well as a double stranded mosaic sequence that is recognized by the enzyme and enables the transposition reaction (FIG. 1A). This transposition step is done in solution (as opposed to having the insertion sequence linked directly to the bead). This enables a very efficient incorporation of the hybridization sequence along the genomic DNA molecules. As previously observed (10), the transposase enzyme has the property of remaining bound to genomic DNA after the transposition event, effectively leaving the transposon-integrated long genomic DNA molecule intact.

After the DNA has been treated with, e.g., Tn5, it is diluted in hybridization buffer and combined with clonally barcoded beads. In one approach (Examples, below) 50 million ~2.8 μm clonally barcoded beads in hybridization buffer are used. Each bead contains approximately 400,000 capture adapters (also called capture oligos or capture oligonucleotides), each containing the same barcode sequence. A portion of the capture adapter contains uracil nucleotides to enable destruction of unused adaptors in a later step. For example, the capture adaptor may be 5-50% uracil, more often 5-50%, more often 5-20%. The mix is incubated under optimized temperature and buffer conditions during which time the transposon inserted DNA is captured to beads via the hybridization sequence.

It has been suggested that genomic DNA in solution forms balls with both tails sticking out (16). This may enable the capture of long DNA fragments towards one end of the molecule followed by a rolling motion that wraps the genomic DNA molecule around the bead. Approximately every 7.8 nm on the surface of each bead there is a capture oligo. This enables a very uniform and high rate of sub-fragment capture. A 100 kb genomic fragment would wrap around a 2.8 μm bead approximately 3 times. In our data, 300 kb is the longest fragment size captured, suggesting larger beads may be necessary to capture longer DNA molecules.

In alternative embodiments parameters such as bead size, capture oligonucleotide spacing, or the number of different oligos per mixture may vary. For example, the beads used may have a diameter in the range of 1-20 μm, alternatively 2-8 μm, 3-6 μm or 1-3 μm. For example, the spacing of barcoded oligos on the beads is can at least 1, at least 2, at least 3, at least 4, at least 5, at least 6 or at least 7 nm. In come embodiments the spacing is less than 10 nm (e.g., 5-10 nm), less than 15 nm, less than 20 nm, less than 30 nm, less than 40 nm, or less than 50 nm. In some embodiments, the number of different barcodes used per mixture may be >1M, >10M, >30M, >100M, >300M, or >1B. As discussed below, a very large number of barcodes may be produced for use in the invention, e.g., using methods described herein. In some embodiments, the number of different barcodes are used per mixture may be >1M, >10M, >30M, >100M, >300M, or >1B and they are sampled from a pool of at least 10-fold greater diversity (e.g. from >10M, >0.1B, 0.3B, >0.5B, >1B, >3B, >10B different barcodes on beads.)

Individual barcode sequences are transferred at regular intervals through ligation of the 3' terminus of the capture adaptor to the 5' terminus of the transposon-inserted hybridization sequence mediated by a bridge or splint (terms used interchangeably) oligonucleotide with a first region complementary to the capture adaptor and a second region complementary to the hybridization sequence (FIG. 1A and FIG. 15). Beads are collected and DNA/transposase complexes are disrupted producing sub-fragments less than 1 kb in size.

If desired, sample barcoding can be achieved in this step. Transposons carrying a unique barcode between the mosaic sequence and the hybridization sequence are used. These can be synthesized in 96, 384, or 1536 plate format, with each well containing many copies of a transposon carrying the same barcode and each barcode being different between wells. Different DNA samples can be transposon inserted in 96, 384, or 1536 plate format using these barcoded transposons. Samples tagged with the sample barcode can be multiplexed in any manner.

Due to the large number of beads and high density of capture oligos per bead, the amount of excess adapter is four orders of magnitude greater than the amount of product. This huge unused adapter can overwhelm the following steps. In order to avoid this, we designed beads with capture oligos connected by the 5' terminus. This enabled an exonuclease strategy to be developed that specifically degraded excess unused capture oligonucleotides. See FIGS. 14 and 16. Uracil-DNA Glycosylase (UDG) can also be used to degrade excess adaptors.

In one aspect the method includes combining in a single mixture (i) first fragments of the target nucleic acid, and (ii) a population of beads, wherein each bead comprises oligonucleotides immobilized thereon, said oligonucleotides comprising a tag-containing sequence (or barcode adaptors), wherein each tag-containing sequence comprises a tag sequence, wherein the oligonucleotides immobilized on the same individual bead comprise the same tag-containing sequence and a majority of beads have different tag sequences. In some embodiments the DNA fragments are concatamers of at least 2, at least 10, at least 30, or at least 100 copies of DNA or cDNA molecules. The nucleic acid monomers may have a length of 0.5 kb to 10 kb, or are >1 kb, or are >10 kb in length. In some approaches sequence is determined for >50% or >70%>90%, 95%, >99%, 100% of bases of DNA or cDNA molecules in a mixture.

1.1.1 Two-Transposon Methods

In one approach to stLFR, using two different transposons are used in the initial insertion step, allowing PCR to be performed after exonuclease treatment. However, this approach results in approximately 50% less coverage per long DNA molecule as it requires that two different transposons were inserted next to each other to generate a proper PCR product.

1.1.2 Single Transposon Methods Using 3' Branch Ligation

To achieve the highest coverage per genomic DNA fragment we use a single transposon in the initial insertion step and add an additional adapter through ligation. This noncanonical ligation, termed 3' branch ligation, involves the covalent joining of 5' phosphate from a blunt-end adapter to the recessed 3' hydroxyl of the genomic DNA (FIG. 1A). Branch ligation is described in Example 3, below. Also see US Pat. Pub. US2018/0044668 and International Application WO 2016/037418, both incorporated by reference for all purposes. Also see US Pat. Pub. 2018/0044667, incorporated by reference for all purposes. Using this method, it is theoretically possible to amplify and sequence all sub-fragments of a captured genomic molecule.

In addition, this ligation step enables a sample barcode to be placed adjacent to the genomic sequence for sampling multiplexing. The benefit of using these adapters for sample barcoding is that the barcode can be placed adjacent to the genomic DNA so that the same primer can be used to sequence the barcode and the genomic DNA and no additional sequencing primer is required to read the barcode. Sample barcoding allows preparations from multiple samples to be pooled before sequences, and distinguished by the barcode. 3' branch ligation adapters can be synthesized in 96, 384, or 1536 plate format, with each well containing many copies of the adapter carrying the same barcode and each barcode being different between wells. After capture on beads these adapters can be used for ligation in 96, 384, or 1536 plate format.

After this ligation step, PCR is performed and the library is ready to enter any standard next generation sequencing (NGS) workflow. It will be appreciated that PCR (or other amplification) can be carried out using a first primer that hybridizes to a site on the capture oligonucleotide or its complement (see FIG. 1A) and a second primer that hybridizes to a site on 3' branch ligation adapter or its complement. In the case of BGISEQ-500, the library is circularized as previously described (17). From single stranded circles DNA nanoballs are made and loaded onto patterned nanoarrays (17). These nanoarrays are then subjected to combinatorial probe-anchor synthesis (cPAS) based sequencing on the BGISEQ-500 (18-20). After sequencing, barcode sequences are extracted. Mapping the read data by unique barcode shows that most reads with the same barcode are clustered in a region of the genome corresponding to the length of DNA used during library preparation (FIG. 1B). A detailed description of this method, as well as a protocol for making the beads is described in EXAMPLES 1 and 2.

In some embodiments >50%, >70%, >80%, >90%, or >95% of the barcoded DNA fragments are barcoded with a unique barcode. In some embodiments, >50%, >70%, >80%>90% of subfragments in a fragment are ligated to barcode oligo. In some embodiments, >10% or >20%, >40%, >50%, >60% of subfragments of long fragments are sequenced, on average.

1.2 stLFR Read Coverage and Variant Calling

To demonstrate stLFR phasing and variant calling we generated four libraries using 1 ng (stLFR-1 and stLFR-2) and 10 ngs (stLFR-3 and stLFR-4) of DNA from NA12878. The number of beads were varied, with 10 million (stLFR-3), 30 million (stLFR-4), and 50 million (stLFR-1 and stLFR-2) used. Finally, both 3' branch ligation (stLFR-1, stLFR-2, and stLFR-3) and two transposon (stLFR-4) methods were tested. Both stLFR-1 and stLFR-2 were sequenced deeply to 336 Gb and 660 Gb of total base coverage, respectively. We also analyzed these at downsampled coverages. stLFR-3 and stLFR-4 were sequenced to more modest levels of 117 Gb and 126 Gb, respectively. Co-barcoded reads were mapped to build 37 of the human reference genome using BWA-MEM (21). Because stLFR does not require any preamplification steps, read coverage distribution across the genome was close to Poisson (FIG. 3). The non-duplicate coverage ranged from 34-58× and the number of long DNA molecules per barcode ranged from 1.2-6.8 (Table 1 and FIG. 1C). As expected, the stLFR libraries made from 50 million beads and 1 ng of genomic DNA had the highest single unique barcode co-barcoding rates of over 80% (FIG. 1C). These libraries also observed the highest average non-overlapping read coverage per long DNA molecule of 10.7-12.1% and the highest average non-overlapping base coverage of captured sub-fragments per long DNA molecule of 17.9-18.4% (FIG. 1*d*). This coverage is ~10× higher than previously demonstrated using 3 ng of DNA and transposons attached to beads (12).

For each library, variants were called using GATK (22) using default settings. Comparing SNP and indel calls to Genome in a Bottle (GIAB) (23) allowed for the determination of false positive (FP) and false negative (FN) rates (TABLE 1). In addition, we performed variant calling using the same settings in GATK on a standard non-stLFR library made from ~1000 times more genomic DNA and also sequenced on a BGISEQ-500 (STD), and a Chromium library from 10× Genomics (11). We also compared precision and sensitivity rates against those reported in the bead haplotyping library study by Zhang et al. (12), incorporated by reference herein for all purposes. Our stLFR approach and the method described by Zhang et al. demonstrated lower SNP and Indel FP rates than the Chromium library. stLFR had 2-fold higher FP and FN rates than the STD library and depending on the particular stLFR library and filtering criteria the FN rate was either higher or lower than the Chromium library. The higher FN rate in stLFR libraries compared to standard libraries is primarily due to the shorter average insert size (~200 bp versus 300 bp in a standard library). That said, stLFR had a much lower FN rate than Zhang et al. for SNPs and Indels and a much lower FN rate than the Chromium library for Indels (TABLE 1). Overall, most metrics for variant calling were better for our stLFR libraries than the published results from Zhang et al. or Chromium libraries, especially when nonoptimized mapping and variant calling processes were used (TABLE 1, "No Filter").

One potential issue with using GIAB data to measure the FP rate is that we were unable to use the GIAB reference material (NIST RM 8398) due to the rather small fragment size of the isolated DNA. For this reason, we used the GM12878 cell line and isolated DNA using a dialysis-based method capable of yielding very high molecular weight DNA (see methods). However, it is possible that our isolate of the GM12878 cell line could have a number of unique somatic mutations compared to the GIAB reference material and thus cause the number of FPs to be inflated in our stLFR libraries. To examine this further we compared the overlap of single nucleotide FP variants between the 4 stLFR libraries and the two non-LFR libraries (FIG. 4*a*). Overall, 544 FP variants were shared between the six libraries and 2,078 FPs were unique to the four stLFR libraries. We also compared stLFR FPs with the Chromium library and found that over half (1,194) of these shared FPs were also present in the Chromium library (FIG. 4*b*). An examination of the read and barcode coverage of these shared variants showed they were more similar to that of TP variants (FIG. 5-6). We also examined the distribution across the genome of these shared FP variants versus 2,078 randomly selected variants (FIG. 7*a*). This analysis showed 219 variants that are found in clusters where two or more of these FPs are within 100 bp of each other. However, the majority (90%) of variants have distributions that appear indistinguishable from randomly selected variants. In addition, of those FPs shared between stLFR and Chromium libraries only 41 were found to be clustered (FIG. 7*a*). Finally, 96 of these variants are called by GIAB but with a different zygosity than called in the stLFR libraries.

If we accept the evidence that these shared FP variants are largely real and not present in the GIAB reference material, the FP rate for stLFR could be up to 1,859 variants less than what is reported in TABLE 1 for SNP detection. This is still several thousand single nucleotide variants more than the standard BGISEQ-500 library. To further improve the FP rate in stLFR libraries we tested a number of different filtering strategies for removing errors. Ultimately, by applying a few filtering criteria based on reference and variant allele ratios and barcode counts (see Examples) we were able to remove 3,647-13,840 FP variants depending on the library and amount of coverage. Importantly, this was achieved while only increasing the FN rate by 0.10-0.29% in the stLFR libraries. After this filtering step we examined the shared FPs between the four stLFR libraries. Filtering removed only 340 shared FP variants, of which 147 were cluster within 100 base pairs of each other and likely not real (FIG. 7*b*). This further suggests most of these shared FPs are real variants. Taking into account these variants and the reduced number of FP variants after filtering results in a similar FP rate and a 2-3 fold higher FN rate than the filtered STD library for SNP calling (Table 3). This increased FN rate is primarily due to increased non-unique mapping of mate-pairs with short insert sizes in stLFR libraries.

1.3 stLFR Phasing Performance

To evaluate variant phasing performance high confidence variants from GIAB were phased using the publicly available software package HapCut2 (24). Over 99% of all heterozygous SNPs were placed into contigs with N50s ranging from 0.6-15.1 Mb depending on the library type and the amount of sequence data (TABLE 1). The stLFR-1 library with 336 Gb of total read coverage (44× unique genome coverage) achieved the highest phasing performance with an N50 of 15.1 Mb. N50 length appeared to be mostly affected by length and coverage of long genomic fragments. This can be seen in the decreased N50 of stLFR-2 as the DNA used for this sample was slightly older and more fragmented than the material used for stLFR-1 (TABLE 1, average fragment length of 52.5 kb versus 62.2 kb) and the ~10-fold shorter N50 of the 10 ng libraries (stLFR-3 and 4). Comparison to GIAB data showed that short and long switch error rates were low and comparable to previous studies (11, 12, 25). stLFR performance was very similar to the Chromium library. As the Zhang et al. bead haplotyping method did not have read data available we could only compare our results to the results from their phasing algorithm written and optimized specifically for their data. This demonstrated that stLFR-1 and stLFR-2 libraries had a longer N50, a similar short switch error rate, but a higher long switch error rate. stLFR-3 and stLFR-4, which used more DNA, had an N50 similar to the Zhang et al. However, direct comparison is difficult due to differences in DNA input and coverage.

It should be noted that this phasing result was achieved using a program that was not written for stLFR data. In order to see if this result could be improved we developed a phasing program, LongHap, and optimized it specifically for stLFR data. Using GIAB variants LongHap was able to phase over 99% of SNPs into contigs with an N50 of 18.1 Mb (TABLE 1). Importantly, these increased contigs lengths were achieved while decreasing the short and long switch errors (TABLE 1). LongHap is also able to phase indels. Applying LongHap to stLFR-1 using GIAB SNPs and indels results in a 23.4 Mb N50, but also results in increased switch error rates (Table 4).

1.4 Structural Variation Detection

Previous studies have shown that long fragment information can improve the detection of structural variations (SVs) and described large deletions (4-155 kb) in NA12878 (11, 12). To demonstrate the power of stLFR to detect SVs we examined barcode overlap data, as previously described (12), for stLFR-1 and stLFR-4 libraries in these regions. In every case the deletion was observed in the stLFR-1 data, even at lower coverage (FIG. 2*a* and FIG. 8). Closer examination of the co-barcoded sequence reads covering a ~150 kb deletion in chromosome 8 demonstrated that the deletion was heterozygous and found in a single haplotype (FIG. 2*b-c*). The 10 ng stLFR-4 library also detected most of the deletions, but the three smallest were difficult to identify due to the lower coverage per fragment (and thus less barcode overlap) of this library.

Figure 2D:
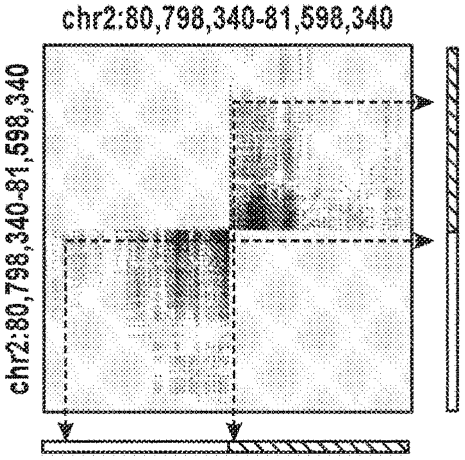

To evaluate stLFR performance for detecting other types of SVs we made libraries from a cell line from a patient with a known translocation between chromosomes 5 and 12 (26) and GM20759, a cell line with a known inversion on chromosome 2 (27). stLFR libraries were able to identify the inversion and the translocation in the respective cell lines (FIG. 2*d-e*). Downsampling the amount of reads per library showed that a strong signal of the translocations was detected even with as little as 5 Gb of read data (~1.7× total coverage, FIG. 9*a-h*). Finally, examination of both SVs in the stLFR-1 library resulted in no obvious pattern (FIG. 9*i*-1), suggesting the false positive rate for detection of these types of SVs is low.

1.5 Scaffolding Contigs with stLFR stLFR is a powerful method in part because it uses a very large number (e.g., ~1.8 billion) unique barcodes and enables co-barcoding that is specific to each individual long genomic DNA molecule. This type of data should be beneficial for de novo genome assembly and improved scaffolding. To demonstrate how stLFR can be used to improve genome assemblies we used reads from stLFR-1 and stLFR-4 libraries and SALSA (28), a program designed for chromatin conformation capture (Hi-C) data, to scaffold Single Molecule Real-Time (SMRT) read assemblies of NA12878 (29). SALSA was not designed for stLFR data, making it necessary to alter the stLFR data to a structure similar to Hi-C. This was achieved by selecting pairs of reads sharing the same barcode and located towards the ends of the captured long DNA molecule. These were then labeled as read pairs for the SALSA program. Substituting stLFR data for Hi-C data resulted in excellent scaffolding. Using only 60 million stLFR reads enabled the linkage of 1,411 contigs into 597 scaffolds with an N50 of 44.7 Mb. These scaffolds covered 2.84 Gb of the genome. These metrics compared very favorably to those generated in the SALSA manuscript using the same contigs and 10-fold more (734 million) Hi-C read pairs generated from human embryonic stem cells (30) (Table 2). The quality of stLFR scaffolds was further analyzed by aligning them to build 37 of the human reference genome and comparing them with the program dnadiff (31). In general, stLFR scaffolds agreed closely with the reference genome and the number of breakpoints, translocations, relocations, and inversions was similar to those of the scaffolds generated with Hi-C reads (Table 2). Alignment dot plots further demonstrate the high degree of continuity between stLFR scaffolds and the reference genome (FIG. 10).

1.6 Discussion

Here we describe an efficient whole genome sequencing library preparation technology, stLFR, that enables the co-barcoding of sub-fragments of long genomic DNA molecules with a single unique clonal barcode in a single tube process. Using microbeads as miniaturized compartments allows a practically unlimited number of clonal barcodes to be used per sample at a negligible cost. Our optimized hybridization-based capture of transposon inserted DNA on beads, combined with 3'-branch ligation and exonuclease degradation of the extreme excess of capture adapters, successfully barcodes up to ~20% of sub-fragments in DNA molecules as long as 300 kb in length. Importantly, this is achieved without DNA amplification of initial long DNA fragments and the representation bias that comes with it. In this way, stLFR solves the cost and limited co-barcoding capacity of emulsion-based methods.

The quality of variant calls using stLFR is very high and possibly, with further optimization, will approach that of standard WGS methods, but with the added benefit that co-barcoding enables advanced informatics applications. We demonstrate high quality, near complete phasing of the genome into long contigs with extremely low error rates, detection of SVs, and scaffolding of contigs to enable de novo assembly applications. All of this is achieved from a single library that does not require special equipment nor add significantly to the cost of library preparation.

As a result of efficient barcoding, we successfully used as little as 1 ng of human DNA (600× genome coverage) to make stLFR libraries and achieved high quality WGS with most sub-fragments uniquely co-barcoded. Less DNA can be used, but stLFR does not use DNA amplification during co-barcoding and thus does not create overlapping sub-fragments from each individual long DNA molecule. For this reason overall genomic coverage suffers as the amount of DNA is lowered. In addition, a sampling problem is created as stLFR currently retains 10-20% of each original long DNA molecule followed by PCR amplification. This results in a relatively high duplication rate of reads and results in added sequencing cost, but improvements are possible. One obvious solution is to remove the PCR step. This would eliminate sampling, but also it could substantially reduce the false positive and false negative error rates. In addition, improvements such as optimizing the distance of insertion between transposons and increasing the length of sequencing reads to paired-end 200 bases should be easy to enable and will increase the coverage and overall quality. For some applications, such as structural variation detection, using less DNA and less coverage may be desirable. As we demonstrate in this paper, as little as 5 Gb of sequence coverage can faithfully detect inter and intrachromosomal translocations and in these cases the duplication rate is negligible. Indeed, stLFR may represent a simple and cost-effective replacement for long mate pair libraries in a clinical setting.

In addition, we believe this type of data can enable full diploid phased de novo assembly from a single stLFR library without the need for long physical reads such as those generated by SMRT or nanopore technologies. One interesting feature of transposon insertion is that it creates a 9 base sequence overlap between adjacent sub-fragments. Frequently, these neighboring sub-fragments are captured and sequenced enabling reads to be synthetically doubled in length (e.g., for 200 base reads, two neighboring captured sub-fragments would create two 200 base reads with a 9 base overlap, or 391 bases). stLFR does not require special equipment like droplet based microfluidic methods and the cost per sample is minimal. In this paper we demonstrated using 50 million beads but using more is possible. This will enable many types of cost-effective analyses where 100s of millions of barcodes would be useful. We envision this type of cheap massive barcoding can be useful for RNA analyses such as full-length mRNA sequencing from 1,000s of cells by combination with single cell technologies or deep population sequencing of 16S RNA in microbial samples. Phased chromatin mapping by the Assay for Transposase-Accessible Chromatin (ATAC-seq) (32) or methylation studies are all also possible with stLFR.

1.7 Target Nucleic Acids

As used herein, the term "target nucleic acid" (or polynucleotide) or "nucleic acid of interest" refers to any nucleic acid (or polynucleotide) suitable for processing and sequencing by the methods described herein. The nucleic acid may be single stranded or double stranded and may include DNA, RNA, or other known nucleic acids. The target nucleic acids may be those of any organism, including but not limited to viruses, bacteria, yeast, plants, fish, reptiles, amphibians, birds, and mammals (including, without limitation, mice, rats, dogs, cats, goats, sheep, cattle, horses, pigs, rabbits, monkeys and other non-human primates, and humans). A target nucleic acid may be obtained from an individual or from a multiple individuals (i.e., a population). A sample from which the nucleic acid is obtained may contain a nucleic acids from a mixture of cells or even organisms, such as: a human saliva sample that includes human cells and bacterial cells; a mouse xenograft that includes mouse cells and cells from a transplanted human tumor; etc. Target nucleic acids may be unamplified or they may be amplified by any suitable nucleic acid amplification method known in the art. Target nucleic acids may be purified according to methods known in the art to remove cellular and subcellular contaminants (lipids, proteins, carbohydrates, nucleic acids other than those to be sequenced, etc.), or they may be unpurified, i.e., include at least some cellular and subcellular contaminants, including without limitation intact cells that are disrupted to release their nucleic acids for processing and sequencing. Target nucleic acids can be obtained from any suitable sample using methods known in the art. Such samples include but are not limited to: tissues, isolated cells or cell cultures, bodily fluids (including, but not limited to, blood, urine, serum, lymph, saliva, anal and vaginal secretions, perspiration and semen); air, agricultural, water and soil samples, etc. Non-limiting examples of target nucleic acids include "circulating nucleic acids" (CNA), which are nucleic acids circulating in human blood or other body fluids, including but not limited to lymphatic fluid, liquor, ascites, milk, urine, stool and bronchial lavage, for example, and can be distinguished as either cell-free (CF) or cell-associated nucleic acids (reviewed in Pinzani et al., Methods 50:302-307, 2010).

Target nucleic acids may be genomic DNA (e.g., from a single individual), cDNA, and/or may be complex nucleic acids, including nucleic acids from multiple individuals or genomes. Examples of complex nucleic acids include a microbiome, circulating fetal cells in the bloodstream of a expecting mother (see, e.g., Kavanagh et al., J. Chromatol. B 878:1905-1911, 2010), circulating tumor cells (CTC) from the bloodstream of a cancer patient (see, e.g., Allard et al., Clin Cancer Res. 10:6897-6904, 2004). Another example is genomic DNA from a single cell or a small number of cells, such as, for example, from biopsies (e.g., fetal cells biopsied from the trophectoderm of a blastocyst; cancer cells from needle aspiration of a solid tumor, etc.). Another example is pathogens, e.g., bacteria cells, virus, or other pathogens, in a tissue, in blood or other body fluids, etc. As used herein, the term "complex nucleic acid" refers to large populations of nonidentical nucleic acids or polynucleotides. In certain embodiments, the target nucleic acid is genomic DNA; exome DNA (a subset of whole genomic DNA enriched for transcribed sequences which contains the set of exons in a genome); a transcriptome (i.e., the set of all mRNA transcripts produced in a cell or population of cells, or cDNA produced from such mRNA); a methylome (i.e., the population of methylated sites and the pattern of methylation in a genome); an exome (i.e., protein-coding regions of a genome selected by an exon capture or enrichment method; a microbiome; a mixture of genomes of different organisms; a mixture of genomes of different cell types of an organism; and other complex nucleic acid mixtures comprising large numbers of different nucleic acid molecules (examples include, without limitation, a microbiome, a xenograft, a solid tumor biopsy comprising both normal and tumor cells, etc.), including subsets of the aforementioned types of complex nucleic acids. In one embodiment, such a complex nucleic acid has a complete sequence comprising at least one gigabase (Gb) (a diploid human genome comprises approximately 6 Gb of sequence).

In some cases, target nucleic acids or first fragments are genomic fragments. In some embodiments the genomic fragments are longer than 10 kb, e.g., 10-100 kb, 10-500 kb, 20-300 kb, or longer than 100 kb. The amount of DNA (e.g., human genomic DNA) used in a single mixture may be <10 ng, <3 ng, <1 ng, <0.3 nm, or <0.1 ng of DNA. In some cases, target nucleic acids or first fragments are 5,000 to 100,000 KB in length

1.8 Additional Approaches

Although the working examples described herein use the polymerase chain reaction, other nucleic acid amplification methods may be used. It is within the ability of a person skilled in the art to make modifications appropriate to a suitable amplification technology.

FIGS. 17-B5 illustrate additional approaches. FIG. 17 shows production of double stranded DNBs, which can be transposon inserted and captured by stLFR beads. Up to thousands of copies (e.g., 10-10,000 copies, such as 10-1000 copies or 100-1000 copies) can be made on the same DNA strand. This enables high coverage of the original molecule with stLFR sequencing. FIG. 18 illustrates that when a limited amount of template DNA is available, limited pre-amplification steps can be used prior to stLFR. FIG. 19 describes an approach in which random nickase is used at low concentration, Klenow fragment at medium concentration, and ligase at high concentration. Beads and DNA are at concentrations suitable for stLFR. As nicks are made and opened to gaps by Klenow, ligation is immediate and locks long fragments to beads. Nicking is allowed to proceed and more gaps are opened for more adapters to ligate into gaps. Primer extension results in ~500 base pair fragments. A second adapter is ligated to the blunt end and the library can be sequenced. FIG. 20 shows ligation of hairpin adapters on long DNA and use of primers in the loops and Ph29 or similar polymerase to create concatenated dsDNA before barcoding. In addition to improving read coverage per molecule, an interesting result of this process that at the end of 0.5-3 h of polymerase reaction total "length" (number of bases) for each concatamer is similar independent of the initial fragment length. This provides an option to use barcoded beads with binding capacity that corresponds to the size of concatamers and thus prevents binding of multiple concatamers per bead. This would reduce the number of beads need per reaction, thus further reducing cost.

FIG. B5 shows an approach to intermediate length tagging. In one approach, 96 or more different barcoded transposons linked in groups of 10 or less by a linker moiety (e.g. DNA, long inert molecules such as dextrin or polyethylene glycol (PEG), or long proteins such as keratin or collagen). Hybridization and ligation can be used to attach transposons to linker DNA. The other methods can be attached via chemical linkages or by attaching an avidin to these molecules and attaching a biotin to the transposon. This achieves two things, it controls the distance of insertion between transposons and it gives intermediate read proximity information (10 kb or less). This is useful for analysis of repeat sequences (tandem repeats, trinucleotide mapping, etc.). The DNA comprising insertion sequences may be captured on beads as for other stLFR approaches described herein and elsewhere. See Joseph C. Mellor, et al., "Phased NGS Library Generation via Tethered Synaptic Complexes," seqWell (2017), available at world wide web seqwell.com/wp-content/uploads/2017/02/seqWell_LongBow_poster AGBT2017.pdf (last accessed May 16, 2018).

1.9 References for Section 1

1. K. Zhang et al., Long-range polony haplotyping of individual human chromosome molecules. *Nat Genet* 38, 382-387 (2006).
2. L. Ma et al., Direct determination of molecular haplotypes by chromosome microdissection. *Nat Methods* 7, 299-301 (2010).
3. J. O. Kitzman et al., Haplotype-resolved genome sequencing of a Gujarati Indian individual. *Nat Biotechnol* 29, 59-63 (2011).
4. E. K. Suk et al., A comprehensively molecular haplotype-resolved genome of a European individual. *Genome Res* 21, 1672-1685 (2011).
5. H. C. Fan, J. Wang, A. Potanina, S. R. Quake, Whole-genome molecular haplotyping of single cells. *Nat Biotechnol* 29, 51-57 (2011).
6. B. A. Peters et al., Accurate whole-genome sequencing and haplotyping from 10 to 20 human cells. *Nature* 487, 190-195 (2012).
7. J. Duitama et al., Fosmid-based whole genome haplotyping of a HapMap trio child: evaluation of Single Individual Haplotyping techniques. *Nucleic Acids Res* 40, 2041-2053 (2012).
8. S. Selvaraj, R. D. J, V. Bansal, B. Ren, Whole-genome haplotype reconstruction using proximity-ligation and shotgun sequencing. *Nat Biotechnol* 31, 1111-1118 (2013).
9. V. Kuleshov et al., Whole-genome haplotyping using long reads and statistical methods. *Nat Biotechnol* 32, 261-266 (2014).
10. S. Amini et al., Haplotype-resolved whole-genome sequencing by contiguity-preserving transposition and combinatorial indexing. *Nat Genet* 46, 1343-1349 (2014).
11. G. X. Zheng et al., Haplotyping germline and cancer genomes with high-throughput linked-read sequencing. *Nat Biotechnol*, (2016).
12. F. Zhang et al., Haplotype phasing of whole human genomes using bead-based barcode partitioning in a single tube. *Nat Biotechnol* 35, 852-857 (2017).
13. B. A. Peters, J. Liu, R. Drmanac, Co-barcoded sequence reads from long DNA fragments: a cost-effective solution for "perfect genome" sequencing. *Frontiers in genetics* 5, 466 (2014).
14. R. Drmanac. Nucleic Acid Analysis by Random Mixtures of Non-Overlapping Fragments. WO 2006/138284 A2 (2006).
15. R. Drmanac, Peters, B. A., Alexeev, A. Multiple tagging of long DNA fragments. WO 2014/145820 A2 (2014).
16. K. Jo, Y. L. Chen, J. J. de Pablo, D. C. Schwartz, Elongation and migration of single DNA molecules in microchannels using oscillatory shear flows. *Lab Chip* 9, 2348-2355 (2009).
17. R. Drmanac et al., Human genome sequencing using unchained base reads on self-assembling DNA nanoarrays. *Science* 327, 78-81 (2010).

18. T. Fehlmann et al., cPAS-based sequencing on the BGISEQ-500 to explore small non-coding RNAs. *Clin Epigenetics* 8, 123 (2016).
19. J. Huang et al., A reference human genome dataset of the BGISEQ-500 sequencer. *Gigascience* 6, 1-9 (2017).
20. S. S. T. Mak et al., Comparative performance of the BGISEQ-500 vs Illumina HiSeq2500 sequencing platforms for palaeogenomic sequencing. *Gigascience* 6, 1-13 (2017).
21. H. Li, R. Durbin, Fast and accurate short read alignment with Burrows-Wheeler transform. *Bioinformatics* 25, 1754-1760 (2009).
22. A. McKenna et al., The Genome Analysis Toolkit: a MapReduce framework for analyzing next-generation DNA sequencing data. *Genome Res* 20, 1297-1303 (2010).
23. J. M. Zook et al., Integrating human sequence data sets provides a resource of benchmark SNP and indel genotype calls. *Nat Biotechnol* 32, 246-251 (2014).
24. P. Edge, V. Bafna, V. Bansal, HapCUT2: robust and accurate haplotype assembly for diverse sequencing technologies. *Genome Res* 27, 801-812 (2017).
25. Q. Mao et al., The whole genome sequences and experimentally phased haplotypes of over 100 personal genomes. *Gigascience* 5, 1-9 (2016).
26. Z. Dong et al., Low-pass whole-genome sequencing in clinical cytogenetics: a validated approach. *Genet Med* 18, 940-948 (2016).
27. Z. Dong et al., Identification of balanced chromosomal rearrangements previously unknown among participants in the 1000 Genomes Project: implications for interpretation of structural variation in genomes and the future of clinical cytogenetics. *Genet Med*, (2017).
28. J. Ghurye, M. Pop, S. Koren, D. Bickhart, C. S. Chin, Scaffolding of long read assemblies using long range contact information. *BMC Genomics* 18, 527 (2017).
29. M. Pendleton et al., Assembly and diploid architecture of an individual human genome via single-molecule technologies. *Nat Methods* 12, 780-786 (2015).
30. J. R. Dixon et al., Topological domains in mammalian genomes identified by analysis of chromatin interactions. *Nature* 485, 376-380 (2012).
31. A. M. Phillippy, M. C. Schatz, M. Pop, Genome assembly forensics: finding the elusive mis-assembly. *Genome biology* 9, R55 (2008).
32. J. D. Buenrostro, P. G. Giresi, L. C. Zaba, H. Y. Chang, W. J. Greenleaf, Transposition of native chromatin for fast and sensitive epigenomic profiling of open chromatin, DNA-binding proteins and nucleosome position. *Nat Methods* 10, 1213-1218 (2013).

EXAMPLES

2. Example 1: Methods and Materials

2.1. High Molecular Weight DNA Isolation

Long genomic DNA was isolated from cell lines following a modified version of the RecoverEase™ DNA isolation kit (Agilent Technologies, La Jolla, CA) protocol (1).

Briefly, approximately 1 million cells were pelleted and lysed with 500 ul of lysis buffer. After a 10 minute incubation at 4° C. 20 μL of RNase-IT ribonuclease cocktail in 4 mL of digestion buffer was added directly to the lysed cells and incubated on a 50° C. heat block. After 5 minutes 4.5 mL of proteinase K solution (~1.1 mg/mL proteinase K, 0.56% SDS, and 0.89×TE) was added and the mix was incubated at 50° C. for an additional 2 hours. The genomic DNA was then transferred to dialysis tubing with a 1,000 kD molecular weight cutoff (Spectrum Laboratories, Inc., Rancho Dominguez, CA) and dialyzed overnight at room temperature in 0.5×TE buffer.

2.2 Barcoded Bead Construction

Barcoded beads are constructed through a split and pool ligation-based strategy using three sets of double-stranded barcode DNA molecules. See FIGS. 12 and 13 A common adapter sequence comprising a PCR primer annealing site was attached to Dynabeads™ M-280 Streptavidin (ThermoFisher, Waltham, MA) magnetic beads with a 5' dual-biotin linker. Three sets 1,536 of barcode oligos containing regions of overlapping sequence were constructed by Integrated DNA Technologies (Coralville, IA). Ligations were performed in 384 well plates in a 15 μL reaction containing 50 mM Tris-HCl (pH 7.5), 10 mM $MgCl_2$, 1 mM ATP, 2.5% PEG-8000, 571 units T4 ligase, 580 pmol of barcode oligo, and 65 million M-280 beads. Ligation reactions were incubated for 1 hour at room temperature on a rotator. Between ligations beads were pooled into a single vessel through centrifugation, collected to the side of the vessel using magnet, and washed once with high salt wash buffer (50 mM Tris-HCl (pH 7.5), 500 mM NaCl, 0.1 mM EDTA, and 0.05% Tween 20) and twice with low salt wash buffer (50 mM Tris-HCl (pH 7.5), 150 mM NaCl, and 0.05% Tween 20). Beads were resuspended in 1× ligation buffer and distributed across 384 wells plates and the ligation steps were repeated.

Certain "barcodes" referred to herein are "tripartate barcodes." Tripartate refers to their structure and/or to their synthesis. As shown in FIG. 12 the tripartate barcodes may be synthesized by successive ligations of shorter (e.g., 4-20 nucleotide) sequences. In one embodiment the shorter barcodes are 10 bases in length. As shown in the figure, an exemplary structure comprised CS1-BC1-CS2-BC2-CS3-BC3-CS4 wherein CS is a constant sequence present on all capture adaptors and the BC sequences are diverse 10 base barcode as discussed here. The tripartate barcode can be constructed using partially double stranded oligonucleotides with the structure CSa-BC-CSb annealed to a shorter oligonucleotide that is the complement of BC (i.e., BC') as shown in the figures.

In one aspect the invention provides a composition comprising beads with capture oligonucleotides comprising clonal barcodes attached, where the composition comprises more than 3 billion different barcodes and where the barcodes are tripartate barcodes with the structure 5'-CS1-BC1-CS2-BC2-CS3-BC3-CS4. In some embodiments CS1 and CS4 are loner than CS2 and CS3. In some embodiments CS2 and CS3 are 4-20 bases, CS1 and CS4 are 5 or 10 to 40 bases, e.g., 20-30, and the BC sequences are 4-20 bases (e.g., 10 bases) in length. In some embodiments CS4 is complementary to a splint oligonucleotide. In some embodiments the composition comprises bridge oligonucleotides. In some embodiments the composition comprises bridge oligonucleotides, beads comprising a tripartate barcode as discussed above, and genomic DNA comprising hybridization sequences with a region complementary to the bridge oligonucleotides.

2.3 stLFR Using Two Transposons 2 pmol of Tn5 coupled transposons were inserted into 40 ng of genomic DNA in a 60 μL reaction of 10 mM TAPS- NaOH (pH 8.5), 5 mM $MgCl_2$, and 10% DMF at 55° C. for 10 minutes. 1.5 μL of transposon inserted DNA was transferred to 248.5 μL of hybridization buffer consisting of 50 mM Tris-HCl (pH 7.5), 100 mM $MgCl_2$, and 0.05% TWEEN® 20. 10-50 million barcoded beads were resuspended in the same hybridization buffer. The diluted DNA was added to the barcoded beads and the mix was heated to 60° C. for 10 minutes with occasional light mixing. The DNA-bead mix was transferred to a tube revolver in a laboratory oven and incubated at 45° C. for 50 minutes. 500 μL of ligation mix containing 50 mM Tris-HCl (pH 7.8), 10 mM DTT, 1 mM ATP, 2.5% PEG-8000, and 4,000 units of T4 ligase was added directly to the DNA-bead mix. The ligation reaction was incubated at room temperature on a revolver for 1 hour. 110 μL of 1% SDS were added and the mix was incubated at room temperature for 10 minutes to remove the Tn5 enzyme. Beads were collected to the side of the tube via a magnet and washed once with low salt wash buffer and once with NEB2 buffer (New England Biolabs, Ipswich, MA). Excess barcode oligos were removed using 10 units of UDG (New England Biolabs, Ipswich, MA), 30 units of APE1 (New England Biolabs, Ipswich, MA), and 40 units of Exonuclease 1 (New England Biolabs, Ipswich, MA) in 100 μL of 1×NEB2 buffer. This reaction was incubated at 37° C. for 30 minutes. Beads were collected to the side of the tube and washed once with low salt wash buffer and once with 1×PCR buffer (1×PfuCx buffer (Agilent Technologies, La Jolla, CA), 5% DMSO, 1 M Betaine, 6 mM $MgSO_4$, and 600 μM dNTPs). The PCR mix containing 1×PCR buffer, 400 pmol of each primer, and 6 μL of PfuCx enzyme (Agilent Technologies, La Jolla, CA) was heated to 95° C. for 3 minutes then cooled to room temperature. This mix was used to resuspend beads and the combined mixture was incubated at 72° C. for 10 minutes followed by 12 cycles of 95° C. for 10 seconds, 58° C. for 30 seconds, and 72° C. for 2 minutes.

2.4 stLFR with 3' Branched Ligation Adapter

This method starts with the same hybridization insertion conditions but using only one transposon as opposed to two transposons. After capture and barcode ligation steps, as described above, beads were collected to the side of the tube and washed with low salt wash buffer. An adapter digestion mix of 90 units of Exonuclease I (New England Biolabs, Ipswich, MA) and 100 units of Exonuclease III (New England Biolabs, Ipswich, MA) in 100 μL of 1×TA Buffer (Teknova, Hollister, CA) is added to the beads and incubated at 37° C. for 10 minutes. The reaction is stopped and the Tn5 enzyme is removed by adding 11 μL of 1% SDS. Beads were collected to the side of the tube and washed once with low salt wash buffer and once with 1×NEB2 buffer (New England Biolabs, Ipswich, MA). Excess capture oligonucleotide was removed by adding 10 units of UDG (New England Biolabs, Ipswich, MA) and 30 units of APE1 (New England Biolabs, Ipswich, MA) in 100 μL of 1×NEB2 buffer (New England Biolabs, Ipswich, MA) and incubating at 37° C. for 30 minutes. Beads were collected to the side of the tube and washed once with high salt wash buffer and once with low salt wash buffer. 300 pmol of second adapter was ligated to the bead bound sub-fragments with 4,000 units of T4 ligase in 100 μL of ligase buffer containing 50 mM Tris-HCl (pH 7.8), 10 mM $MgCl_2$, 0.5 mM DTT, 1 mM ATP, and 10% PEG-8000 on a revolver for 2 hours at room temperature. Beads were collected to the side of the tube and washed once in high salt wash buffer and once in 1×PCR buffer. The PCR mix and conditions were the same as the two-transposon process described above.

An exemplary 3' Branch ligation adaptor comprises 3' branch ligation adapter-F (/5Phos/CTGATGGCGCGAGGGAGGC (SEQ ID NO: 27)) and 3' branch ligation adapter-R (TCGCGCCATCA/3'dd/G (SEQ ID NO: 28)) oligonucleotides shown in Table 6. In this example, the Adaptor F sequence comprises a PCR primer annealing sequence. Optionally a barcode (e.g., sample barcode) can be included between 5' phosphate and the sequence shown. In this example, the Adaptor R sequence is shorter than the primer annealing sequence such that it will melt off under conditions in which the PCR primer anneals.

2.5 Sequence Mapping and Variant Calling

Raw read data were first demultiplexed by the associated barcode sequence using the barcode split tool (available at GitHub github.com/stLFR/stLFR_read_demux). Barcode assigned and clipped reads were mapped to the hs37d5 reference genome with BWA-MEM (2). The resulting BAM file was then sorted by chromosomal coordinates with SAMtools (3) and duplicates were marked with picard MarkDuplicate function (broadinstitute.github.io/picard). Short variant (SNPs and indels) calling was performed using the HaplotypeCaller within GATK4.0.3.0(4). The vcf file generated from the above step was then benchmarked against the Genome in a Bottle (GIAB) high confidence variant list (ftp-trace.ncbi.nlm.nih.gov/giab/ftp/release/NA12878_HG001/latest/GRCh37/) (5) using the rtgtools vcfeval function (6). After benchmarking the stLFR libraries were analyzed using GATK VariantRecalibrator, with the GIAB truth set being used to train the gaussian mixture model. VCFs were then filtered using GATK ApplyVQSR. In almost all cases the 99.9 tranche was applied to the raw vcfs, with the exception of the 100 Gb stLFR-1library and the STD library, where the 100 tranche was applied. We then established and applied further hard filtering criteria based on GQ score, ratio of reference to alternate depth, and barcode support as listed in Table 5:

2.6 Variant Phasing with Hapcut2

SNPs were phased with Hapcut2 (github.com/vibansal/HapCUT2) (7) using its 10× Genomics data pipeline. The BAM file was first converted into a format that carries barcode information in a similar format as a 10× Genomics barcoded BAM. Specifically, a 'BX' field was added to each line reflecting the barcode information of that read. GIAB variants or variants called by GATK for each library were used as the input for phasing, and the phasing result was summarized and compared against GIAB phased vcf file (5) using the calculate_haplotype_statistics.py tool of Hapcut2.

2.7. LongHap

The seed-extension strategy is used in the phasing process of LongHap. It initially starts from one pair of seeds, composed of the most upstream heterozygous variant in the chromosome. The seeds are extended by linking the other downstream candidate variants until no more variants can be added to the extending seeds (FIG. 11). In this extending process, the candidate variants at different loci will not be equally treated (i.e., the upstream variant has higher priority compared with the downstream ones across the chromosome). Each two heterozygous loci have two possible combinations along the two different alleles. Taking variant $T_2/G_2$ and $G_3/C_3$ for example (FIG. 11), one combination pattern is $T_2$-$G_3$ and $G_2$-$C_3$, while another one is $T_2$-$C_3$ and $G_2$-$G_3$. The score of each combination is calculated by the number of long DNA fragments spanning the two loci, which is equivalent to the number of unique barcodes with reads mapping to these two loci. As shown in FIG. 11, the final score of the former combination is 3, which is three times more than the latter. The variant $T_2/G_2$ is added to the extending seeds and the process repeats. Notably, if any barcode supports both of the alleles at one specific locus, it will be ignored when calculating the linkage score. This helps to decrease the switch error rate. When a conflict in linking downstream candidate variants occurs, as the variant $A_4/C_4$ in FIG. 11 shows, a simple decision will be made by comparing the linked loci number to allow further extending candidate variants. In this case, there are two linked loci in the left scenario while there is only one in the right scenario. LongHap will choose the left combination pattern as the final phasing result.

2.8 SV Detection

Structural variants were detected by calculating shared barcodes between regions of the genome as previously described (8). Duplicate reads were first removed. The mapped co-barcoded reads were scanned using a sliding window (the default value is 2 kb) along the genome, every window recorded how many barcodes have been found within this 2 kb window, and a Jaccard index was calculated for the shared barcodes ratio between the window pairs. Structural variant events were identified by the Jaccard index sharing metric between window pairs.

For every window pair (X, Y) across the genome, the Jaccard index is calculated as follows:

$$X = (x_1, x_2, \ldots x_n);\ Y = (y_1, y_2, \ldots y_n)$$

$$\text{Jaccard\_index}_{ij} = \begin{cases} \dfrac{x_i \cap y_j}{x_i \cup y_j} & (\text{if } x_i > 0 \text{ or } y_j > 0) \\ 0 & (\text{if } x_i = y_j = 0) \end{cases}$$

2.9 Contig Scaffolding with SALSA

Sequencing reads from stLFR libraries were used to scaffold an NA12878 assembly containing 18,903 contigs with NG50 of 26.83 Mb (9) (contigs downloaded from the NCBI genome website using scaffolding program SALSA (10). To mimic the HiC sequence structure suited for SALSA, stLFR sequence reads were selected from fragments of size >=5 kb. From each fragment with a length >=5 kb, the 'first' and 'last' read was selected to form a read pair. Subsequently, such artificial read pairs were selected by moving inward on these fragments at 2 kb intervals. These read pairs were then mapped onto the NA12878 contigs and scaffolding was performed with SALSA. The resulting scaffolds were then aligned to and compared with hg19 reference genome using nucmer and dnadiff of the MUMmer 4 program (11).

2.10 References for Example 1

1. I. Agent Technologies, RecoverEase DNA Isolation Kit. Revision C.0, (2015).
2. H. Li, R. Durbin, Fast and accurate short read alignment with Burrows-Wheeler transform. *Bioinformatics* 25, 1754-1760 (2009).
3. H. Li et al., The Sequence Alignment/Map format and SAMtools. *Bioinformatics* 25, 2078-2079 (2009).
4. A. McKenna et al., The Genome Analysis Toolkit: a MapReduce framework for analyzing next-generation DNA sequencing data. *Genome Res* 20, 1297-1303 (2010).
5. J. M. Zook et al., Integrating human sequence data sets provides a resource of benchmark SNP and indel genotype calls. *Nat Biotechnol* 32, 246-251 (2014).
6. J. G. Cleary et al., Comparing Variant Call Files for Performance Benchmarking of Next-Generation Sequencing Variant Calling Pipelines. bioRxiv, (2015).
7. P. Edge, V. Bafna, V. Bansal, HapCUT2: robust and accurate haplotype assembly for diverse sequencing technologies. *Genome Res* 27, 801-812 (2017).
8. F. Zhang et al., Haplotype phasing of whole human genomes using bead-based barcode partitioning in a single tube. *Nat Biotechnol* 35, 852-857 (2017).
9. M. Pendleton et al., Assembly and diploid architecture of an individual human genome via single-molecule technologies. *Nat Methods* 12, 780-786 (2015).
10. J. Ghurye, M. Pop, S. Koren, D. Bickhart, C. S. Chin, Scaffolding of long read assemblies using long range contact information. *BMC Genomics* 18, 527 (2017).
11. S. Kurtz et al., Versatile and open software for comparing large genomes. *Genome biology* 5, R12 (2004).

Example 2: Detailed Protocol

3.1 Materials

1 Kb Plus DNA Ladder (ThermoFisher, cat. no. 10787018)
100 Kd MWCO Biotech CE dialysis tubing (Spectrum Labs, cat. no. 131486)
384-well Armadillo PCR plate (ThermoFisher, cat. no. AB2384)
Agencourt® AMPure XP beads (Beckman Coulter, cat. no. A63882)
APE 1 (10,000 units/mL) (New England Biolabs, cat. no. M0282L)
ATP (100 mM) (Teknova, cat. no. A1210)
Barcoded bead construction oligonucleotides (IDT) (see note)
Betaine (5 M) (Sigma-Aldrich, cat. no. B0300-5VL)
BSA (20 mg/mL) (New England Biolabs, cat. no. B9000S)
Common adapter oligonucleotides (IDT)
DMF (~100%) (Sigma-Aldrich, cat. no. D4551-250ML)
DMSO (100%) (Sigma-Aldrich, cat. no. D9170-5VL)
dNTPs (25 mM) (ThermoFisher, cat. no. R1121)
Dialysis tubing (1,000 kD MWCO) (Spectrum Laboratories, Inc., cat. no. 131486)
DTT (Sigma-Aldrich, cat. no. 11583786001)
Dynabeads™ M-280 Streptavidin (ThermoFisher, cat. no. 60210)
EDTA (0.5 M, pH 8.0) (Sigma-Aldrich, cat. no. 03690-100ML)
Exonuclease I (20,000 units/mL) (New England Biolabs, cat. no. M0293L)
Exonuclease III (100,000 units/mL) (New England Biolabs, cat. no. M0206L)
Formamide (100%, 250 mL) (Sigma-Aldrich, cat. no. 47671-250ML-F)

Glycerol (100%) (Sigma-Aldrich, cat. no. G5516-100ML)

KCl (Sigma-Aldrich, cat. no. P9333-1 KG)

KH2PO4 (Sigma-Aldrich, cat. no. 795488-1 KG)

KOH (Sigma-Aldrich, cat. no. P5958-1 KG)

MgCl2 (1 M) (Sigma-Aldrich, cat. no. 63069-500ML)

$MgSO_4$ (1 M) (Sigma-Aldrich, cat. no. M3409-100ML)

MicroAmp Clear Adhesive Film (ThermoFisher, cat. no. 4306311)

NaCl (5M) (ThermoFisher, cat. no. AM9760G)

Na2HPO4 (Sigma-Aldrich, cat. no. S7907-1 KG)

NaOH (10M) (Sigma-Aldrich, cat. no. 72068-100ML)

NEB2 Buffer (10×) (New England Biolabs, cat. no. B7002S)

PEG-8000 (50%) (Rigaku, cat. no. 1008063)

Pfu Turbo Cx Hotstart DNA Polymerase (Agilent, cat. no. 600414)

Proteinase K, recombinant, PCR grade solution (14-22 mg/mL) (Roche, cat. no. 03115844001)

RiboRuler Low Range RNA Ladder (Thermofisher, cat. no. SM1831)

RNase-IT ribonuclease cocktail (Agilent, cat. no. 400720)

SDS (10%) (ThermoFisher, cat. no. 15553027)

Sucrose (Sigma-Aldrich, cat. no. S7903-1 KG)

T4 DNA ligase (2×106 units/mL) (New England Biolabs, cat. no. M0202M)

TA Buffer (10×) (Teknova, cat. no. T0379)

TAPS-NaOH (1 M, pH 8.5) (Boston BioProducts, cat. no. BB-2375)

TBE (10×) (ThermoFisher, cat. no. 15581028)

TE Buffer (10×) (Fisher Scientific, cat. no. BP24771)

Tn5 enzyme

Transposon oligonucleotides (IDT)

Tris-HCl (1 M, pH 7.5) (ThermoFisher, cat. no. 15567027)

Tris-HCl (2 M, pH 7.8) (Amresco, cat. no. J837-500ML)

Triton™ X-100 (10%) (Sigma-Aldrich, cat. no. 93443-100ML)

TWEEN® 20 (10%) (Roche, cat. no. 11332465001)

UDG (5,000 units/mL) (New England Biolabs, cat. no. M0280L)

3.2 Equipment 2.4 L tall polystyrene container (Click Clack, cat. no. 659030) or equivalent DynaMag™-2 Magnet (ThermoFisher, cat. no. 12321D)

Easy 50 EasySep™ Magnet (Stem Cell Technologies, cat. no. 18002) or equivalent

Lab oven capable of holding Tube Revolver/Rotator

Magnetic plate stirrer

Medium sized magnetic stir bar

Standard lab vortexer

Tetrad PCR thermocycler (Bio-Rad, cat. no. PTC0240) or equivalent capable of

100 µL per well reaction volumes

Tube Revolver/Rotator (Thermo Fisher, cat. no. 88881001) or equivalent 3.3 Reagent Setup Annealing Buffer (3×)
3 mL of 1 M Tris-HCl, pH 7.5
6 mL of 5 M NaCl
91 mL of sterile dH2O
Store at room temperature for 1 year.

3.4 Buffer D (10×)
224 mg of KOH
50 µL of 0.5 M EDTA
2.45 mL of sterile dH2O
Make aliquots and store at −20° C. for 1 month.

3.5 Coupling Buffer (1×)
5 mL of 1×TE
5 mL of 100% glycerol
Store at −20° C. for 1 year.

3.6 Digestion Buffer (1×, pH 8.0)
1.75 g of Na2HPO4
0.2 g of KCl
0.2 g of KH2PO4
27.4 mL 5 M NaCl
20 mL of 0.5 M EDTA (pH 8.0)
800 mL of sterile dH2O
Adjust the pH to 8.0 with 1 M NaOH.
Add sterile dH2O to a final volume of 1 liter.
Filter sterilize.
Store at room temperature for 1 year.

3.7 3' branch ligation Buffer (3×)
6 mL of 50% PEG-8000
0.75 mL 2 M Tris-HCl (pH 7.8)
0.3 mL 1 M MgCl2
0.3 mL 0.1 M ATP
15 µL 1 M DTT
75 µL 20 mg/mL BSA
2.560 mL of sterile dH2O
Store at −20° C. for 1 year.

3.8 High-Salt Bead Binding Buffer (1×)
5 mL of 1 M Tris-HCl (pH7.5)
6 mL of 5 M NaCl
20 µL of 0.5 M EDTA
88.98 mL of sterile dH2O
Store at room temperature for 1 year.

3.9 High-Salt Wash Buffer (1×)
5 mL of 1 M Tris-HCl, pH 7.5
10 mL of 5 M NaCl
20 µL of 0.5 M EDTA
0.5 mL of 10% TWEEN® 20
84.48 mL of sterile dH2O
Store at room temperature for 1 year.

3.10 Hybridization Buffer (1×)
50 mL of 1 M Tris-HCl, pH 7.5
100 mL of 1 M MgCl2
5 mL of 10% TWEEN® 20
845 mL of Water
Store at room temperature for 1 year 3.11 Ligation Buffer (10×)
25 mL of 50% PEG-8000
12.5 mL of 2 M Tris-HCl (pH 7.8)
5 mL of 100 mM ATP
5 mL of 1 M MgCl2
2.5 mL of sterile dH2O
Store at −20° C. for 1 year.

3.12 Ligation Buffer, No MgCl2 (10×)
25 mL of 50% PEG-8000
12.5 mL of 2 M Tris-HCl (pH 7.8)
5 mL of 100 mM ATP
5 mL of 1 M DTT
2.5 mL of sterile dH2O
Store at −20° C. for 1 year.

3.13 Low-Salt Wash Buffer (1×)
5 mL of 1 M Tris-HCl, pH 7.5
3 mL of 5 M NaCl
0.5 mL of 10% TWEEN® 20
91.5 mL of sterile dH2O Store at room temperature for 1 year.

3.14 Lysis Buffer (1×, pH 8.3)

0.22 g of KCl 120 g of sucrose 13 mL of 1 M Tris-HCl (pH 7.5)

2 mL of 0.5 M EDTA (pH 8.0)

28 mL of 5 M NaCl 10 mL of Triton® X-100

800 mL of sterile dH2O

Adjust the pH to 8.3

Add sterile dH2O to a final volume of 1 liter

Filter sterilize

Store at 4° C. for 1 year.

3.15 Transposase Buffer (5×)

0.5 mL of 1 M TAPS-NaOH (pH 8.5)

0.25 mL of 1 M MgCl2

5 mL of 100% DMF 4.25 mL of sterile dH2O

Store at-20° C. for 1 year.

3.16 PfuCx mix (2×)

2 mL of 10× PfuCx buffer (included with enzyme)

0.5 mL of 100% DMSO 2 mL of 5 M Betaine

60 μL of 1 M MgSO4

240 μL of 25 mM dNTPs 5.2 mL of sterile dH2O 3.16 Barcoded bead construction oligos All barcoded oligonucleotides were synthesized at 100 nmol scale in 384 well format with standard desalting and delivered at a concentration of 200 μM in 1×TE (pH 8.0) by Integrated DNA Technologies (Coralville, IA). There are a total of 1,536 unique barcode oligos for each barcode set and there are 3 barcode sets. This enables up to ~3.6 billion different barcode combinations. This may be more than necessary for some applications and less barcode combinations can be achieved by ordering less plates of oligonucleotides. This particular design does require that at least one barcode oligonucleotidefrom each set is used to create the proper final sequence, however, slight modifications of the 6 base overlapping sequences between barcode sets can be made to remove an entire barcode set.

3.2 Procedure

High Molecular Weight DNA Isolation from Cells

This method is based on the RecoverEase™ DNA isolation kit protocol26, but is performed using much larger volumes so as to reduce the viscosity of the resulting solution.

1. Pellet up to 1×107 dispersed nucleated cells in a 15 or 50 mL conical tube (500×g for 5 min). Remove supernatant. Add 500 μL of lysis buffer to the cell pellet and vortex sample briefly for 3-5 seconds on medium speed and place the conical tube in refrigerator for ~10 minutes, swirling occasionally.
2. Prepare proteinase K solution by combining 250 μL of 10% SDS, 250 μL of Proteinase K, and 4 mL of 1×TE. Place on 50° C. heat block and warm briefly (~5 minutes).
3. Prepare the digestion solution by combining 20 μL of RNase-It ribonuclease cocktail with 4 mL of digestion buffer.
4. Add ~4 mL of the prepared digestion solution to the lysed cells and buffer from step one and gently rock the conical tube.
5. Place the conical tube in a 50° C. heat block after 5 minutes add 4.5 mL of the warmed proteinase K solution to the free-floating pellet. Swirl the conical tube gently to mix.
6. Recap the tube and incubate in a 50° C. heat block for 2 hours, swirling the tube gently every 30 minutes.
7. Cut approximately 13 cm of dialysis tubing (it has a capacity of approximately 1 mL/cm). Allow to equilibrate in 0.5×TE for 30 minutes. Seal one end with a dialysis clip.
8. Pour at least 1 L of 0.5×TE buffer into a dialysis reservoir.
9. Carefully pour viscous genomic DNA from the conical tube into the open end of dialysis tubing. Seal open end of dialysis tubing with dialysis clip. Attach float to one clip. Place dialysis tubing with float into dialysis reservoir.
10. Dialyze the genomic DNA at room temperature for 24 to 48 hours while stirring the buffer gently with a magnetic stir bar. Replace the TE buffer once during the dialysis period to maximize the purity of the recovered DNA.
11. Upon completion of dialysis, remove the dialysis tubing from TE buffer, remove the float and clip from the top of the dialysis tubing and gentle pour into a 15 mL conical tube. DNA can be used immediately without shearing.

3.3 Barcoded Beads

Barcoded beads are constructed using a split and pool strategy with 3 sets of double-stranded barcode DNA molecules. Full length adaptors are constructed through successive ligations (FIG. 12 and FIG. 13). Barcode oligonucleotides are supplied in 384-well plates (see Reagents Notes). Common adapter oligonucleotides are supplied in tubes. Depending on what sequencing technology is being used, it may be necessary to alter the PCR primer sequence within the common adapter oligo.

12. Mix 10 μL of complementary oligonucleotide from each well of the source 384-well plates in 384-well PCR plates with 10 μL 3× Annealing Buffer. Mix 30 μL of common adapter oligonucleotides in one well of an 8-well PCR strip tube.
13. Incubate at 70° C. for 3 minutes followed by a slow ramp of 0.1° C./s to 20° C. on a PCR thermocycler. Hybridized barcode oligonucleotides have a final concentration of 66 μM.
14. Mix 4.725 mL (157.5 μmol) of hybridized Bead Linker containing a 5' dual-biotin with 3.225 mL of Ligation Buffer (10×), 460.8 μL (921,600 units) of T4 DNA Ligase, and 9.67 mL dH2O to a total volume of 18.081 mL.
15. Dispense 11.2 μL of the ligation mixture into each well of four new 384-well PCR plates. Then add 8.8 μL (580 μmol) from each well of the hybridized first barcode plates to each well containing the bead linker ligation mixture. Seal with MicroAmp Clear Adhesive Film, vortex, centrifuge, and incubate at room temperature for 1 hour.
16. Collect 100 billion (143 mL) of M-280 streptavidin coated magnetic beads by transferring 50 mL beads into empty 50 mL centrifuge tube. Place the 50 mL tube with beads in the Easy 50 EasySep™ Magnet for 5 minutes to collect beads to the side of the tube. Carefully remove supernatant by pipette. Transfer a second 50 mL beads into tube on magnet. Let sit for 5 minutes on magnet and carefully remove supernatant. Transfer a final 43 mL of beads to the 50 mL tube. Let sit for 5 minutes on magnet and carefully remove supernatant. Wash beads twice with Low-Salt Wash Buffer then resuspend well in 8 mL of High-Salt Bead Binding Buffer.

17. Dispense 5 μL of beads in High-Salt Bead Binding Buffer to each well of the plates containing ligation product. Vortex the beads source tube occasionally during dispensing to keep the beads well-suspended.
18. Seal plates with MicroAmp Clear Adhesive Film, vortex, and place onto the tube revolver for incubation at room temperature for 1 hour on "oscillating" mode.
19. Centrifuge plates at 300×g for 5 seconds to remove beads from seal, but not allow a pellet to form. Remove seal and add 2.8 μL 0.1% SDS to each well. Seal plates again with MicroAmp Clear Adhesive Film, vortex briefly and incubate at room temperature for 10 minutes.
20. Vortex and then centrifuge plates at 300×g for 5 seconds to remove beads from the plate seal. Remove the seal from each plate and invert plates onto a collection tray. Centrifuge at 500×g for 2 minutes. Using a 10 mL serological pipette, collect beads into one new 50 mL tube.
21. Collect beads to the side of the tube on the Easy 50 EasySep™ Magnet for 5 minutes. Discard supernatant. Wash once with 10 mL of High Salt Wash Buffer and then twice with Low-Salt Wash Buffer. Resuspend beads 8 mL 1× Ligation Buffer.
22. Dispense 5 ul of beads into each well of four new 384-well PCR plates. Vortex the beads source tube occasionally during dispensing to keep the beads well-suspended.
23. To ligate the second set of barcodes, make a mixture containing 3.225 mL Ligation Buffer (10×), 460.8 μL (921,600 units) of T4 DNA Ligase, and 6.33 mL dH2O to a total volume of 10.02 mL. Dispense 6.2 μL of the second ligation mixture to each well of the four 384-well PCR plates containing beads. Next add 8.8 μL (580 pmol) from each well of the hybridized second barcode plates to the corresponding wells of the 384-well PCR plates containing the bead and ligation mixture.
24. Repeat steps 18-22.
25. To ligate the third set of barcodes, make a ligation mixture containing 3.225 mL Ligation Buffer (10×), 460.8 μL (921,600 units) of T4 DNA Ligase, and 6.33 mL dH2O to a total volume of 10.02 mL. Dispense 6.2 μL of the third ligation mixture to each well of the four 384-well PCR plates containing beads. Next add 8.8 μL (580 pmol) from each well of the hybridized third barcode plates to the corresponding wells of the 384-well PCR plates containing the bead and ligation mixture.
26. Repeat steps 18-22. The beads can now be stored at 4° C. for up to one year. In the current form the beads are almost completely double stranded and not yet in the correct form to be used for stLFR.
27. Count the beads with hemocytometer and take out 5 million beads for the QC step. Place the tube with beads onto the DynaMag™-2 Magnet for 5 minutes. Discard supernatant. Add 5 μL 100% formamide, 4 μL dH2O and 1 μL 10× loading buffer. Incubate it at 95° C. for 3 minutes on a PCR thermocycler. Immediately place on ice for 2 minutes. Place the tube with beads onto the DynaMag™-2 Magnet for 5 minutes. Collect supernatant, load on a 15% TBU gel, and run at 200 V for 40 minutes to check the oligonucleotide length and amount. Alternatively, beads can be examined using a flow cytometer by hybridizing a fluorescently labeled oligonucleotide to the 3' end of the bead adapter sequence. We typically see about 25% of the total streptavidin bound sites have a full length constructed adapter sequence.

3.20 Bead Preparation for stLFR

To prepare beads for stLFR, they must first be denatured to single stranded DNA and then rehybridized with the bridge oligo.

28. Pipette 500 million constructed barcoded beads from step 26. of the previous section into a standard 1.5 mL microcentrifuge tube.
29. Place on DynaMag™-2 Magnet for 2 minutes to collect beads onto the side of the tube. Remove supernatant.
30. Add 1 mL of a 1× dilution of Buffer D. Vortex briefly and incubate for 2 minutes at room temperature.
31. Place on DynaMag™-2 Magnet for 2 minutes to collect beads onto the side of the tube. Remove supernatant.
32. Repeat steps 30 and 31 one more time.
33. Wash once in 1× Annealing buffer. Place on DynaMag™-2 Magnet for 2 minutes to collect beads onto the side of the tube. Remove supernatant.
34. Mix 36 μL of 100 μM Bridge Oligo, 333.33 μL of Annealing Buffer (3×), and 630.67 μL of dH2O for a final volume of 1 mL. Add to mixture to beads. Vortex briefly.
35. Incubate at 60° C. for 5 minutes, and room temperature for 50 minutes.
36. Place on DynaMag™-2 Magnet for 2 minutes to collect beads onto the side of the tube. Remove supernatant and resuspend in 500 μL of Low-Salt Wash Buffer. These beads are now ready for stLFR and can be stored for 3 months at 4° C.

3.21 Two Transposons stLFR Protocol

The protocol utilizes two transposons to create hybridization sequences and PCR primer sites along the length of genomic DNA molecules. This is the most simplified and quickest stLFR method, but has potentially 50% less coverage per long DNA fragment than the 3' branch ligation protocol. It may be necessary to alter some of the transposon sequence after the mosaic region for compatibility with sequencing technologies other than BGISEQ-500. Check the sequencing primers being used prior to ordering these oligonucleotides. Information on all of the oligonucleotide sequences is available in the supplementary materials.

37. Hybridize the capture transposon oligos by combining 10 μL of Transposon1T (100 μM), 10 μL of TransposonB (100 μM), 10 μL of Annealing Buffer (3×) in the first well of an 8 well PCR strip tube and the non-captured transposon oligos by combining 10 μL of Transposon1T (100 μM), 10 μL of TransposonB (100 μM), 10 μL of Annealing Buffer (3×) in the second well of the same PCR strip tube.
38. Incubate at 70° C. for 3 minutes followed by a slow ramp of 0.1° C./s to 20° C. on a PCR thermocycler. Combine the two transposons into the third well of the PCR strip tube.
39. Couple the Tn5 enzyme to the transposon mix by combining 9.6 μL of mix transposons with 23.53 μL of Tn5 (13.6 pmol/μL), and 46.87 μL of Coupling Buffer (1×).
40. Incubate at 30° C. for 1 hour. Use immediately or store at −20° C. for up to 1 month. For optimal performance and consistency between experiments we suggest making aliquots prior to storage.

41. Incorporate transposons into long genomic DNA by combining 12 μL of Transposase Buffer (5×), 0.5 μL of coupled transposon from step 40, and 40 ng of DNA in a total volume of 60 μL in one well of an 8-well strip tube. Note: this amount of DNA and the amount of coupled transposon can be adjusted in this step. It will be necessary to titrate the amount of Tn5 enzyme used as there can be variability between batches. Also, starting with less DNA is possible, but for the purposes of titration it is useful to use 40 ng so that some of the material can be run on an agarose gel to determine the efficiency of transposon incorporation (see later steps).
42. Incubate at 55° C. for 10 minutes.
43. Transfer 40 μL of transposon incorporated material to one well of a new 8-well strip tube. Add 4 μL of 1% SDS and incubate at room temperature for 10 minutes.
44. Load the material from step 43 on a 0.5×TBE 1% agarose gel and run at 150 V for 40 minutes. The transposed DNA should run between 200 to 1,500 bp on the gel. We typically want to see the brightest part of the DNA smear around 600 bp, this might be different based on which sequencing technology is chosen. We typically load controls that are put through the same steps but lack the transposon, the Tn5 enzyme, or genomic DNA. If the size of transposon integrated products looks correct proceed to step 45. If not, repeat the steps above but adjust the concentration of the coupling product until the smear is the desired size.
45. Dilute 1.5 μL of the remaining product of step 42, with 248.5 μL of 1× Hybridization buffer.
46. Transfer 50 μL of beads (50 million) from step 36 to a 1.5 mL microcentrifuge tube. Place on DynaMag™-2 Magnet for 2 minutes to collect beads onto the side of the tube. Remove supernatant and resuspend in 250 μL of Hybridization Buffer (1×).
47. Heat DNA and beads separately at 60° C. for 30 seconds.
48. Add 250 μL of diluted DNA to the 250 μL of beads, mix gently by flicking the bottom of the tube with a finger, and continue incubating at 60° C. for 10 minutes. Lightly mix the tube every few minutes with your finger.
49. Place on tube revolver for incubation in oven at 45° C. for 50 minutes on “oscillating” mode.
50. Make ligation mix by combining 100 μL of Ligation Buffer, No MgCl2 (10×), 2 μL of T4 DNA ligase (2×106 units/mL), and 398 μL of dH2O. Remove tube from rotator and add ligation mix for a total volume of 1 mL.
51. Incubate on tube revolver for 1 hour on “oscillating” mode at room temperature.
52. Add 110 μL of 1% SDS to tube and incubate for 10 minutes at room temperature.
53. Place on DynaMag™-2 Magnet for 2 minutes to collect beads onto the side of the tube. Remove supernatant and wash once with 500 μL of Low-Salt Wash Buffer and once with 500 μL of NEB2 buffer (1×).
54. Make capture oligonucleotide digestion mix by combining 10 μL of NEB2 buffer (10×), 2 μL of UDG (5,000 U/mL), 3 μL of APE1 (10,000 U/mL), 2 μL of Exonuclease 1 (20,000 units/mL), and 83 μL of dH2O. Remove wash buffer and add digestion mix to beads.
55. Vortex lightly to resuspend beads and incubate at 37° C. for 30 minutes.
56. Place on DynaMag™-2 Magnet for 2 minutes to collect beads onto the side of the tube. Remove supernatant and wash once with 500 μL of Low-Salt Wash Buffer and once with 500 μL of PfuCx Buffer (1×).
57. Prepare PCR master mix by adding 150 μL of PCR mix (2×), 4 μL of PCR Primer 1 (100 μM), 4 μL of PCR primer 2 (100 μM), 6 μL of PfuCx enzyme, and 136 μL of dH2O. Preheat the PCR mastermix at 95° C. for 3 minutes. Place on DynaMag™-2 Magnet for 2 minutes to collect beads onto the side of the tube. Remove wash buffer and add PCR master mix to beads.
58. Vortex lightly to resuspend beads and cycle PCR reaction with the following conditions:

| | | |
|---|---|---|
| Step 1 | 72° C. | 10 minutes |
| Step 2 | 95° C. | 10 seconds |
| Step 3 | 58° C. | 30 seconds |
| Step 4 | 72° C. | 2 minutes |
| Step 6 | Repeat steps 2-5 10-12 times | |

59. PCR should result in ~500 ng of DNA, run 20 ng of product on a 0.5×TBE 1% agarose gel for 40 minutes at 150 V. The material should be a smear with a peak around 500 bp.
60. Purify PCR product with 300 μL of Agencourt XP beads following the manufacturer's protocol. This purified product is now ready to enter the sequencing process. Single transposon 3' branch ligation stLFR protocol This protocol is based on the single transposon insertion and novel adapter ligation methods in a DNA gap and can enable higher coverage per fragment, which may be important for some sequencing strategies such as de novo assembly. This strategy is slightly more expensive due to additional reagents. It also takes 2.5 hours longer.

61. Hybridize the capture transposon oligos by combining 10 μL of Transposon1T (100 μM), 10 μL of TransposonB (100 μM), 10 μL of Annealing Buffer (3×) in the first well of an 8 well PCR strip tube and the gap ligation adapter by combing 10 μL of BranchT (100 μM), 10 μL of BranchB (100 μM), 10 μL of Annealing Buffer (3×) in the second well of the same PCR strip tube.
62. Incubate at 70° C. for 3 minutes followed by a slow ramp of 0.1° C./s to 20° C. on a PCR thermocycler.
63. Couple the Tn5 enzyme to the transposon by combining 9.6 μL of hybridized capture transposon in step 61 with 23.53 μL of Tn5 (13.6 pmol/μL), and 46.87 μL of Coupling Buffer (1×).
64. Incubate at 30° C. for 1 hour. Use immediately or store at −20° C. for up to 1 month.
65. Follow steps 41-51.
66. Place on DynaMag™-2 Magnet for 2 minutes to collect beads onto the side of the tube. Remove supernatant and wash once with 500 μL of Low-Salt Wash Buffer.
67. Make adapter oligonucleotide digestion mix by combining 10 μL of TA Buffer (10×), 4.5 μL of Exonuclease I (20,000 U/mL), 1 μL of Exonuclease III (100,000 U/mL), and 74.5 μL of dH2O. Remove wash buffer and add digestion mix to beads.
68. Vortex lightly to resuspend beads and incubate on the tube revolver for 10 minutes at 37° C. on “oscillating” mode.
69. Add 11 μL of 1% SDS and incubate for 10 minutes at room temperature.
70. Place on DynaMag™-2 Magnet for 2 minutes to collect beads onto the side of the tube. Remove supernatant and wash once with 500 μL of Low-Salt Wash Buffer and once with 500 μL of NEB2 buffer (1×).

71. Make capture oligonucleotide digestion mix by combining 10 μL of NEB2 buffer (10×), 2 μL of UDG (5,000 U/mL), 3 μL of APE1 (10,000 U/mL), and 85 μL of dH2O. Remove wash buffer and add digestion mix to beads.
72. Lightly vortex to resuspend beads and incubate at 37° C. for 30 minutes.
73. Place on DynaMag™-2 Magnet for 2 minutes to collect beads onto the side of the tube. Remove supernatant and wash once with 500 μL of High-Salt Wash Buffer and once with 500 μL of Low-Salt Wash Buffer (1×).
74. Prepare 3' branch ligation mix by combining 33.4 μL of 3' branch ligation Buffer (3×), 18 μL of 3' branch ligation adapter (16.7 μM) prepared in step 61, 2 μL of T4 DNA ligase (2×106 units/mL), and 46.6 μL of dH2O. Remove wash buffer and add ligation mix to beads.
75. Vortex lightly to resuspend beads and incubate on the tube revolver for 2 hours at 25° C. on "oscillating" mode.
76. Place on DynaMag™-2 Magnet for 2 minutes to collect beads onto the side of the tube. Remove supernatant and wash once with 500 μL of High-Salt Wash Buffer and once with 500 μL of PCR buffer (1×).
77. Prepare PCR master mix by adding 150 μL of 2×PCR buffer, 4 μL of PCR Primer 1 (100 μM), 4 μL of PCR primer 2 (100 μM), 6 μL of PCR enzyme, and 136 μL of dH2O. Remove wash buffer and add PCR master mix to beads.
78. Vortex lightly to resuspend beads and cycle PCR reaction with the following conditions:

| | | |
|---|---|---|
| Step 1 | 95 C. | 3 minutes |
| Step 2 | 95 C. | 10 seconds |
| Step 3 | 58 C. | 30 seconds |
| Step 4 | 72 C. | 2 minutes |
| Step 5 | Repeat steps 2-4 10-12 times | |

79. Follow steps 59-60 above.

3.4 Analyzing stLFR Data

7The starting point for this process is a FASTQ file. This is a standard format for read data that is generated by most sequencing technologies. The software we use to deconvolute the barcode information takes the FASTQ file and expects 42 bases of the barcode and common adapter sequence to be appended to the end of the first read. It matches the barcode read data to the expected 1536 sequences at each barcode position. The barcoding strategy used by stLFR enables error correction of barcodes that have a single base mismatch. The final output from our software is a FASTQ file with the barcode information appended to the end of the read ID with the format #BarcodeID_Barcode2ID_Barcode3ID, where BarcodeID is a number from 0-1536. Zero for a barcode ID means it did not match any of the expected barcode sequences We recommend using BWA-mem27 for mapping, GATK28 for variant calling, and HapCUT229 for phasing. We also recommend mapping to Hg19 with decoy sequences.

3.5 References For Example 2

1 Zhang, K. et al. Long-range polony haplotyping of individual human chromosome molecules. Nat Genet 38, 382-387 (2006).
2 Ma, L. et al. Direct determination of molecular haplotypes by chromosome microdissection. Nat Methods 7, 299-301 (2010).
3 Kitzman, J. O. et al. Haplotype-resolved genome sequencing of a Gujarati Indian individual. Nat Biotechnol 29, 59-63 (2011).
4 Suk, E. K. et al. A comprehensively molecular haplotype-resolved genome of a European individual. Genome Res 21, 1672-1685 (2011).
5 Fan, H. C., Wang, J., Potanina, A. & Quake, S. R. Whole-genome molecular haplotyping of single cells. Nat Biotechnol 29, 51-57 (2011).
6 Peters, B. A. et al. Accurate whole-genome sequencing and haplotyping from 10 to 20 human cells. Nature 487, 190-195 (2012).
7 Duitama, J. et al. Fosmid-based whole genome haplotyping of a HapMap trio child: evaluation of Single Individual Haplotyping techniques. Nucleic Acids Res 40, 2041-2053 (2012).
8 Selvaraj, S., J, R. D., Bansal, V. & Ren, B. Whole-genome haplotype reconstruction using proximity-ligation and shotgun sequencing. Nat Biotechnol 31, 1111-1118 (2013).
9 Kuleshov, V. et al. Whole-genome haplotyping using long reads and statistical methods. Nat Biotechnol 32, 261-266 (2014).
10 Amini, S. et al. Haplotype-resolved whole-genome sequencing by contiguity-preserving transposition and combinatorial indexing. Nat Genet 46, 1343-1349 (2014).
11 Zheng, G. X. et al. Haplotyping germline and cancer genomes with high-throughput linked-read sequencing. Nat Biotechnol (2016).
12 Zhang, F. et al. Haplotype phasing of whole human genomes using bead-based barcode partitioning in a single tube. Nat Biotechnol 35, 852-857 (2017).
13 Peters, B. A., Liu, J. & Drmanac, R. Co-barcoded sequence reads from long DNA fragments: a cost-effective solution for "perfect genome" sequencing. Frontiers in genetics 5, 466 (2014).
14 Drmanac, R. Nucleic Acid Analysis by Random Mixtures of Non-Overlapping Fragments. WO 2006/138284 A2 (2006).
15 McElwain, M. A., Zhang, R. Y., Drmanac, R. & Peters, B. A. Long Fragment Read (LFR) Technology: Cost-Effective, High-Quality Genome-Wide Molecular Haplotyping. Methods Mol Biol 1551, 191-205 (2017).
16 Schaaf, C. P. et al. Truncating mutations of MAGEL2 cause Prader-Willi phenotypes and autism. Nat Genet 45, 1405-1408 (2013).
17 Peters, B. A. et al. Detection and phasing of single base de novo mutations in biopsies from human in vitro fertilized embryos by advanced whole-genome sequencing. *Genome Res* 25, 426-434 (2015).
18 Ciotlos, S. et al. Whole genome sequence analysis of BT-474 using complete Genomics' standard and long fragment read technologies. Gigascience 5, 8 (2016).
19 Hellner, K. et al. Premalignant SOX2 overexpression in the fallopian tubes of ovarian cancer patients: Discovery and validation studies. EBioMedicine 10, 137-149 (2016).
20 Mao, Q. et al. The whole genome sequences and experimentally phased haplotypes of over 100 personal genomes. Gigascience 5, 1-9 (2016).
21 Gulbahce, N. et al. Quantitative Whole Genome Sequencing of Circulating Tumor Cells Enables Personalized Combination Therapy of Metastatic Cancer. Cancer Res 77, 4530-4541 (2017).

22 Walker, R. F. et al. Clinical and genetic analysis of a rare syndrome associated with neoteny. Genetics In Medicine (2017).
23 Mao, Q. et al. Advanced Whole-Genome Sequencing and Analysis of Fetal Genomes from Amniotic Fluid. Clinical chemistry (2018).
24 Drmanac, R., Peters, B. A., Alexeev, A. Multiple tagging of individual long DNA fragments. WO 2014/145820 A2 (2013).
25 Picelli, S. et al. Tn5 transposase and tagmentation procedures for massively scaled sequencing projects. Genome Res 24, 2033-2040 (2014).
26 Agent Technologies, I. RecoverEase DNA Isolation Kit. Revision C.0 (2015).
27 Li, H. & Durbin, R. Fast and accurate short read alignment with Burrows-Wheeler transform. Bioinformatics 25, 1754-1760 (2009).
28 McKenna, A. et al. The Genome Analysis Toolkit: a MapReduce framework for analyzing next-generation DNA sequencing data. Genome Res 20, 1297-1303 (2010).
29 Edge, P., Bafna, V. & Bansal, V. HapCUT2: robust and accurate haplotype assembly for diverse sequencing technologies. Genome Res 27, 801-812 (2017).

The BAM file "NA12878_WGS_v2_phased_possorted_bam.bam" from a recent Chromium dataset was downloaded from the 10× Genomics website and processed in the same manner as the stLFR libraries. For filtered results we used the VCF file "NA12878_WGS_v2_phased_variants.vcf.gz" from the same Chromium library. This VCF contains data that was processed through 10× Genomics' optimized pipeline. The fragment size was for the Chromium library was copied from the 10× Genomics website. 10 Genomics uses a length weighted mean to calculate fragment size which may result in a larger size than the average fragment size. [2]Read data were not available, this is what is reported in Zhang et al. w (12). [3]Data from a standard library processed on a BGISEQ-500.

Table 6 shows exemplary sequences that may be used in the stLFR methods described herein.

Example 3: 3' Branch Ligation, a Novel Method to Ligate DNA to 3'OH Ends of DNA or RNA, and its Applications

4.1 Introduction

This example describes 3' Branch Ligation generally. 3' Branch ligation is used to add an additional adaptor (3' branch ligation adapter) in the stLFR embodiment described herein. See, e.g., § 1.1.2.

Ligases join breaks in nucleic acids, which is essential for cell viability and vitality. DNA ligases catalyze the formation of a phosphodiester bond between DNA ends and play crucial roles in DNA repair, recombination and replication in vivo. RNA ligases join 5'-phosphoryl (5'PO4) and 3'-hydroxyl (3'OH) RNA termini via phosphodiester bonds and are involved in RNA repair, splicing and editing. Ligases from all three kingdoms of organisms (bacteria, archaebacteria, and eukaryotes) can be utilized in vitro as important molecular tools for applications like cloning, ligase-based amplification or detection, synthetic biology and etc.

One of the most widely used ligases in vitro is Bacteriophage T4 DNA ligase, which is a single 55-kDA polypeptide and requires ATP as energy source. T4 DNA ligase typically joins the adjacent 5'PO4 and 3'OH termini of duplexed DNA. In addition to sealing nicks or ligating cohesive ends, T4 DNA ligase can also efficiently catalyze blunt end joining, which was not seen in all the other DNA ligases. Some unusual catalytic properties of this ligase were reported previously, such as sealing single-strand gaps in duplex DNA, sealing nicks adjacent to abasic sites in double-stranded DNA (dsDNA), promoting intramolecular loop formation of partially double-stranded DNA, and joining DNA strands containing 3' branch extensions. (Nilsson and Magnusson, Nucleic Acids Res 10:1425-1437, 1982; Goffin et al., Nucleic Acids Res 15:8755-8771, 1987; Mendel-Hartvig et al., Nucleic Acids Res. 32: e2, 2004; Western and Rose, Nucleic Acids Res., 19:809-813, 1991). Researchers also observed template-independent ligations mediated by T4 ligase, such as mispaired nick sealing in dsDNA (Alexander, 2003, Nucleic Acids Res. 2003 Jun. 15; 31 (12): 3208-16) or even single-stranded DNA (ssDNA) ligation, although at very low efficiency (H. Kuhn, 2005, FEBS J. 2005 December; 272 (23): 5991-6000). These results suggest that the perfect complementary base pairing at or adjacent to the ligation junction is not critically needed for some unconventional T4 DNA ligase activity. T4 RNA ligase 1 and 2 are the products of gene 63 and 24, respectively, of T4 phage. They both require an adjacent 5'PO4 and 3'OH end for a successful ligation with hydrolysis of ATP to AMP and PPi. The substrates for T4 RNA ligase 1 include single-stranded RNA and DNA, while T4 RNA ligase 2 preferentially seals nicks on dsRNA rather than ligating the ends of ssRNA.

Here we demonstrated a non-conventional end-joining event mediated by T4 DNA ligase, which we call 3'-branch ligation (3'BL). It can join DNA or DNA/RNA fragments at nicks, single-stranded gaps or 5'-overhang regions to form a branch structure. This report extensively studied a wide variety of ligation cofactors and activators and optimized the ligation conditions for this type of novel ligation. With our 3'BL protocol, no base pairing was required and the ligation can be more than 90% complete even for a 1-nt gap. One of its applications is to attach adapters to DNA or RNA in the NGS library preparation. Several genomic structures which were previously seen as unligatable can now become a substrate for 3'BL, resulting in a high conversion rate of input DNA into adapter-ligated molecules while avoiding chimeras. We demonstrated that 3'BL could be coupled with transposon insertion. The directional transposon insertion strategy we propose can theoretically produce templates 100% of which can be utilized for sequencing. microRNA applications. Our study demonstrated the value of this novel technique for NGS library preparation, as well as the potential to advance many other molecular applications such as radioactive labeling of 3' termini of RNA.

4.2 3' Branch Ligation, a Novel Way to Ligate DNA Ends

Conventionally, DNA ligation involves the joining of 5'PO4 and 3'OH DNA ends of cohesive or blunt ended fragments. Cohesive end ligation is generally faster and less dependent on enzyme concentration than blunt end joining. Both processes can be catalyzed by Bacteriophage T4 DNA ligase, which uses ATP as energy-yielding cofactor and requires Mg2+. T4 DNA ligase was also reported to ligate specific or degenerate single-stranded oligos to partially single-stranded substrates through hybridization. Here we demonstrated a unprecedented T4 DNA ligase-mediated ligation, which doesn't require complimentary base pairing and can ligate a blunt-ended DNA donor to 3'OH end of a duplex DNA acceptor at nicks, gaps or 5'-overhangs to form a branch structure (FIG. 21*a*). Therefore, we use the term 3'-branch ligation (3'BL) to describe these ligations. The synthetic donor DNA we used contained one blunt duplex end and one ssDNA end. The acceptor substrates contained one of the following structures: a dephosphorylated nick, a 1- or 8-nucleotide (nt) gap, or a 5'-overhang of 36 nt. T4 ligase helps to join 5'PO4 of the adapter strand to the sole ligatable 3'OH of the substrate strand to form a fork-shaped ligation product.

Figures 22A, 22B, 22C, 22D:
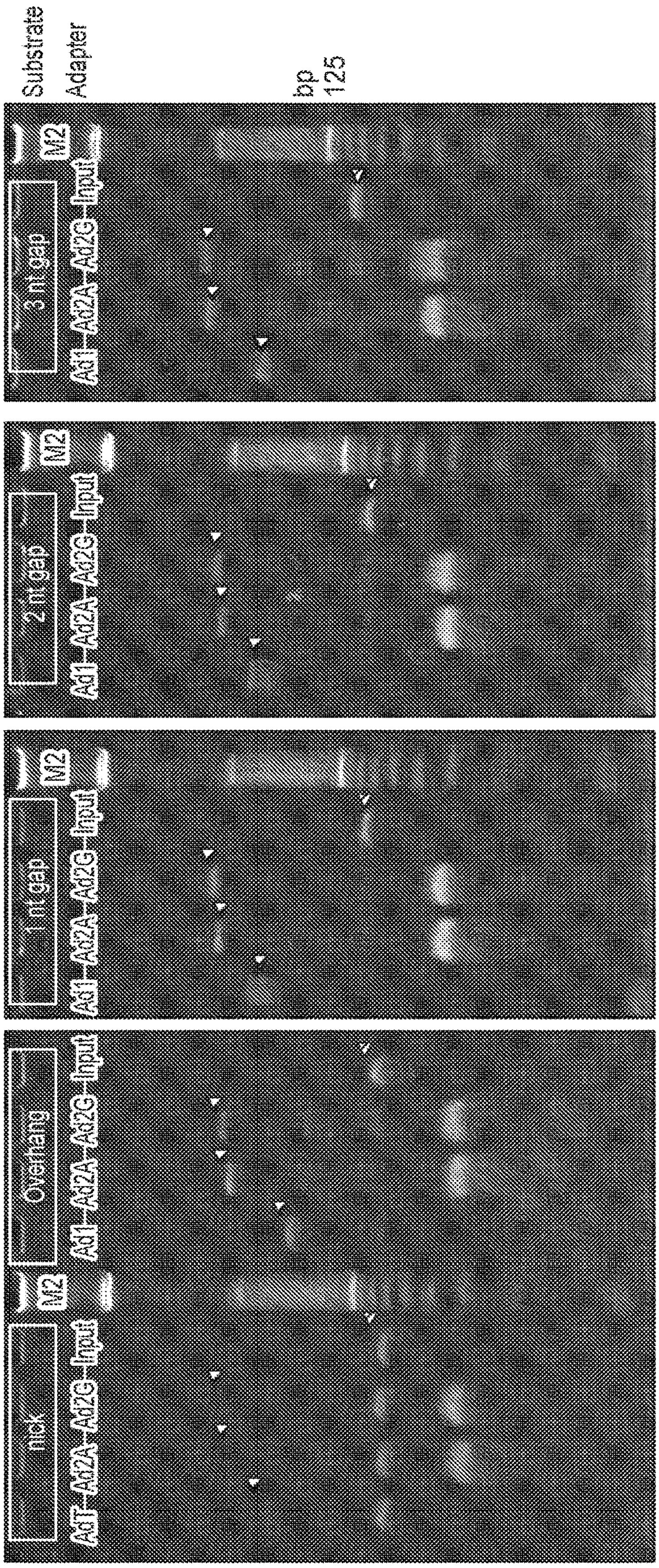

To optimize the ligation efficiency, we extensively tested a number of factors that affect general ligation efficiency, including adaptor::DNA substrate ratio, T4 ligase amount, final ATP concentration, $Mg^{2+}$ concentration, pH, incubation time and presence of different additives such as polyethyleneglycol-8000 (PEG-8000) and single-stranded binding protein (SSB) (supplementary FIGS. 1 and 2,). We found that adding PEG-8000 to a final concentration of 10% could substantially increase the ligation efficiency from less than 10% to more than 90% (FIG. 21). A large range of ATP concentration (from 1 uM to 1 mM) and $Mg^{2+}$ concentration (3 mM to 10 mM,) also worked with 3' branch ligation. The ligase amount needed for 3'BL was comparable to that in the blunt-end ligation. In our optimized conditions, we used adapter::substrate DNA molar ratios of 10 to 100, and performed the reactions at 37° C. for one hour at pH 7.8 with 1 mM ATP, 10 mM $MgCl_2$ and 10% PEG-8000. Ligation of the same adapters to blunt-ended substrates as well as no ligase reactions were used as controls. To assay for ligation product yields, the reactions were run on either denaturing polyacrylamide gels (FIG. 21*b*) or TBE gels (FIG. 22*a-d*). The ratio of product to substrate intensity was used to quantify ligation efficiency through ImageJ (FIG. 21*b-c*). The 5'-overhang ligation (lane 11 in FIG. 1*b*) appeared to be more than 90% complete, even higher than the blunt-end ligation control (lane 14, 76.9%), suggesting remarkably high ligation efficiency of DNA 5'-overhangs. The 1 or 8 nt gap substrates (lane 5 and 8) showed good ligation efficiency of about 60%. However, nick ligation (lane 2) efficiency was the lowest, about 20%. But the ligation yield could be improved if we incubated the nick ligation for 12 hours, suggesting slower kinetics for the nick ligation reaction (FIG. 22).

We also extended our study to different adapter and substrate sequences (FIG. 22). The 5'PO4 ends of three different adapters (Ad-T, Ad-A or Ad-GA) contained either a single T or A or dinucleotide GA before a consensus CTGCTGA sequence as the ligation. They were individually ligated to 3'OH ends of acceptor templates with a T at the ligation junction. Overall, higher ligation efficiency (70-90%) in all cases except for nick ligations was observed using Ad-T and Ad-A than Ad-GA (FIG. 22), indicating some nucleotide preferences of T4 DNA ligase at the ligation junctions. Despite the adapter and substrate sequences, 5'-overhang or 3' branch ligations always showed better efficiencies (60-90%), while the nick ligation was fairly inefficient with 1 hour incubation. We hypothesize that these discrepancies in ligation efficiency are due to the DNA bending where the nick/gap/overhang starts and exposes 3'OH group for ligation. The longer ssDNA region likely makes 3' termini more accessible in the ligation and results in higher ligation efficiency. We also tested if similar end jointing event could happen as 5' branch ligation. In contrast, no obvious ligation of a blunt-end adapter to 5'PO4 end at the gap or 3'-overhang was observed, indicating that T4 DNA ligase possibly has a more stringent tertiary structure requirement at donor's 5' termini than 3' termini.

4.3. 3' Branch Ligation, a Novel Way to Ligate DNA to RNA

We further investigated 3'BL on DNA/RNA hybrids (ON21/22) that form one DNA and one RNA 5'-overhang (FIG. 23*a*). Negative ligation controls included DNA/RNA hybrids, ssDNA or ssRNA oligos, individually or incubated with adapters (lane 3, 4 and 5 in FIG. 23*b*). Interestingly when DNA/RNA hybrids were incubated with adapters, we saw size change of RNA oligonucleotidefrom original 29 nt to 49 nt at an efficiency of >90%, suggesting T4 DNA ligase can efficiently ligate adapter to the RNA. However, the DNA substrate remained unchanged (lane 1 and 2 in FIG. 23*b*). This suggests that blunt-end DNA adapters ligated to the 3'-end of RNA at 5'-DNA overhang, but not to 3'-end of DNA at 5'-RNA overhang. To confirm that 5' overhang structure was needed for 3'BL, we carried out the same ligation reaction replacing the original DNA oligonucleotide (ON21) with another long DNA template (ON23) that is not complimentary with ON22 RNA. Not surprisingly, no ligation was observed using ON23 DNA template, suggesting 3'BL can only happen with 5' overhangs. Our finding indicates that T4 DNA ligase has certain substrate preferences, possibly caused by differences in protein-substrate binding affinities.

Previous study suggested that T4 DNA ligase and T4 RNA ligase 2, but not T4 RNA ligase 1, can join a 5'PO4 DNA end to a juxtaposed 3'OH DNA or RNA end on a RNA/DNA duplexed hybrid, but not to a RNA 3'OH (Bullard 2006, Biochem J 398:135-144). We performed the same ligation test using T4 RNA ligase 1 and 2 (FIG. 24C). It appeared that R4 RNA ligase 1 and 2 could ligate the blunt end adapter to the RNA but the ligation efficiency was very low (<10%).

4.4 Directional Transposon Insertion Library Construction

Since 3'-branch ligation had been demonstrated to be useful for ligating adapters to several genomic structures with high efficiency, we explored its application in NGS workflows. Transposon-based library construction method is time-efficient and consume less input-DNA than conventional NGS library preparation. However, using commercial transposon-based library preparation systems, only half of tagged molecules are flanked by two different adapter sequences, and tagged DNA is flanked by self-complementary regions which may form stable hairpin structures that can compromise sequencing quality (Gorbacheva, 2015, Biotechniques April; 58 (4): 200-202). In addition, PCR-mediated incorporation of adapter sequences is not adapted for whole-genome bisulfite sequencing nor PCR-free NGS library construction.

To overcome these limitations, we have developed a new protocol for transposon-based NGS library construction incorporating 3'BL. Both Tn5 and MuA transposons work through a "cut and paste" mechanism, where transposon adapter sequence is end-joined to 5'-end of target DNA, creating a 9 bp or 5 bp gap, respectively, at 3'-end of the genomic DNA (FIG. 24). Then, 3'BL was used to add another adapter sequence to 3'-end of genomic DNA at the gap to complete the directional adapter ligation. We compared the efficiency of 3'BL approach with that of a double-transposon insertion approach, which uses two different Tn5-based adapters, TnA and TnB. Human genomic DNA was incubated either with TnA transposome complex alone or with equimolar amounts of TnA and TnB transposome complexes. The product of TnA transposome fragmentation was further used for 3'BL with blunt-end adapter AdB which shares a common adapter sequence with TnB. PCR amplification using two primers, Pr-A and Pr-B, designed to TnA and AdB/TnB adapters, respectively, showed a similar PCR yield (FIG. 4*b*, lanes 9 and 10, and FIG. 4*c*) suggesting that these two approaches had the same efficiency. No significant amplification was observed when only one primer specific to either TnA or AdB/TnB adapters was used (FIG. 4*b* and FIG. 4*c*). As expected due to PCR suppression, both 3'-ligation approach and the double-transposon insertion approach showed significantly higher PCR efficiency than the transposon insertion reaction with only the TnA or TnB transposome complex alone (FIG. 24*b*, lane 3 and lane 8, and FIG. 24*c*).

4.5 Material and Methods

3'-Branch Ligation for Duplex DNA

The substrates for 3'BL were composed of 2 pmol ON1 or ON9 mixed with 4 pmol each of one or two additional oligos in pH 8 Tris-EDTA (TE) Buffer (Life Technologies). Substrate 1 and 5 (nick): ON1/2/3 and ON9/10/11; substrate 2 and 6 (1 bp gap): ON1/2/4 and ON9/10/12; substrate 3 (8 bp gap): ON1/4/5; substrate 4 and 9 (5'-overhang): ON1/2 and ON9/10; substrate 7 (2 bp gap): ON9/10/13; substrate 8 (3 bp gap): ON9/10/14; blunt-end control: ON1/6 (FIG. 1, Supplementary Table 1). The template was ligated to 180 pmol of adapter (Ad-C: ON7/8, Ad-T: ON15/16, Ad-A: ON17/8 or Ad-GA: ON19/20) using 2400 units of $T_4$ ligase (Enzymatics Inc) in 3'BL buffer [0.05 mg/ml BSA (New England Biolabs), 50 mM Tris-Cl pH7.8 (Amresco), 10 mM MgCl2 (EMD Millipore), 0.5 mM DTT (VWR Scientific), 10% PEG-8000 (Sigma Aldrich), and 1 mM ATP (Sigma Aldrich)]. The optimization tests were conducted by altering the ATP concentration from 1 uM to 1 mM, the $Mg^{2+}$ concentration, pH value, temperature from 12 to 42° C. and additives like PEG-8000 from 2.5% to 10% and SSB from 2.5 to 20 ng/ul. The ligation mix was prepared on ice and incubated at 37° C. for 1 to 12 hours followed by heat inactivation at 65° C. for 15 min. The samples were purified using Axygen beads (Corning) and eluted into 40 μL TE Buffer. All ligation reactions were run on 6% TBE or denaturing polyacrylamide gels (Life Technologies) and visualized on an Alpha Imager (Alpha Innotech). An input control was loaded at either equal or half of the amount of the templates used for the ligation. A ligation efficiency rate was estimated by dividing the intensity of ligated products by the total intensity of ligated and unligated products using ImageJ Software (NIH).

3'-Branch Ligation for DNA/RNA Hybrid

The substrates for 3'BL was composed of 10 pmol ON22 RNA oligonucleotide mixed with 2 pmol of ON21 or ON23 DNA oligo. For T4 DNA ligase mediated 3'BL, the substrate was incubated with Ad-T (ON15/16) in 3'BL buffer as described above and incubated at 37° C. for 1 hour. 3'BL using T4 RNA ligase 1 or 2 was performed in their own 1×RNA ligase buffer (NEB) along with 20% DMSO. All the ligation products were assayed on 6% denaturing polyacrylamide gels.

Directional Transposon Insertion Library Construction

The transposon oligonucleotides used in this experiment were synthesized by Sangon Biotech. For the 2 transposon experiments using TnA and TnB, TnA, TnB, and MErev oligos were annealed at a ratio of 1:1:2. For the single transposon experiment with tn1, tn1 and MErev were annealed at a ratio of 1:1.

Transposome assembly was performed by mixing 15 pmol of pre-annealed adapters, 7 ul of Tn5 transposase (Vazemy), and 5.5 ul of glycerol to obtain a 20 ul reaction which was incubated at 30° C. for 1 hour. Transposon insertion of genomic DNA (Coriell 19240) was carried out in 20 ul reactions containing 100 ng of gDNA, TAG buffer (Vazyme), and 2 ul of the assembled transposome. The reaction was incubated at 55° C. for 10 min, followed by addition of 100 ul of PB buffer (Qiagen) to remove the transposome complex from tagmented DNA and purification using Agencourt AMPure XP beads (Beckman Coulter). 3' branch ligation of AdB (ONB1, ONB2) to the tagmented DNA was performed in reactions containing 100 pmol of the adapter, 600 U of T4 DNA ligase (Enzymatics Inc.), and 3'BL buffer incubated at 25° C. for 1 hour. Reactions were purified using AMPure XP beads. PCR amplification of tagmented and gap ligated DNA was done in 50 ul reactions containing 2 ul of the tagmented or gap ligated DNA, TAB buffer, 1 ul TruePrep Amplify Enzyme (Vazyme), 200 mM dNTPs (Enzymatics Inc.), and 400 mM of each primer Pr-A and Pr-B. Tagmented reactions were run at 72° C. for 3 min; 98° C. for 30 sec; 98° C. for 10 sec, 58° C. for 30 sec, 72° C. for 2 min for 8 cycles; and 72° C. for a 10 minute extension. Gap ligated reactions were run using the same program without the initial 3 min extension at 72° C. PCR reactions were purified using AMPure XP beads, in either a single step size selection or through double fractionation. Purified products were quantified using the Qubit High-Sensitivity DNA kit (Invitrogen).

Example 4: 3' Branch Ligation: A Novel Method to Ligate Non-Complementary DNA to Recessed or Internal 3'OH Ends in DNA or RNA Nucleic acid ligases are crucial enzymes that repair breaks in DNA or RNA during synthesis, repair and recombination. Various molecular tools have been developed using the diverse activities of DNA/RNA ligases. However, additional ligase activities remain to be discovered. Herein, we demonstrate the non-conventional ability of T4 DNA ligase to join 5' phosphorylated blunt-end double-stranded DNA to DNA breaks at 3' recessive ends, gaps, or nicks to form a 3' branch structure. Therefore, this base pairing-independent ligation is termed 3' branch ligation (3'BL). In an extensive study of optimal ligation conditions, similar to blunt-end ligation, the presence of 10% PEG-8000 in the ligation buffer significantly increased ligation efficiency. Some nucleotide preference was observed at the junction sites using different synthetic DNAs, which indicates a level of ligation bias for 3'BL. Furthermore, we discovered that T4 DNA ligase efficiently ligated DNA to the 3' end of RNA in a DNA/RNA hybrid, whereas RNA ligases are less efficient in this reaction. These novel properties of T4 DNA ligase can be utilized as a broad molecular technique in many important applications. We performed a proof-of-concept study of a new directional tagmentation protocol for next generation sequencing (NGS) library construction that eliminates inverted adapters and allows sample barcode insertion adjacent to genomic DNA. 3'BL after single transposon tagmentation can theoretically achieve 100% usable template, and our empirical data demonstrate that the new approach produced higher yield compared with traditional double transposon or Y transposon tagmentation. We further explore the potential use of 3'BL for preparing targeted RNA NGS libraries with mitigated structure-based bias and adapter dimer problems.

5.1 Introduction

Ligases repair breaks in nucleic acids, and this activity is essential for cell viability and vitality. DNA ligases catalyze the formation of a phosphodiester bond between DNA ends and play crucial roles in DNA repair, recombination, and replication in vivo 1-3. RNA ligases join the 5'-phosphoryl (5'PO4) and 3'-hydroxyl (3'OH) RNA termini via phosphodiester bonds and are involved in RNA repair, splicing, and editing4. Ligases from all three kingdoms of organisms (bacteria, archaebacteria, and eukaryotes) can be utilized in vitro as important molecular tools for applications such as cloning, ligase-based amplification or detection, and synthetic biology5-7.

One of the most widely used ligases in vitro is bacteriophage T4 DNA ligase, which is a single 55-kDA polypeptide that requires ATP as an energy source 8. T4 DNA ligase typically joins the adjacent 5'PO4 and 3'OH termini of duplexed DNA. In addition to sealing nicks and ligating cohesive ends, T4 DNA ligase can also efficiently catalyze blunt-end joining, which has not been observed for any other DNA ligases9,10. Some unusual catalytic properties of this ligase were reported previously, such as sealing single-stranded gaps in duplex DNA, sealing nicks adjacent to abasic sites in double-stranded DNA (dsDNA), promoting intramolecular loop formation with partially double-stranded DNA, and joining DNA strands containing 3' branch extensions11-13. Researchers also observed template-independent ligation mediated by T4 ligase, such as mis-paired nick sealing in dsDNA14 or even single-stranded DNA (ssDNA) ligation, albeit at very low efficiency15. These results suggest that perfect complementary base pairing at or adjacent to the ligation junction is not critically needed for some unconventional T4 DNA ligase activities. T4 RNA ligases 1 and 2 are the products of genes 63 and 24, respectively, of T4 phage. Both require an adjacent 5'PO4 and 3'OH end for a successful ligation with the concurrent hydrolysis of ATP to AMP and PPi. The substrates for T4 RNA ligase 1 include single-stranded RNA and DNA, whereas T4 RNA ligase 2 preferentially seals nicks on dsRNA rather than ligating the ends of ssRNA16,17.

Here, we demonstrate a non-conventional end-joining event mediated by T4 DNA ligase that we call 3'-branch ligation (3'BL). This method can join DNA or DNA/RNA fragments at nicks, single-stranded gaps, or 3' recessive ends to form a branch structure. This report includes extensive study of a wide variety of ligation cofactors and activators and the optimization of the ligation conditions for this type of novel ligation. With our 3'BL protocol, no base pairing was required, and the ligation can reach 70-90% completion in most cases, including for a 1-nt gap. One application of this method is the attachment of adapters to DNA or RNA during NGS library preparation. Several genomic structures that were previously considered unligatable can now be used as substrates for 3'BL, resulting in a high conversion rate of input DNA into adapter-ligated molecules while avoiding chimeras. We demonstrate that 3'BL can be coupled with transposon tagmentation to increase library yield. The directional tagmentation strategy we propose will theoretically produce templates 100% of which can be utilized for sequencing. Our study demonstrated the value of this novel technique for NGS library preparation and the potential to advance many other molecular applications.

5.2 Results: 3' Branch Ligation, a Novel Method to Ligate DNA Ends

Conventionally, DNA ligation involves the joining of 5'PO4 and 3'OH DNA ends of cohesive or blunt-ended fragments. Cohesive-end ligation is generally faster and less dependent on enzyme concentration compared with blunt-end joining. Both processes can be catalyzed by bacteriophage T4 DNA ligase, which uses ATP as an energy-yielding cofactor and requires Mg2+ 8. T4 DNA ligase was also reported to ligate specific or degenerate single-stranded oligos to partially single-stranded substrates through hybridization18,19. Here, we demonstrated a non-conventional T4 DNA ligase-mediated ligation that does not require complimentary base pairing and can ligate a blunt-end DNA donor to 3'OH end of a duplex DNA acceptor at 3' recessed strands, gaps, or nicks (FIG. 26*a*). Therefore, we use the term 3'-branch ligation (3'BL) to describe these ligations. The synthetic donor DNA we used contained a 5' blunt duplex end and a 3' ssDNA end. The acceptor substrates contained one of the following structures: a dephosphorylated nick, a 1- or 8-nucleotide (nt) gap, or a 3' 36-nt recessed end (Supplementary Table 1). T4 ligase helps to join 5'PO4 of the donor strand to the sole ligatable 3'OH of the acceptor strand to form a branch-shaped ligation product.

To optimize the ligation efficiency, we extensively tested a number of factors that affect general ligation efficiency, including the adapter:DNA substrate ratio, T4 ligase quantity, final ATP concentration, Mg2+ concentration, pH, incubation time, and different additives, such as polyethyleneglycol-8000 (PEG-8000) and single-stranded binding protein (SSB). Adding PEG-8000 to a final concentration of 10% substantially increased the ligation efficiency from less than 10% to more than 80% (FIGS. 26 and 27). A large range of ATP concentrations (from 1 M to 1 mM) and Mg2+ concentrations (3 mM to 10 mM,) were compatible with 3'BL. The ligase quantity needed for 3'BL was comparable to that for blunt-end ligation. In our optimized conditions, we used donor:substrate DNA molar ratios of 30 to 100, and we performed the reactions at 37° C. for one hour at pH 7.8 with 1 mM ATP, 10 mM MgCl2, and 10% PEG-8000. The ligation of the same donors to blunt-end substrates and ligase-free reactions were used as positive and negative controls, respectively.

The ligation donor (Ad-G) is double-stranded on one end (5' phosphorylated and 3' dideoxy protected) and single-stranded (3' dideoxy protected) on the other end (FIG. 26). The ligation substrates are composed of the same bottom strand (ON1) with different top strands to compose nick, gap, and overhang structures. To quantify ligation product yields, the reaction products were separated on 6% denaturing polyacrylamide gels (FIG. 26*b*). Ligation efficiency was calculated as the ratio of product to substrate intensity using ImageJ (FIG. 26*b-c*). The 3'-recessive ligation (lane 11 in FIG. 26*b*) appeared approximately 90% complete, which is even higher than the blunt-end ligation control (lane 14, 72.74%) and suggests remarkably high ligation efficiency with 3'-recessive DNA ends. The 1- or 8-nt gap substrates (lane 5 and 8) showed good ligation efficiency of approximately 45%. Nick ligation (lane 2) efficiency was the lowest at approximately 13%. However, this ligation yield was improved when the nick ligation reaction was incubated longer, suggesting slower kinetics for the nick ligation reaction.

We also extended our study to different adapter and substrate sequences (FIG. 27). The 5'PO4 ends of three different adapters (Ad-T, Ad-A, or Ad-GA in Supplementary Table 1) contained either a single T or A or the dinucleotide GA at the ligation junction before a consensus CTGCTGA sequence. These 5'PO4 ends were individually ligated to 3'OH ends of acceptor templates with a T at the ligation junction. Overall, high ligation efficiency (70-90%) was seen in most cases except for nick ligations or 3'BL using Ad-GA (FIG. 27*f*), thus indicating some nucleotide preference of T4 DNA ligase at the ligation junctions. Independent of the adapter and substrate sequences, 3'-recessive end or gap ligations always showed better efficiencies (60-90%), whereas the nick ligation was fairly inefficient, in a one-hour incubation. We hypothesize that these discrepancies in ligation efficiency are due to the DNA bending where the nick/gap/overhang starts and exposes 3'OH group for ligation. The longer ssDNA region likely makes 3' termini more accessible in the ligation and results in higher ligation efficiency. We also tested whether a similar end-joining event could occur as 5' branch ligation. In contrast to 3'BL, no obvious ligation of a blunt-end adapter to 5'PO4 end at the gap or 5'-recessive end was observed. This result suggests greater steric hindrance of T4 DNA ligase at the donor's 5' termini compared with 3' termini.

5.3: 3' Branch Ligation to Ligate DNA to RNA

We further investigated 3'BL on DNA/RNA hybrids (ON-21/ON-23 in Table 3) that form one DNA and one RNA 5'-overhang (FIG. 28*a*). Ligation on DNA/DNA hybrids served as a positive control, whereas negative ligation controls included DNA/RNA hybrids, ssDNA, or ssRNA oligos incubated individually or with adapters (lanes 3, 4, and 5 in FIG. 28*c* and). Interestingly, when DNA/RNA hybrids were incubated with a blunt-end dsDNA donor, we observed a size change of the RNA oligo from the original 29 nt to 49 nt upon ligation. However, the DNA substrate remained unchanged (lanes 1 and 2 in FIG. 28*c*). This result suggests that the blunt-end dsDNA donor ligated to 3'-end of RNA at 3'-recessive DNA end but not to 3'-end of DNA at 3'-recessive RNA termini. As a positive control, DNA/DNA hybrids with 3' recessive ends on each side showed band shifts to larger species on both strands with nearly 100% efficiency. To confirm that 3' recessive structure was needed for 3'BL, we performed the same ligation reaction while replacing the original DNA oligo (ON-21) with another long DNA template (ON-23) that is not complimentary to ON-22 RNA (FIG. 28*b*). Unsurprisingly, no ligation was observed using the ON-23 DNA template (lane 10-13 in FIG. 28*c*). Our finding indicates that T4 DNA ligase can promote 3'BL on DNA/RNA hybrids and that this activity has certain steric substrate preferences that may be affected by differences in T4 DNA ligase-substrate binding affinities.

A previous study reported that for sealing nicks in DNA/RNA hybrids, T4 DNA ligase and T4 RNA ligase 2, but not T4 RNA ligase 1, can effectively join a 5'PO4 DNA end to a juxtaposed 3'OH DNA or RNA end when the complimentary strand is RNA but not DNA17. Therefore, we performed the same ligation test using T4 RNA ligase 1 and 2 either in 20% DMSO (FIG. 28*d*) or in 10% PEG. In both tests, T4 RNA ligase 1 and T4 RNA ligase 2 slightly ligated the blunt end adapters to the 3' end of RNA in a DNA/RNA hybrid. Notably, in the RNA-only controls, T4 RNA ligase 2 could join a blunt-end dsDNA adapter to ssRNA. In conclusion, T4 DNA ligase, but not T4 RNA ligase, is competent to efficiently ligate blunt-end dsDNA to the 3' end of RNA through 3'BL.

5.4 Directional Tagmentation Library Construction

Because 3'BL is useful for ligating adapters to several genomic structures with high efficiency, we explored its application in NGS workflows. Transposon-based library construction is rapid and consumes less input DNA compared with conventional NGS library preparation. However, using commercial transposon-based library preparation systems, only half of tagged molecules are flanked by two different adapter sequences (FIG. 29*a*), and tagged DNA is flanked by self-complementary regions that could form stable hairpin structures and compromise sequencing quality 20. In addition, the PCR-mediated incorporation of adapter sequences has not been adapted for whole-genome bisulfite sequencing or PCR-free NGS library construction.

To overcome these limitations, we developed a new protocol for transposon-based NGS library construction by incorporating 3'BL. Both Tn5 and MuA transposons work through a "cut and paste" mechanism, in which a transposon adapter sequence is end-joined to 5'-end of target DNA to create a 9-bp or 5-bp gap, respectively, at 3'-end of the genomic DNA (FIG. 29*a*). Subsequently, 3'BL can be used to add another adapter sequence to 3'-end of genomic DNA at the gap to complete the directional adapter ligation (FIG. 29*c*). We used Tn5 transposons in this manuscript to compare the efficiency of the single-tagmentation+3'BL approach (FIG. 29*c*) to that of a double-tagmentation approach, which uses the two different Tn5-based adapters TnA and TnB (FIG. 29*a*), and to that of another directional single-tagmentation strategy using Y adapters that contain two different adapter sequences (FIG. 29*b*). Human genomic DNA was incubated with equimolar amounts of TnA and TnB transposome complexes, with the TnA transposome complex alone, or with the TnY (TnA/B) transposome complex.

The product of TnA transposome-only fragmentation was further used as a template for 3'BL with the blunt-end adapter AdB, which shares a common adapter sequence with TnB. PCR amplification was performed using two primers, Pr-A and Pr-B, designed to recognize the TnA and AdB/TnB adapters, respectively. The quantification data suggested that TnA&AdB had the highest efficiency compared to TnA&TnB and TnY (TnA/B) (FIG. 29*d*). No significant amplification was observed when only one primer specific to TnA adapter was used (FIG. 29*d*). As expected due to PCR suppression, the TnA-3'BL approach, the double-tagmentation approach, and the TnY approach all showed significantly higher PCR efficiency than the tagmentation reaction with only the TnA or TnB transposome complex alone (FIG. 29*d*).

We also sequenced these libraries using BGISEQ-500 and compared the base-positional bias among the transposon-interfered end, 3'BL end, and the regular TA ligation end (FIG. 30). It is obvious that the positional bias at 3'BL end is less than that at the Tn5 end (FIG. 30*a-b*), which occurs because 3'BL end is influenced by both transposon interruption and 3'BL. Because only the first 6 nt (position 1-6) of 3'BL end showed base bias and the bias was similar to but not exactly the same as that of its hybridized Tn5 end (position 30-35, after the 9-nt overhang), we conclude that the positional bias we observed at the 3'BL end is mainly caused by the Tn5 transposon. Therefore, 3'BL causes minimal bias and is similar to regular TA ligation (FIG. 30*c*).

5.5 Discussion

One important property of T4 DNA ligase is its efficient joining of blunt-ended dsDNA21,22, which has not been observed with other DNA ligases. This ligase was also reported to mediate some unusual catalytic events, such as ligating single-strand gaps or mismatched bases in duplex DNA11,12, forming a stem-loop molecule from partially double-stranded DNA13, or inefficiently ligating ssDNA in a template-independent manner20.

Here, we demonstrated that T4 DNA ligase catalyzed the joining of blunt-end dsDNA to 3'OH end of dsDNA with a nick and the joining of partially single-stranded duplex DNA with a gap or 5' overhang. In contrast, no ligation to 5'PO4 end at 5' recessed ends or in the gaps was observed, which indicates that after binding to 5'PO4 end of the dsDNA adapter, T4 DNA ligase can access the recessed 3' end when DNA bends. With our 3'BL method, no base pairing was required, and even for a 1-nt gap, greater than 70% completion was accomplished using optimized conditions. However, different ligation efficiencies were observed for ligating 5' T, A, or GA to 3' T (FIG. 2), which indicates some sequence preference at the ligation junction. Despite recognized ligation bias23, T4 DNA ligase is commonly used in the adapter addition step during NGS library preparation. With its ability to perform 3'BL, T4 ligase can ligate adapters to several genomic structures that were previously considered unligatable, resulting in a higher template usage rate. 3'BL can also be coupled with transposon tagmentation. The traditional double-transposon strategy has only 50% of the tagmented molecules that are amenable for the following amplification step. However, when DNA tagmentation is performed using one transposon with subsequent 3'BL, an increased yield of molecules with different adapters on each insert end can be acquired (FIG. 4). Furthermore, the tagmented-3'BL products can be directly loaded on Illumina's flow cell as PCR free WGS libraries, which was difficult to achieve using double-transposon strategy.

Other directional transposon protocols have been proposed using a Y transposon composed of two different adapter sequences or replacing the unlinked strand from a single transposon with a second adapter oligo followed by gap filling and ligation24. However, these approaches continue to preserve the inverted adapter sequences and cannot insert sample barcodes adjacent to genomic DNA as the tagmented-3'BL protocol can. Based on NGS data, the 3'BL ligated genomic ends also demonstrated fewer positions with positional base composition bias, and the first 6-nt bias was mild and mainly caused by transposon interruption, suggesting that 3'BL has minimal positional bias. Using this new library construction method, Wang et al. successfully achieved highly accurate and complete variant calling in WGS and near-perfect phasing of variants into long contigs with N50 size up to 23.4 Mb for long fragment reading (BioRxiv, doi.org/10.1101/324392).

In this study, we also investigated 3'BL using templates of a chimeric DNA/RNA duplex that forms a 5' DNA and a 5' RNA overhang (FIG. 3). Unexpectedly, blunt-ended dsDNA was efficiently ligated to 3' termini of RNA, but not DNA, suggesting that T4 ligase has a ternary complex formation preference. The ligation efficiency was greatly reduced if T4 RNA ligase I or II was used to join the ends. Another preliminary yet important application of 3'BL with T4 DNA ligase is the enrichment of mRNA or the construction of targeted RNA libraries, especially for miRNAs, the small regulatory RNAs whose uncontrolled expression leads to a number of diseases25,26. Thus, our 3'BL technique can be readily applied to the detection of cancer and Alzheimer's disease using miRNA. Hybridization with DNA probes targeting the Poly(A) tail or specific miRNA sequences can be used to create DNA-RNA hybrids with a DNA 5'-overhang, which is followed by ligation to adapter sequences with sample and/or UID barcodes through 3'BL. These common sequences can then be reverse transcribed to produce the cDNA of targeted RNA sequences. Compared with current miRNA capture technologies, the use of 3'BL mediated by T4 DNA ligase could potentially provide several advantages for NGS RNA library construction. First, hybridization with a DNA strand would prevent secondary structure formation by the RNA strand and therefore mitigate the bias introduced by other protocols. Second, T4 DNA ligase enables high-efficiency adapter addition through 3'BL, which avoids intramolecular RNA interactions that can be promoted by RNA ligases. Third, adapter dimers can be effectively eliminated, possibly rendering undesirable gel purification unnecessary. This new method could lead to improved unbiased microRNA expression profiling with simple and scalable workflows, and thus, large-scale research studies would become more affordable.

The findings of this study add to the growing understanding of T4 DNA ligase activities. We envision 3' branch ligation becoming a general tool in molecular biology that will advance the development of new DNA engineering methods beyond described NGS applications.

5.6 Materials and Methods

3'-Branch Ligation for Duplex DNA

The substrates for 3'BL were composed of 2 pmol of ON1 or ON9 mixed with 4 pmol each of one or two additional oligos in pH 8 Tris-EDTA (TE) buffer (Life Technologies) as follows: substrate 1 and 5 (nick), ON-1/2/3 and ON-9/10/11; substrate 2 and 6 (1-nt gap), ON1/2/4 and ON9/10/12; substrate 3 (8-nt gap), ON1/4/5; substrate 4 and 9 (5' overhang), ON1/2 and ON9/10; substrate 7 (2-nt gap), ON9/10/13; substrate 8 (3-nt gap), ON9/10/14; blunt-end control, ON1 and ON6 (FIG. 26, Supplementary Table 1). The template was ligated to 180 pmol of adapter (Ad-G: ON7/8, Ad-T: ON15/16, Ad-A: ON17/8, or Ad-GA: ON19/20) using 2,400 units of T4 ligase (Enzymatics Inc.) in 3'BL buffer [0.05 mg/ml BSA (New England Biolabs), 50 mM Tris-Cl pH 7.8 (Amresco), 10 mM MgCl2 (EMD Millipore), 0.5 mM DTT (VWR Scientific), 10% PEG-8000 (Sigma Aldrich), and 1 mM ATP (Sigma Aldrich)]. The optimization tests were conducted by altering the ATP concentration from 1 μM to 1 mM, the Mg2+ concentration from 3 to 10 mM, the pH value from 3 to 9, temperature from 12 to 42° C., and adjusting additives such as PEG-8000 from 2.5% to 10% and SSB from 2.5 to 20 ng/μL. The ligation mixture was prepared on ice and incubated at 37° C. for 1 to 12 hours before heat inactivation at 65° C. for 15 min. The samples were purified using Axygen beads (Corning) and eluted into 40 μL TE Buffer. All ligation reactions were run on 6% TBE or denaturing polyacrylamide gels (Life Technologies) and visualized on an Alpha Imager (Alpha Innotech). An input control was loaded at either an equal quantity or half the quantity of the template used for ligation. A ligation efficiency rate was estimated by dividing the intensity of ligated products by the total intensity of ligated and unligated products using ImageJ Software (NIH).

3'-Branch Ligation for DNA/RNA Hybrid

The substrates for 3'BL were composed of 10 pmol ON-21 RNA oligo mixed with 2 pmol of ON-21 or ON-23 DNA oligo. For T4 DNA ligase-mediated 3'BL, the substrate was incubated with Ad-T (ON15/16) in 3'BL buffer as described above and incubated at 37° C. for 1 hour. 3'BL using T4 RNA ligase 1 or 2 was performed in 1×RNA ligase buffer (NEB) with either 20% DMSO or 25% PEG. All ligation products were assayed on 6% denaturing polyacrylamide gels.

Directional Tagmentation Library Construction

The transposon oligonucleotides used in this experiment were synthesized by Sangon Biotech. For the 2 transposon experiments using TnA/TnB, oligos for TnA (ON24), TnB (ON25), and MErev (ON26) were annealed at a 1:1:2 ratio. For the single transposon experiment with TnA, ON24 and ON26 were annealed at a 1:1 ratio. For the Y (TnA&TnB) transposon experiment, ON24 and ON27 were annealed at a 1:1 ratio.

Transposon assembly was performed by mixing 100 pmol of pre-annealed adapters, 7 μL of Tn5 transposase, and sufficient glycerol to obtain a total 20-μL reaction, which was incubated at 30° C. for 1 hour. Tagmentation of genomic DNA (Coriell 12878) was performed in 20-μL reactions containing 100 ng of gDNA, TAG buffer (homemade), and 1 μL of the assembled transposon. The reaction was incubated at 55° C. for 10 min; 40 μL of 6 M guanidine hydrochloride (Sigma) was then added to remove the transposon complex from tagmented DNA, and DNA was purified using Agencourt AMPure XP beads (Beckman Coulter). The gap ligation of AdB (ON28 and ON29) to the tagmented DNA was performed at 25° C. for 1 hour in reactions containing 100 pmol of the adapter, 600 U of T4 DNA ligase (Enzymatics Inc.), and 3'BL buffer. Reactions were purified using AMPure XP beads. PCR amplification of tagmented and gap-ligated DNA was performed in 50-μL reactions containing 2 μL of the tagmented or gap-ligated DNA, TAB buffer, 1 μL TruePrep Amplify Enzyme (Vazyme), 200 mM dNTPs (Enzymatics Inc.), and 400 mM each of primers Pr-A and Pr-B. Tagmented reactions were incubated as follows: 72° C. for 3 min; 98° C. for 30 sec; 8 cycles of 98° C. for 10 sec, 58° C. for 30 sec, and 72° C. for 2 min; and 72° C. for a 10-minute extension. Gap-ligated reactions were run using the same program without the initial 3 min extension at 72° C. PCR reactions using either prA (ON30) or both prA and prB (ON31) were purified using AMPure XP beads. Purified products were quantified using the Qubit High-Sensitivity DNA kit (Invitrogen).

5.6 References for Example 4

1. Lehnman, I. R. DNA ligase: structure, mechanism, and function. Science (80-.). 186, 790-797 (1974).
2. Tomkinson, A. E. & Mackey, Z. B. Structure and function of mammalian DNA ligases. Mutat. Res. Repair 407, 1-9 (1998).
3. Timson, D. J., Singleton, M. R. & Wigley, D. B. DNA ligases in the repair and replication of DNA. Mutat. Res. Repair 460, 301-318 (2000).
4. Ho, C. K., Wang, L. K., Lima, C. D. & Shuman, S. Structure and mechanism of RNA ligase. Structure 12, 327-339 (2004).
5. Tomkinson, A. E., Vijayakumar, S., Pascal, J. M. & Ellenberger, T. DNA ligases: structure, reaction mechanism, and function. Chem. Rev. 106, 687-699 (2006).
6. Pascal, J. M. DNA and RNA ligases: structural variations and shared mechanisms. Curr. Opin. Struct. Biol. 18, 96-105 (2008).
7. Shuman, S. DNA ligases: progress and prospects. J. Biol. Chem. 284, 17365-17369 (2009).
8. Dickson, K. S., Burns, C. M. & Richardson, J. P. Determination of the free-energy change for repair of a DNA phosphodiester bond. J. Biol. Chem. 275, 15828-15831 (2000).
9. Cai, L., Hu, C., Shen, S., Wang, W. & Huang, W. Characterization of bacteriophage T3 DNA ligase. J. Biochem. 135, 397-403 (2004).
10. Ampligase® Thermostable DNA Ligase. Available at: epibio.com/enzymes/ligases-kinases-phosphatases/dna-ligases/ampligase-thermostable-dna-ligase?details.
11. Nilsson, S. V & Magnusson, G. Sealing of gaps in duplex DNA by T4 DNA ligase. Nucleic Acids Res. 10, 1425-1437 (1982).
12. Goffin, C., Bailly, V. & Verly, W. G. Nicks 3' or 5' to AP sites or to mispaired bases, and one-nucleotide gaps can be sealed by T4 DNA ligase. Nucleic Acids Res. 15, 8755-8771 (1987).
13. Mendel-Hartvig, M., Kumar, A. & Landegren, U. Ligase-mediated construction of branched DNA strands: a novel DNA joining activity catalyzed by T4 DNA ligase. Nucleic Acids Res. 32, e2-e2 (2004).
14. Alexander, R. C., Johnson, A. K., Thorpe, J. A., Gevedon, T. & Testa, S. M. Canonical nucleosides can be utilized by T4 DNA ligase as universal template bases at ligation junctions. Nucleic Acids Res. 31, 3208-3216 (2003).
15. Kuhn, H. & Frank-Kamenetskii, M. D. Template-independent ligation of single-stranded DNA by T4 DNA ligase. FEBS J. 272, 5991-6000 (2005).
16. Ho, C. K. & Shuman, S. Bacteriophage T4 RNA ligase 2 (gp24. 1) exemplifies a family of RNA ligases found in all phylogenetic domains. Proc. Natl. Acad. Sci. 99, 12709-12714 (2002).
17. Bullard, D. R. & Bowater, R. P. Direct comparison of nick-joining activity of the nucleic acid ligases from bacteriophage T4. Biochem. J. 398, 135-144 (2006).
18. Broude, N. E., Sano, T., Smith, C. L. & Cantor, C. R. Enhanced DNA sequencing by hybridization. Proc. Natl. Acad. Sci. 91, 3072-3076 (1994).
19. Gunderson, K. L. et al. Mutation detection by ligation to complete n-mer DNA arrays. Genome Res. 8, 1142-1153 (1998).
20. Gorbacheva, T., Quispe-Tintaya, W., Popov, V. N., Vijg, J. & Maslov, A. Y. Improved transposon-based library preparation for the Ion Torrent platform. Biotechniques 58, 200 (2015).
21. Sgaramella, V. & Khorana, H. G. CXII. Total synthesis of the structural gene for an alanine transfer RNA from yeast. Enzymic joining of the chemically synthesized polydeoxynucleotides to form the DNA duplex representing nucleotide sequence 1 to 20. J. Mol. Biol. 72, 427-444 (1972).
22. SGARAMELLA, V. & EHRLICH, S. D. Use of the T4 Polynucleotide Ligase in The Joining of Flush-Ended DNA Segments Generated by Restriction Endonucleases. FEBS J. 86, 531-537 (1978).
23. Seguin-Orlando, A. et al. Ligation bias in illumina next-generation DNA libraries: implications for sequencing ancient genomes. PLOS One 8, e78575 (2013).
24. Goryshin, I., Baas, B., Vaidyanathan, R. & Maffitt, M. Oligonucleotide replacement for di-tagged and directional libraries. (2016).
25. Bushati, N. & Cohen, S. M. microRNA functions. Annu. Rev. Cell Dev. Biol. 23, 175-205 (2007).
26. Mallory, A. C. & Vaucheret, H. Functions of microRNAs and related small RNAs in plants. Nat. Genet. 38, S31 (2006).

While this invention has been disclosed with reference to specific aspects and embodiments, it is apparent that other embodiments and variations of this invention may be devised by others skilled in the art without departing from the true spirit and scope of the invention.

For all purposes in the United States of America, each and every publication and patent document cited in this disclosure is incorporated herein by reference as if each such publication or document was specifically and individually indicated to be incorporated herein by reference. Citation of publications and patent documents is not intended as an indication that any such document is pertinent prior art, nor does it constitute an admission as to its contents or date.

TABLE 1A: Phasing and variant calling statistics

| | | stLFR-1 | | | stLFR-2 | | | stLFR-3 | stLFR-4 |
|---|---|---|---|---|---|---|---|---|---|
| Library Statistics | Total bases sequenced (Gb) | 336 | 230 | 100 | 660 | 200 | 100 | 117 | 126 |
| | Input genomic DNA (ng) | 1 | 1 | 1 | 1 | 1 | 1 | 10 | 10 |
| | Average genomic fragment size (kb) | 66.2 | 66.3 | 66.4 | 52.5 | 52.7 | 52.6 | 30.2 | 46.8 |
| | Unique genome coverage | 44X | 38X | 24X | 58X | 37X | 23X | 37X | 34X |
| | Duplicate rate | 59.4% | 49.6% | 29.4% | 70.88% | 41.05% | 25.37% | 5.4% | 15.0% |
| | Read length | PE100 | PE100 | PE100 | PE100 | PE100 | PE100 | PE100 | PE100 |
| | Unique compartments | 10,186,086 | 10,007,746 | 9,427,999 | 11,823,872 | 10,932,966 | 10,297,180 | 30,544,841 | 10,577,590 |
| | Average fragments per compartment | 1.18 | 1.18 | 1.17 | 1.25 | 1.23 | 1.22 | 2.87 | 6.84 |
| | Average co-barcoded reads per fragment | 80.7 | 71.5 | 47.4 | 88.3 | 60.2 | 40.7 | 7.5 | 8.9 |
| No-Filter | SNP Precision | 0.997 | 0.997 | 0.995 | 0.997 | 0.997 | 0.995 | 0.997 | 0.993 |
| | SNP Sensitivity | 0.996 | 0.995 | 0.988 | 0.997 | 0.994 | 0.986 | 0.996 | 0.991 |
| | Indel Precision | 0.934 | 0.935 | 0.924 | 0.938 | 0.938 | 0.924 | 0.960 | 0.948 |
| | Indel Sensitivity | 0.956 | 0.951 | 0.914 | 0.965 | 0.950 | 0.912 | 0.961 | 0.925 |
| Filtered | SNP Precision | 0.999 | 0.998 | 0.997 | 0.999 | 0.998 | 0.996 | 0.999 | 0.997 |
| | SNP Sensitivity | 0.995 | 0.994 | 0.985 | 0.995 | 0.993 | 0.985 | 0.995 | 0.989 |
| | Indel Precision | 0.971 | 0.965 | 0.943 | 0.974 | 0.964 | 0.942 | 0.978 | 0.964 |
| | Indel Sensitivity | 0.943 | 0.940 | 0.902 | 0.958 | 0.940 | 0.902 | 0.952 | 0.917 |
| Hap | % heterozygous SNPs phased | 99.9% | 99.9% | 99.8% | 99.9% | 99.7% | 99.7% | 98.9% | 98.7% |
| | Contig N50 size (Mb) | 15.1 | 12.9 | 8.6 | 6.4 | 4.2 | 2.6 | 0.6 | 1.2 |

| | | | | | | | | | |
|---|---|---|---|---|---|---|---|---|---|
| | | Short switch error rate | 0.00273 | 0.00272 | 0.00272 | 0.00261 | 0.00272 | 0.00271 | 0.00272 | 0.00571 |
| | | Long switch error rate | 0.0057 | 0.0057 | 0.00570 | 0.0055 | 0.0057 | 0.0057 | 0.00574 | 0.0027 |
| LongHap | | % heterozygous SNPs phased | 0.999 | 0.9988 | 0.9966 | 0.9991 | 0.9984 | 0.9952 | 0.9895 | 0.9879 |
| | | Contig N50 size (Mb) | 18.1 | 16.6 | 10.7 | 8 | 5.2 | 3.3 | 1.1 | 1.9 |
| | | Short switch error rate | 0.0025748 | 0.0025949 | 0.0026139 | 0.0025228 | 0.0025307 | 0.0025773 | 0.0027524 | 0.0030534 |
| | | Long switch error rate | 0.0017183 | 0.0017073 | 0.0017638 | 0.0017197 | 0.0017038 | 0.0017101 | 0.0019273 | 0.0020666 |

TABLE 1B

| 10X Genomics[1] | Illumina Bead Haplotyping[2] | BGISEQ500 STD[3] |
|---|---|---|
| 128 | 99 | 132 |
| 1.25 | 3 | 1,000 |
| 85.7 | — | N/A |
| 33X | 19X | 43X |
| 6.0% | 21.0% | 3.7% |
| PE150 | PE76 | PE100 |
| 1,538,345 | 147,456 | N/A |
| 8.32 | ~100 | N/A |
| 49.8 | 5 | N/A |
| 0.952 | 0.997 | 0.998 |
| 0.996 | 0.952 | 0.998 |
| 0.639 | 0.932 | 0.960 |
| 0.864 | 0.832 | 0.972 |
| 0.994 | — | 0.999 |
| 0.997 | — | 0.997 |
| 0.916 | — | 0.991 |
| 0.871 | — | 0.962 |
| 99.9% | 98.0% | N/A |
| 12.8 | 1.14 | N/A |
| 0.00273 | 0.0013 | N/A |
| 0.00572 | 0.000085 | N/A |
| N/A | N/A | N/A |
| N/A | N/A | N/A |
| N/A | N/A | N/A |
| N/A | N/A | N/A |

TABLE 2

| Scaffolding statistics | | | | |
|---|---|---|---|---|
| | stLFR-1 | stLFR-4 | HiC[1] | HiC[2] |
| Read pairs (M) | 60 | 134 | 734 | 734 |
| Total scaffold length (Gb) | 2.84 | 2.72 | 2.92 | 2.92 |
| Scaffold N50 (Mb) | 44.7 | 42.8 | 68.3 | 60.02 |
| % aligned bases | 98.61% | 98.56% | 98.22% | 94.52% |
| Scaffold count | 597 | 699 | 1,411 | 1,555 |
| Contigs in scaffolds | 1,411 | 1,586 | 3,096 | 18,903 |
| Breakpoints | 31,386 | 30,501 | 35,132 | 33,079 |
| Relocations | 296 | 327 | 430 | 136 |
| Translocations | 179 | 189 | 406 | 96 |
| Inversions | 624 | 656 | 898 | 408 |

[1]HiC read pairs from human embryonic stem cells (hESCs) (30) were downloaded and used to scaffold SMRT reads using SALSA (28) and the same process as used for the stLFR libraries.

[2]Results as reported by Ghurye et al. (28) using the same HiC read pairs to scaffold SMRT reads using SALSA.

| | | | | | | | | | | |
|---|---|---|---|---|---|---|---|---|---|---|
| TABLE | 3 | | | | | | | | | |
| stLFR- | stLFR- | | | | | | | | | |
| stLFR-1 | stLFR-2 | 3 | 4 | BGISEQ-500 STD | | | | | | |
| Total bases | | | | | | | | | | |
| sequenced | (Gb) | 336 | 230 | 100 | 660 | 200 | 100 | 117 | 126 | 132 |
| FP calls | 10,579 | 10,498 | 14,602 | 11,068 | 11,012 | 15,022 | 8,422 | 22,404 | 5,438 | |
| FN calls | 13,023 | 15,106 | 40,088 | 11,218 | 18,511 | 46,182 | 14,205 | 27,792 | 7,816 | |
| Filtered FP calls 4,491 | 5,443 | 9,503 | 4,606 | 6,326 | 11,326 | 4,775 | 8,564 | 3,111 | | |
| Filtered FN calls 16,988 | 19,014 | 49,330 | 15,302 | 22,152 | 49,443 | 17,436 | 34,482 | 8,984 | | |
| Change | in FP | - | | | | | | | | |
| calls | -6,088 | -5,055 | -5,099 | -6,462 | -4,686 | -3,696 | -3,647 | 13,840 | -2,327 | |
| Change | in FN | | | | | | | | | |
| calls | 3,965 | 3,908 | 9,242 | 4,084 | 3,641 | 3,261 | 3,231 | 6,690 | 1,168 | |
| Final FP calls with shared FP removed | 2,825 | 3,777 | 7,837 | 2,940 | 4,660 | 9,660 | 3,109 | 6,898 | 3,111 | |

| | | | | | | | |
|---|---|---|---|---|---|---|---|
| TABLE | 4 | | | | | | |
| stLFR-1 | stLFR-2 | stLFR-3 | stLFR-4 | | | | |
| Total bases | | | | | | | |
| 336 | 230 | 100 | 660 | 200 | 100 | 117 | 126 |
| sequenced | (Gb) | | | | | | |
| % | heterozygous | | | | | | |
| 99.9% | 99.9% | 99.7% | 99.9% | 99.9% | 99.6% | 99.1% | 99.0% |
| SNPs | phased | | | | | | |
| % | heterozygous | | | | | | |
| 96.8% | 96.6% | 94.9% | 97.1% | 96.2% | 94.1% | 93.9% | 90.9% |
| Indels phased | | | | | | | |
| Contig N50 size | | | | | | | |
| 23.4 | 19.7 | 13 | 10.5 | 7.3 | 4.1 | 1.2 | 2.1 |
| (Mb) | | | | | | | |
| Short switch | | | | | | | |
| 0.00939 | 0.00938 | 0.00988 | 0.00943 | 0.00935 | 0.01002 | 0.01171 | 0.01212 |
| error rate | | | | | | | |
| Long | switch | | | | | | |
| 0.00332 | 0.00337 | 0.00340 | 0.00313 | 0.00337 | 0.00321 | 0.00390 | 0.00426 |
| error rate | | | | | | | |

TABLE 5

| stLFR-1 | stLFR-1 | stLFR-1 | stLFR-2 | stLFR-2 | stLFR-2 | stLFR- | stLFR- | ST | | | |
|---|---|---|---|---|---|---|---|---|---|---|---|
| Criteria | 336 Gb | 230 Gb | 100 | Gb | 660 | Gb | 200 Gb | 100 | Gb | 3 | 4 D |
| GQ | 23 | 18 | 18 | 41 | 12 | 0 | 13 | 3 | 41 | | |
| min | 0.2 | | | | | | | | | | |
| ?+0- | Ref/Alt | 0.125 | 0.125 | 0.15 | 0.2 | 0.1 | 0.07 | 0.105 | 0.11 | 2 | |
| z | | | | | | | | | | | |
| v-) | | | | | | | | | | | |
| max | | | | | | | | | | | |
| Ref/Alt | 6.68 | 6.68 | 5 | 6.7 | 6.68 | 6.67 | 6.5 | 4.8 | 5.3 | | |
| Barcod | | | | | | | | | | | |
| es | ref <1 | ref <1 | ref <1 | ref <2 | ref <2 | ref <2 | ref <1 | alt <1 | NA | | |
| GQ | 70 | 60 | 45 | 80 | 65 | 40 | 60 | 50 | 95 | | |
| v, | min | | | | | | | | | | |
| a) | | | | | | | | | | | |
| -0 | Ref/Alt | 0.3 | 0.27 | 0.2 | 0.27 | 0.28 | 0.2 | 0.3 | 0.22 | 0.4 | |
| c | | | | | | | | | | | |
| _ | | | | | | | | | | | |
| max | | | | | | | | | | | |
| Ref/Alt | 3.2 | 3.5 | 5 | 3.2 | 4.2 | 5 | 3.5 | 5 | 3 | | |

TABLE 6

| | | |
|---|---|---|
| BeadCommonT | SEQ. ID NO: 14 | /52-Bio/AAAAAAAAAATGTGAGCCAAGGAGTTG |
| BeadCommonB | SEQ. ID NO: 15 | CCAGAGCAACTCCTTGGCTCACA |
| Bridge | SEQ. ID NO: 16 | GCACUGACGACAUGAUCACCAAGGAUCGCCAUAGUCCAUGCUA |
| For BGISEQ-500 | | |
| Transposon1T | SEQ. ID NO: 17 | /5Phos/CGATCCTTGGTGATCATGTCGTCAGTGCTTGTCTTCCTAAGATGTGTATAAGAGACAG |
| Transposon2T | SEQ. ID NO: 18 | GCCTCCCTCGCGCCATCAGAGATGTGTATAAGAGACAG |
| TransposonB | SEQ. ID NO: 19 | /5Phos/CTGUCTCUTATACACAUCT |
| PCR1 | SEQ. ID NO: 20 | TGTGAGCCAAGGAGTTG |
| PCR2 | SEQ. ID NO: 21 | GCCTCCCTCGCGCCATCAG |
| Sequencing Primers | | |
| BGI R1 Seq Primer | SEQ. ID NO: 22 | GCCTCCCTCGCGCCATCAGAGATGTGTATAAGAGACAG |
| BGI stLFR Barcode seq Primer | SEQ. ID NO: 23 | CGAGAACGTCTTGTGAGCCAAGGAGTTGCTCTGG |
| BGI R2 Seq Primer | SEQ. ID NO: 24 | CGTCAGTGCTTGTCTTCCTAAGATGTGTATAAGAGACAG |
| BGI MDA Primer 1 | SEQ. ID NO: 25 | TGATCACCAAGGATCGCCATAGTCCATGCTA |

TABLE 6-continued

| | | |
|---|---|---|
| BGI MDA Primer 2 | SEQ. ID NO: 26 | CTGTCTCTTATACACATCTTAGGAAGACAAGCACTGACGA |
| For 3' branch ligation | | |
| 3' branch ligation adapter-F | SEQ. ID NO: 27 | /5Phos/CTGATGGCGCGAGGGAGGC |
| 3' branch ligation adapter-R | SEQ. ID NO: 28 | TCGCGCCATCA/3'dd/G |
| Sequencing Primer | | |
| R1 Seq Primer Gap | SEQ. ID NO: 29 | CAACTCCTTGGCTCACACGGAGGGAGCGCGGTAGTC |

TABLE 7

| Ligation efficiency | | | | | |
|---|---|---|---|---|---|
| | Ligation efficiency Substrate | | | | |
| | 1 | 2 | 3 | 4 | 5 |
| Adapter | Nick | overhang | 1 nt gap | 2 nt gap | 3 nt gap |
| Ad-T | 15.2% | 79.5% | 89.6% | 88.9% | 83.9% |
| Ad-A | 12.0% | 88.6% | 77.5% | 68.3% | 83.9% |
| Ad-GA | 7.7% | 58.9% | 80.5% | 56.4% | 59.2% |

| | | | | | | | | | |
|---|---|---|---|---|---|---|---|---|---|
| Substrate | LI ati ri product | | | | | | | | |
| Normalized | ’ | n | | | | | | | |
| Size | intensity | Intensity | Size | e | " | y | | | |
| fni) | (pixel) | (nt) | | | | | | | |
| inixelintit | xelinti | | | | | | | | |
| . | 19044?+076 | 705?+036 | 5U62Oo | 103.3112,77% | | | | | |
| 27 | 13120,29 | 486,94 | 492280769 | 465,’4648,92% | | | | | |
| 14042,49 | 561,70 | 471906050 | 405.5441,93% | | | | | | |
| 11 | 3’-recessive end | 27 | 1376,23 | 50.97 | 49 | 17684,29 | 360,90 | 87,62% | |
| 14 | Buntzend | o5nti-o1 | 40 | 53 1,44 | 13279 | 2 | 21973,00 | 354,40 | 72.14% |

TABLE 8

| | | | | | | | | |
|---|---|---|---|---|---|---|---|---|
| Subtrate | Litigation product | | | | | | | |
| Subtrate type | Donor | type | Normalized | Normalized | Ligation | | | |
| Size (nt) | Intensity (pixel) | intensity | Size (nt) | Intensity (pixel) | intensity | efficiency | | |
| (pixel/nt) | (pixel/nt) | | | | | | | |
| Ad-T | 124 | 11801.78 | 95.18 | 156 | 1744.01 | 11.18 | 10.51% | |
| Nick | Ad-A | 124 | 13130.49 | 105.89 | 182 | 1091.70 | 6.00 | 5.36% |
| Ad-GA | 124 | 12810.37 | 103.31 | 184 | 603.87 | 3.28 | 3.08% | |
| Ad-T | 123 | 2561.08 | 20.82 | 155 | 23719.00 | 153.03 | 88.02% | |
| 1-nt gap | Ad-A | 123 | 2058.55 | 16.74 | 181 | 7034.96 | 38.87 | 69.90% |
| Ad-GA | 123 | 1709.67 | 13.90 | 183 | 8340.98 | 45.58 | 76.63% | |
| Ad-T | 122 | 1164.89 | 9.55 | 154 | 6909.36 | 44.87 | 82.45% | |
| 2-nt gap | Ad-A | 122 | 3882.74 | 31.83 | 180 | 7688.03 | 42.71 | 57.30% |
| Ad-GA | 122 | 6573.57 | 53.88 | 182 | 8495.74 | 46.68 | 46.42% | |
| Ad-T | 121 | 2344.08 | 19.37 | 153 | 11764.83 | 76.89 | 79.88% | |
| 3-nt gap | Ad-A | 121 | 1974.72 | 16.32 | 179 | 9738.98 | 54.41 | 76.93% |
| Ad-GA | 121 | 8896.47 | 73.52 | 181 | 10145.81 | 56.05 | 43.26% | |
| Ad-T | 108 | 1934.79 | 17.91 | 140 | 8791.10 | 62.79 | 77.80% | |
| 3’-recessive end | Ad-A | 108 | 1070.23 | 9.91 | 166 | 7834.38 | 47.20 | 82.65% |
| Ad-GA | 108 | 5675.05 | 52.55 | 168 | 7206.26 | 42.89 | 44.94% | |

The invention claimed is:

1. A method of preparing a sequencing library for sequencing a target nucleic acid without the use of nanodrops, comprising:

(a) transposing an insertion sequence in a transposome into first fragments derived from the target nucleic acid while the transposome is in solution, wherein the insertion sequence comprises a hybridization sequence, and wherein the transposing produces nicks in the first fragments and 3' hydroxyl at said nicks; (b) combining in a single vessel or mixture (i) the first fragments of the target nucleic acid from (a), (ii) a splint oligonucleotide, and (iii) a population of beads, wherein each bead comprises capture oligonucleotides immobilized thereon, said capture oligonucleotides comprising 1) A barcode-containing sequence, wherein the capture oligonucleotides immobilized on the same individual bead comprise the same barcode-containing sequence and a majority of beads have different barcode-containing sequences, 2) A common sequence complementary to at least a portion of the splint oligonucleotide, where a second portion of the splint oligonucleotide is complementary to at least a portion of the hybridization sequence;

(c) ligating capture oligonucleotides of individual beads to inserted hybridization sequences of individual first fragments; and (d) ligating a 3' branch ligation adaptor oligonucleotide to the first fragments at the nicks via a 3' branch ligation, wherein 3' branch ligation adaptor oligonucleotide is a blunt end adaptor and 3' branch ligation comprises joining of 5' phosphate from the blunt-end adapter covalently to the 3' hydroxyl at the nicks of the first fragments.

2. The method of claim 1 wherein the capture oligonucleotides comprise a first PCR primer annealing site, and wherein 3' branch ligation adaptor oligonucleotide comprises a second PCR primer annealing site.

3. The method of claim 2 wherein the first PCR primer annealing site and the second PCR primer annealing site have different sequences.

4. The method of claim 2 wherein 3' branch ligation adaptor oligonucleotide comprises a tag sequence.

5. The method of claim 1 wherein in the step of transposing the insertion sequence into the first fragments a transposase enzyme remains bound to the first fragments; wherein the method further comprises (d) removing the transposase from the first fragments thereby producing subfragments.

6. The method of claim 5 comprising amplifying the subfragments to produce amplicons.

7. The method of claim 6 comprising sequencing the amplicons to produce sequence reads wherein sequence reads with the same barcode-containing sequence are from the same first fragment.

8. The method of claim 1 wherein the target nucleic acid is human genomic DNA.

9. The method of claim 1 wherein two different insertion sequences are inserted into the first fragments.

10. The method of claim 1 wherein the target nucleic acid is not amplified prior to step (a).

11. The method of claim 1 wherein the beads comprise at least 100,000 copies of the capture oligonucleotide.

12. The method of claim 6 wherein at least some capture oligonucleotides are enzymatically removed using exonuclease, optionally exonuclease I or III or both.

13. The method of claim 1 wherein the capture oligonucleotides and/or the splint oligonucleotides comprise uracil such that treatment with a uracil-DNA glycosylase (UDG) degrades uracil-containing oligonucleotides.

14. The method of claim 1 wherein >90% of the first fragments are barcoded.

15. The method of claim 5 wherein >90% of subfragments in a fragment are ligated to capture oligonucleotide.

16. The method of claim 1 wherein, on average, the spacing of the capture oligonucleotides on the beads is <30 nm.

17. The method of claim 7 wherein >50% of the subfragments are sequenced.

18. The method of claim 7 further comprising:

(e) assigning a majority of the sequence reads to corresponding first fragments; and (f) assembling the sequence reads to produce an assembled sequence of the target nucleic acid.

19. The method of claim 1 wherein the majority of first fragments in step (a) are longer than 20 kb.

20. The method of claim 1 wherein a majority of the first fragments are in a range of from 50 kilobases to 200 kilobases in length.

21. The method of claim 1 wherein the first fragments are from a single cell.

22. The method of claim 1 wherein the first fragments in the single mixture contains 5-100 genome equivalents of human DNA.

23. The method of claim 1 in which the population of beads comprises, in aggregate, at least 100,000 different tag sequences.

24. The method of claim 1, wherein the first fragments are duplex DNA or DNA/RNA hybrid molecules.

25. The method of claim 1, wherein ligating the first oligonucleotide to the first fragments is by a T4 DNA ligase.

26. The method of claim 1, wherein first fragments are concatemers of DNA.

27. The method of claim 1, wherein a plurality of first fragments are from a single cell.

28. The method of claim 1, wherein, on average, the spacing of the adaptor oligonucleotide on the beads is <10 nm, <15 nm, <20 nm, <30 nm, <40 nm, or 50 nm.

29. The method of claim 1, wherein the population of beads comprises 10-50 million beads.

30. The method of claim 1, wherein the beads have a diameter in a range of 2 μm-8 μm.

* * * * *

SEQUENCE LISTING

<160> NUMBER OF SEQ ID NOS: 31

<210> SEQ ID NO 1
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
aaaaaaaacc cgtagccatg tcgttctg                                        28

<210> SEQ ID NO 2
<211> LENGTH: 32
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (7)..(26)
<223> OTHER INFORMATION: a, c, t, g, unknown or other
<220> FEATURE:
<221> NAME/KEY: misc_feature
<222> LOCATION: (7)..(26)
<223> OTHER INFORMATION: This region may encompass 4-20 nucleotides

<400> SEQUENCE: 2
ctctggnnnn nnnnnnnnnn nnnnnntctg cg                                   32

<210> SEQ ID NO 3

<211> LENGTH: 26
<212> TYPE: DNA
<213> ORGANISM: Artificial Sequence
<220> FEATURE:
<223> OTHER INFORMATION: Description of Artificial Sequence: Synthetic
oligonucleotide

<400> SEQUENCE: 3
ccagagcaga acgacatggc tacggg 26

<210> SEQ ID NO 4
<211> LENGTH: 60
<212> TYPE: DNA
<213> ORGANISM: Artificial Sequence
<220> FEATURE:
<223> OTHER INFORMATION: Description of Artificial Sequence: Synthetic
oligonucleotide
<220> FEATURE:
<221> NAME/KEY: modified_base
<222> LOCATION: (35)..(54)
<223> OTHER INFORMATION: a, c, t, g, unknown or other
<220> FEATURE:
<221> NAME/KEY: misc_feature
<222> LOCATION: (35)..(54)
<223> OTHER INFORMATION: This region may encompass 4-20 nucleotides

<400> SEQUENCE: 4
aaaaaaaacc cgtagccatg tcgttctgct ctggnnnnnn nnnnnnnnnn nnnntctgcg 60

<210> SEQ ID NO 5
<211> LENGTH: 46
<212> TYPE: DNA
<213> ORGANISM: Artificial Sequence
<220> FEATURE:
<223> OTHER INFORMATION: Description of Artificial Sequence: Synthetic
oligonucleotide
<220> FEATURE:
<221> NAME/KEY: modified_base
<222> LOCATION: (1)..(20)
<223> OTHER INFORMATION: a, c, t, g, unknown or other
<220> FEATURE:
<221> NAME/KEY: misc_feature
<222> LOCATION: (1)..(20)
<223> OTHER INFORMATION: This region may encompass 4-20 nucleotides

<400> SEQUENCE: 5
nnnnnnnnnn nnnnnnnnnn ccagagcaga acgacatggc tacggg 46

<210> SEQ ID NO 6
<211> LENGTH: 60
<212> TYPE: DNA
<213> ORGANISM: Artificial Sequence
<220> FEATURE:
<223> OTHER INFORMATION: Description of Artificial Sequence: Synthetic
oligonucleotide
<220> FEATURE:
<221> NAME/KEY: modified_base
<222> LOCATION: (35)..(54)
<223> OTHER INFORMATION: a, c, t, g, unknown or other
<220> FEATURE:
<221> NAME/KEY: misc_feature
<222> LOCATION: (35)..(54)
<223> OTHER INFORMATION: This region may encompass 4-20 nucleotides

<400> SEQUENCE: 6
aaaaaaaacc cgtagccatg tcgttctgct ctggnnnnnn nnnnnnnnnn nnnntctgcg 60

<210> SEQ ID NO 7
<211> LENGTH: 46
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (1)..(20)
<223> OTHER INFORMATION: a, c, t, g, unknown or other
<220> FEATURE:
<221> NAME/KEY: misc_feature
<222> LOCATION: (1)..(20)
<223> OTHER INFORMATION: This region may encompass 4-20 nucleotides

<400> SEQUENCE: 7
nnnnnnnnnn nnnnnnnnnn ccagagcaga acgacatggc tacggg 46

<210> SEQ ID NO 8
<211> LENGTH: 80
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (35)..(54)
<223> OTHER INFORMATION: a, c, t, g, unknown or other
<220> FEATURE:
<221> NAME/KEY: misc_feature
<222> LOCATION: (35)..(54)
<223> OTHER INFORMATION: This region may encompass 4-20 nucleotides
<220> FEATURE:
<221> NAME/KEY: modified_base
<222> LOCATION: (61)..(80)
<223> OTHER INFORMATION: a, c, t, g, unknown or other
<220> FEATURE:
<221> NAME/KEY: misc_feature
<222> LOCATION: (61)..(80)
<223> OTHER INFORMATION: This region may encompass 4-20 nucleotides

<400> SEQUENCE: 8
aaaaaaaacc cgtagccatg tcgttctgct ctggnnnnnn nnnnnnnnnn nnnntctgcg 60
nnnnnnnnnn nnnnnnnnnn 80

<210> SEQ ID NO 9
<211> LENGTH: 78
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (7)..(26)
<223> OTHER INFORMATION: a, c, t, g, unknown or other
<220> FEATURE:
<221> NAME/KEY: misc_feature
<222> LOCATION: (7)..(26)
<223> OTHER INFORMATION: This region may encompass 4-20 nucleotides
<220> FEATURE:
<221> NAME/KEY: modified_base
<222> LOCATION: (33)..(52)
<223> OTHER INFORMATION: a, c, t, g, unknown or other
<220> FEATURE:
<221> NAME/KEY: misc_feature
<222> LOCATION: (33)..(52)
<223> OTHER INFORMATION: This region may encompass 4-20 nucleotides

<400> SEQUENCE: 9
ggaaggnnnn nnnnnnnnnn nnnnnncgca gannnnnnnn nnnnnnnnnn nnccagagca 60
gaacgacatg gctacggg 78

<210> SEQ ID NO 10
<211> LENGTH: 121
<212> TYPE: DNA
<213> ORGANISM: Artificial Sequence
<220> FEATURE:
<223> OTHER INFORMATION: Description of Artificial Sequence: Synthetic
polynucleotide
<220> FEATURE:
<221> NAME/KEY: modified_base
<222> LOCATION: (35)..(54)
<223> OTHER INFORMATION: a, c, t, g, unknown or other
<220> FEATURE:
<221> NAME/KEY: misc_feature
<222> LOCATION: (35)..(54)
<223> OTHER INFORMATION: This region may encompass 4-20 nucleotides
<220> FEATURE:
<221> NAME/KEY: modified_base
<222> LOCATION: (61)..(80)
<223> OTHER INFORMATION: a, c, t, g, unknown or other
<220> FEATURE:
<221> NAME/KEY: misc_feature
<222> LOCATION: (61)..(80)
<223> OTHER INFORMATION: This region may encompass 4-20 nucleotides
<220> FEATURE:
<221> NAME/KEY: modified_base
<222> LOCATION: (87)..(106)
<223> OTHER INFORMATION: a, c, t, g, unknown or other
<220> FEATURE:
<221> NAME/KEY: misc_feature
<222> LOCATION: (87)..(106)
<223> OTHER INFORMATION: This region may encompass 4-20 nucleotides

<400> SEQUENCE: 10
aaaaaaaacc cgtagccatg tcgttctgct ctggnnnnnn nnnnnnnnnn nnnntctgcg 60
nnnnnnnnnn nnnnnnnnnn ccttccnnnn nnnnnnnnnn nnnnnntagc atggactatg 120
g 121

<210> SEQ ID NO 11
<211> LENGTH: 113
<212> TYPE: DNA
<213> ORGANISM: Artificial Sequence
<220> FEATURE:
<223> OTHER INFORMATION: Description of Artificial Sequence: Synthetic
polynucleotide
<220> FEATURE:
<221> NAME/KEY: modified_base
<222> LOCATION: (16)..(35)
<223> OTHER INFORMATION: a, c, t, g, unknown or other
<220> FEATURE:
<221> NAME/KEY: misc_feature
<222> LOCATION: (16)..(35)
<223> OTHER INFORMATION: This region may encompass 4-20 nucleotides
<220> FEATURE:
<221> NAME/KEY: modified_base
<222> LOCATION: (42)..(61)
<223> OTHER INFORMATION: a, c, t, g, unknown or other
<220> FEATURE:
<221> NAME/KEY: misc_feature
<222> LOCATION: (42)..(61)
<223> OTHER INFORMATION: This region may encompass 4-20 nucleotides
<220> FEATURE:
<221> NAME/KEY: modified_base
<222> LOCATION: (68)..(87)
<223> OTHER INFORMATION: a, c, t, g, unknown or other
<220> FEATURE:
<221> NAME/KEY: misc_feature
<222> LOCATION: (68)..(87)
<223> OTHER INFORMATION: This region may encompass 4-20 nucleotides

<400> SEQUENCE: 11
ccatagtcca tgctannnnn nnnnnnnnnn nnnnnggaag gnnnnnnnnn nnnnnnnnnn 60
ncgcagannn nnnnnnnnnn nnnnnnncca gagcagaacg acatggctac ggg 113

<210> SEQ ID NO 12
<211> LENGTH: 121
<212> TYPE: DNA
<213> ORGANISM: Artificial Sequence
<220> FEATURE:
<223> OTHER INFORMATION: Description of Artificial Sequence: Synthetic
polynucleotide
<220> FEATURE:
<221> NAME/KEY: modified_base
<222> LOCATION: (35)..(54)
<223> OTHER INFORMATION: a, c, t, g, unknown or other
<220> FEATURE:
<221> NAME/KEY: misc_feature
<222> LOCATION: (35)..(54)
<223> OTHER INFORMATION: This region may encompass 4-20 nucleotides
<220> FEATURE:
<221> NAME/KEY: modified_base
<222> LOCATION: (61)..(80)
<223> OTHER INFORMATION: a, c, t, g, unknown or other
<220> FEATURE:
<221> NAME/KEY: misc_feature
<222> LOCATION: (61)..(80)
<223> OTHER INFORMATION: This region may encompass 4-20 nucleotides
<220> FEATURE:
<221> NAME/KEY: modified_base
<222> LOCATION: (87)..(106)
<223> OTHER INFORMATION: a, c, t, g, unknown or other
<220> FEATURE:
<221> NAME/KEY: misc_feature
<222> LOCATION: (87)..(106)
<223> OTHER INFORMATION: This region may encompass 4-20 nucleotides

<400> SEQUENCE: 12
aaaaaaaacc cgtagccatg tcgttctgct ctggnnnnnn nnnnnnnnnn nnnntctgcg 60
nnnnnnnnnn nnnnnnnnnn ccttccnnnn nnnnnnnnnn nnnnnntagc atggactatg 120
g 121

<210> SEQ ID NO 13
<211> LENGTH: 121
<212> TYPE: DNA
<213> ORGANISM: Artificial Sequence
<220> FEATURE:
<223> OTHER INFORMATION: Description of Artificial Sequence: Synthetic
polynucleotide
<220> FEATURE:
<221> NAME/KEY: modified_base
<222> LOCATION: (35)..(54)
<223> OTHER INFORMATION: a, c, t, g, unknown or other
<220> FEATURE:
<221> NAME/KEY: misc_feature
<222> LOCATION: (35)..(54)
<223> OTHER INFORMATION: This region may encompass 4-20 nucleotides
<220> FEATURE:
<221> NAME/KEY: modified_base
<222> LOCATION: (61)..(80)
<223> OTHER INFORMATION: a, c, t, g, unknown or other
<220> FEATURE:
<221> NAME/KEY: misc_feature
<222> LOCATION: (61)..(80)
<223> OTHER INFORMATION: This region may encompass 4-20 nucleotides
<220> FEATURE:
<221> NAME/KEY: modified_base
<222> LOCATION: (87)..(106)
<223> OTHER INFORMATION: a, c, t, g, unknown or other
<220> FEATURE:
<221> NAME/KEY: misc_feature
<222> LOCATION: (87)..(106)
<223> OTHER INFORMATION: This region may encompass 4-20 nucleotides

<400> SEQUENCE: 13
aaaaaaaacc cgtagccatg tcgttctgct ctggnnnnnn nnnnnnnnnn nnnntctgcg 60
nnnnnnnnnn nnnnnnnnnn ccttccnnnn nnnnnnnnnn nnnnnntagc atggactatg 120
g 121

<210> SEQ ID NO 14
<211> LENGTH: 27
<212> TYPE: DNA
<213> ORGANISM: Artificial Sequence
<220> FEATURE:
<223> OTHER INFORMATION: Description of Artificial Sequence: Synthetic
oligonucleotide

<400> SEQUENCE: 14
aaaaaaaaaa tgtgagccaa ggagttg 27

<210> SEQ ID NO 15
<211> LENGTH: 23
<212> TYPE: DNA
<213> ORGANISM: Artificial Sequence
<220> FEATURE:
<223> OTHER INFORMATION: Description of Artificial Sequence: Synthetic
oligonucleotide

<400> SEQUENCE: 15
ccagagcaac tccttggctc aca 23

<210> SEQ ID NO 16
<211> LENGTH: 43
<212> TYPE: RNA
<213> ORGANISM: Artificial Sequence
<220> FEATURE:
<223> OTHER INFORMATION: Description of Artificial Sequence: Synthetic
oligonucleotide

<400> SEQUENCE: 16
gcacugacga caugaucacc aaggaucgcc auaguccaug cua 43

<210> SEQ ID NO 17
<211> LENGTH: 58
<212> TYPE: DNA
<213> ORGANISM: Artificial Sequence
<220> FEATURE:
<223> OTHER INFORMATION: Description of Artificial Sequence: Synthetic
oligonucleotide

<400> SEQUENCE: 17
cgatccttgg tgatcatgtc gtcagtgctt gtcttcctaa gatgtgtata agagacag 58

<210> SEQ ID NO 18
<211> LENGTH: 38
<212> TYPE: DNA
<213> ORGANISM: Artificial Sequence
<220> FEATURE:
<223> OTHER INFORMATION: Description of Artificial Sequence: Synthetic
oligonucleotide

<400> SEQUENCE: 18
gcctccctcg cgccatcaga gatgtgtata agagacag 38

<210> SEQ ID NO 19
<211> LENGTH: 19
<212> TYPE: DNA
<213> ORGANISM: Artificial Sequence
<220> FEATURE:
<223> OTHER INFORMATION: Description of Artificial Sequence: Synthetic
oligonucleotide
<220> FEATURE:
<223> OTHER INFORMATION: Description of Combined DNA/RNA Molecule:
Synthetic oligonucleotide

```
<400> SEQUENCE: 19

ctguctcuta tacacauct                                               19

<210> SEQ ID NO 20
<211> LENGTH: 17
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 20

tgtgagccaa ggagttg                                                 17

<210> SEQ ID NO 21
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 21

gcctccctcg cgccatcag                                               19

<210> SEQ ID NO 22
<211> LENGTH: 38
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 22

gcctccctcg cgccatcaga gatgtgtata agagacag                          38

<210> SEQ ID NO 23
<211> LENGTH: 34
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 23

cgagaacgtc ttgtgagcca aggagttgct ctgg                              34

<210> SEQ ID NO 24
<211> LENGTH: 39
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 24

cgtcagtgct tgtcttccta agatgtgtat aagagacag                         39

<210> SEQ ID NO 25
<211> LENGTH: 31
<212> TYPE: DNA
<213> ORGANISM: Artificial Sequence
<220> FEATURE:
<223> OTHER INFORMATION: Description of Artificial Sequence: Synthetic
      primer
```

<400> SEQUENCE: 25
tgatcaccaa ggatcgccat agtccatgct a 31

<210> SEQ ID NO 26
<211> LENGTH: 40
<212> TYPE: DNA
<213> ORGANISM: Artificial Sequence
<220> FEATURE:
<223> OTHER INFORMATION: Description of Artificial Sequence: Synthetic
primer

<400> SEQUENCE: 26
ctgtctctta tacacatctt aggaagacaa gcactgacga 40

<210> SEQ ID NO 27
<211> LENGTH: 19
<212> TYPE: DNA
<213> ORGANISM: Artificial Sequence
<220> FEATURE:
<223> OTHER INFORMATION: Description of Artificial Sequence: Synthetic
oligonucleotide

<400> SEQUENCE: 27
ctgatggcgc gagggaggc 19

<210> SEQ ID NO 28
<211> LENGTH: 12
<212> TYPE: DNA
<213> ORGANISM: Artificial Sequence
<220> FEATURE:
<223> OTHER INFORMATION: Description of Artificial Sequence: Synthetic
oligonucleotide

<400> SEQUENCE: 28
tcgcgccatc ag 12

<210> SEQ ID NO 29
<211> LENGTH: 36
<212> TYPE: DNA
<213> ORGANISM: Artificial Sequence
<220> FEATURE:
<223> OTHER INFORMATION: Description of Artificial Sequence: Synthetic
primer

<400> SEQUENCE: 29
caactccttg gctcacacgg agggagcgcg gtagtc 36

<210> SEQ ID NO 30
<211> LENGTH: 43
<212> TYPE: RNA
<213> ORGANISM: Artificial Sequence
<220> FEATURE:
<223> OTHER INFORMATION: Description of Artificial Sequence: Synthetic
oligonucleotide

<400> SEQUENCE: 30
gcacugacga caugaucacc aaggaucgcc auaguccaug cua 43

<210> SEQ ID NO 31

-continued

```
<211> LENGTH: 13
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 31

cccccccccc ccc                                                     13
```